US012649807B2

(12) United States Patent
Urakawa

(10) Patent No.: US 12,649,807 B2
(45) Date of Patent: Jun. 9, 2026

(54) COMPOSITION AND CURED PRODUCT

(71) Applicant: TOKYO OHKA KOGYO CO., LTD., Kanagawa (JP)

(72) Inventor: Kazuki Urakawa, Kanagawa (JP)

(73) Assignee: TOKYO OHKA KOGYO CO., LTD., Kanagawa (JP)

(*) Notice: Subject to any disclaimer, the term of this patent is extended or adjusted under 35 U.S.C. 154(b) by 693 days.

(21) Appl. No.: 18/160,435

(22) Filed: Jan. 27, 2023

(65) Prior Publication Data

US 2023/0242692 A1 Aug. 3, 2023

(30) Foreign Application Priority Data

Jan. 31, 2022 (JP) ................................ 2022-013476
Dec. 23, 2022 (JP) ................................ 2022-207168

(51) Int. Cl.

*C08F 136/22* (2006.01)
*C08K 3/11* (2018.01)
*C08K 3/22* (2006.01)
*C08K 5/5415* (2006.01)

(52) U.S. Cl.

CPC .............. *C08F 136/22* (2013.01); *C08K 3/11* (2018.01); *C08K 3/22* (2013.01); *C08K 5/5415* (2013.01); *C08K 2003/2237* (2013.01)

(58) Field of Classification Search

None
See application file for complete search history.

(56) References Cited

U.S. PATENT DOCUMENTS

2008/0200582 A1* 8/2008 Craciun ........... B29D 11/00442 525/451
2010/0058955 A1* 3/2010 Tanaka ..................... G02B 1/14 351/159.57
2010/0117503 A1* 5/2010 Mizuno .................. C01G 25/02 977/773
2012/0065312 A1* 3/2012 Ishihara ................. B82Y 30/00 524/413

FOREIGN PATENT DOCUMENTS

JP 2008019422 A 1/2008
JP 2008248169 A 10/2008
JP 2017-214465 A 12/2017

OTHER PUBLICATIONS

Inomata et al., "Evaluation of Optical Thin Films and Development of Functional Thin Film Materials", Journal of The Surface Finishing Society of Japan, 2020, vol. 71, No. 10, pp. 613-619; English abstract.

Ghicov et al., "Self-ordering electrochemistry: a review on growth and functionality of TiO2 nanotubes and other self-aigned MOx structuctures", Chemical Communication, 2009, pp. 2791-2808.

* cited by examiner

*Primary Examiner* — Katarzyna I Kolb

(74) *Attorney, Agent, or Firm* — Rankin, Hill & Clark LLP

(57) ABSTRACT

A composition that gives a cured product having both of high refractive index and high light transmittance, and a cured product of said composition are provided. In the composition including a photopolymerizable compound (A) and metal oxide particles (B), metal oxide particles (B) where those surfaces are functionalized with a functionalizing agent, and which are composed of a metal oxide that exhibits a refractive index of 2.0 or higher for light at a wavelength of 550 nm are used, and a first functionalizing agent including a metal atom having HOMO-LUMO band gap of more than 3.1 eV and 6.0 eV or less, and a second functionalizing agent having a spacer group and not corresponding to the first functionalizing agent are used as the functionalizing agent in combination.

16 Claims, No Drawings

COMPOSITION AND CURED PRODUCT

BACKGROUND OF THE INVENTION

Field of the Invention

The present invention relates to a composition including a photopolymerizable compound (A) and metal oxide particles and a cured product of said composition.

Related Art

Heretofore, various inorganic particles are blended into compositions used to form materials with various functionalities for the purpose of imparting functionality to the materials. For example, for forming optical materials, highly refractive materials are used. A composition in which metal oxide particles such as titanium oxide and zirconium oxide are dispersed is used as highly refractive material, for example. As a composition for forming such a highly refractive material, an energy beam curable composition including a metal oxide (A) with a specific particle size, (meth)acrylate (B), and a photoinitiator (C) has been proposed (see Patent Document 1).

Patent Document 1: Japanese Unexamined Patent Application, Publication No. 2017-214465

SUMMARY OF THE INVENTION

However, in translucent materials, there is often a trade-off between the refractive index and the light transmittance. When the composition described in Patent Document 1, it is difficult to form a cured product having both of high refractive index and high light transmittance.

In light of the above problems, the present invention has been made and an object thereof is to provide a composition that gives a cured product having both of high refractive index and high light transmittance, and a cured product of said composition.

The present inventors have found that the above problems can be solved by using metal oxide particles (B) where those surfaces are functionalized with a functionalizing agent, and which are composed of a metal oxide that exhibits a refractive index of 2.0 or higher for light at a wavelength of 550 nm in a composition including a photopolymerizable compound (A) and the metal oxide particles (B), and using a first functionalizing agent including a metal atom having HOMO-LUMO band gap of more than 3.1 eV and 6.0 eV or less, and a second functionalizing agent having a spacer group and not corresponding to the first functionalizing agent as the functionalizing agent in combination. Thus, the present invention has been completed. Specifically, the present invention provides the followings.

A first aspect of the present invention is directed to a composition including a photopolymerizable compound (A) and metal oxide particles (B), wherein the metal oxide particles (B) are composed of a metal oxide including a metal oxide that exhibits a refractive index of 2.0 or higher for light at a wavelength of 550 nm, and the surfaces of the metal oxide particles (B) are functionalized with a functionalizing agent, wherein the functionalizing agent including:

a first functionalizing agent including a metal atom having a HOMO-LUMO band gap of more than 3.1 eV and 6.0 eV or less as oxide, and a second functionalizing agent having a spacer group and not corresponding to the first functionalizing agent.

A second aspect of the present invention is directed to a cured product of the composition according to the first aspect.

According to the present invention, it is possible to provide a composition that gives a cured product having both of high refractive index and high light transmittance, and a cured product of said composition.

DETAILED DESCRIPTION OF THE INVENTION

<<Composition>>

A composition includes a photopolymerizable compound (A) and metal oxide particles (B). Therefore, the composition of the present invention is dispersion composition or photosensitive composition. Hereinafter, essential or optional components that may be included in the composition will be described.

<Photopolymerizable Compound (A)>

The composition includes a photopolymerizable compound (A). The photopolymerizable compound (A) is a compound having a radically polymerizable group-containing group or a cationically polymerizable group-containing group.

As the radically polymerizable group-containing group, typically, a group having an ethylenically unsaturated double bond is exemplified. As the ethylenically unsaturated double bond-containing group, an alkenyl group-containing group containing an alkenyl group such as a vinyl group or an allyl group is preferred, and a (meth)acryloyl group is more preferred. Examples of the cationically polymerizable group typically include an epoxy group-containing group, an oxetanyl group-containing group, a vinyloxy group-containing group, and a vinylthio group-containing group. Among these, an epoxy group-containing group and a vinyloxy group-containing group are preferred. Preferred epoxy group-containing groups are an alicyclic epoxy group-containing group and a glycidyl group. It should be noted that the alicyclic epoxy group is an aliphatic cyclic group in which adjacent two carbon atoms, as atoms constituting the ring, are bonded via an oxygen atom. That is, the alicyclic epoxy group has an epoxy group including a 3-membered ring composed of two carbon atoms and one oxygen atom on the aliphatic ring.

In the description and claims of the present application, (meth)acryl means both acryl and methacryl, (meth)acryloyl means both acryloyl and methacryloyl, and (meth)acrylate means both acrylate and methacrylate.

The photopolymerizable compound (A) is not particularly limited as long as the photopolymerizable compound (A) is a compound which gives transparent cured product. Since the cured product having good transparency and a high refractive index is easily obtained, the photopolymerizable compound (A) preferably includes a compound (A1) described below.

[Compound (A1)]

As described above, the photopolymerizable compound (A) preferably includes the compound represented by the formula (A1). In the present specification, the compound represented by the formula (A1) is referred to as "compound (A1)"

$$R^{a01}—X^{a03}—R^{a02}—X^{a01}\text{-}Ph^1\text{-}S\text{-}Ph^2\text{-}X^{a02}—R^{a04}—X^{a04}—R^{a03} \quad (A1)$$

In the formula (A1), $R^{a01}$ and $R^{a03}$ are each independently a radically polymerizable group-containing group or a cationically polymerizable group-containing group. $R^{a02}$ and $R^{a04}$ are each independently an alkylene group which may be interrupted with one or more oxygen atoms and/or one or more sulfur atoms. $X^{a01}$, $X^{a02}$, $X^{a03}$, and $X^{a04}$ are each independently oxygen atom or sulfur atom. $Ph^1$ and $Ph^2$ are each independently, a phenylene group optionally substituted with an alkyl group having 1 or more and 5 or less carbon atoms. Sum of a number of O and/or S included in the alkylene group as $R^{a02}$ and a number of O and/or S included in the alkylene group as $R^{a04}$ is 2 or more. The compound represented by the formula (A1) do not have the radically polymerizable group-containing group and the cationically polymerizable group-containing group simultaneously.

In the formula (A1), $Ph^1$ and $Ph^2$ are each independently, a phenylene group optionally substituted with an alkyl group having 1 or more and 5 or less carbon atoms. The phenylene group as $Ph^1$ and $Ph^2$ may be any of o-phenylene group, m-phenylene group and p-phenylene group, and is preferably p-phenylene group.

An aromatic group as $Ar^{a01}$ may be substituted with 1 or more groups selected from the group consisting of an alkyl group having 1 or more and 5 or less carbon atoms, a cyano group, and a halogen atom. A number of alkyl group as substituent bonding to the phenylene group as $Ph^1$ and $Ph^2$ is not particularly limited. Examples of the alkyl group having 1 or more and 5 or less carbon atoms include methyl group, ethyl group, n-propyl group, isopropyl group, n-butyl group, isobutyl group, sec-butyl group, tert-butyl group, n-pentyl group, isopentyl group, neopentyl group, sec-pentyl group, and tert-pentyl group. Among these groups, methyl group and ethyl group are preferred.

$R^{a01}$ and $R^{a03}$ are each independently a radically polymerizable group-containing group and a cationically polymerizable group-containing group. The radically polymerizable group-containing group and the cationically polymerizable group-containing group are as described above. The radically polymerizable group-containing group is preferably a (meth)acryloyl group-containing group, and more preferably a (meth)acryloyl group. The cationically polymerizable group-containing group as $R^{a01}$ and $R^{a03}$ is preferably vinyl group, vinyloxy group-containing group, and epoxy group-containing group, more preferably vinyl group, and epoxy group-containing group, and further preferably glycidyl group. The vinyl group is usually the radically polymerizable group. However, when $R^{a01}$ or $R^{a03}$ is vinyl group in the formula (A1), said vinyl group forms vinyloxy group or vinylthio group which is the cationically polymerizable group together with $X^{a03}$ or $X^{a04}$ which is oxygen atom or sulfur atom. Therefore, in the formula (A1), the vinyl group as $R^{a01}$ and $R^{a03}$ is defined as the cationically polymerizable group, not the radically polymerizable group. As the alicyclic epoxy group-containing group is preferably an alicyclic epoxy group represented by the formula (a1-IIIa) or (a1-IIIb) described below.

$R^{a02}$ and $R^{a04}$ are each independently an alkylene group which may be interrupted with one or more oxygen atoms and/or one or more sulfur atoms. $R^{a02}$ and $R^{a04}$ are preferably an alkylene group interrupted with one or more oxygen atoms and/or one or more sulfur atoms. A number of caron atoms in the alkylene group which may be interrupted with one or more oxygen atoms and/or one or more sulfur atoms as $R^{a02}$ and $R^{a04}$ is not particularly limited as long as the desired effect is impaired.

The alkylene group which may be interrupted with one or more oxygen atoms and/or one or more sulfur atoms as $R^{a02}$ and $R^{a04}$ preferably consists of ma aliphatic chain saturated hydrocarbon groups selected from the alkylene group having 1 or more and 4 or less carbon atoms, the alkanetriyl group having 1 or more and 4 or less carbon atoms, and (ma-1) oxygen atoms and/or sulfur atoms bridging the ma aliphatic chain saturated hydrocarbon groups. Herein, ma is an integer of 2 or more and 6 or less.

Suitable examples of the alkylene group having 1 or more and 4 or less carbon atoms include methylene group, ethane-1,2-diyl group (ethylene group), propane-1,3-diyl group, and butane-1,4-diyl group. Among these group, ethane-1,2-diyl group (ethylene group), propane-1,2-diyl group, and propane-1,3-diyl group are preferred. Suitable examples of the alkanetriyl group having 1 or more and 4 or less carbon atoms include propane-1,2,3-triyl group, butane-1,2,3-triyl group and butane-1,2,4-triyl group. Among these groups, propane-1,2,3-triyl group is preferred. Suitable examples of the alkyl group having 1 or more and 4 or less carbon atoms include methyl group, ethyl group, n-propyl group, isopropyl group, n-butyl group, isobutyl group, sec-butyl group, and tert-butyl group. Among these groups, methyl group and ethyl group are preferred.

The alkylene group which may be interrupted with one or more oxygen atoms and/or one or more sulfur atoms as $R^{a02}$ and $R^{a04}$ is preferably a group consisting of ma alkylene groups having 1 or more and 4 or less carbon atoms, and (ma-1) oxygen atoms and/or sulfur atoms bridging the ma alkylene groups. Herein, ma is an integer of 2 or more and 6 or less.

Suitable specific examples of the alkylene group which may be interrupted with one or more oxygen atoms and/or one or more sulfur atoms include the following groups.

$—CH_2CH_2—O—CH_2CH_2—$
$—(CH_2CH_2—O)_2—CH_2CH_2—$
$—(CH_2CH_2—O)_3—CH_2CH_2—$
$—(CH_2CH_2—O)_4—CH_2CH_2—$
$—(CH_2CH_2—O)_5—CH_2CH_2—$
$—C(CH_3)HCH_2—O—C(CH_3)HCH_2—$
$—(C(CH_3)HCH_2—O)_2—C(CH_3)HCH_2—$
$—(C(CH_3)HCH_2—O)_3—C(CH_3)HCH_2—$
$—(C(CH_3)HCH_2—O)_4—C(CH_3)HCH_2—$
$—(C(CH_3)HCH_2—O)_5—C(CH_3)HCH_2—$
$—(C(CH_3)HCH_2—O)_2—C(CH_3)HCH_2—$
$—(C(CH_3)HCH_2—O)_3—C(CH_3)HCH_2—$
$—(C(CH_3)HCH_2—O)_4—C(CH_3)HCH_2—$
$—(C(CH_3)HCH_2—O)_5—C(CH_3)HCH_2—$
$—CH_2CH_2CH_2—O—CH_2CH_2CH_2—$
$—(CH_2CH_2CH_2—O)_2—CH_2CH_2CH_2—$
$—(CH_2CH_2CH_2—O)_3—CH_2CH_2CH_2—$
$—(CH_2CH_2CH_2—O)_4—CH_2CH_2CH_2—$
$—(CH_2CH_2CH_2—O)_5—CH_2CH_2CH_2—$
$—CH_2C(OCH_3)HCH_2—$
$—CH_2C(OCH_2CH_3)HCH_2—$
$—CH_2C(OCH_2CH_2CH_3)HCH_2—$
$—CH_2C(OCH_2CH_2CH_2CH_3)HCH_2—$
$—CH_2CH_2—S—CH_2CH_2—$
$—(CH_2CH_2—S)_2—CH_2CH_2—$
$—(CH_2CH_2—S)_3—CH_2CH_2—$
$—(CH_2CH_2—S)_4—CH_2CH_2—$
$—(CH_2CH_2—S)_5—CH_2CH_2—$
$—C(CH_3)HCH_2—S—C(CH_3)HCH_2—$
$—(C(CH_3)HCH_2—S)_2—C(CH_3)HCH_2—$
$—(C(CH_3)HCH_2—S)_3—C(CH_3)HCH_2—$
$—(C(CH_3)HCH_2—S)_4—C(CH_3)HCH_2—$
$—(C(CH_3)HCH_2—S)_5—C(CH_3)HCH_2—$ $—CH_2CH_2CH_2—S—CH_2CH_2CH_2—$
$—(CH_2CH_2CH_2—S)_2—CH_2CH_2CH_2—$
$—(CH_2CH_2CH_2—S)_3—CH_2CH_2CH_2—$
$—(CH_2CH_2CH_2—S)_4—CH_2CH_2CH_2—$
$—(CH_2CH_2CH_2—S)_5—CH_2CH_2CH_2—$
$—CH_2C(SCH_3)HCH_2—$
$—CH_2C(SCH_2CH_3)HCH_2—$
$—CH_2C(SCH_2CH_2CH_3)HCH_2—$
$—CH_2C(SCH_2CH_2CH_2CH_3)HCH_2—$

Among these groups,
$—CH_2CH_2—O—CH_2CH_2—$,
$—(CH_2CH_2—O)_2—CH_2CH_2—$,
$—(CH_2CH_2—O)_3—CH_2CH_2—$,
$—CH_2CH_2CH_2—O—CH_2CH_2CH_2—$,
$—CH_2CH_2—S—CH_2CH_2—$,
$—(CH_2CH_2—S)_2—CH_2CH_2—$, and
$—(CH_2CH_2—S)_3—CH_2CH_2—$ are preferred, and
$—(CH_2CH_2—O)_2—CH_2CH_2—$,
$—(CH_2CH_2—O)_3—CH_2CH_2—$,
$—(CH_2CH_2—S)_2—CH_2CH_2—$, and
$—(CH_2CH_2—S)_3—CH_2CH_2—$ are more preferred.

In the formula (A1), $X^{a01}$, $X^{a02}$, $X^{a03}$, and $X^{a04}$ are each independently oxygen atom or sulfur atom.

In the formula (A1), sum of a number of oxygen atoms and/or sulfur atoms included in the alkylene group as $R^{a02}$ and a number of oxygen atoms and/or sulfur atoms included in the alkylene group as $R^{a04}$ is 2 or more. By inclusion of specific amount or more of oxygen atoms and/or sulfur atoms in a specific portion of the compound (A1), excessive reduction of a weight of components other than solvent in case that the composition is heated can be suppressed, and the metal oxide particle (B) can be stably dispersed in the composition. Upper limit of sum of the number of oxygen atoms and/or sulfur atoms included in the alkylene group as $R^{a02}$ and the number of oxygen atoms and/or sulfur atoms included in the alkylene group as $R^{a04}$ is not particularly limited as long as the desired effect is not impaired. For example, sum of the number of oxygen atoms and/or sulfur atoms included in the alkylene group as $R^{a02}$ and the number of oxygen atoms and/or sulfur atoms included in the alkylene group as $R^{a04}$ is preferably 2 or more and 10 or less, more preferably 2 or more and 8 or less, and further preferably 2 or more and 6 or less.

Specific examples of the compound (A1) include the following compounds. Compounds which a bridging group bridging acryloyloxy group or methacryloyloxy group and aryloxy group, arylthio group, heteroaryloxy group, or heteroarylthio group is replaced with $—CH_2CH_2—O—CH_2CH_2—$, $—(CH_2CH_2—O)_2—CH_2CH_2—$, $—(CH_2CH_2—O)_3—CH_2CH_2—$, $—CH_2CH_2CH_2—O—CH_2CH_2CH_2—$, $—CH_2CH_2—S—CH_2CH_2—$, $—(CH_2CH_2—S)_2—CH_2CH_2—$, and $—(CH_2CH_2—S)_3—CH_2CH_2—$ in the following compounds are preferred as the compound (A1).

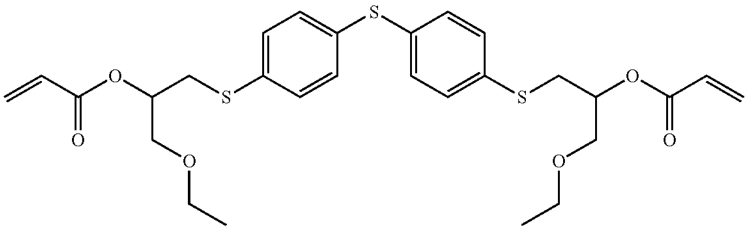

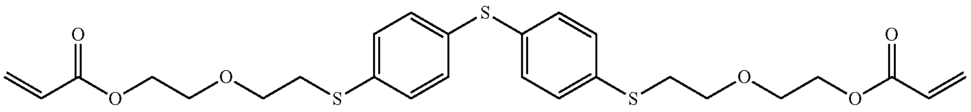

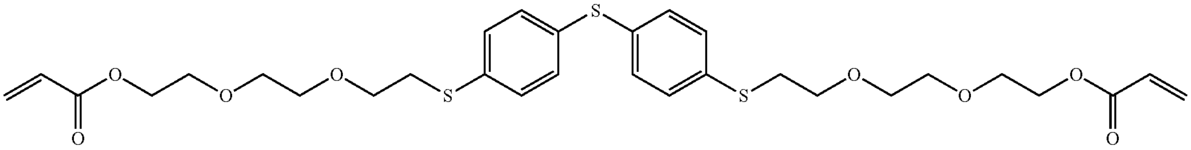

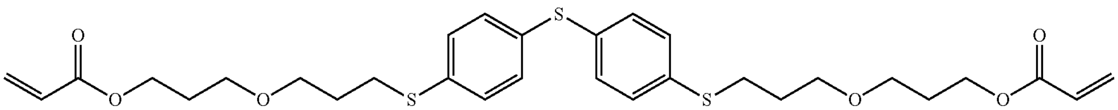

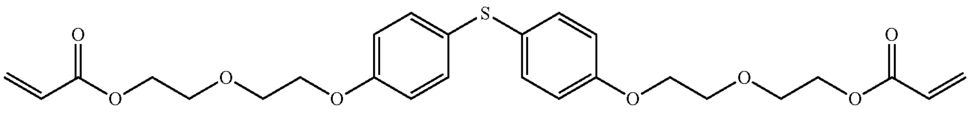

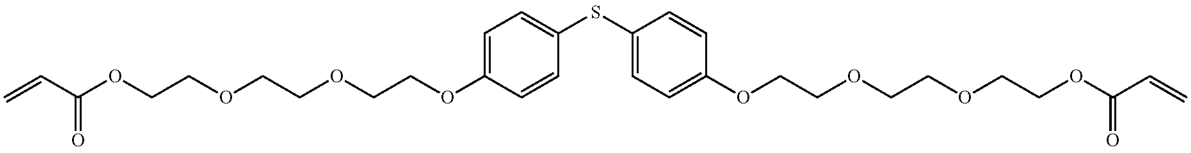

-continued

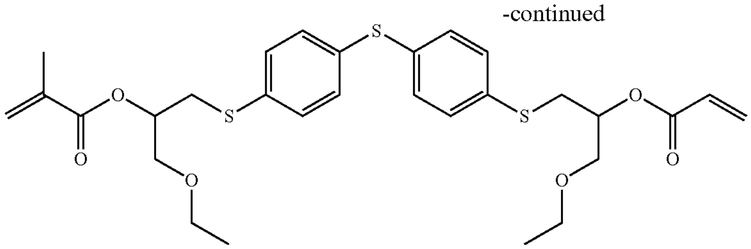

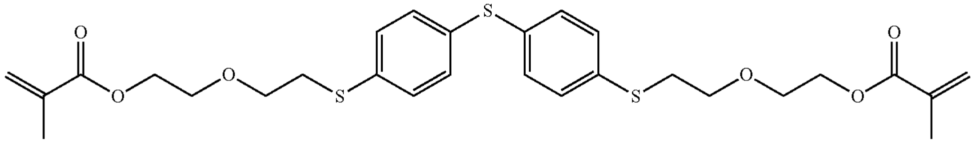

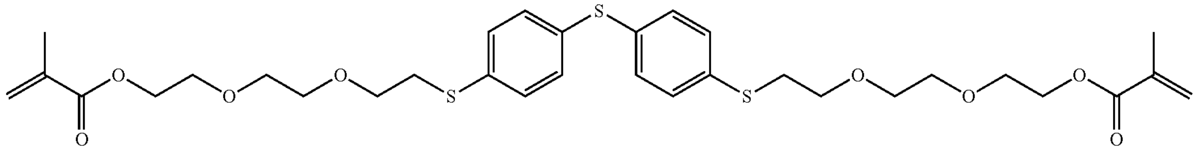

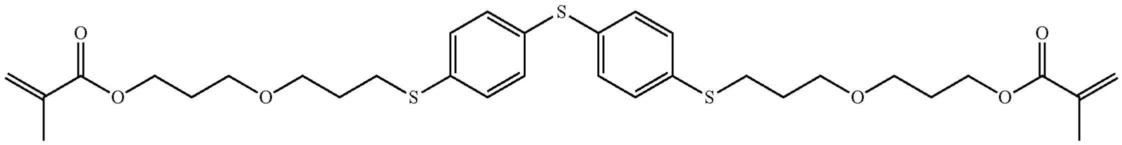

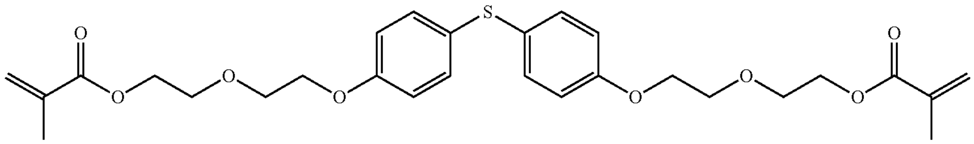

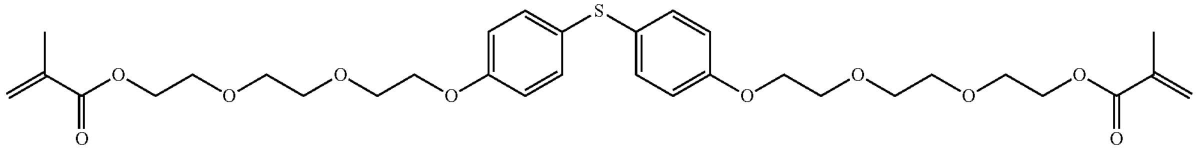

[Novel Compound]

Among the above compounds (A1), a compound represented by the formula (A1) is provided as a novel compound.

$$R^{a01}—X^{a03}—R^{a02}—X^{a01}\text{-}Ph^1\text{-}S\text{-}Ph^2\text{-}X^{a02}—R^{a04}—X^{a04}—R^{a03} \quad (A1)$$

In the formula (A1), $R^{a01}$ and $R^{a03}$ are each independently a radically polymerizable group-containing group or a cationically polymerizable group-containing group. $R^{a02}$ and $R^{a0}4$ are each independently an alkylene group which may be interrupted with one or more oxygen atoms and/or sulfur atoms. $X^{a01}$, $X^{a02}$, $X^{a03}$, and $X^{a04}$ are each independently oxygen atom or sulfur atom. $Ph^1$ and $Ph^2$ are each independently a phenylene group optionally substituted with an alkyl group having 1 or more and 5 or less carbon atoms. Sum of a number of oxygen atoms and/or sulfur atoms included in the alkylene group as $R^{a02}$ and a number of oxygen atoms and/or sulfur atoms included in the alkylene group as $R^{a04}$ is 2 or more. The compound represented by the formula (A1) does not have the radically polymerizable group-containing group and the cationically polymerizable group-containing group simultaneously. It should be noted that $R^{a02}$ and $R^{a04}$ are not a group represented by $—CH_2—CH_2—O—CH_2CH_2—$, when both of $X^{a01}$ and $X^{a02}$ are S, $X^{a0}1$ bonds to para position in $Ph^1$ relative to S bridging $Ph^1$ and $Ph^2$, and $X^{a02}$ bonds to para position in $Ph^2$ relative to S bridging $Ph^1$ and $Ph^2$.

Suitable specific examples of the novel compounds above include the following compounds. Compounds which a bridging group bridging acryloyloxy group or methacryloyloxy group and aryloxy group, arylthio group, heteroaryloxy group, or heteroarylthio group is replaced with $—CH_2CH_2—O—CH_2CH_2—$, $—(CH_2CH_2—O)_2—CH_2CH_2—$, $—(CH_2CH_2—O)_3—CH_2CH_2—$, $—CH_2CH_2CH_2—O—CH_2CH_2CH_2—$, $—CH_2CH_2—S—CH_2CH_2—$, $—(CH_2CH_2—S)_2—CH_2CH_2—$, and $—(CH_2CH_2—S)_3—CH_2CH_2—$ in the following compounds are preferred as the novel compounds.

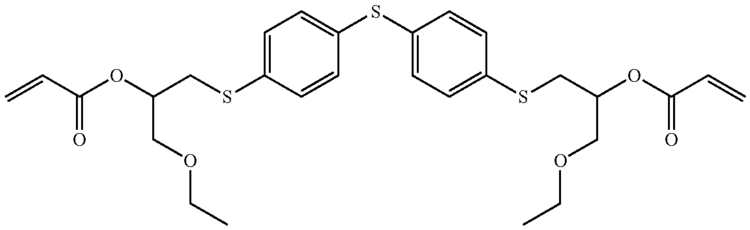

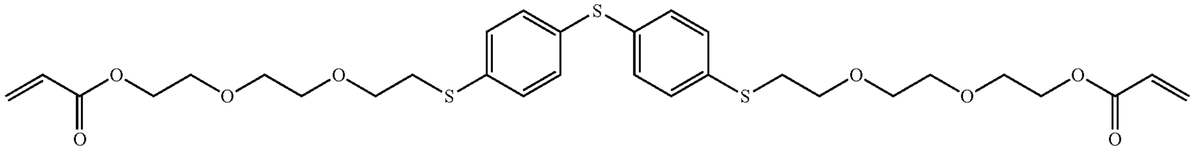

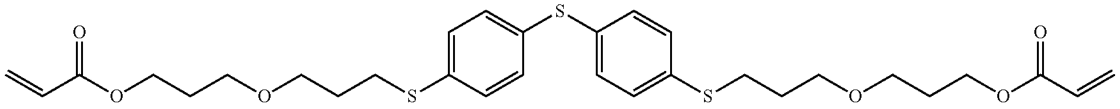

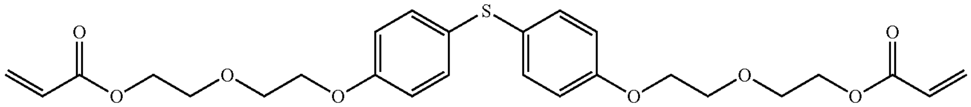

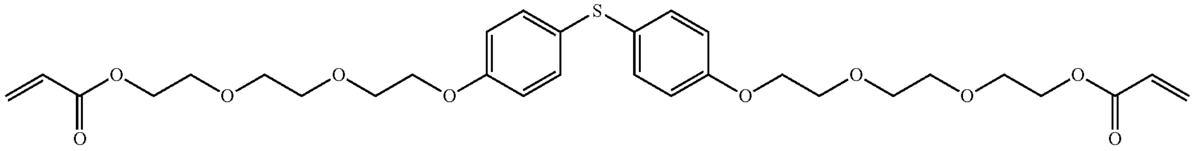

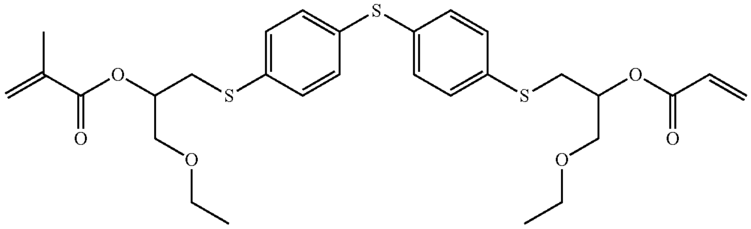

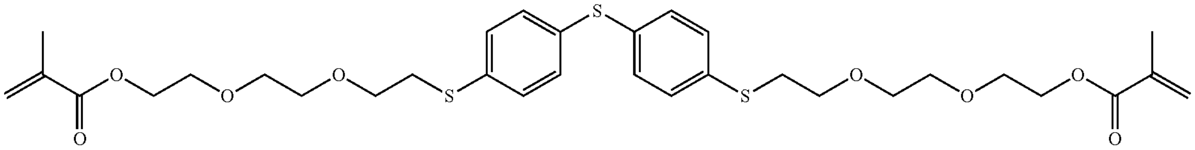

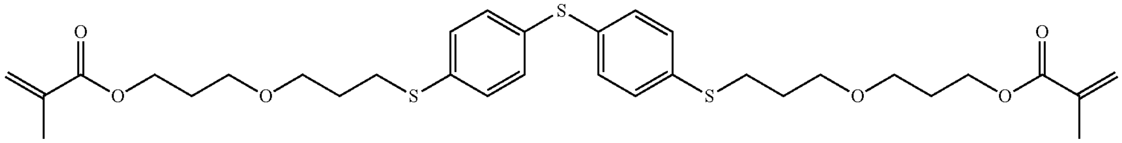

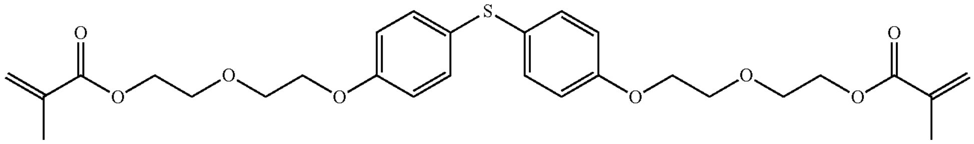

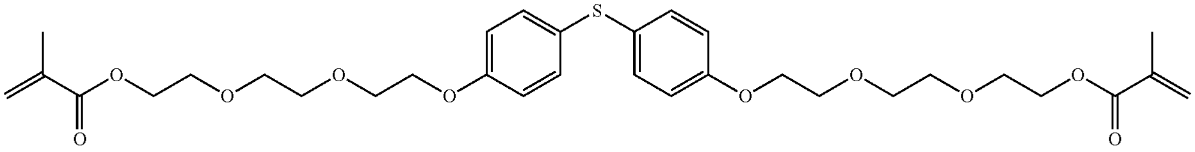

A production method of the compound represented by the formula (A1) is not particular limited. Suitable examples of a production method include a method including obtaining a compound represented by the following formula (A1-d) by reacting a compound represented by the following formula (A1-a) with a compound represented by the following formula (A1-b) and a compound represented by the following formula (A1-c) in the presence of a base, and in the compound represented by the following formula (A1-d), substituting a hydrogen atom at a terminus represented by —$X^{a03}$—H with a group represented by $R^{a01}$, and substituting a hydrogen atom at a terminus represented by —$X^{a04}$—H with a group represented by $R^{a03}$.

H—$X^{a01}$-$Ph^1$-S-$Ph^2$-$X^{a02}$—H (A1-a)

H—$X^{a03}$—$R^{a02}$—Hal (A1-b)

H—$X^{a04}$—$R^{a04}$—Hal (A1-c)

H—$X^{a03}$—$R^{a02}$—$X^{a01}$-$Ph^1$-S-$Ph^2$-$X^{a02}$—$R^{a04}$—$X^{a04}$—H (A1-d)

In the formula (A1-a), the formula (A1-b), the formula (A1-c), and the formula (A1-d), $R^{a02}$, $R^{a04}$, $X^{a01}$ to $X^{a04}$, $Ph^1$, and $Ph^2$ are the same as those in the formula (A1). Hal is a halogen atom.

The reaction of the compound represented by the formula (A1-a), the compound represented by the formula (A1-b), the compound represented by the formula (A1-c) in the presence of base is usually carried out in the presence of an organic solvent. The organic solvent used for the reaction of the compound represented by the formula (A1-a), the compound represented by the formula (A1-b), the compound represented by the formula (A1-c) is not particularly limited as long as the organic solvent that does not inhibit the progress of the reaction. Since the reaction is carried out in the presence of base, the organic solvent not having an acidic group such as carboxy group, and sulfonic acid group, and hydroxy group is preferred. Since it is easy to proceed a reaction well, an aprotic polar organic solvent is preferred as the organic solvent. Suitable examples of the aprotic polar organic solvent include N,N-dimethylformamide, N,N-dimethylacetamide, N-methyl-2-pyrrolidone, dimethylsulfoxide, tetrahydrofuran, cyclopentyl methyl ether, acetonitrile, and hexamethylphosphoric triamide.

The compound represented by the formula (A1-a), the compound represented by the formula (A1-b), and the compound represented by the formula (A1-c) may react simultaneously. In addition, the compound represented by the formula (A1-b) and the compound represented by the formula (A1-c) may be reacted with the compound represented by the formula (A1-a) in any order. It is preferred that the compound represented by the formula (A1-b) and the compound represented by the formula (A1-c) are the same compound because of the ease of purification of the intermediate and the final product. When resulting product of the reaction of the compound represented by the formula (A1-a) with the compound represented by the formula (A1-b) and the compound represented by the formula (A1-c) is a plurality of compounds, for example, the compound represented by the formula (A1-d) can be selectively collected by known various chromatography methods such as column chromatography method.

In the reaction of the compound represented by the formula (A1-a) with the compound represented by the formula (A1-b) and the compound represented by the formula (A1-c) is carried out, an amount of the organic solvent is not particularly limited. The amount of the organic solvent is preferably 0.5 parts by mass or more and 50 parts by mass or less, more preferably 7 parts by mass or more and 20 parts by mass or less, and further preferably 1 part by mass or more and 10 parts by mass or less relative to sum of a mass of the base and a mass of the raw material compound.

As the base, a base used in the Williamson's ether synthesis can be used with no particular limitation. Suitable examples of the base include sodium carbonate, potassium carbonate, cesium carbonate, sodium hydroxide, potassium hydroxide, lithium hydroxide, sodium hydride, potassium hydride, metallic sodium, and metallic potassium.

An amount of the base used in the reaction of the compound represented by the formula (A1-a) with the compound represented by the formula (A1-b) and the compound represented by the formula (A1-c) is not particularly limited as long as desired amount of the compound represented by the formula (A1-d) can be formed. For example, amount of the base is preferably 1.6 mole or more and 20 mole or less, more preferably 1.8 mole or more and 10 mole or less, and further preferably 2 mole or more and 6 more or less relative to 1 mole of the compound represented by the formula (A1-a).

Amount of the compound represented by the formula (A1-b) and the compound represented by the formula (A1-c) is not particularly limited as long as desired amount of the compound represented by the formula (A1-d) can be formed. For example, the amount of the compound represented by the formula (A1-b) and the amount of the compound represented by the formula (A1-c) are respectively preferably 0.8 mole or more and 10 mole or less, more preferably 0.9 mole or more and 5 mole or less, and further preferably 1 mole or more and 3 mole or less relative to 1 mole of the compound represented by the formula (A1-a).

A temperature for the reaction of the compound represented by the formula (A1-a) with the compound represented by the formula (A1-b) and the compound represented by the formula (A1-c) is not particularly limited as long as desired amount of the compound represented by the formula (A1-d) can be formed. For example, the reaction temperature is preferably 0° C. or higher and 200° C. or lower, more preferably 10° C. or higher and 180° C. or lower, and further preferably 20° C. or higher and 150° C. or lower. In case of carrying out the reaction at a temperature higher than the boiling point of the organic solvent, the reaction is preferably carried out using a pressure-resistant vessel. Time for the reaction of the compound represented by the formula (A1-a) with the compound represented by the formula (A1-b) and the compound represented by the formula (A1-c) is not particularly limited as long as desired amount of the compound represented by the formula (A1-d) can be formed. Typically, reaction time is preferably 1 hour or longer and 2 days or shorter, more preferably 2 hours or longer and 1 day or shorter, and further preferably 3 hours or longer and 18 hours or shorter.

Subsequently, in the compound represented by the formula (A1-d), a hydrogen atom at a terminus represented by —$X^{a0}$3-H is substituted with a group represented by $R^{a01}$, and a hydrogen atom at a terminus represented by —$X^{a04}$—H is substituted with a group represented by $R^{a03}$. Method for substituting the hydrogen atom at the terminus represented by —$X^{a0}$3-H with the group represented by $R^{a01}$ is not particularly limited. Method for substituting the hydrogen atom at the terminus represented by —$X^{a0}$3-H with the group represented by $R^{a01}$ is appropriately selected depending of the type of the radically polymerizable group-containing group or the cationically polymerizable group-containing group represented by $R^{a01}$.

For example, when $R^{a01}$ is (meth)acryloyl group, hydrogen atom at a terminus represented by —$X^{a03}$—H can be substituted with (meth)acryloyl group by reacting the group —$X^{a0}$3-H in the compound represented by the formula (A1-d) with (meth)acrylic acid halide such as (meth)acryloyl chloride. Reaction of the compound represented by the formula (A1-d) with the (meth)acrylic acid halide is preferably carried out in an organic solvent. Type of the organic solvent is not particularly limited as long as the organic solvent does not react with the (meth)acrylic acid halide. The compound represented by the formula (A1) is also obtained by reacting a (meth)acrylic acid with the compound represented by the formula (A1-d) according to known ester synthesis method.

When $R^{a01}$ is a glycidyl group, a hydrogen atom at a terminus represented by —$X^{a03}$—H can be substituted with the glycidyl group by reacting the group represented by —$X^{a03}$—H in the compound represented by the formula (A1-d) with an epichlorohydrin according to usual method. When $R^{a01}$ is a vinyl group, the group represented by —$X^{a0}$3-H in the compound represented by the formula (A1-d) can be directly vynilized with acetylene according to usual method.

A method for substituting a hydrogen atom at a terminus represented by —$X^{a04}$—H with a group represented by $R^{a03}$ is the same as the method for substituting a hydrogen atom at a terminus represented by —$X^{a0}$3-H with a group represented by $R^{a01}$.

The compound represented by the formula (A1) can be also prepared by a method including obtaining the compound represented by the formula (A1) by reacting a compound represented by the following formula (A1-a), a compound represented by the following formula (A1-e), and a compound represented by the following formula (A1-f) in the presence of a base.

$$H—X^{a01}\text{-}Ph^1\text{-}S\text{-}Ph^2\text{-}X^{a02}—H \quad (A1\text{-}a)$$

$$R^{a01}—X^{a03}—R^{a02}—Hal \quad (A1\text{-}e)$$

$$R^{a03}—X^{a04}—R^{a04}—Hal \quad (A1\text{-}f)$$

In the formula (A1-a), the formula (A1-e), and the formula (A1-f), $R^{a01}$ to $R^{a04}$, $X^{a01}$ to $X^{a04}$, $Ph^1$, and $Ph^2$ are the same as those in the formula (A1). Hal is a halogen atom.

The reaction of the compound represented by the formula (A1-a), the compound represented by the formula (A1-e), and the compound represented by the formula (A1-f) in the presence of the base is carried out in the same manner as the reaction of the compound represented by the formula (A1-a), the compound represented by the formula (A1-b), and the compound represented by the formula (A1-c) in the presence of the base.

The compound (A1) produced by the above-described method is purified as necessary and then added to the composition. Examples of a purification method include well-known methods such as a chromatography including a column chromatography and recrystallization.

The photopolymerizable compound (A) may include other photopolymerizable compound (A2) other than the compound (A1) described above. When the photopolymerizable compound (A) includes other photopolymerizable compound (A2), the photopolymerizable compound preferably include the compound (A1) and other photopolymerizable compound (A2) in combination. A ratio of a mass of the compound (A1) is preferably 50% by mass or more, more preferably 70% by mass or more, further preferably 80% by mass or more, and particularly preferably 100% by mass relative to a mass of the photopolymerizable compound (A).

[Other Photopolymerizable Compound (A2)]

As described above, the composition can include other photopolymerizable compound (A2) with the compound (A1). When the compound (A1) has the radically polymerizable group-containing group, other photopolymerizable compound (A2) also has the radically polymerizable group-containing group. When the compound (A1) has the cationically polymerizable group-containing group, other photopolymerizable compound (A2) also has the cationically polymerizable group-containing group.

When other photopolymerizable compound (A2) has radically polymerizable group-containing group(s), other photopolymerizable compound (A2) may be a monofunctional compound having one radically polymerizable group-containing group, or polyfunctional compound having two or more radically polymerizable group-containing group, and is preferably the polyfunctional compound. As other photopolymerizable compound (A2) having the radically polymerizable group-containing group, a compound having one or more (meth)acryloyl group such as (meth)acrylate compound and (meth)acrylic amide is preferred, and the (meth) acrylate compound having one or more (meth)acryloyloxy group is more preferred.

Examples of the monofunctional compound having the radically polymerizable group-containing group include (meth)acrylamide, methylol (meth)acrylamide, methoxymethyl (meth)acrylamide, ethoxymethyl (meth)acrylamide, propoxymethyl (meth)acrylamide, butoxymethoxymethyl (meth)acrylamide, N-methylol (meth)acrylamide, N-hydroxymethyl (meth)acrylamide, (meth)acrylic acid, fumaric acid, maleic acid, maleic anhydride, itaconic acid, itaconic anhydride, citraconic acid, citraconic anhydride, crotonic acid, 2-acrylamide-2-methylpropanesulfonic acid, tert-butylacrylamidesulfonic acid, methyl (meth)acrylate, ethyl (meth)acrylate, butyl (meth)acrylate, 2-ethylhexyl (meth) acrylate, cyclohexyl (meth)acrylate, 2-hydroxyethyl (meth) acrylate, 2-hydroxypropyl (meth)acrylate, 2-hydroxybutyl (meth)acrylate, 2-phenoxy-2-hydroxypropyl (meth)acrylate, 2-(meth)acryloyloxy-2-hydroxypropyl phthalate, glycerin mono(meth)acrylate, tetrahydrofurfuryl (meth)acrylate, dimethylaminoethyl (meth)acrylate, glycidyl (meth)acrylate, 2,2,2-trifluoroethyl (meth)acrylate, 2,2,3,3-tetrafluoropropyl (meth)acrylate, a half (meth)acrylate of phthalic acid derivatives, and the like. These monofunctional compounds may be used alone, or in combination of two or more types thereof.

Examples of the polyfunctional compound having the radically polymerizable group-containing group include ethylene glycol di(meth)acrylate, diethylene glycol di(meth) acrylate, tetraethylene glycol di(meth)acrylate, propylene glycol di(meth)acrylate, polypropylene glycol di(meth)acrylate, butylene glycol di(meth)acrylate, neopentyl glycol di(meth)acrylate, 1,6-hexane glycol di(meth)acrylate, trimethylolpropane tri(meth)acrylate, glycerin di(meth)acrylate, pentaerythritol triacrylate, pentaerythritol tetraacrylate, dipentaerythritol pentaacrylate, dipentaerythritol hexaacrylate, pentaerythritol di(meth)acrylate, pentaerythritol tri (meth)acrylate, pentaerythritol tetra(meth)acrylate, dipentaerythritol penta(meth)acrylate, dipentaerythritol hexa (meth)acrylate, 2,2-bis(4-(meth)acryloxydiethoxyphenyl) propane, 2,2-bis(4-(meth)acryloxypolyethoxyphenyl) propane, 2-hydroxy-3-(meth)acryloyloxypropyl (meth) acrylate, ethylene glycol diglycidyl ether di(meth)acrylate, diethylene glycol diglycidyl ether di(meth)acrylate, phthalic acid diglycidyl ester di(meth)acrylate, glycerin triacrylate, glycerin polyglycidyl ether poly(meth)acrylate, urethane (meth)acrylate (i.e., tolylene diisocyanate, trimethylhexamethylene diisocyanate, or a reaction product of hexamethylene diisocyanate and 2-hydroxyethyl (meth)acrylate), methylenebis(meth)acrylamide, (meth)acrylamide methylene ether, a polyfunctional compound such as a fused product of polyhydric alcohol and N-methylol(meth)acrylamide, triacryl formal, and the like. These polyfunctional compounds may be used alone, or in combination of two or more types thereof.

Among other photopolymerizable compounds (A2) having the radically polymerizable group-containing group, a trifunctional or higher polyfunctional compound is preferred, a tetrafunctional or higher polyfunctional compound is more preferred, and a pentafunctional or higher polyfunctional compound is further preferred, in view of the fact that they tend to increase the strength of the cured product formed using the composition.

In addition, the composition preferably includes a compound represented by the following formula (A-2a) or the following formula (A-2b) as the photopolymerizable compound (A) having the radically polymerizable group-containing group.

(A-2a)

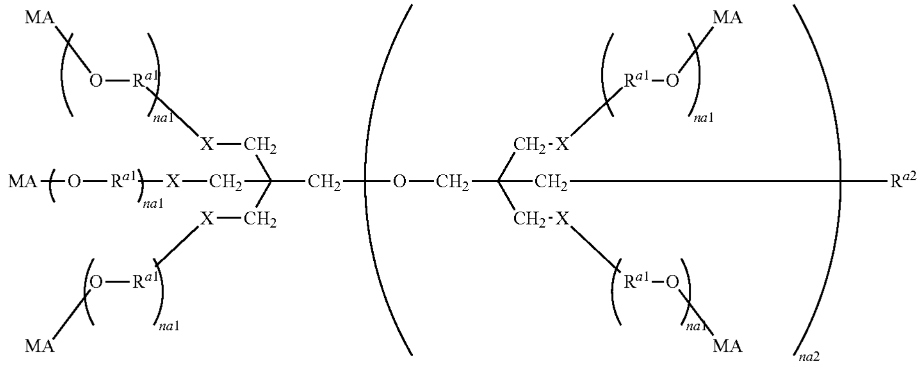

$(MA\text{-}(O—R^{a1})_{na1}—X—CH_2)_2—CH—X—(R^{a1}—O)_{na1}\text{-}MA$ (A-2b)

In the formula (A-2a) and the formula (A-2b), MA(s) are each independently (meth)acryloyl group. X(s) are each independently oxygen atom, —NH—, or —N($CH_3$)—. $R^{a1}$(s) are each independently ethane-1,2-diyl group, propane-1,2-diyl group, or propane-1,3-diyl group. $R^{a2}$ is a hydroxy group, an alkyl group having 1 or more and 4 or less carbon atoms, or a group represented by $—X—(R^{a1}—O)_{na1}$-MA. X is the same as above. na1 and na2 are each independently 0 or 1.

In the formula (A-2a), examples of the alkyl group having 1 or more and 4 or less carbon atoms as $R^{a2}$ include methyl group, ethyl group, n-propyl group, isopropyl group, n-butyl group, isobutyl group, sec-butyl group, and tert-butyl group. Among these alkyl groups, methyl group and ethyl group are preferred.

Suitable examples of the compound represented by the formula (A-2a), and the compound represented by the formula (A-2b) include pentaerythritol tetra(meth)acrylate, dipentaerythritol hexa(meth)acrylate, trimethylolpropane tri(meth)acrylate, glycerine tri(meth)acrylate, and the following compounds of 1) to 32). In the following compound of 1) to 32), MA is (meth)acryloyl group.

1) $(MA\text{-}NH—CH_2)_4—C$
2) $(MA\text{-}N(CH_3)—CH_2)_4—C$
3) $(MA\text{-}O—CH_2CH_2CH_2—O—CH_2)_4—C$
4) $(MA\text{-}O—CH_2CH_2—O—CH_2)_4—C$
5) $(MA\text{-}O—CH_2CH_2CH_2—NH—CH_2)_4—C$
6) $(MA\text{-}O—CH_2CH_2—NH—CH_2)_4—C$
7) $(MA\text{-}O—CH_2CH_2CH_2—N(CH_3)—CH_2)_4—C$
8) $(MA\text{-}O—CH_2CH_2—N(CH_3)—CH_2)_4—C$
9) $(MA\text{-}NH—CH_2)_3—C—CH_2—O—CH_2—C—(CH_2—NH\text{-}MA)_3$
10) $(MA\text{-}N(CH_3)—CH_2)_3—C—CH_2—O—CH_2—C—(CH_2—N(CH_3)\text{-}MA)_3$
11) $(MA\text{-}O—CH_2CH_2CH_2—O—CH_2)_3—C—CH_2—O—CH_2—C—(CH_2—O—CH_2CH_2CH_2—O\text{-}MA)_3$
12) $(MA\text{-}O—CH_2CH_2—O—CH_2)_3—C—CH_2—O—CH_2—C—(CH_2—O—CH_2CH_2—O\text{-}MA)_3$
13) $(MA\text{-}O—CH_2CH_2CH_2—NH—CH_2)_3—C—CH_2—O—CH_2—C—(CH_2—NH—CH_2CH_2CH_2—O\text{-}MA)_3$
14) $(MA\text{-}O—CH_2CH_2—NH—CH_2)_3—C—CH_2—O—CH_2—C—(CH_2—NH—CH_2CH_2—O\text{-}MA)_3$
15) $(MA\text{-}O—CH_2CH_2CH_2—N(CH_3)—CH_2)_3—C—CH_2—O—CH_2—C—(CH_2—N(CH_3)—CH_2CH_2CH_2—O\text{-}MA)_3$
16) $(MA\text{-}O—CH_2CH_2—N(CH_3)—CH_2)_3—C—CH_2—O—CH_2—C—(CH_2—N(CH_3)—CH_2CH_2—O\text{-}MA)_3$
17) $(MA\text{-}NH—CH_2)_2—CH—NH\text{-}MA$
18) $(MA\text{-}N(CH_3)—CH_2)_2—CH—N(CH_3)\text{-}MA$
19) $(MA\text{-}O—CH_2CH_2CH_2—O—CH_2)_2—CHO—CH_2CH_2CH_2—O\text{-}MA$
20) $(MA\text{-}O—CH_2CH_2—O—CH_2)_2—CH—CO—CH_2CH_2—O\text{-}MA$
21) $(MA\text{-}O—CH_2CH_2CH_2—NH—CH_2)_2—CH—NH—CH_2CH_2CH_2—O\text{-}MA$
22) $(MA\text{-}O—CH_2CH_2—NH—CH_2)_2—CH—NH—CH_2CH_2—O\text{-}MA$
23) $(MA\text{-}O—CH_2CH_2CH_2—N(CH_3)—CH_2)_2—CH—N(CH_3)—CH_2CH_2CH_2—O\text{-}MA$
24) $(MA\text{-}O—CH_2CH_2—N(CH_3)—CH_2)_2—CH—N(CH_3)—CH_2CH_2—O\text{-}MA$
25) $(MA\text{-}NH—CH_2)_3—C—CH_2CH_3$
26) $(MA\text{-}N(CH_3)—CH_2)_3—C—CH_2CH_3$
27) $(MA\text{-}O—CH_2CH_2CH_2—O—CH_2)_3—C—CH_2CH_3$
28) $(MA\text{-}O—CH_2CH_2—O—CH_2)_3—C—CH_2CH_3$
29) $(MA\text{-}O—CH_2CH_2CH_2—NH—CH_2)_3—C—CH_2CH_3$
30) $(MA\text{-}O—CH_2CH_2—NH—CH_2)_3—C—CH_2CH_3$
31) $(MA\text{-}O—CH_2CH_2CH_2—N(CH_3)—CH_2)_3—C—CH_2CH_3$
32) $(MA\text{-}O—CH_2CH_2—N(CH_3)—CH_2)_3—C—CH_2CH_3$ A ratio of sum of a mass of the compound represented by the formula (A-2a) and a mass of the compound represented by the formula (A-2b) is preferably 20% by mass or more and 50% by mass or less, more preferably 30% by mass or more and 50% by mass or less, and further preferably 40% by mass or more and 50% by mass or less relative to the mass of the photopolymerizable compound (A).

In view of easy formation of the cured product by using the composition, it is also preferred that the composition includes a compound represented by the following formula (A-2c) as other photopolymerizable compound having the radically polymerizable group-containing group.

(A-2c)

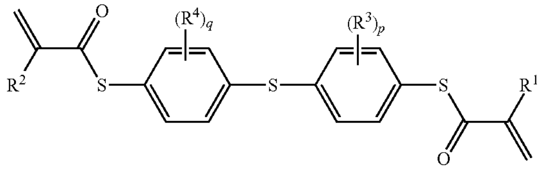

In the formula (A-2c), $R^1$ and $R^2$ are each independently hydrogen atom or methyl group. $R^3$ and $R^4$ are each independently an alkyl group having 1 or more and 5 or less carbon atoms. p and q are each independently 0 or 1.

$R^1$ and $R^2$ are each independently hydrogen atom or methyl group. $R^1$ and $R^2$ may be different or may be the same. Since the compound represented by the formula (A-2c) is easily synthesized and available, $R^1$ and $R^2$ are preferably the same.

$R^3$ and $R^4$ are each independently an alkyl group having 1 or more and 5 or less carbon atoms. $R^3$ and $R^4$ may be different or may be the same. Since the compound represented by the formula (A-2c) is easily synthesized and available, $R^3$ and $R^4$ are preferably the same.

The alkyl group having 1 or more and 5 or less carbon atoms as $R^3$ and $R^4$ may be linear or branched. Examples of the alkyl group having 1 or more and 5 or less carbon atoms as $R^3$ and $R^4$ include methyl group, ethyl group, n-propyl group, isopropyl group, n-butyl group, isobutyl group, sec-butyl group, tert-butyl group, n-pentyl group, isopentyl group, and tert-pentyl group.

Suitable specific examples of the compound represented by the formula (A-2c) include the following compounds.

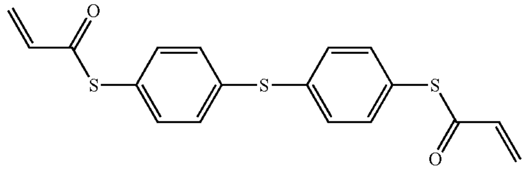

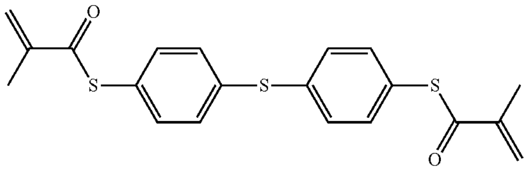

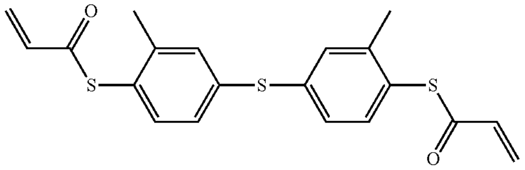

-continued

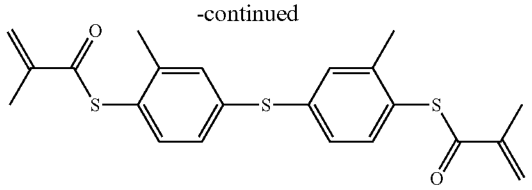

When the composition includes the compound represented by the formula (A-2c) as other photopolymerizable compound (A2) having the radically polymerizable group-containing group, a ratio of a mass of the compound represented by the formula (A-2c) is preferably 10% by mass or more and 50% by mass or less, and more preferably 30% by mass or more and 50% by mass or less relative to a mass of the photopolymerizable compound (A).

It is also preferred that the composition includes a sulfur-containing (meth)acrylate represented by the following formula (A-2d) as other photopolymerizable compound (A2) having the radically polymerizable group-containing group.

$$Ar^{a1}—R^{a21}—S—R^{a22}—O—CO—CR^{a23}═CH2 \quad (A\text{-}2d)$$

In the formula (A-2d), $Ar^{a1}$ is a phenyl group optionally substituted with a halogen atom. $R^{a21}$ is a single bond or an alkylene group having 1 or more and 6 or less carbon atoms. $R^{a22}$ is an alkyl group having 1 or more and 6 or less carbon atoms. $R^{a23}$ is hydrogen atom or methyl group.

$Ar^{a1}$ is the phenyl group optionally substituted with the halogen atom. When the phenyl group is substituted with the halogen atom, a number of halogen atoms bonding to the phenyl group is not particularly limited. The number of halogen atoms bonding to the phenyl group is preferably 1 or 2, and more preferably 1. When two or more halogen atoms bond to the phenyl group, a plurality of halogen atoms bonding to the phenyl group may consist of only halogen atoms of the same species or halogen atoms of two or more species. As the halogen atom which may bond to the phenyl group, fluorine atom, chlorine atom, bromine atom, and iodine atom are exemplified, and fluorine atom, chlorine atom, and bromine atom are preferred. Unsubstituted phenyl group is preferred as $Ar^{a1}$.

$R^{a21}$ is single bond or alkylene group having 1 or more and 6 or less carbon atoms. Examples of the alkylene group having 1 or more and 6 or less carbon atoms include methylene group, ethan-1,2-diyl group, propane-1,2-diyl group, propane-1,3-diyl group, butane-1,4-diyl group, pentane-1,5-diyl group, and hexane-1,6-diyl group. $R^{a21}$ is preferably single bond or methylene group, and more preferably single bond.

$R^{a22}$ is an alkylene group having 1 or more and 6 or less carbon atoms. Examples of the alkylene group having 1 or more and 6 or less carbon atoms include methylene group, ethane-1,2-diyl group, propane-1,2-diyl group, propane-1,3-diyl group, butane-1,4-diyl group, pentane-1,5-diyl group, and hexane-1,6-diyl group. $R^{a22}$ is preferably methylene group, ethane-1,2-diyl group, and propane-1,3-diyl group, and more preferably ethane-1,2-diyl group, and propane-1,3-diyl group.

In view of easy availability and curability of the sulfur-containing (meth)acrylate, and the refractive index of the cured product, in the formula (A-2d), it is particularly preferable that $Ar^{a1}$ is phenyl group and $R^{a21}$ is single bond.

Specific examples of the sulfur-containing (meth)acrylate represented by the formula (A-2d) include 2-phenylthioethyl (meth)acrylate, 3-phenylthiopropyl (meth)acrylate, 2-benzylthioethyl (meth)acrylate, 3-benzylthiopropyl (meth)acrylate, 2-(2-chlorophenyl)ethyl (meth)acrylate, 2-(3-chlorophenyl)ethyl (meth)acrylate, 2-(4-chlorophenyl)ethyl (meth)acrylate, 3-(2-chlorophenyl)propyl (meth)acrylate, 3-(3-chlorophenyl)propyl (meth)acrylate, 3-(4-chlorophenyl)propyl (meth)acrylate, 2-(2-fluorophenyl)ethyl (meth) acrylate, 2-(3-fluorophenyl)ethyl (meth)acrylate, 2-(4-fluorophenyl)ethyl (meth)acrylate, 3-(2-fluorophenyl)propyl (meth)acrylate, 3-(3-fluorophenyl)propyl (meth)acrylate, 3-(4-fluorophenyl)propyl (meth)acrylate, 2-(2-bromophenyl)ethyl (meth)acrylate, 2-(3-bromophenyl)ethyl (meth) acrylate, 2-(4-bromophenyl)ethyl (meth)acrylate, 3-(2-bromophenyl)propyl (meth)acrylate, 3-(3-bromophenyl)propyl (meth)acrylate, and 3-(4-bromophenyl)propyl (meth)acrylate.

When the composition includes the sulfur-containing (meth)acrylate represented by the formula (A-2d) as other photopolymerizable compound, a ratio of a mass of the sulfur-containing (meth)acrylate represented by the formula (A-2d) is preferably 40% by mass or more and 50% by mass or less relative to the mass of the photopolymerizable compound (A).

When the compound (A1) has the cationically polymerizable group, other photopolymerizable compound (A2) may be a monofunctional compound having one cationically polymerizable group, or a polyfunctional compound having two or more cationically polymerizable group, and is preferably the polyfunctional compound.

When the compound (A1) has the vinyloxy group as the cationically polymerizable group-containing group, the composition may include a vinyl ether compound as other photopolymerizable compound (A2). Such vinyl ether compound may be a monofunctional compound or may be a polyfunctional compound.

Suitable specific examples of the vinyl ether compound include aromatic monovinyl ether compounds such as viny phenyl ether, 4-vinyloxytoluene, 3-vinyloxytoluene, 2-vinyloxytoluene, 1-vinyloxy-4-chlorobenzene, 1-vinyloxy-3-chlorobenzene, 1-vinyloxy-2-chlorobenzene, 1-vinyloxy-2,3-dimethylbenzene, 1-vinyloxy-2,4-dimethylbenzene, 1-vinyloxy-2,5-dimethylbenzene, 1-vinyloxy-2,6-dimethylbenzene, 1-vinyloxy-3,4-dimethylbenzene, 1-vinyloxy-3,5-dimethylbenzene, 1-vinyloxynaphthalene, 2-vinyloxynaphthalene, 2-vinyloxyfluorene, 3-vinyloxyfluorene, 4-vinyloxy-1,1'-biphenyl, 3-vinyloxy-1,1'-biphenyl, 2-vinyloxy-1,1'-biphenyl, 6-vinyloxytetralin, and 5-vinyloxytetralin; aromatic divinyl ether compounds such as 1,4-divinyloxybenzene, 1,3-divinyloxybenzene, 1,2-divinyloxybenzene, 1,4-divinyloxynaphthalene, 1,3-divinyloxynaphthalene, 1,2-divinyloxynaphthalene, 1,5-divinyloxynaphthalene, 1,6-divinyloxynaphthalene, 1,7-divinyloxynaphthalene, 1,8-divinyloxynaphthalene, 2,3-divinyloxynaphthalene, 2,6-divinyloxynaphthalene, 2,7-divinyloxynaphthalene, 1,2-divinyloxyfluorene, 3,4-divinyloxyfluorene, 2,7-divinyloxyfluorene, 4,4'-divinyloxybiphenyl, 3,3'-divinyloxybiphenyl, 2,2'-divinyloxybiphenyl, 3,4'-divinyloxybiphenyl, 2,3'-divinyloxybiphenyl, 2,4'-divinyloxybiphenyl, and bisphenol A divinyl ether. These vinyl ether compounds can be used in combination of two or more types thereof.

When the compound (A1) has the epoxy group-containing group as the cationically polymerizable group-containing group, the composition may include various epoxy compounds as other photopolymerizable compound (A2). Examples of the epoxy compound include difunctional epoxy resins such as a bisphenol A type epoxy resin, a bisphenol F type epoxy resin, a bisphenol S type epoxy resin, a bisphenol AD type epoxy resin, a naphthalene type epoxy resin, and a biphenyl type epoxy resin; novolak epoxy resins such as a phenol novolak type epoxy resin, a brominated phenol novolak type epoxy resin, an ortho-cresol novolak type epoxy resin, a bisphenol A novolak type epoxy resin, and a bisphenol AD novolak type epoxy resin; cyclic aliphatic epoxy resins such as an epoxidized product of a dicyclopentadiene type phenol resin; aromatic epoxy resins such as an epoxidized product of a naphthalene type phenol resin; glycidyl ester type epoxy resins such as a dimer acid glycidyl ester and triglycidyl ester; glycidylamine type epoxy resins such as tetraglycidylaminodiphenylmethane, triglycidyl-p-aminophenol, tetraglycidylmetaxylylenediamine, and tetraglycidyl bisaminomethylcyclohexane; heterocyclic epoxy resins such as triglycidyl isocyanurate; trifunctional epoxy resins such as phloroglucinol triglycidyl ether, trihydroxybiphenyl triglycidyl ether, trihydroxyphenylmethane triglycidyl ether, glycerin triglycidyl ether, 2-[4-(2,3-epoxypropoxy)phenyl]-2-[4-[1,1-bis[4-(2,3-epoxypropoxy)phenyl]ethyl]phenyl]propane, and 1,3-bis[4-[1-[4-(2,3-epoxypropoxy)phenyl]-1-[4-[1-[4-(2,3-epoxypropoxy) phenyl]-1-methylethyl]phenyl]ethyl]phenoxy]-2-propanol; tetrafunctional epoxy resins such as tetrahydroxyphenylethane tetraglycidyl ether, tetraglycidylbenzophenone, bisresorcinol tetraglycidyl ether, and tetraglycidoxybiphenyl; and a 1,2-epoxy-4-(2-oxyranyl)cyclohexane adduct of 2,2-bis (hydroxymethyl)-1-butanol. The 1,2-epoxy-4-(2-oxiranyl) cyclohexene adduct of 2,2-bis(hydroxymethyl)-1 butanol is commercially available as EHPE-3150 (manufactured by Daicel Corporation).

In addition, the oligomer or polymer type polyfunctional epoxy compound may also be suitably used. Typical examples of the oligomer or polymer type polyfunctional epoxy compound include a phenol novolak type epoxy compound, a brominated phenol novolak type epoxy compound, an ortho-cresol novolak type epoxy compound, a xylenol novolak type epoxy compound, a naphthol novolak type epoxy compound, a bisphenol A novolak type epoxy compound, a bisphenol AD novolak type epoxy compound, an epoxidized product of a dicyclopentadiene type phenol resin, an epoxidized product of a naphthalene type phenol resin, and the like.

Other examples of the suitable epoxy compound include a polyfunctional alicyclic epoxy compound having an alicyclic epoxy group.

Specific examples of the alicyclic epoxy compound include 2-(3,4-epoxycyclohexyl-5,5-spiro-3,4-epoxy)cyclohexane-meta-dioxane, bis(3,4-epoxycyclohexylmethyl)adipate, bis(3,4-epoxy-6-methylcyclohexylmethyl)adipate, 3,4-epoxy-6-methylcyclohexyl-3',4'-epoxy-6'-methylcyclohexanecarboxylate, ε-caprolactone-modified 3,4-epoxycyclohexylmethyl-3',4'-epoxycyclohexanecarboxylate, trimethylcaprolactone-modified 3,4-epoxycyclohexylmethyl-3',4'-epoxycyclohexanecarboxylate, 3-methyl-6-valerolactone-modified 3,4-epoxycyclohexylmethyl-3',4'-epoxycyclohexane carboxylate, methylenebis(3,4-epoxycyclohexane), di(3,4-epoxycyclohexylmethyl)ether of ethylene glycol, ethylenebis(3,4-epoxycyclohexane carboxylate), epoxycyclohexahydrophthalate, di-2-ethylhexyl epoxycyclohexahydrophthalate, and an epoxy resin having a tricyclodecene oxide group and compounds represented by the following formulas (a01-1) to (a01-5).

Among specific examples of these alicyclic epoxy compounds, alicyclic epoxy compounds represented by the following formulas (a01-1) to (a01-5) are preferred, since the cured product with high hardness can be formed.

(a01-1)

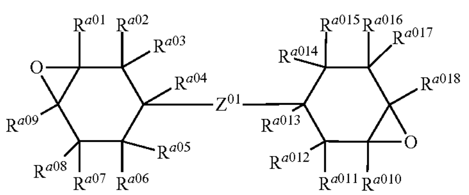

In the formula (a01-1), $Z^{01}$ represents a single bond or a linking group (divalent group having one or more atoms). $R^{a01}$ to $R^{a018}$ each independently represent a group selected from the group consisting of a hydrogen atom, a halogen atom, and an organic group.

Examples of the linking group $Z^{01}$ include a divalent hydrocarbon group, a divalent group selected from the group consisting of —O—, —O—CO—, —S—, —SO—, —$SO_2$—, —$CBr_2$—, —$C(CBr_3)_2$—, —$C(CF_3)_2$—, and —$R^{a019}$—O—CO—, and a group in which plural these groups are bonded.

Examples of the divalent hydrocarbon group as the linking group $Z^{01}$ include a linear or branched alkylene group having 1 or more and 18 or less carbon atoms, a divalent alicyclic hydrocarbon group, and the like. Examples of the linear or branched alkylene group having 1 or more and 18 or less carbon atoms include a methylene group, a methylmethylene group, a dimethylmethylene group, a dimethylene group, a trimethylene group, and the like. Examples of the divalent alicyclic hydrocarbon group include cycloalkylene groups (including a cycloalkylidene group) such as a 1,2-cyclopentylene group, a 1,3-cyclopentylene group, a cyclopentylidene group, a 1,2-cyclohexylene group, a 1,3-cyclohexylene group, a 1,4-cyclohexylene group, a cyclohexylidene group, and the like.

$R^{a019}$ is an alkylene group having 1 or more and 8 or less carbon atoms, and preferably a methylene group or an ethylene group.

(a01-2)

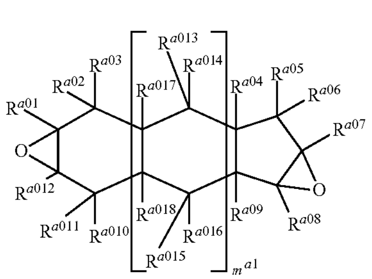

In the formula (a01-2), $R^{a01}$ to $R^{a18}$ are groups selected from the group consisting of a hydrogen atom, a halogen atom, and an organic group. $R^{a02}$ and $R^{a010}$ may be combined with each other. $R^{a013}$ and $R^{a016}$ may be combined with each other to form a ring. $m^{a1}$ is 0 or 1.

As the alicyclic epoxy compound represented by the formula (a01-2), a compound represented by the formula (a01-2-1) that corresponds to a compound in which $m^{a1}$ in the formula (a01-2) is 0 is preferred.

(a01-2-1)

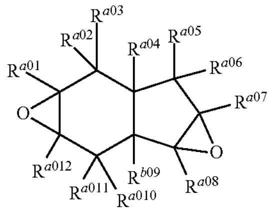

In the formula (a01-2-1), $R^{a01}$ to $R^{a012}$ are groups selected from the group consisting of a hydrogen atom, a halogen atom, and an organic group. $R^{a02}$ and $R^{a010}$ may be combined with each other.

(a01-3)

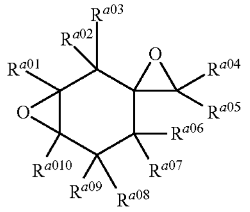

In the formula (a01-3), $R^{a01}$ to $R^{a010}$ are groups selected from the group consisting of a hydrogen atom, a halogen atom, and an organic group. $R^{a02}$ and $R^{a08}$ may be combined with each other.

(a01-4)

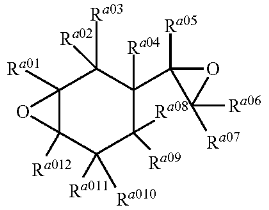

In the formula (a01-4), $R^{a01}$ to $R^{a012}$ are groups selected from the group consisting of a hydrogen atom, a halogen atom, and an organic group. $R^{a02}$ and $R^{a010}$ may be combined with each other.

(a01-5)

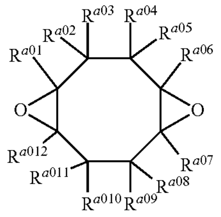

In the formula (a01-5), $R^{a01}$ to $R^{a012}$ are groups selected from the group consisting of a hydrogen atom, a halogen atom, and an organic group.

In the formulas (a01-1) to (a01-5), when $R^{a01}$ to $R^{a018}$ are organic groups, the organic group is not particularly limited as long as the object of the present invention is not impaired, and may be a hydrocarbon group, a group composed of a carbon atom and a halogen atom, or a group containing heteroatoms such as a halogen atom, an oxygen atom, a sulfur atom, a nitrogen atom, and a silicon atom, together with a carbon atom and a hydrogen atom. Examples of the halogen atom include a chlorine atom, a bromine atom, an iodine atom, and a fluorine atom.

The organic group is preferably a group composed of a hydrocarbon group and a carbon atom, a hydrogen atom, and an oxygen atom, a group composed of a halogenated hydrocarbon group and a carbon atom, an oxygen atom, and a halogen atom, and a group composed of a carbon atom, a hydrogen atom, an oxygen atom, and a halogen atom. When the organic group is a hydrocarbon group, the hydrocarbon group may be an aromatic hydrocarbon group, or an aliphatic hydrocarbon group, or a group including an aromatic skeleton and an aliphatic skeleton. The number of carbon atoms in the organic group is preferably 1 or more and 20 or less, more preferably 1 or more and 10 or less, and particularly preferably 1 or more and 5 or less.

Specific examples of the hydrocarbon group include chain alkyl groups such as a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, a 2-ethylhexyl group, an n-nonyl group, an n-decyl group, an n-undecyl group, an n-tridecyl group, an n-tetradecyl group, an n-pentadecyl group, an n-hexadecyl group, an n-heptadecyl group, an n-octadecyl group, an n-nonadecyl group, and an n-icosyl group; chain alkenyl groups such as a vinyl group, a 1-propenyl group, a 2-n-propenyl group (allyl group), a 1-n-butenyl group, a 2-n-butenyl group, and a 3-n-butenyl group; cycloalkyl groups such as a cyclopropyl group, a cyclobutyl group, a cyclopentyl group, a cyclohexyl group, and a cycloheptyl group; aryl groups such as a phenyl group, an o-tolyl group, a m-tolyl group, a p-tolyl group, an α-naphthyl group, a β-naphthyl group, a biphenyl-4-yl group, a biphenyl-3-yl group, a biphenyl-2-yl group, an anthryl group, and a phenanthryl group; and aralkyl groups such as a benzyl group, a phenethyl group, an α-naphthylmethyl group, a 3-naphthylmethyl group, an α-naphthylethyl group, and a 3-naphthylethyl group.

Specific examples of the halogenated hydrocarbon group include halogenated chain alkyl groups such as a chloromethyl group, a dichloromethyl group, a trichloromethyl group, a bromomethyl group, a dibromomethyl group, a tribromomethyl group, a fluoromethyl group, a difluoromethyl group, a trifluoromethyl group, a 2,2,2-trifluoroethyl group, a pentafluoroethyl group, a heptafluoropropyl group, a perfluorobutyl group, a perfluoropentyl group, a perfluorohexyl group, a perfluoroheptyl group, a perfluorooctyl group, a perfluorononyl group, and a perfluorodecyl group; halogenated cycloalkyl groups such as a 2-chlorocyclohexyl group, a 3-chlorocyclohexyl group, a 4-chlorocyclohexyl group, a 2,4-dichlorocyclohexyl group, a 2-bromocyclohexyl group, a 3-bromocyclohexyl group, and a 4-bromocyclohexyl group; halogenated aryl groups such as a 2-chlorophenyl group, a 3-chlorophenyl group, a 4-chlorophenyl group, a 2,3-dichlorophenyl group, a 2,4-dichlorophenyl group, a 2,5-dichlorophenyl group, a 2,6-dichlorophenyl group, a 3,4-dichlorophenyl group, a 3,5-dichlorophenyl group, a 2-bromophenyl group, a 3-bromophenyl group, a 4-bromophenyl group, a 2-fluorophenyl group, a 3-fluorophenyl group, and a 4-fluorophenyl group; and halogenated aralkyl groups such as a 2-chlorophenylmethyl group, a 3-chlorophenylmethyl group, a 4-chlorophenylmethyl group, a 2-bromophenylmethyl group, a 3-bromophenylmethyl group, a 4-bromophenylmethyl group, a 2-fluorophenylmethyl group, a 3-fluorophenylmethyl group, and a 4-fluorophenylmethyl group.

Specific examples of the group composed of a carbon atom, a hydrogen atom, and an oxygen atom include hydroxy chain alkyl groups such as a hydroxymethyl group, a 2-hydroxyethyl group, a 3-hydroxy-n-propyl group, and a 4-hydroxy-n-butyl group; halogenated cycloalkyl groups such as a 2-hydroxycyclohexyl group, a 3-hydroxycyclohexyl group, and a 4-hydroxycyclohexyl group; hydroxyaryl groups such as a 2-hydroxyphenyl group, a 3-hydroxyphenyl group, a 4-hydroxyphenyl group, a 2,3-dihydroxyphenyl group, a 2,4-dihydroxyphenyl group, a 2,5-dihydroxyphenyl group, a 2,6-dihydroxyphenyl group, a 3,4-dihydroxyphenyl group, and a 3,5-dihydroxyphenyl group; hydroxyaralkyl groups such as a 2-hydroxyphenylmethyl group, a 3-hydroxyphenylmethyl group, and a 4-hydroxyphenylmethyl group; chain alkoxy groups such as a methoxy group, an ethoxy group, an n-propoxy group, an isopropoxy group, an n-butyloxy group, an isobutyloxy group, a sec-butyloxy group, a tert-butyloxy group, an n-pentyloxy group, an n-hexyloxy group, an n-heptyloxy group, an n-octyloxy group, a 2-ethylhexyloxy group, an n-nonyloxy group, an n-decyloxy group, an n-undecyloxy group, an n-tridecyloxy group, an n-tetradecyloxy group, an n-pentadecyloxy group, an n-hexadecyloxy group, an n-heptadecyloxy group, an n-octadecyloxy group, an n-nonadecyloxy group, and an n-icosyloxy group; chain alkenyloxy groups such as a vinyloxy group, a 1-propenyloxy group, a 2-n-propenyloxy group (allyloxy group), a 1-n-butenyloxy group, a 2-n-butenyloxy group, and a 3-n-butenyloxy group; aryloxy groups such as a phenoxy group, an o-tolyloxy group, a m-tolyloxy group, a p-tolyloxy group, an α-naphthyloxy group, a β-naphthyloxy group, a biphenyl-4-yloxy group, a biphenyl-3-yloxy group, a biphenyl-2-yloxy group, an anthryloxy group, and a phenanthryloxy group; aralkyloxy groups such as a benzyloxy group, a phenethyloxy group, an α-naphthylmethyloxy group, a β-naphthylmethyloxy group, an α-naphthylethyloxy group, and a β-naphthylethyloxy group; alkoxyalkyl groups such as a methoxymethyl group, an ethoxymethyl group, an n-propoxymethyl group, a 2-methoxyethyl group, a 2-ethoxyethyl group, a 2-n-propoxyethyl group, a 3-methoxy-n-propyl group, a 3-ethoxy-n-propyl group, a 3-n-propoxy-n-propyl group, a 4-methoxy-n-butyl group, a 4-ethoxy-n-butyl group, and a 4-n-propoxy-n-butyl group; alkoxyalkoxy groups such as a methoxymethoxy group, an ethoxymethoxy group, an n-propoxymethoxy group, a 2-methoxyethoxy group, a 2-ethoxyethoxy group, a 2-n-propoxyethoxy group, a 3-methoxy-n-propoxy group, a 3-ethoxy-n-propoxy group, a 3-n-propoxy-n-propoxy group, a 4-methoxy-n-butyloxy group, a 4-ethoxy-n-butyloxy group, and a 4-n-propoxy-n-butyloxy group; alkoxyaryl groups such as a 2-methoxyphenyl group, a 3-methoxyphenyl group, and a 4-methoxyphenyl group; alkoxyaryloxy groups such as a 2-methoxyphenoxy group, a 3-methoxyphenoxy group, and a 4-methoxyphenoxy group; aliphatic acyl groups such as a formyl group, an acetyl group, a propionyl group, a butanoyl group, a pentanoyl group, a hexanoyl group, a heptanoyl group, an octanoyl group, a nonanoyl group, and a decanoyl group; aromatic acyl groups such as a benzoyl group, an α-naphthoyl group, and a β-naphthoyl group; chain alkyloxycarbonyl groups such as a methoxycarbonyl group, an ethoxycarbonyl group, an n-propoxycarbonyl group, an n-butyloxycarbonyl group, an n-pentyloxycarbonyl group, an n-hexylcarbonyl group, an n-heptyloxycarbonyl group, an n-octyloxycarbonyl group, an n-nonyloxycarbonyl group, and an n-decyloxycarbonyl group; aryloxycarbonyl groups such as a phenoxycarbonyl group, an α-naphthoxycarbonyl group, and a β-naphthoxycarbonyl group; aliphatic acyloxy groups such as a formyloxy group, an acetyloxy group, a propionyloxy group, a butanoyloxy group, a pentanoyloxy group, a hexanoyloxy group, a heptanoyloxy group, an octanoyloxy group, a nonanoyloxy group, and a decanoyloxy group; and aromatic acyloxy groups such as a benzoyloxy group, an α-naphthoyl oxy group, and a β-naphthoyl oxy group.

$R^{a01}$ to $R^{a018}$ each independently is preferably a group selected from the group consisting of a hydrogen atom, a halogen atom, an alkyl group having 1 or more and 5 or less carbon atoms, and an alkoxy group having 1 or more and 5 or less carbon atoms. All $R^{a01}$ to $R^{a018}$ are more preferably hydrogen atoms since it is easy to form a cured film having particularly excellent mechanical properties by using the composition.

In the formulas (a01-2) to (a01-5), $R^{a01}$ to $R^{a018}$ are the same as $R^{a01}$ to $R^{a018}$ in the formula (a01-1). When $R^{a02}$ and $R^{a010}$ are combined with each other in the formulas (a01-2) and formula (a01-4), when $R^{a013}$ and $R^{a016}$ are combined with each other in the formula (a01-2), and when $R^{a02}$ and $R^{a08}$ are combined with each other in the formula (a01-3), for example, $—CH_2—$ and $—C(CH_3)_2—$ are exemplified as the divalent group to be formed.

Among the alicyclic epoxy compounds represented by the formula (a01-1), specific examples of suitable compound include alicyclic epoxy compounds represented by the following formula (a01-1a), formula (a01-1b), and formula (a01-1c), 2,2-bis(3,4-epoxycyclohexan-1-yl)propane[=2,2-bis(3,4-epoxycyclohexyl)propane], and the like.

(a01-1a)

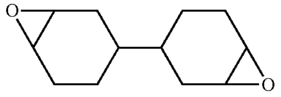

(a01-1b)

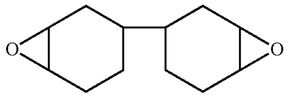

(a01-1c)

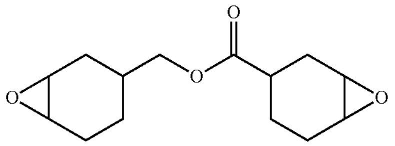

Among the alicyclic epoxy compounds represented by the formula (a01-2), specific examples of suitable compound include alicyclic epoxy compounds represented by the following formulas (a01-2a) and (a01-2b).

(a01-2a)

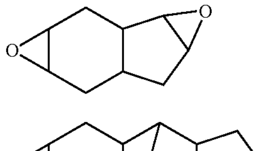

(a01-2b)

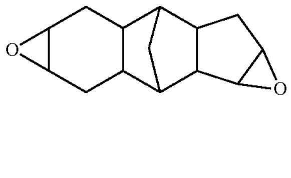

Among the alicyclic epoxy compounds represented by the formula (a01-3), specific examples of suitable compound include S spiro[3-oxatricyclo[3.2.1.$0^{2,4}$]octane-6,2'-oxirane], and the like.

Among the alicyclic epoxy compounds represented by the formula (a01-4), specific examples of suitable compound include 4-vinylcyclohexene dioxide, dipentene dioxide, limonene dioxide, 1-methyl-4-(3-methyloxiran-2-yl)-7-oxabicyclo[4.1.0]heptane, and the like.

Among the alicyclic epoxy compounds represented by the formula (a01-5), specific examples of suitable compound include 1,2,5,6-diepoxycyclooctane, and the like.

It is also possible to suitably use, as the epoxy compound, a compound represented by the following formula (a1-I).

(a1-I)

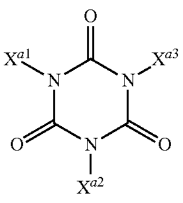

In the formula (a1-I), $X^{a1}$, $X^{a2}$, and $X^{a3}$ each independently represent a hydrogen atom, or an organic group optionally having an epoxy group, and the total number of epoxy groups possessed by $X^{a1}$, $X^{a2}$, and $X^{a3}$ is 2 or more.

The compound represented by the formula (a1-I) is preferably a compound represented by the following formula (a1-II).

(a1-II)

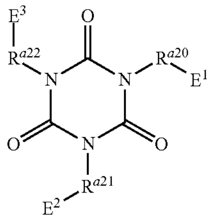

In the formula (a1-II), $R^{a20}$ to $R^{a22}$ represent a linear, branched, or cyclic alkylene group, an arylene group, —O—, —C(=O)—, —NH—, and a combination thereof, and each may be the same or different. $E^1$ to $E^3$ represent at least one substituent or hydrogen atom selected from the group consisting of an epoxy group, an oxetanyl group, an ethylenically unsaturated group, an alkoxysilyl group, an isocyanate group, a blocked isocyanate group, a thiol group, a carboxy group, a hydroxy group, and a succinic anhydride group. Provided that, a total number of epoxy groups possessed by $E^1$, $E^2$, and $E^3$ is 2 or more.

In the formula (a1-II), each of at least two of a group represented by $R^{a20}$ and $E^1$, $R^{a21}$ and $E^2$, and $R^{a22}$ and $E^3$ is preferably groups represented by the following formula (b1-IIa), and all the groups are more preferably groups represented by the following formula (a1-IIa). A group represented by plural formulas (a1-IIa) bonded to one compound is preferably the same group.

$$-L-C^{a} \quad \text{(a1-IIa)}$$

In the formula (a1-IIa), L is a linear, branched, or cyclic alkylene group, an arylene group, —O—, —C(=O)—, —NH—, and a combination thereof. $C^a$ is an oxyranyl group (epoxy group) In the formula (a1-IIa), L and $C^a$ may be combined to form a cyclic structure.

In the formula (a1-IIa), the linear, branched, or cyclic alkylene group as L is preferably an alkylene group having 1 or more and 10 or less carbon atoms, and the arylene group as L is preferably an arylene group having 5 or more and 10 or less carbon atoms. In the formula (a1-IIa), L is preferably a linear alkylene group having 1 or more and 3 or less carbon atoms, a phenylene group, —O—, —C(═O)—, —NH—, and a combination thereof, and preferably at least one of a linear alkylene group having 1 or more and 3 or less carbon atoms such as a methylene group, and a phenylene group, or a group composed of a combination of these groups and at least one of —O—, —C(═O)— and NH—.

In the formula (a1-IIa), when L and $C^a$ are combined with each other to form a cyclic structure, for example, when a branched alkylene group and an epoxy group are combined with each other to form a cyclic structure (structure having an alicyclic structure epoxy group), an organic group represented by the following formula (a1-IIb) to (a1-IId) is exemplified.

(a1-IIb)

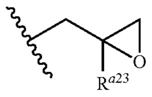

(a1-IIc)

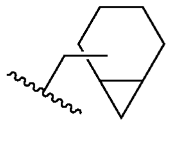

(a1-IId)

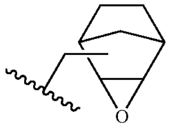

In the formula (a1-IIb), $R^{a23}$ is hydrogen atom or methyl group.

Examples of the compound represented by the formula (a1-II) include, but are not limited to, examples of an epoxy compound having an oxyranyl group or an alicyclic epoxy group.

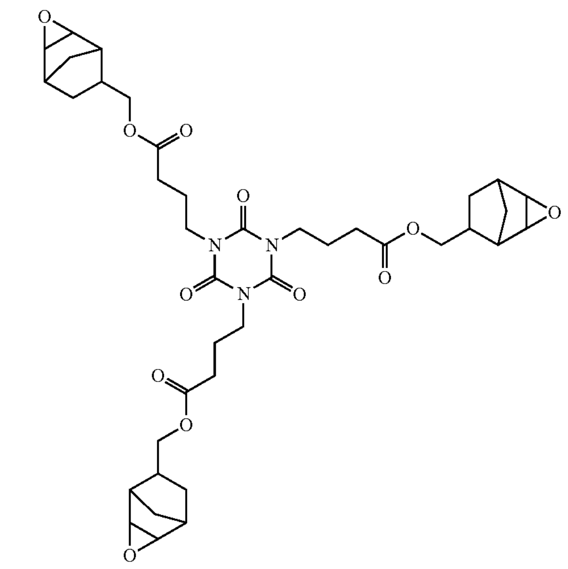

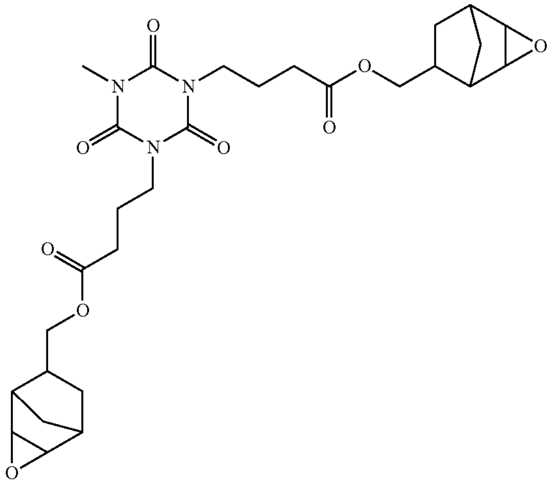

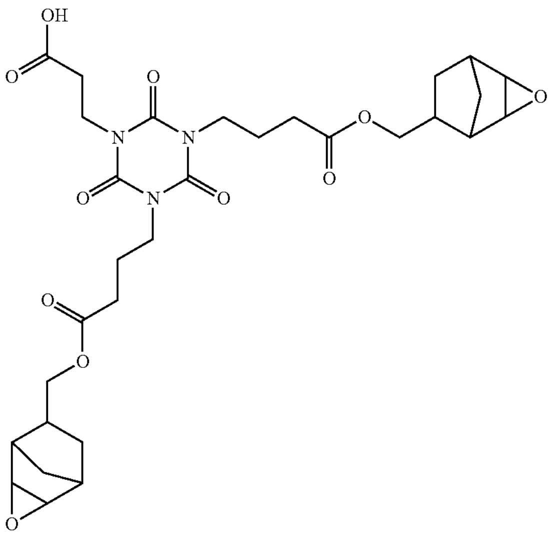

-continued
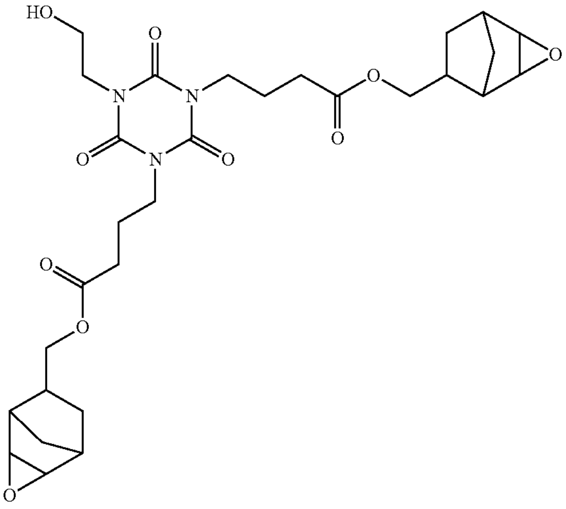
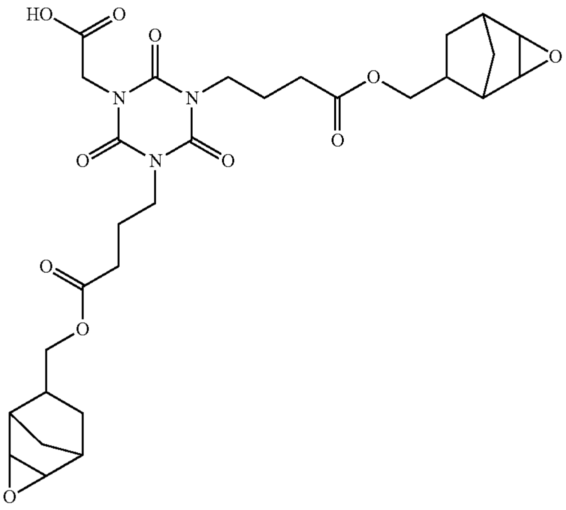
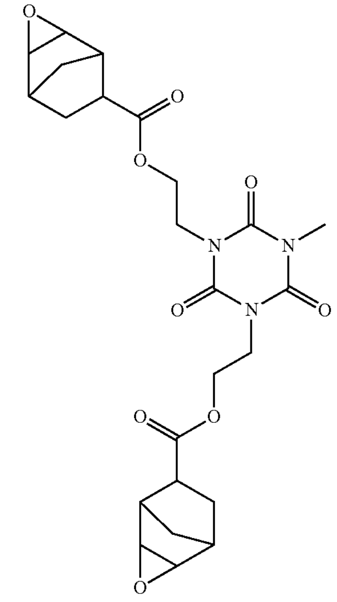
-continued
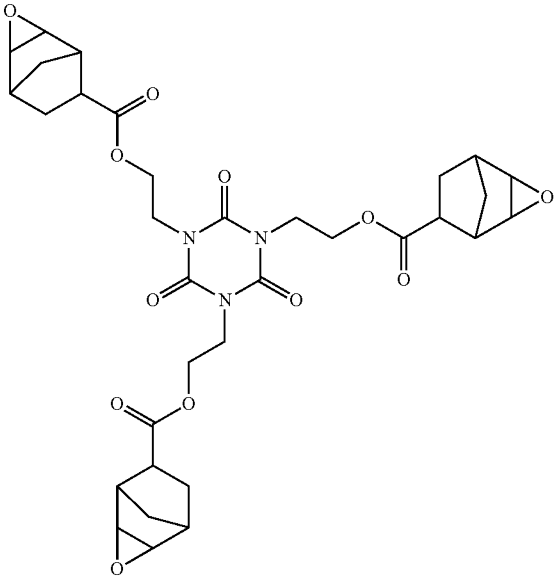
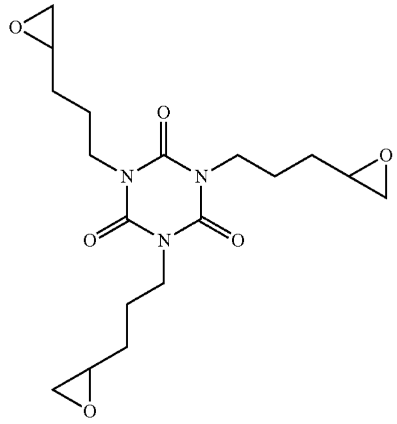
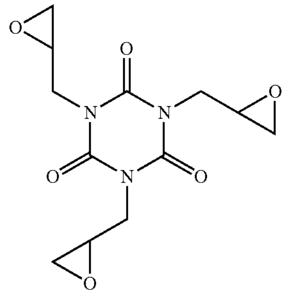
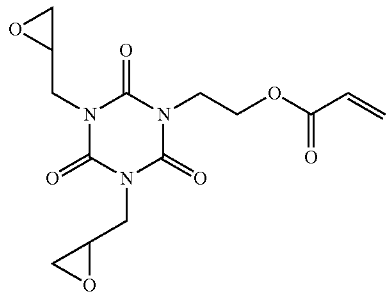

-continued
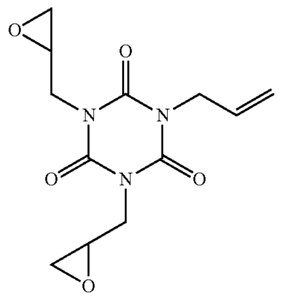
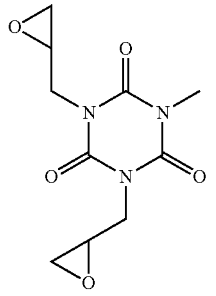
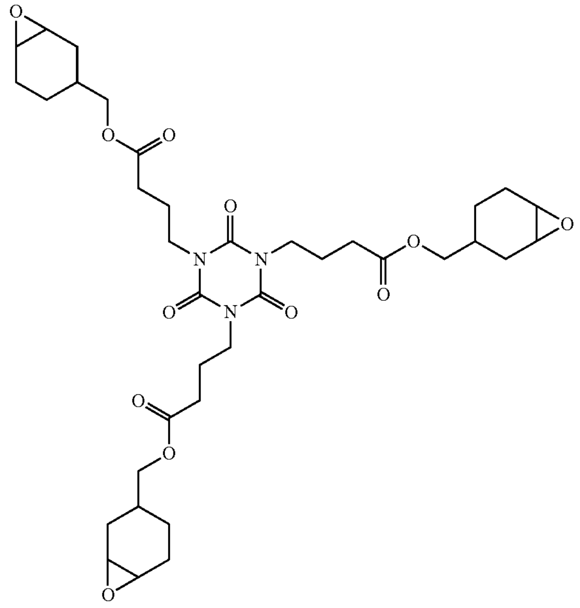
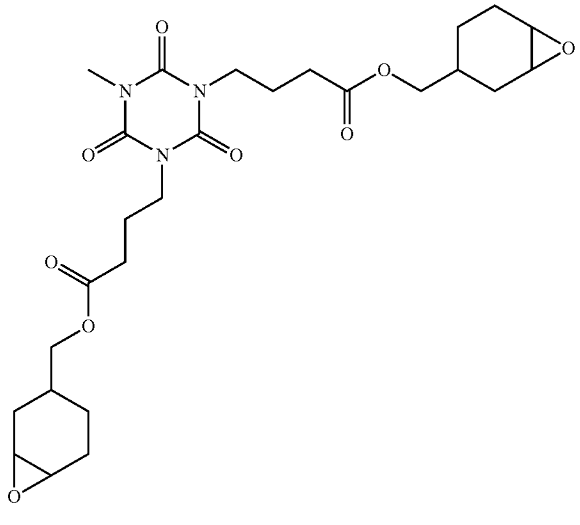
-continued
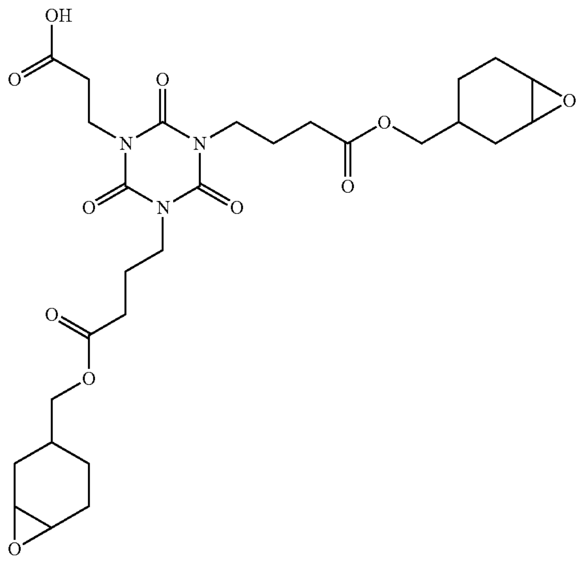
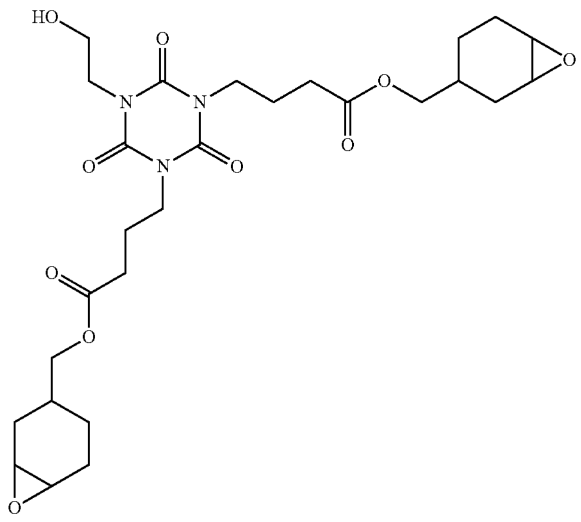
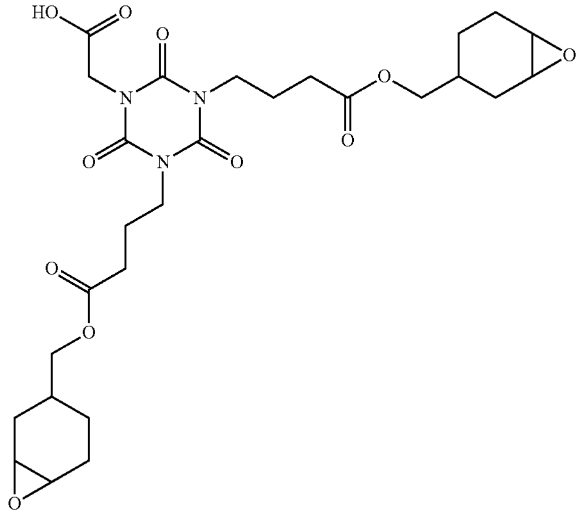

-continued

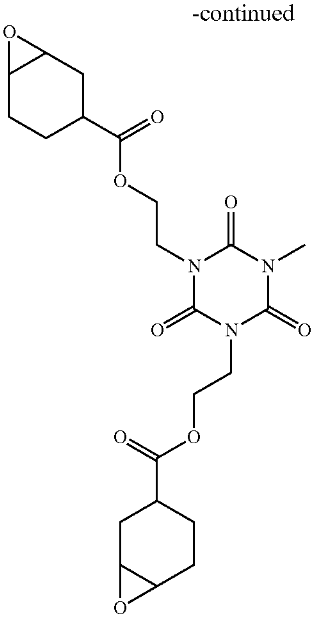

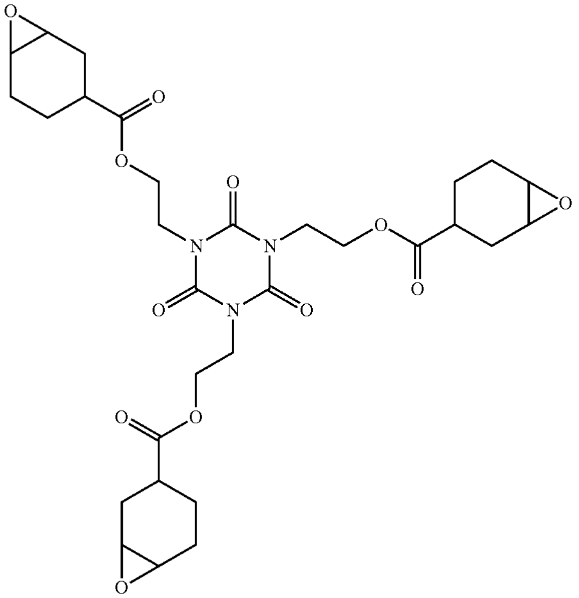 [SMILES: O=C(OCCn1c(=O)n(CCOC(=O)C2CCC3OC3C2)c(=O)n(CCOC(=O)C2CCC3OC3C2)c1=O)C1CCC2OC2C1]

In addition, a siloxane compound having two or more groups selected from a glycidyl group and an alicyclic epoxy group in the molecule (hereinafter simply referred to as "siloxane compound") can be suitably used as the epoxy compound.

The siloxane compound is a compound including a siloxane skeleton composed of a siloxane bond (Si—O—Si) and two or more groups selected from the glycidyl group and the alicyclic epoxy group in the molecule.

Examples of the siloxane skeleton in the siloxane compound include a cyclic siloxane skeleton, and a cage or ladder type polysilsesquioxane skeleton.

The siloxane compound is preferably a compound including a cyclic siloxane skeleton represented by the following formula (a1-III) (hereinafter sometimes referred to as "cyclic siloxane").

(a1-III)

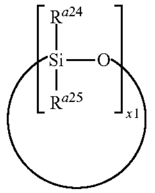

In the formula (a1-III), $R^{a24}$ and $R^{a25}$ represent a monovalent group having an epoxy group, or an alkyl group. Provided that, at least two of x1 $R^{a24}$ and x1 $R^{a25}$ in the compound represented by the formula (a1-III) is a monovalent group having a glycidyl group. x1 in the formula (a1-III) represents an integer of 3 or more. $R^{a24}$ and $R^{a25}$ in the compound represented by the formula (a1-III) may be the same or different. Plural $R^{a24}$(s) may be the same or different. Plural $R^{a2}$5(s) may also be the same or different. Examples of the alkyl group include linear or branched alkyl groups having 1 or more and 18 or less carbon atoms (preferably 1 or more and 6 or less carbon atoms, and particularly preferably 1 or more and 3 or less carbon atoms) such as a methyl group, an ethyl group, a propyl group, and an isopropyl group.

x1 in the formula (a1-III) represents an integer of 3 or more, and preferably an integer of 3 or more and 6 or less in view of excellent crosslinking reactivity in the case of forming a cured film by using the composition. The number of epoxy groups in the molecule possessed by the siloxane compound is 2 or more, preferably 2 or more and 6 or less in view of excellent crosslinking reactivity in the case of forming a cured film by using the composition, and particularly preferably 2 or more and 4 or less.

An alicyclic epoxy group, and a glycidyl ether group represents by $-D^{A}-O—R^{a26}$ [in which, $D^{A}$ represents an alkylene group, and $R^{a26}$ represents a glycidyl group] are preferable, an alicyclic epoxy group is more preferable, and an alicyclic epoxy group represented by the following formula (a1-IIIa) or the following formula (a1-IIIb) is further preferable as the monovalent group including the epoxy group. Examples of the $D^{A}$ (the alkylene group) include a linear or branched alkylene group having 1 or more and 18 or less carbon atoms such as a methylene group, a methylmethylene group, a dimethylmethylene group, a dimethylene group, and a trimethylene group.

(a1-IIIa)

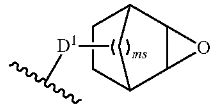

(a1-IIIb)

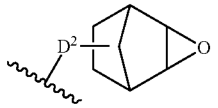

In the formula (a1-IIIa) and the formula (a1-IIIb), $D^1$ and $D^2$ each independently represent an alkylene group, and ms represents an integer of 0 or more and 2 or less.

The composition may include, in addition to the siloxane compound represented by the formula (a1-III), compounds including a siloxane skeleton, such as an alicyclic epoxy group-containing cyclic siloxane, an alicyclic epoxy group-containing silicone resin mentioned in Japanese Unexamined Patent Application, Publication No. 2008-248169, and an organopolysilsesquioxane resin having at least two epoxy functional groups in a molecule mentioned in Japanese Unexamined Patent Application, Publication No. 2008-19422 as the epoxy compound.

More specific examples of the siloxane compound include cyclic siloxane having two or more glycidyl groups in the molecule represented by the following formula. It is possible to use, as the siloxane compound, commercially available products, for example, trade name "X-40-2670", "X-40-2701", "X-40-2728", "X-40-2738", and "X-40-2740" (which are manufactured by Shin-Etsu Chemical Co., Ltd.).

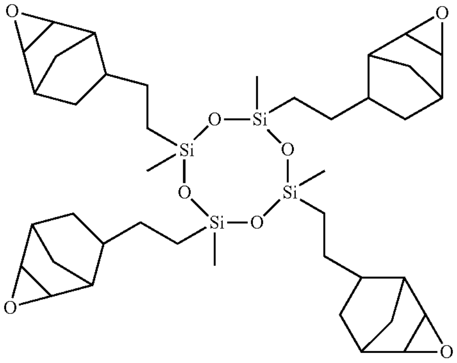

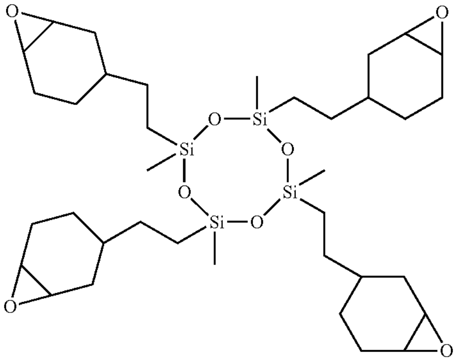

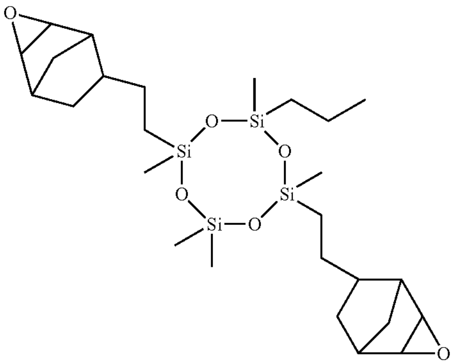

-continued

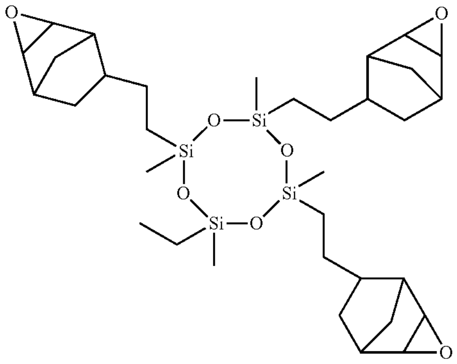

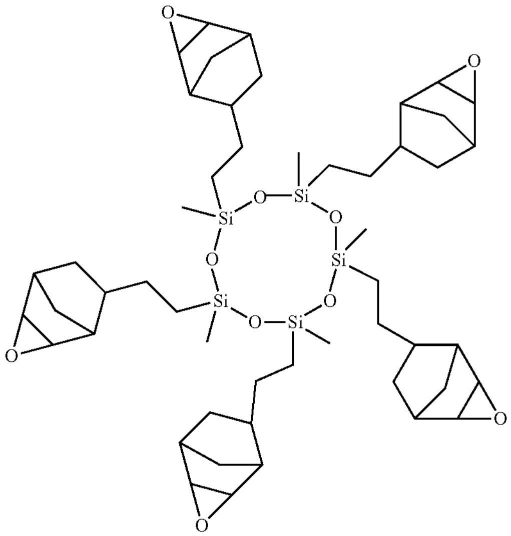

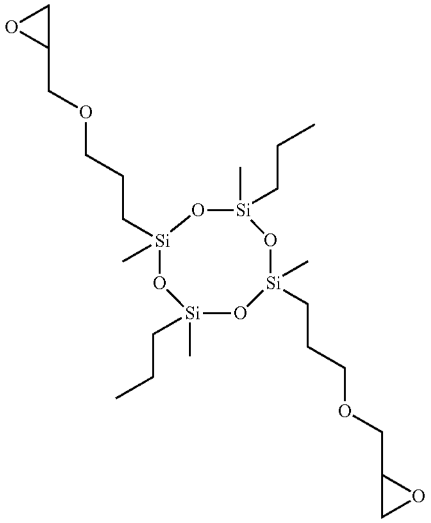

-continued
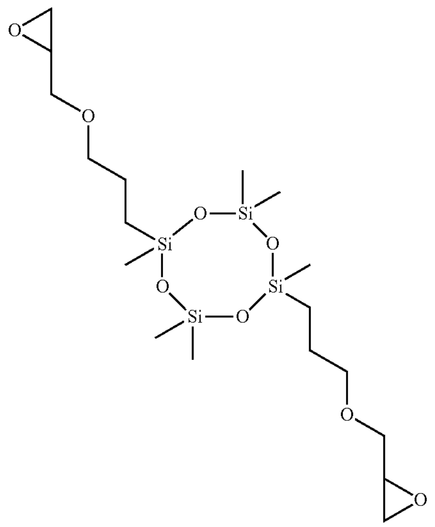
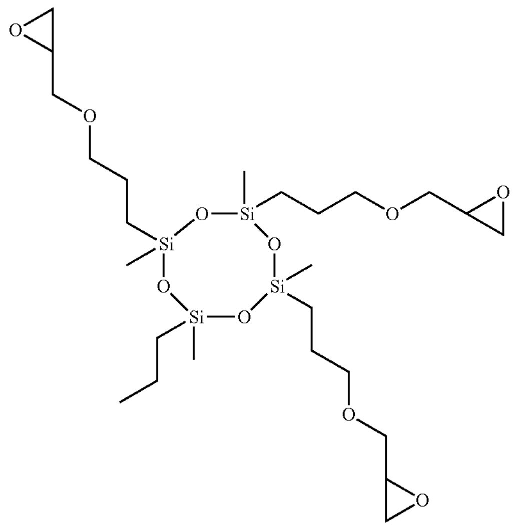
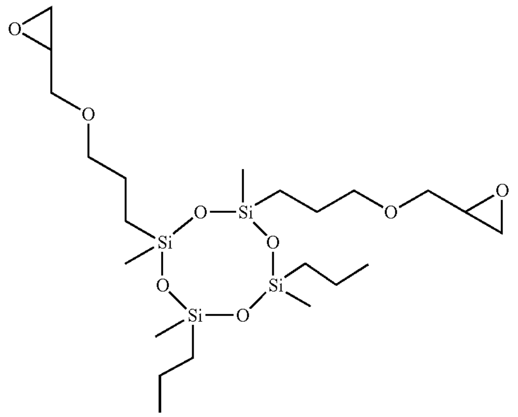
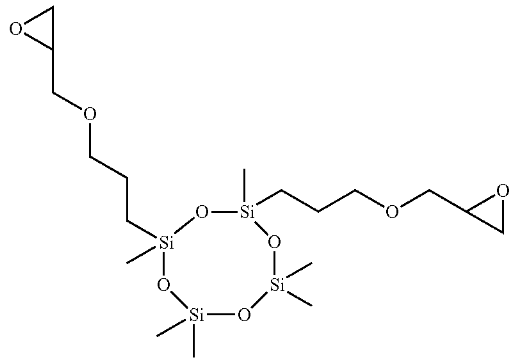
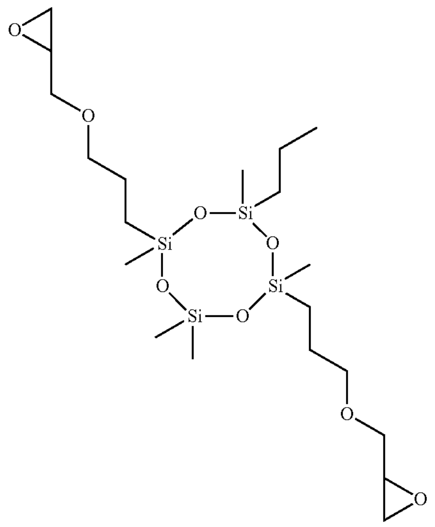
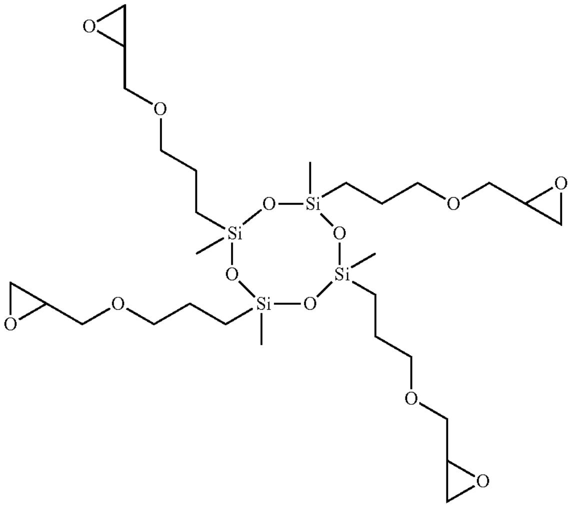
-continued -continued

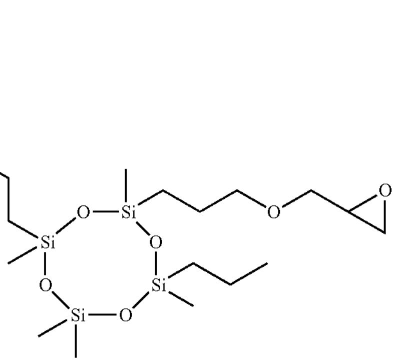

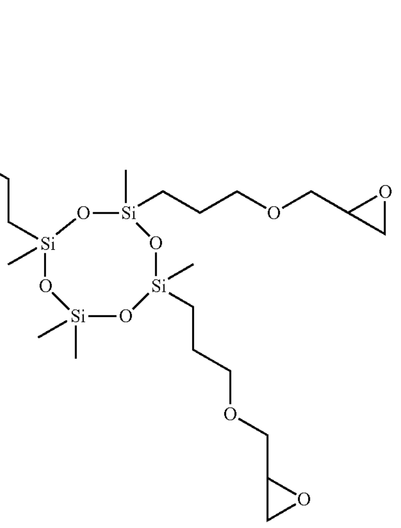

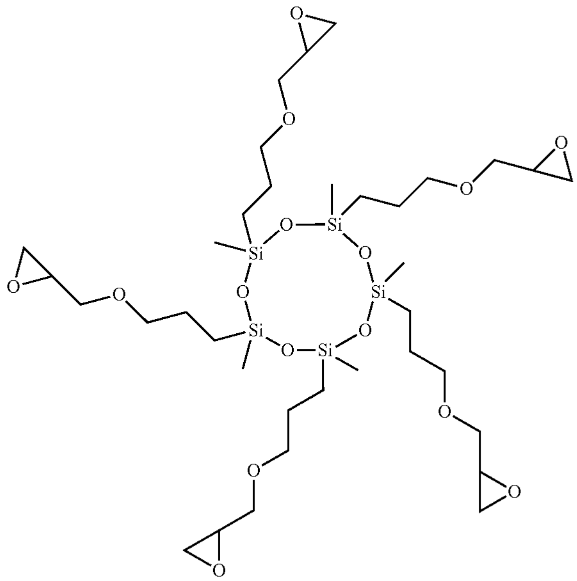

-continued

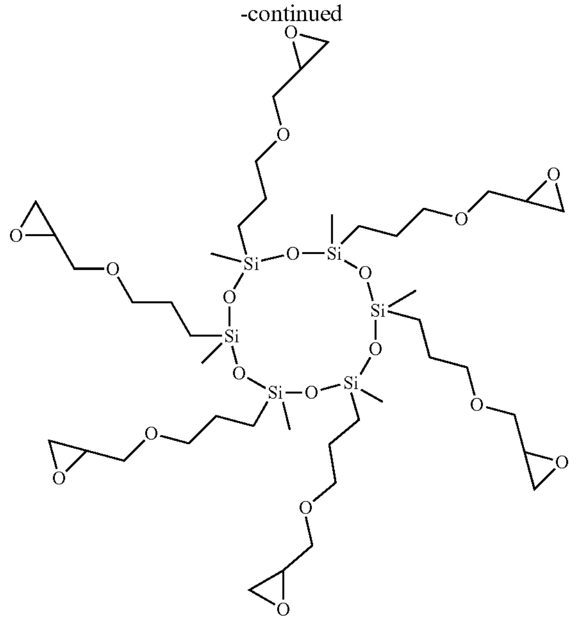

In view of easy formation of cured product having a high refractive index by using the composition, the composition preferably includes a compound represented by the following formula (A-2e) as other photopolymerizable compound (A2).

(A-2e)

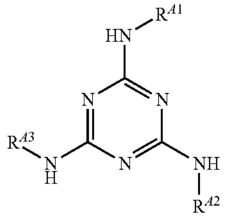

In the formula (A-2e), $R^{A1}$, $R^{A2}$, and $R^{A3}$ are each independently an organic group. At least two of the organic group as $R^{A1}$, the organic group as $R^{A2}$, and the organic group as $R^{A3}$ have the radically polymerizable group-containing group or the cationically polymerizable group-containing group.

Suitable examples of the compound represented by the formula (A-2e) include a compound represented by the following formula (A-2e-a).

(A-2e-a)

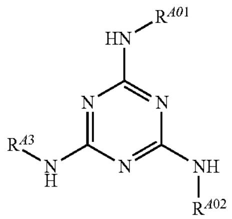

In the formula (A-2e-ad), $R^{A01}$ is an optionally substituted quinolinyl group, an optionally substituted isoquinolinyl group, or an optionally substituted 2-substituted benzothiazolyl group. The 2-substituted benzothiazolyl group has a group represented by —S—$R^{A0}$ at 2-position. $R^{A0}$ is a hydrogen atom, a radically polymerizable group-containing group, or a cationically polymerizable group-containing group. Both of $R^{A02}$ and $R^{A03}$ are aromatic ring-containing group having the radically polymerizable group-containing group, or aromatic ring-containing group having the cationically polymerizable group-containing group. An —NH— group bonding to a triazine ring bonds to the aromatic rings in $R^{A02}$ and $R^{A03}$.

All of the optionally substituted quinolinyl group, the optionally substituted isoquinolinyl group, and the optionally substituted 2-substituted benzothiazolyl group have large polarizability and small volume as a functional group. Therefore, it is thought that the optionally substituted quinolinyl group, the optionally substituted isoquinolinyl group, and the optionally substituted 2-substituted benzothiazolyl group give high refractive index to the cured product formed by using the composition.

The quinolinyl group as $R^{A01}$ may be any one of quinoline-2-yl group, quinoline-3-yl group, quinoline-4-yl group, quinoline-5-yl group, quinoline-6-yl group, quinoline-7-yl group, and quinoline-8-yl group. Among these group, quinoline-3-yl group and quinoline-4-yl group are preferred in view of ease of obtaining raw material compound for the compound represented by the formula (A2e-a), ease of synthesizing the compound represented by the formula (A2e-a), and the like.

The isoquinolinyl group as $R^{A01}$ may be any one of isoquinoline-1-yl group, isoquinoline-2-yl group, isoquinoline-3-yl group, isoquinoline-4-yl group, isoquinoline-5-yl group, isoquinoline-6-yl group, isoquinoline-7-yl group, and isoquinoline-8-yl group.

The substituent which quinolinyl group and isoquinolinyl group as $R^{A01}$ may have is not particularly limited as long as the desired effect is not impaired. Examples of substituent include halogen atom, hydroxy group, mercapto group, cyano group, nitro group, and monovalent organic group. Examples of halogen atom as the substituent include fluorine atom, chlorine atom, bromine atom, and iodine atom. Examples of the monovalent organic group include an alkyl group, an alkoxy group, an alkoxyalkyl group, an aliphatic acryl group, an aliphatic acyloxy group, an alkoxycarbonyl group, an alkylthio group, an aliphatic acylthio group, and the like. In addition, the radically polymerizable group-containing group and the cationically polymerizable group-containing group are preferred as the monovalent organic group.

A number of carbon atoms in the monovalent organic group as the substituent is not particularly limited as long as the desired effect is not impaired. For example, the number of carbon atoms in the monovalent organic group as the substituent is preferably 1 or more and 20 or less, more preferably 1 or more and 12 or less, and further preferably 1 or more and 8 or less. In the alkoxyalkyl group, the aliphatic acyl group, the aliphatic acyloxy group, the alkoxycarbonyl group, the alkoxyalkylthio group, and the aliphatic acylthio group, lower limit of the number of carbon atoms is 2.

Suitable specific examples of the alkyl group as the substituent include methyl group, ethyl group, n-propyl group, isopropyl group, n-butyl group, isobutyl group, sec-butyl group, tert-butyl group, n-pentyl group, n-hexyl group, n-heptyl group, and n-octyl group.

Suitable specific examples of the alkoxy group as the substituent include methoxy group, ethoxy group, n-propyloxy group, isopropyl oxy group, n-butyloxy group, isobutyloxy group, sec-butyloxy group, tert-butyloxy group, n-pentyloxy group, n-hexyloxy group, n-heptyloxy group, and n-octyloxy group.

Suitable specific examples of the alkoxyalkyl group include methoxymethyl group, ethoxymethyl group, n-propyloxymethyl group, n-butyloxymethyl group, 2-methoxyethyl group, 2-ethoxyethyl group, 2-n-propyloxyethyl group, 2-n-butyloxyethyl group, 3-methoxy-n-propyl group, 3-ethoxy-n-propyl group, 3-n-propyloxy-n-propyl group, 3-n-butyloxy-n-propyl group, 4-methoxy-n-bnutyl group, 4-ethoxy-n-butyl group, 4-n-propyloxy-n-butyl group, and 4-n-butyloxy-n-butyl group.

Suitable specific examples of the aliphatic acyl group include acetyl group, propionyl group, butanoyl group, pentanoyl group, hexanoyl group, heptanoyl group, and octanoyl group.

Suitable specific examples of the aliphatic acyloxy group as the substituent include acetoxy group, propionyloxy group, butanoyloxy group, pentanoyloxy group, hexanoyloxy group, heptanoyloxy group, and octanoyloxy group.

Suitable specific examples of the alkoxycarbonyl group as the substituent include methoxycarbonyl group, ethoxycarbonyl group, n-propyloxycarbonyl group, isopropyloxycarbonyl group, n-butyloxycarbonyl group, isobutyloxycarbonyl group, sec-butyloxycarbonyl group, tert-butyloxycarbonyl group, n-pentyloxycarbonyl group, n-hexyloxycarbonyl group, n-heptyloxycarbonyl group, and n-octyloxycarbonyl group.

Suitable specific examples of the alkylthio group as the substituent include methylthio group, ethylthio group, n-propylthio group, isopropylthio group, n-butylthio group, isobutylthio group, sec-butylthio group, tert-butylthio group, n-pentylthio group, n-hexylthio group, n-heptylthio group, and n-octylthio group.

Suitable specific examples of the aliphatic acylthio group as the substituent include acetylthio group, propionylthio group, butanoylthio group, pentanoylthio group, hexanoylthio group, heptanoylthio group, and ocatnoylthio group.

When the quinolinyl group and the isoquinolinyl group have the substituent, a number of the substituent is not particularly limited as long as the desired effect is not impaired. When the quinolinyl group and the isoquinolinyl group have the substituent, the number of the substituent is preferably 1 or more and 4 or less, more preferably 1 or 2, and particularly preferably 1. When the quinolinyl group and the isoquinolinyl group have a plurality of the substituents, the plurality of the substituents may be different from each other.

The 2-substituted benzothiazoly group as $R^{A01}$ has the group represented by —S—$R^{A0}$ at 2-position. The 2-substituted benzothiazoly group as $R^{A01}$ may have other substituent than the group represented by —S—$R^{A0}$ at other position than 2-position. $R^{A0}$ is a hydrogen atom, a radically polymerizable group-containing group, or a cationically polymerizable group-containing group. The radically polymerizable group-containing group or the cationically polymerizable group-containing group will be described later.

Suitable examples of the 2-substituted benzothiazolyl group include the following groups.

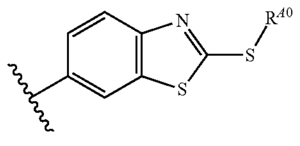

-continued

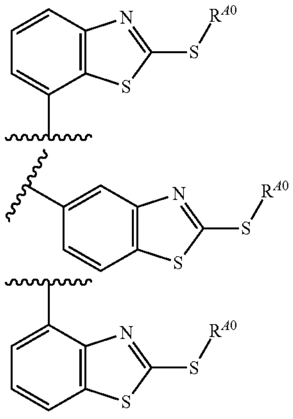

The substituent which the 2-substituted benzothiazolyl group as $R^{A01}$ may have is the same as the substituent which the quinolinyl group and the isoquinolinyl group may have. When the 2-substituted benzothiazolyl group has the substituent, a number of the substituent is not particularly limited as long as the desired effect is not impaired. When the 2-substituted benzothiazolyl group has the substituent, the number of the substituent is preferably 1 or 2, and more preferably 1. When the 2-substituted benzothiazolyl group has a plurality of the substituents, the plurality of the substituents may be different from each other.

Both of $R^{A02}$ and $R^{A03}$ are aromatic ring-containing group having the radically polymerizable group-containing group, or aromatic ring-containing group having the cationically polymerizable group-containing group. It should be noted that —NH— group bonding to triazine ring bonds to the aromatic rings in $R^{A02}$ and $R^{A03}$. In the aromatic ring-containing group as $R^{A02}$ and $R^{A03}$, a position to which the radically polymerizable group-containing group or the cationically polymerizable group-containing group bonds is not particularly limited.

A number of the radically polymerizable group-containing group or the cationically polymerizable group-containing group in the aromatic ring-containing group as $R^{A02}$, and a number the radically polymerizable group-containing group or the cationically polymerizable group-containing group in the aromatic ring-containing group as $R^{A03}$ are not particularly limited. The number of the radically polymerizable group-containing group or the cationically polymerizable group-containing group in the aromatic ring-containing group as $R^{A02}$, and the number the radically polymerizable group-containing group or the cationically polymerizable group-containing group in the aromatic ring-containing group as $R^{A03}$ are preferably an integer of 1 or more and 3 or less, more preferably 1 or 2, and particularly preferably 1.

The aromatic ring-containing group as $R^{A02}$ and $R^{A03}$ may include only one monocyclic aromatic ring or only one condensed aromatic ring, or two or more of monocyclic aromatic ring(s) and/or condensed aromatic ring. When the aromatic ring-containing group as $R^{A02}$ and $R^{A03}$ includes two or more of monocyclic aromatic rings and/or condensed aromatic rings, a type of bridging group which bridges monocyclic aromatic rings, condensed aromatic rings, or monocyclic aromatic ring and condensed aromatic ring. The bridging group may be a divalent bridging group or a trivalent bridging group, and is preferably a divalent bridging group.

Examples of the divalent bridging group include divalent aliphatic hydrocarbon group, divalent halogenated aliphatic hydrocarbon group, —CONH—, —NH—, —N═N—, —CH═N—, —COO—, —O—, —CO—, —SO—, $—SO_2—$, —S—, and —S—S—, and a combination of two or more of these.

In addition, a group represented by $—CR^{a001}R^{a002}—$ is preferred as the divalent bridging group. $R^{a001}$ and $R^{a002}$ are each independently a hydrogen atom, an alkyl group having 1 or more and 4 or less carbon atoms, or a halogenated alkyl group having 1 or more and 4 or less carbon atoms. $R^{a001}$ and $R^{a002}$ may be combined with each other to form a ring. Specific examples of the group represented by $—CR^{a001}R^{a002}—$ include methylene group, ethane-1,2-diyl group, propane-2,2-diyl group, butane-2,2-diyl group, 1,1,1,3,3,3-hexafluoropropane-2,2-diyl group, cyclopentylidene group, cyclohexylidene group, and cycloheptylidene group.

The aromatic ring containing-group as $R^{A02}$ and $R^{A0}3$ has the radically polymerizable group-containing group or the cationically polymerizable group-containing group. The radically polymerizable group-containing group and the cationically polymerizable group-containing group are as described above.

Suitable examples of the radically polymerizable group-containing group include a group represented by the following formula (A-I) or the following formula (A-II) and not corresponding to vinyloxy group.

$$-(A^{01})na—R^{01} \quad \text{(A-I)}$$

$$-(A^{01})na—R^{02}-A^{02}-R^{01} \quad \text{(A-II)}$$

In the formula (A-I) and the formula (A-II), R01 is an alkenyl group having 2 or more and 10 or less carbon atoms. $R^{02}$ is an alkylene group having 1 or more and 10 or less carbon atoms. $A^{01}$ is —C—, —S—, —CO—, —CO—C—, —CO—S—, —O—CO—, —S—CO—, —CO—NH—, —NH—CO—, or —NH. $A^{02}$ is —C—, —S—, —CO—, —CO—C—, —CO—S—, —O—CO—, —S—CO—, —CO—NH—, —NH—CO—, or —NH. na is 0 or 1.

Suitable specific examples of the radically polymerizable group-containing group include groups represented by $—C—R^{03}$,
$—S—R^{03}$,
$—O—CH_2CH_2—O—R^{03}$,
$—C—CH_2CH_2CH_2—O—R^{03}$,
$—O—CH_2CH_2CH_2CH_2—O—R^{03}$,
$—CO—O—CH_2CH_2—O—R^{03}$,
$—CO—O—CH_2CH_2CH_2—O—R^{03}$,
$—COO—CH_2CH_2CH_2CH_2—O—R^{03}$,
$—O—CH_2CH_2—NH—R^{03}$,
$—O—CH_2CH_2CH_2—NH—R^{03}$,
$—O—CH_2CH_2CH_2CH_2—NH—R^{03}$,
$—COO—CH_2CH_2—NH—R^{03}$,
$—CO—O—CH_2CH_2CH_2—NH—R^{03}$,
$—COO—CH_2CH_2CH_2CH_2—R^{03}$,
$—NH—R^{03}$,
$—NH—CH_2CH_2—O—R^{03}$,
$—NH—CH_2CH_2CH_2—O—R^{03}$,
$—NH—CH_2CH_2CH_2CH_2—O—R^{03}$,
$—CO—NH—CH_2CH_2—O—R^{03}$,
$—CO—NH—CH_2CH_2CH_2—O—R^{03}$,
$—CO—NH—CH_2CH_2CH_2CH_2—O—R^{03}$,
$—NH—CH_2CH_2—NH—R^{03}$,
$—NH—CH_2CH_2CH_2—NH—R^{03}$,
$—NH—CH_2CH_2CH_2CH_2—NH—R^{03}$,
$—CO—NH—CH_2CH_2—NH—R^{03}$,
$—CO—NH—CH_2CH_2CH_2—NH—R^{03}$, and $—CO—NH—CH_2CH_2CH_2CH_2—NH—R^{03}$.

$R^{03}$ in these groups is ally group or (meth)acryloyl group.

Suitable examples of the cationically polymerizable group-containing group include vinyl oxy group and groups represented by the following formulas (A3) to (A8).

$$-(A^{01})na—R^{04} \quad (A3)$$

$$-(A^{01})na—R^{02}—R^{05} \quad (A4)$$

$$-(A^{01})na—R^{02}—(CO)_{nb}\text{-}A^{03}\text{-}R^{04} \quad (A5)$$

$$(A^{01})na—R^{02}—(CO)_{nb}\text{-}A^{03}\text{-}R^{07}—R^{05} \quad (A6)$$

$$(A^{01})na—R^{02}—O—R^{06} \quad (A7)$$

$$(A^{01})na—R^{02}—(CO)_{nb}\text{-}A^{03}\text{-}R^{07}—O—R^{06} \quad (A8)$$

In the formulas (A3) to (A8), $R^{02}$ is an alkylene group having 1 or more and 10 or less carbon atoms. $R^{04}$ is an epoxyalkyl group having 2 or more and 20 or less carbon atoms or an alicyclic epoxy group having 3 or more and 20 or less carbon atoms. $R^{05}$ is an alicyclic epoxy group having 3 or more and 20 or less carbon atoms. $R^{06}$ is a vinyl group. $R^{07}$ is an alkylene group having 1 or more and 10 or less carbon atoms. $A^{01}$ is —C—, —S—, —CO—, —CO—C—, —CO—S—, —O—CO—, —S—CO—, —CO—NH—, —NH—CO, or —NH. $A^{03}$ is —C— or —NH-nb is 0 or 1.

Suitable examples of the cationically polymerizable group-containing group include groups represented by $—R^{08}$, $—O—CH_2CH_2—R^{08}$, $—O—CH_2CH_2CH_2—R^{08}$, $—O—CH_2CH_2CH_2CH_2—R^{08}$.

$—CO—O—CH_2CH_2—R^{08}$, $—CO—O—CH_2CH_2CH_2—R^{08}$, $—COO—CH_2CH_2CH_2CH_2—R^{08}$, $—NH—CH_2CH_2—R^{08}$, $—NH—CH_2CH_2CH_2—R^{08}$, $—NH—CH_2CH_2CH_2CH_2—R^{08}$, $—CO—NH—CH_2CH_2—R^{08}$, $—CO—NH—CH_2CH_2CH_2—R^{08}$, and $—CO—NH—CH_2CH_2CH_2CH_2—R^{08}$. $R^{08}$ in these groups is vinyloxy group, glycidyloxy group, glycidylthio group, epoxycyclopentyl group, epoxycyclohexyl group, or epoxycycloheptyl group.

When the aromatic ring-containing group as $R^{A02}$ and $R^{A03}$ has one radically polymerizable group-containing group or one cationically polymerizable group-containing group, suitable examples of the $R^{A02}$ and $R^{A03}$ include the following groups. In the following formulas, PG is the radically polymerizable group-containing group or the cationically polymerizable group-containing group.

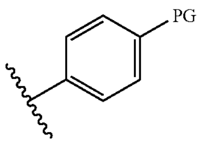
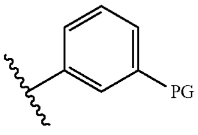
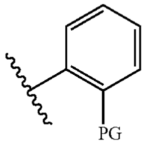
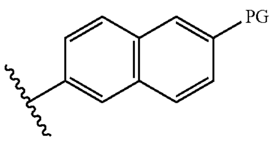

-continued

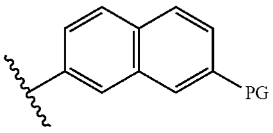
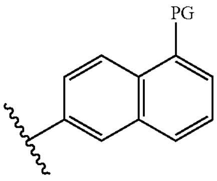
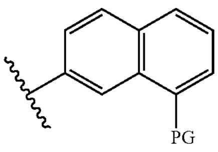
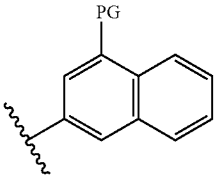
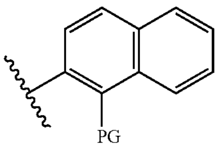
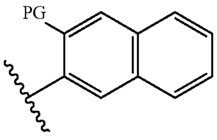
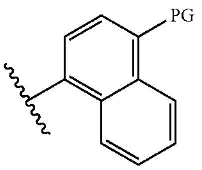
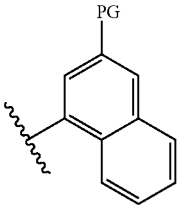
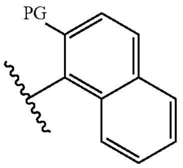
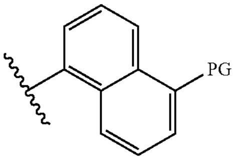
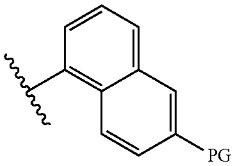
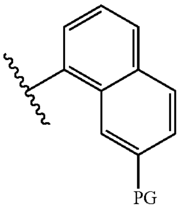
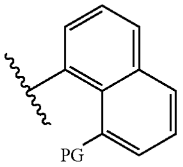
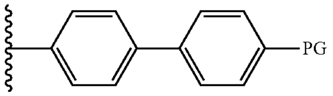
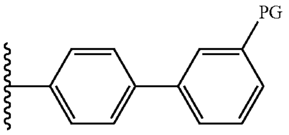
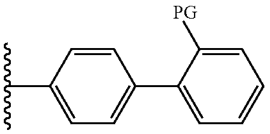
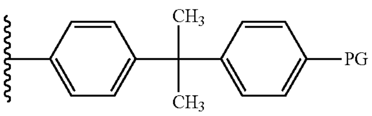

-continued
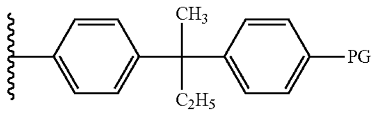
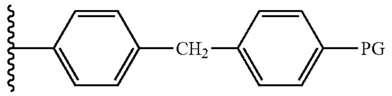
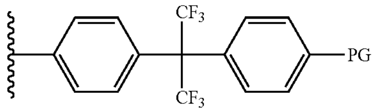
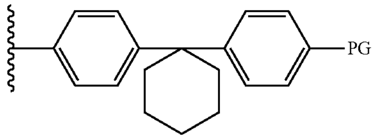
Suitable specific examples of the compound represented by the formula (A-2e) include the following compounds. In the following formulas, $X^A$ is a group selected from the group consisting of (meth)acryloyloxy group, (meth)acryloylthio group, 3-(meth)acryloyloxy-2-hydroxy-n-propyloxycarbonyl group, and glycidyloxy group.
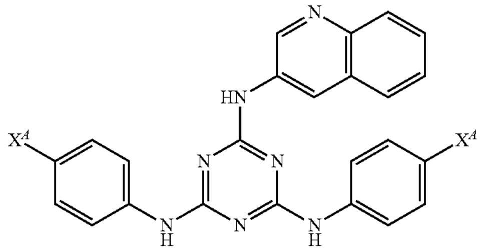
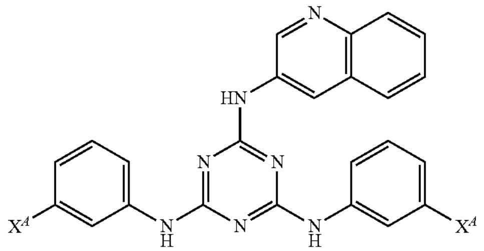
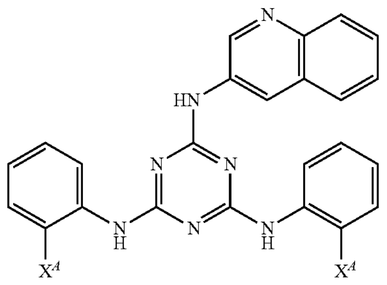
-continued
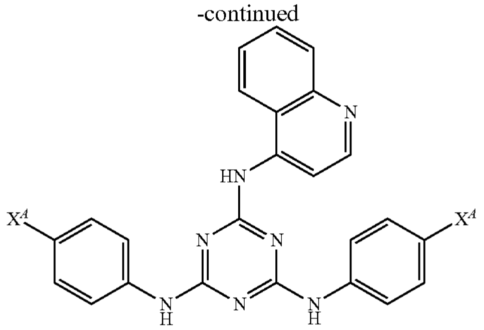
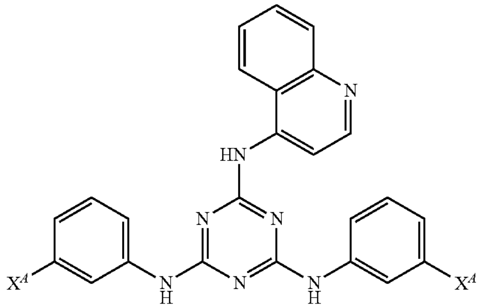
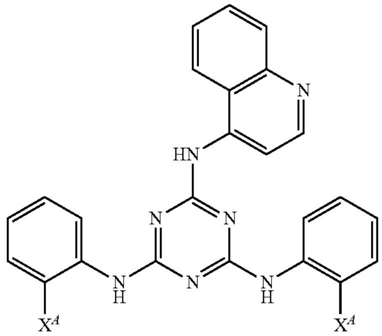
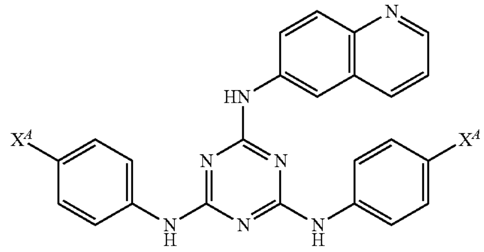
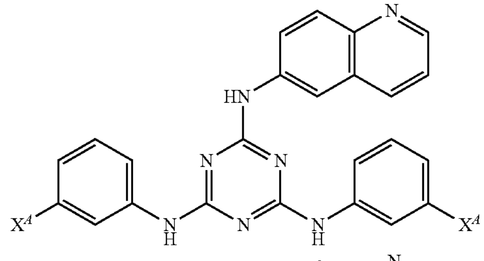
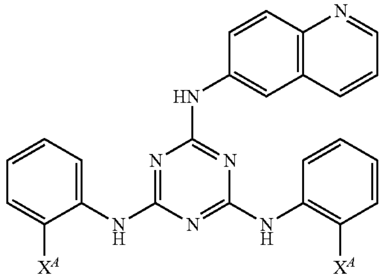

-continued
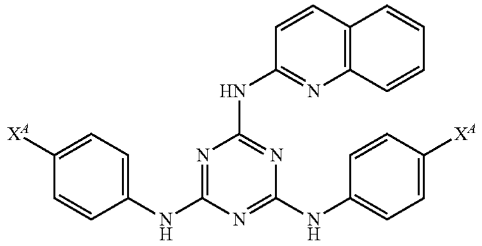
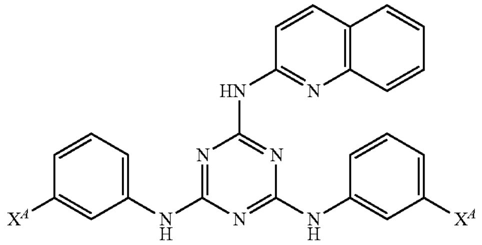
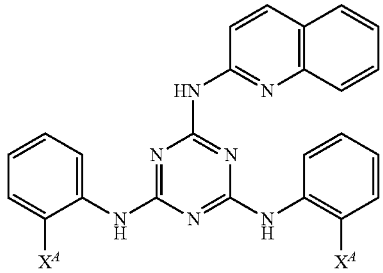
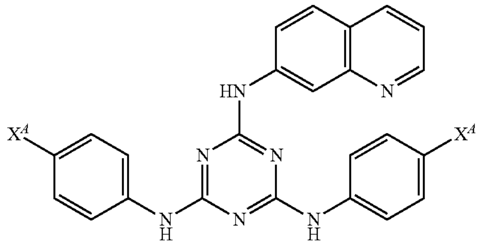
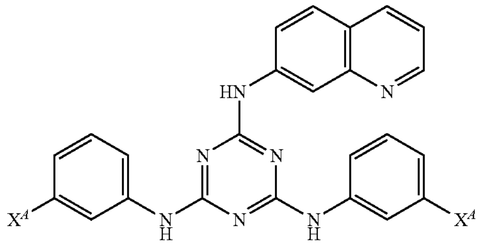
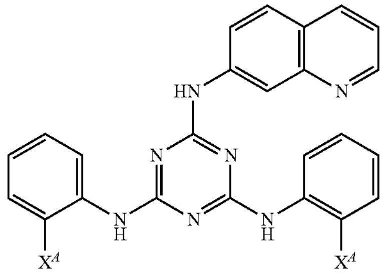
-continued
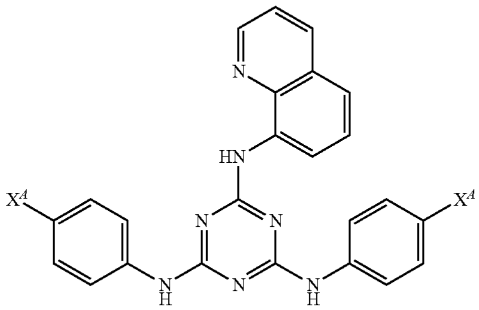
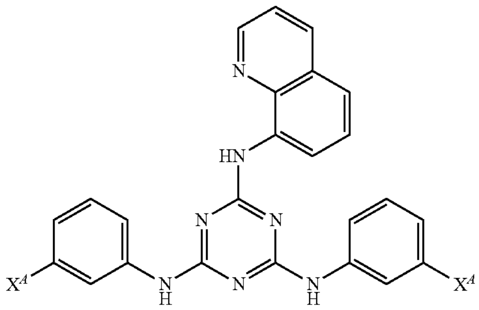
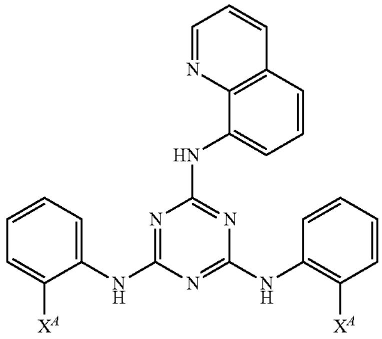
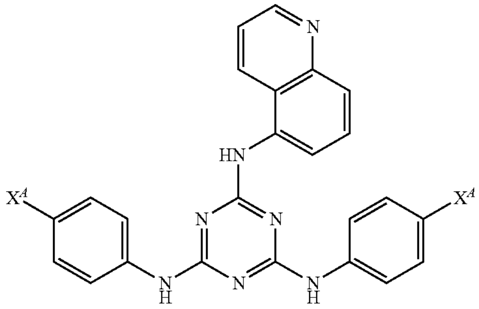
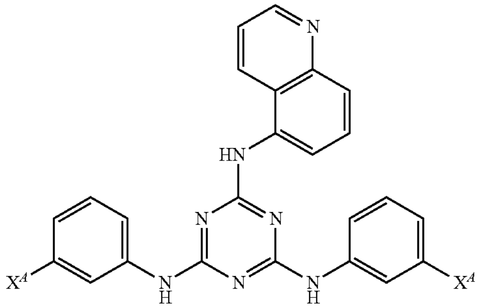

-continued
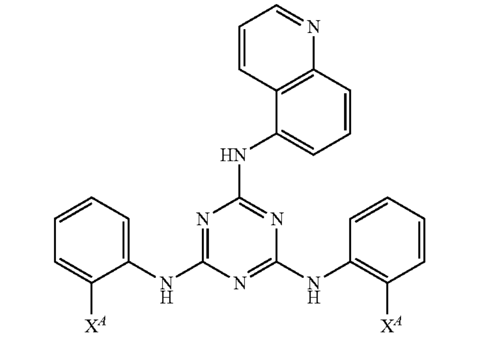
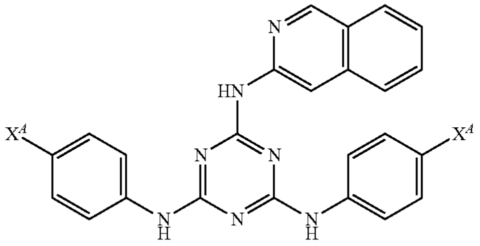
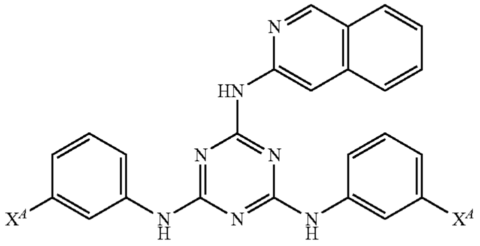
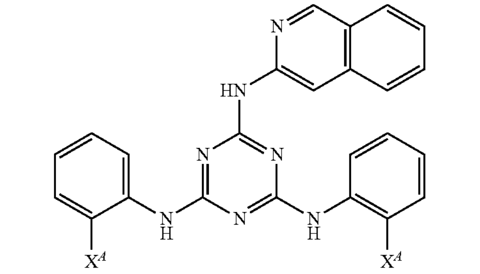
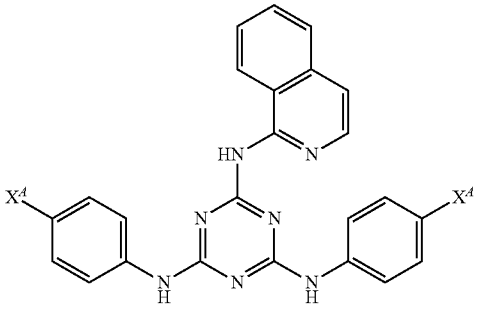
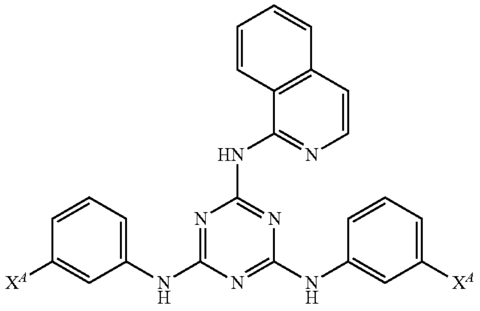
-continued
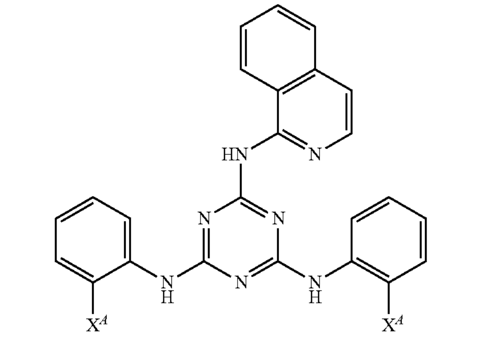
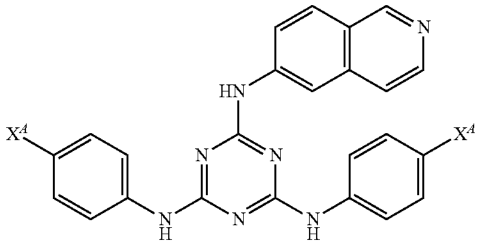
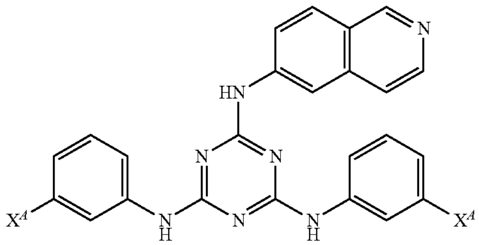
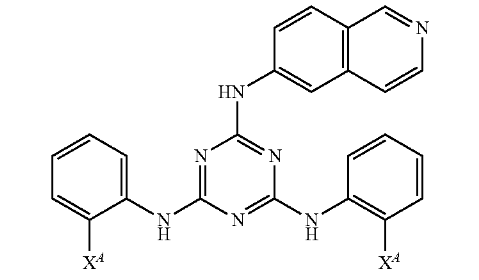
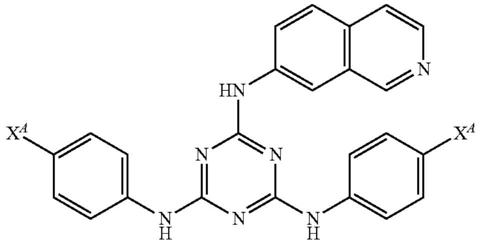
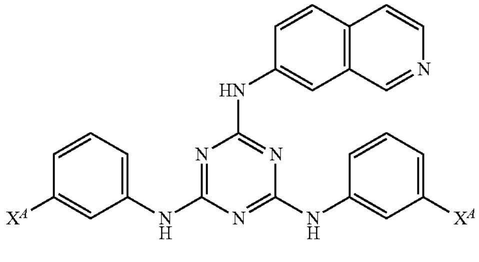

-continued
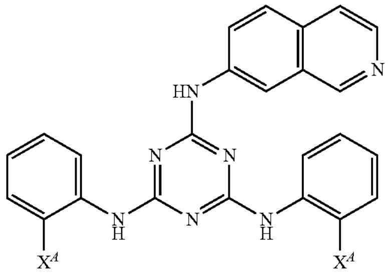
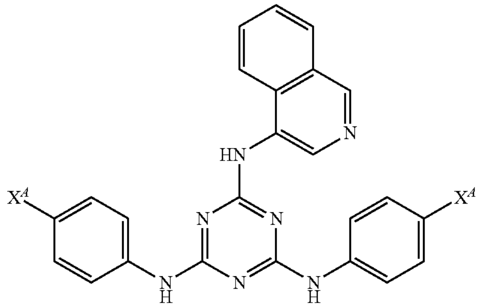
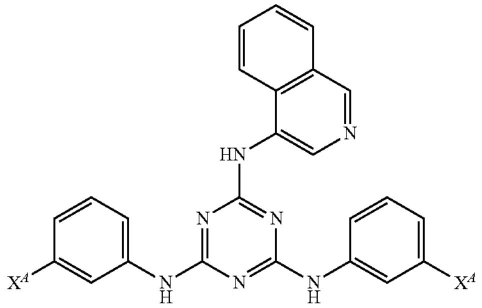
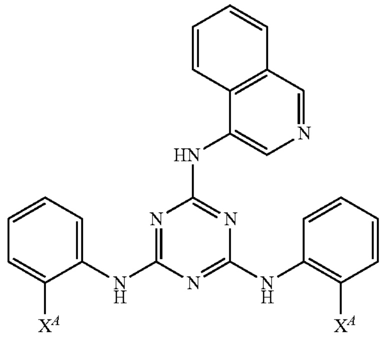
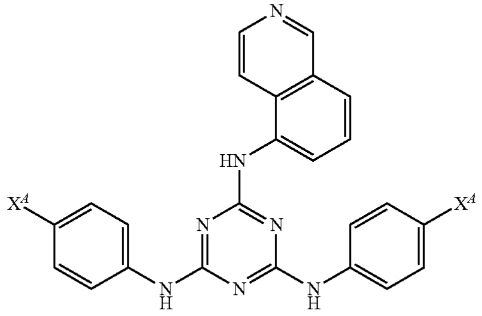
-continued
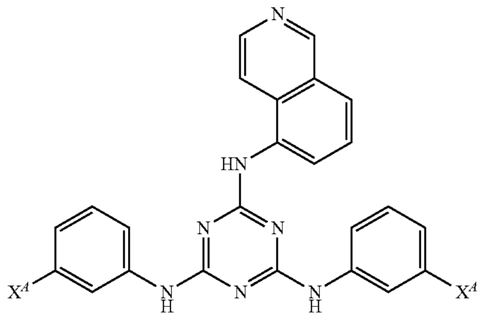
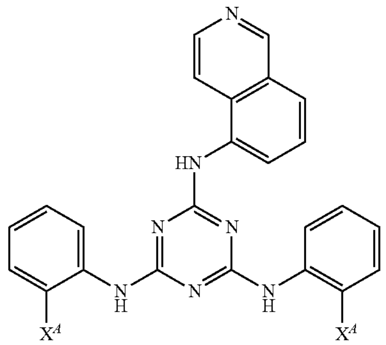
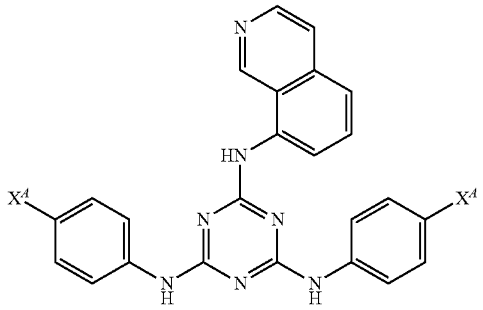
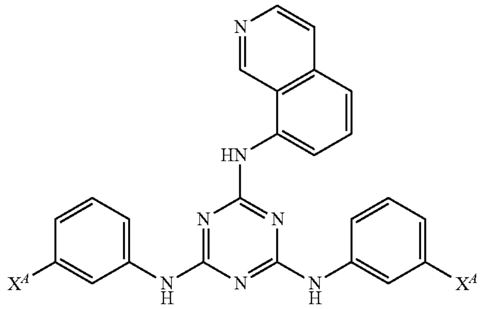
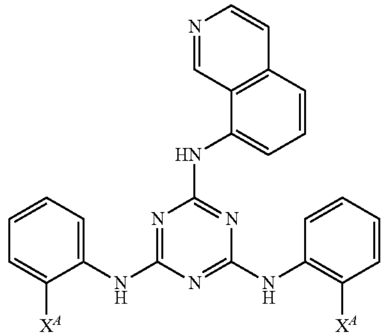

-continued

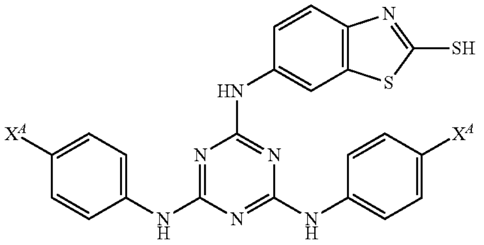

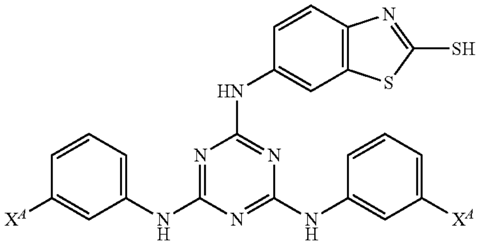

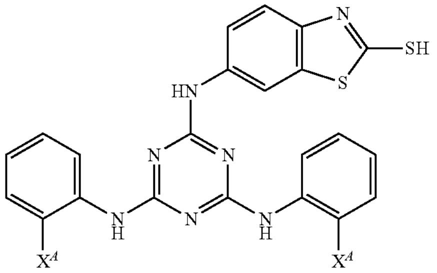

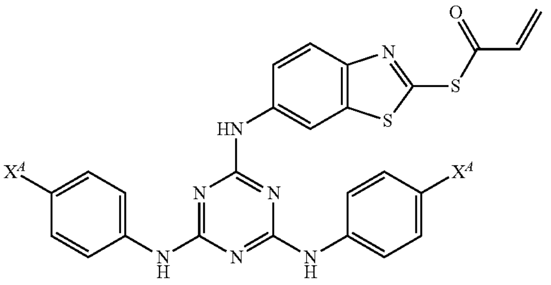

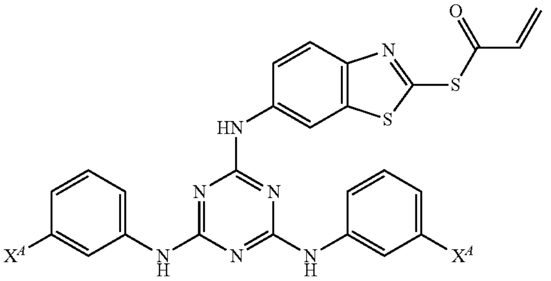

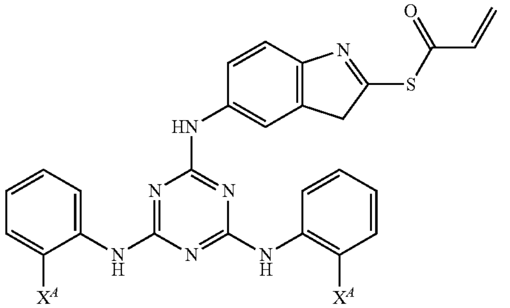

-continued

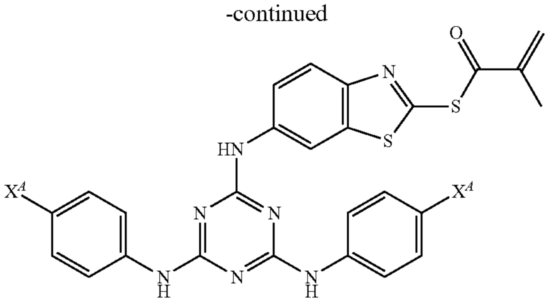

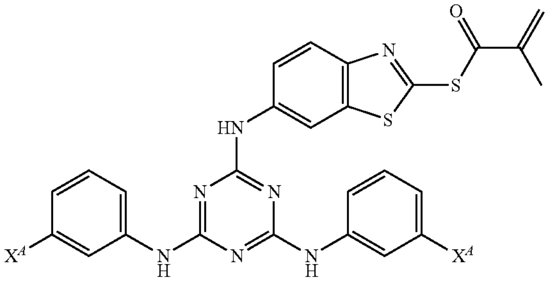

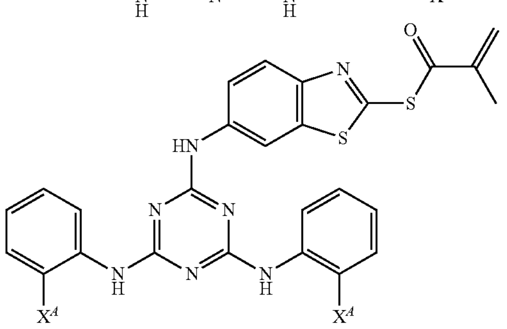

A production method of the compound represented by the formula (A-2e-a) is not particularly limited. Typically, the compound represented by the formula (A-2e-a) can be prepared by reacting cyanuric halide such as cyanuric chloride with aromatic amines represented by $R^{A01}$—$NH_2$, $R^{A02}$—$NH_2$, and $R^{A03}$—$NH_2$. These multiple amines may react with the cyanuric halide simultaneously or sequentially, and preferably sequentially react with the cyanuric halide.

In addition, $R^{A02}$ and $R^{A03}$ in the formula (A-2e-a) can be formed by reacting the cyanuric halide with aromatic amine having a functional group such as hydroxy group, mercapto group, carboxy group, and amino group, and thereafter reacting these functional groups with a compound which gives the radically polymerizable group-containing group or the cationically polymerizable group-containing group. Examples of the compound which gives the radically polymerizable group-containing group or the cationically polymerizable group-containing group include compounds having polymerizable group such as (meth)acrylic acid, (meth) acrylic acid halide, halogenated olefin, epichlorohydrin, and glycidyl (meth)acrylate. As a reaction of the functional group such as hydroxy group, mercapto group, carboxy group, and amino group with a compound having a polymerizable group, well-known reaction forming an ether bond, a carboxylic acid ester bond, a carboxylic amid bond, or a thioether bond can be used.

A reaction forming the radically polymerizable group-containing group or the cationically polymerizable group-containing group may be a multi-step reaction. For example, a radically polymerizable group represented by the following formula can be introduced on an aromatic ring by glycidylizing a phenolic hydroxy group by reaction with epichlorohydrin after reacting cyanuric halide with an aromatic amine having phenolic hydroxy group, subsequently, reacting the glycidyl group with acrylic acid.

$$-O-CH_2-CHOH-CH_2-O-CO-CH{=}CH_2$$

The above reaction is an example, and the radically polymerizable group-containing group or the cationically polymerizable group-containing group can be formed by carrying out various reactions in combination.

The compound represented by the formula (A-2e-a) is usually synthesized in an organic solvent. This organic solvent is not particularly limited as long as the solvent is an inactive solvent which does not react with cyanuric halide, aromatic amine, radically polymerizable group, cationically polymerizable group, and the like. As the solvent, solvents exemplified as specific examples of the solvent (S) described below can be used. In the production of the compound represented by the formula (A-2e-a), reaction temperature is not particularly limited when cyanuric halide is reacted with aromatic amines such as aromatic amines represented by $R^{A01}$—$NH_2$, $R^{A02}$—$NH_2$, and $R^{A03}$—$NH_2$. Typically, the reaction temperature is preferably 0° C. or higher and 150° C. or lower.

Other suitable examples of the compound represented by the formula (A-2e) include a compound represented by the following formula (A-2e-b).

(A-2e-b)

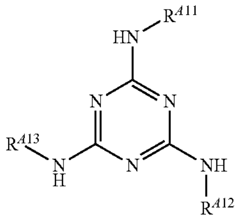

In the formula (A-2e-b), $R^{A1}$, $R^{A12}$, and $R^{A13}$ are respectively an aromatic ring-containing group. At least one of $R^{A12}$ and $R^{A13}$ is a group represented by the following formula (A-2e-b1).

(A-2e-b1)

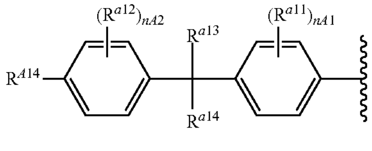

Each of the —NH— groups bonding to the triazine ring bonds to the aromatic ring in $R^{A11}$, $R^{A12}$ and $R^{A13}$. In the formula (A-2e-b1), $R^{a11}$ and $R^{a12}$ are each independently an alkyl group having 1 or more and 4 or less carbon atoms, an alkoxy group having 1 or more and 4 or less carbon atoms, or a halogen atom. nA1 and nA2 are each independently an integer of 0 or more and 4 or less. $R^{a13}$ and $R^{a14}$ are each independently an alkyl group having 1 or more and 4 or less carbon atoms, a halogenated alkyl group having 1 or more and 4 or less carbon atoms, or a phenyl group. $R^{a13}$ and $R^{a14}$ may be combined with each other to form a ring. $R^{A14}$ is the radically polymerizable group-containing group or the cationically polymerizable group-containing group. When both of $R^{A12}$ and $R^{A13}$ are the group represented by the formula (A-2e-b1), both of $R^{A12}$ and $R^{A13}$ have the radically polymerizable group-containing group or the cationically polymerizable group-containing group.

As described above, in the formula (A-2e-b), each of $R^{A11}$, $R^{A12}$, and $R^{A13}$ is the aromatic ring-containing group. Each of —NH— groups bonding to the triazine ring in the formula (A-2e-b) bonds to the aromatic ring in $R^{A11}$, $R^{A12}$, and $R^{A13}$. When the aromatic ring-containing group is a group other than the group represented by the formula (A-2e-b1), the aromatic ring-containing group is not particularly limited as long as the above specific requirements are met.

The aromatic ring-containing group other than the group represented by the formula (A-2e-b1) may have only one monocyclic aromatic ring or one condensed aromatic ring, or may have two or more of monocyclic aromatic ring and/or condensed aromatic ring. When the aromatic ring-containing group includes two or more of monocyclic aromatic rings and/or condensed aromatic rings, a type of bridging group which bridges monocyclic aromatic rings, condensed aromatic rings, or monocyclic aromatic ring and condensed aromatic ring. The bridging group may be a divalent bridging group or a trivalent bridging group, and is preferably a divalent bridging group.

Examples of the divalent bridging group include divalent aliphatic hydrocarbon group, divalent halogenated aliphatic hydrocarbon group, —CONH—, —NH—, —N=N—, —CH=N—, —COO—, —O—, —CO—, —SO—, —$SO_2$—, —S—, and —S—S—, and a combination of two or more of these.

Suitable examples of the aromatic ring-containing group include an optionally substituted quinolinyl group, an optionally substituted isoquinolinyl group, and an optionally substituted 2-substituted benzothiazolyl group. These groups are the same as the optionally substituted quinolinyl group, the optionally substituted isoquinolinyl group, and the optionally substituted 2-substituted benzothiazolyl group described for $R^{A01}$ in the formula (A-2e-a).

Other suitable examples of the aromatic ring-containing group include an optionally substituted phenyl group, an optionally substituted naphthyl group, an optionally substituted biphenylyl group, an optionally substituted phenylthiophenyl group, an optionally substituted phenoxyphenyl group, an optionally substituted phenylsulfonylphenyl group, an optionally substituted benzothiazolyl group, an optionally substituted benzoxazolyl group, and an optionally substituted terphenyl group. When these groups have substituent, the substituent is the same as the substituent which the quinolinyl group and the isoquinolinyl group may have. When these groups have a plurality of the substituents, the plurality of the substituents may be different from each other.

Suitable specific examples of the optionally substituted phenyl group include phenyl group, 4-cyanophenyl group, 3-cyanophenyl group, 2-cyanophenyl group, 2,3-dicyanophenyl group, 2,4-dicyanophenyl group, 2,5-dicyanophenyl group, 2,6-dicyanophenyl group, 3,4-dicyanophenyl group, 3,5-dicyanopohenyl group, 4-nitrophenyl group, 3-nitrophenyl group, 2-nitrophenyl group, 4-chlorophenyl group, 3-chlorophenyl group, 2-chlorophenyl group, 4-bromophenyl group, 3-bromophenyl group, 2-bromophenyl group, 4-iodophenyl group, 3-iodophenyl group, 2-iodophenyl group, 4-methoxyphenyl group, 3-methoxyphenyl group, 2-methoxyphenyl group, 4-methylphenyl group, 3-methylphenyl group, and 2-methylphenyl group.

Suitable specific examples of the optionally substituted naphthyl group include naphthalene-1-yl group, and naphthalene-2-yl group Suitable examples of the optionally substituted biphenylyl group include 4-phenylphenyl group, 3-phenylphenyl group, 2-phenylphenyl group, 4-(4-nitrophenyl)phenyl group, 3-(4-nitrophenyl)phenyl group, 2-(4-nitrophenyl)phenyl group, 4-(4-cyanophenyl)phenyl group, 3-(4-cyanophenyl)phenyl group, and 2-(4-cyanophenyl)phenyl group.

Suitable specific examples of the optionally substituted phenylthiophenyl group include 4-phenylthiophenyl group, 3-phenylthiophenyl group, and 2-phenylthiophenyl group.

Suitable specific examples of the optionally substituted phenoxyphenyl group include 4-phenoxyphenyl group, 3-phenoxyphenyl group, and 2-phenoxyphenyl group.

Suitable specific examples of the optionally substituted phenylsulfonylphenyl group include 4-phenylsulfonylphenyl group, 3-phenylsulfonylphenyl group, and 2-phenylsulfonylphenyl group.

Suitable specific examples of the optionally substituted benzothiazolyl group include benzothiazole-2-yl group, benzothiazole-4-yl group, benzothiazole-5-yl group, benzothiazole-6-yl group, and benzothiazole-7-yl group.

Suitable specific examples of the optionally substituted benzoxazolyl group include benzoxazole-2-yl group, benzoxazole-4-yl group, benzoxazole-5-yl group, benzoxazole-6-yl group, and benzoxazole-7-yl group.

Suitable examples of the optionally substituted terphenyl group include 4-(4-phenylphenyl)phenyl group, 3-(4-phenylphenyl)phenyl group, 2-(4-phenylphenyl)phenyl group, 4-(3-phenylphenyl)phenyl group, 3-(3-phenylphenyl)phenyl group, 2-(3-phenylphenyl)phenyl group, 4-(2-phenylphenyl)phenyl group, 3-(2-phenylphenyl)phenyl group, and 2-(2-phenylphenyl)phenyl group.

As described above, the aromatic ring-containing group other than the group represented by the formula (A-2e-b1) may have the radically polymerizable group-containing group or the cationically polymerizable group-containing group as substituent. In the aromatic ring-containing group, a position to which the radically polymerizable group-containing group or the cationically polymerizable group-containing group bonds is not particularly limited.

A number of the radically polymerizable group-containing group or the cationically polymerizable group-containing group is not particularly limited. The number of the radically polymerizable group-containing group or the cationically polymerizable group-containing group in the aromatic group-containing group is preferably an integer of 1 or more and 3 or less, more preferably 1 or 2, and particularly preferably 1.

When the aromatic ring-containing group has the one radically polymerizable group-containing group or the one cationically polymerizable group-containing group, suitable examples of such group include the following groups. In the following formulas, PG is the radically polymerizable group-containing group or the cationically polymerizable group-containing group.

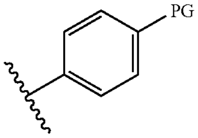

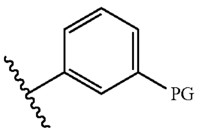

-continued

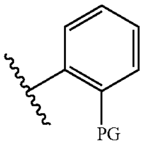

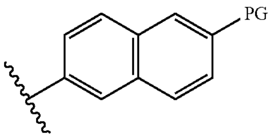

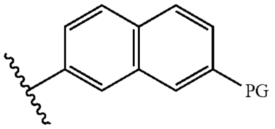

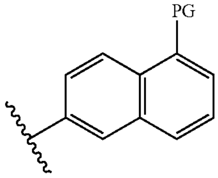

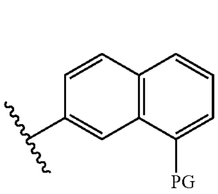

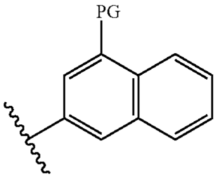

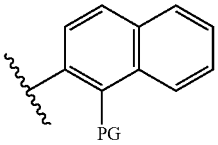

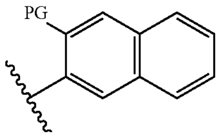

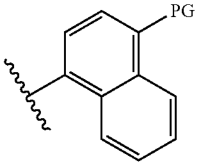

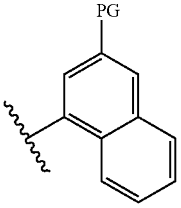

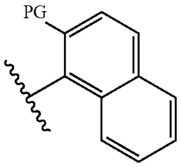

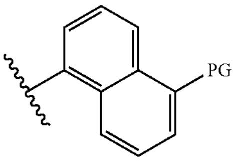

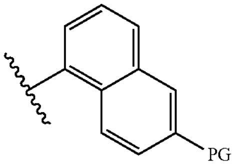

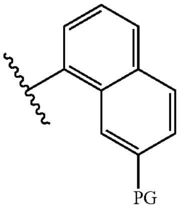

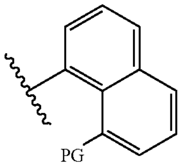

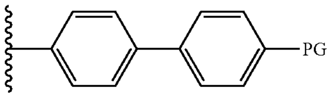

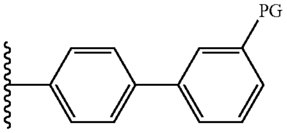

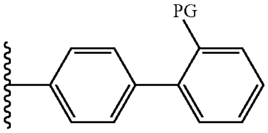

-continued

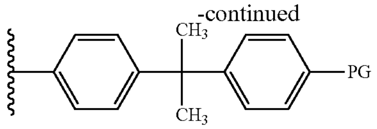

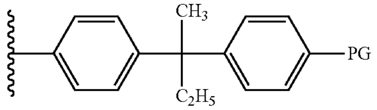

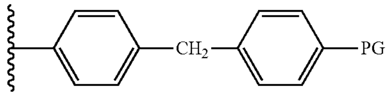

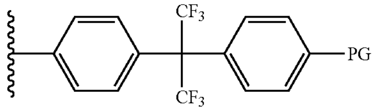

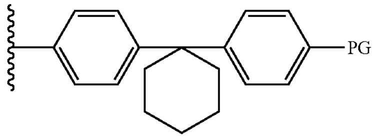

In the formula (A-2e-b), at least one of $R^{A12}$ and $R^{A13}$ is a group represented by the following formula (A-2e-b1).

(A-2e-b1)

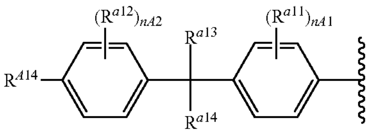

In the formula (A-2e-b1), $R^{a11}$ and $R^{a12}$ are each independently an alkyl group having 1 or more and 4 or less carbon atoms, an alkoxy group having 1 or more and 4 or less carbon atoms, or a halogen atom.

nA1 and nA2 are each independently an integer of 0 or more and 4 or less. $R^{a13}$ and $R^{a14}$ are each independently an alkyl group having 1 or more and 4 or less carbon atoms, a halogenated alkyl group having 1 or more and 4 or less carbon atoms, or a phenyl group. $R^{a13}$ and $R^{a14}$ may be combined with each other to form a ring. $R^{A14}$ is the radically polymerizable group-containing group or the cationically polymerizable group-containing group. When both of $R^{A12}$ and $R^{A13}$ are the group represented by the formula (A-2e-b1), both of $R^{A12}$ and $R^{A13}$ have the radically polymerizable group-containing group or the cationically polymerizable group-containing group.

Examples of the alkyl group having 1 or more and 4 or less carbon atoms as $R^{a11}$ and $R^{a12}$ include methyl group, ethyl group, n-propyl group, isopropyl group, n-butyl group, isobutyl group, sec-butyl group, and tert-butyl group. Examples of the alkoxy group having 1 or more and 4 or less carbon atoms as $R^{a11}$ and $R^{a12}$ include methoxy group, ethoxy group, n-propyloxy group, isopropyloxy group, n-butyloxy group, isobutyloxy group, sec-butyloxy group, and tert-butyloxy group. Examples of the halogen atom as $R^{a11}$ and $R^{a12}$ include fluorine atom, chlorine atom, bromine atom, and iodine atom.

Specific examples of the alkyl group having 1 or more and 4 or less carbon atoms as $R^{a13}$ and $R^{a14}$ are the same as the specific examples of the alkyl group having 1 or more and 4 or less carbon atoms as $R^{a11}$ and $R^{a12}$ Specific examples of the halogenated alkyl group having 1 or more and 4 or less carbon atoms as $R^{a13}$ and $R^{a14}$ include chloromethyl group, dichloromethyl group, trichloromethyl group, bromomethyl group, dibromomethyl group, tribromomethyl group, fluoromethyl group, difluoromethyl group, trifulurormethyl group, 3,3,6-trifluoroethyl group, pentafluoroethyl group, heptafluoropropyl group, and the like.

Suitable examples of the group represented by the formula (A-2e-b1) include the compounds represented by the following formulas.

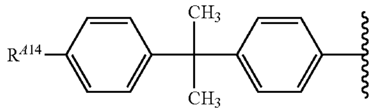

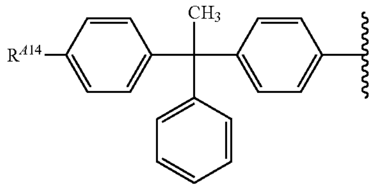

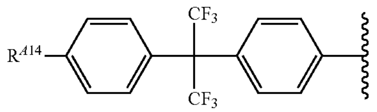

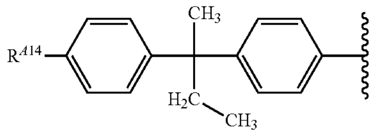

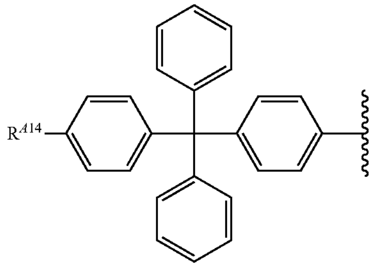

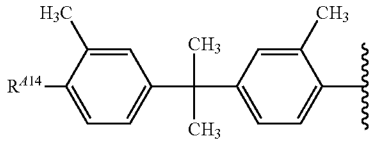

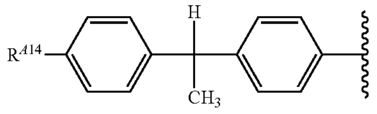

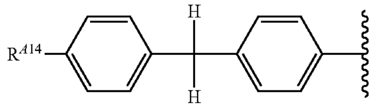

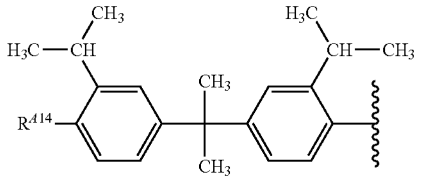

-continued

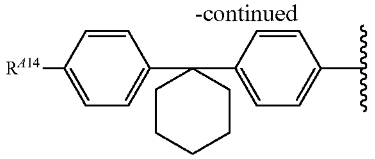

The group represented by the formula (A-2e-b1) has the radically polymerizable group-containing group or the cationically polymerizable group-containing group as $R^{A14}$. The radically polymerizable group-containing group and the cationically polymerizable group-containing group are as described above. Suitable specific examples of the radically polymerizable group-containing group, and suitable specific examples of the cationically polymerizable group-containing group are the same as the suitable specific examples of the radically polymerizable group-containing group, and the suitable specific examples of the cationically polymerizable group-containing group described for the compound represented by the formula (A-2e-a).

Suitable specific examples of the compound represented by the formula (A-2e-b) include the following compounds. In the following formulas, XA is a group selected from the group consisting of (meth)acryloyloxy group, (meth)acryloylthio group, 3-(meth)acryloyloxy-2-hydroxy-n-propyloxycarbonyl group, and glycidyloxy group. $Y^A$ is a group selected from the group consisting of quinoline-3-yl group, phenyl group, 4-cyanophenyl group, 3-cyanophenyl group, 2-cyanophenyl group, 3,4-dicyanophenyl group, 4-nitrophenyl group, 4-methoxyphenyl group, 4-phenylthiophenyl group, 4-phenylsulfonylphenyl, 4-iodophenyl group, benzothiazole-2-yl group, 2-mercaptobenzothiazole-5-yl group, 4-phenylphenyl group, 4-(4-nitrophenyl)phenyl group, 4-(4-cyanophenyl)phenyl group, naphthalene-1-yl group, and 4-(4-phenylphenyl)phenyl group.

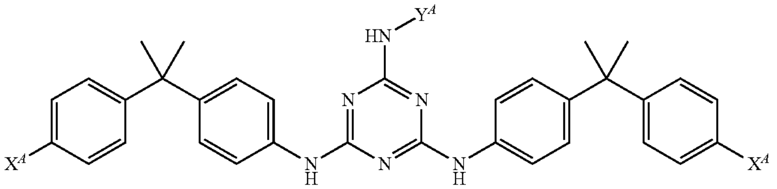

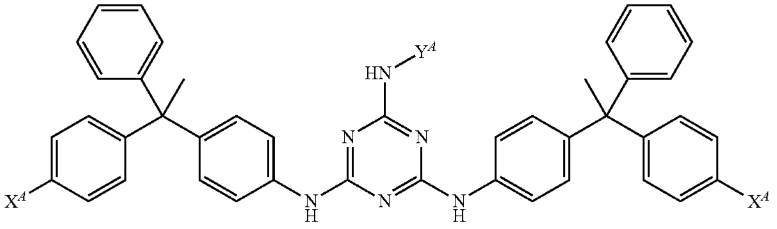

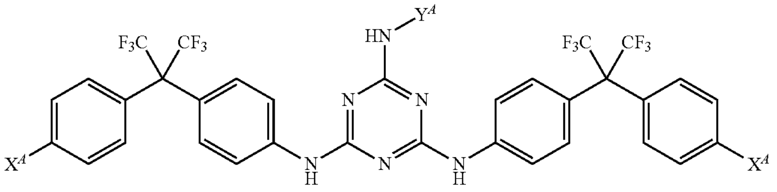

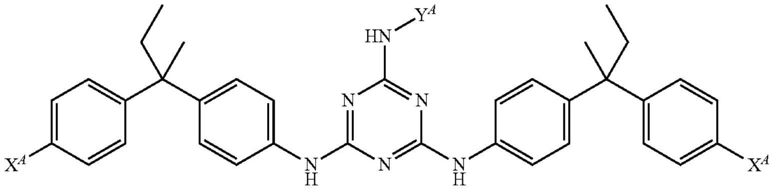

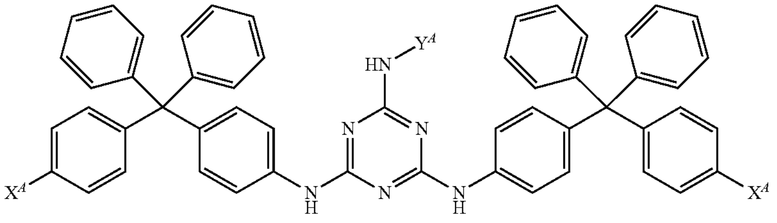

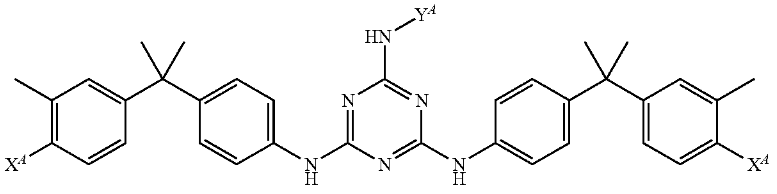

-continued

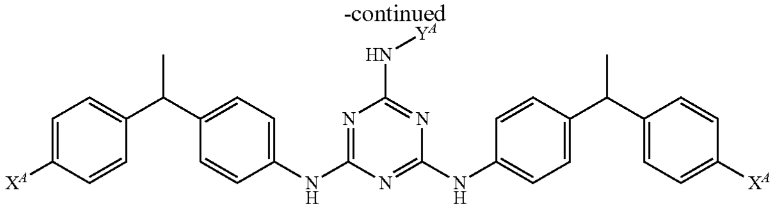

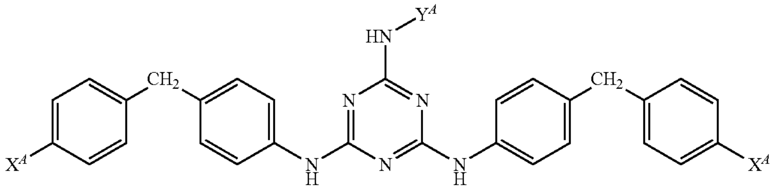

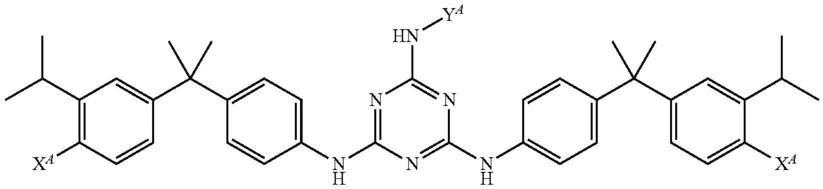

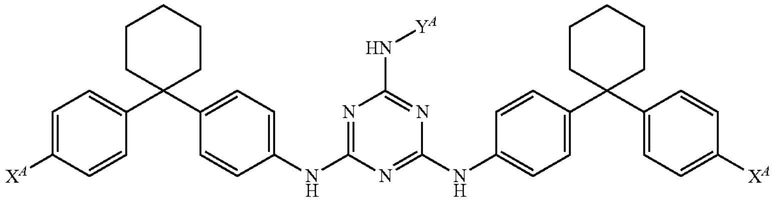

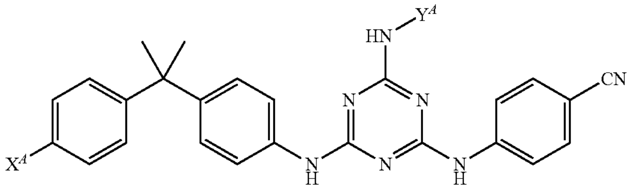

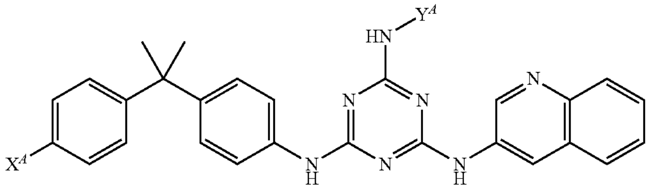

Production method of the compound represented by the formula (A-2e-b) is not particularly limited. Typically, the compound represented by the formula (A-2e-b) can be prepared by reacting cyanuric halide such as cyanuric chloride with aromatic amines represented by $R^{A11}$—$NH_2$, $R^{A12}$—$NH_2$, and $R^{A13}$—$NH_2$. These multiple amines may react with the cyanuric halide simultaneously or sequentially, and preferably sequentially react with the cyanuric halide.

In addition, when the aromatic ring-containing group bonding to the triazine ring via —NH— has the radically polymerizable group-containing group or the cationically polymerizable group-containing group, an aromatic amine having a functional group such as hydroxy group, mercapto group, carboxy group and amino group is reacted with the cyanuric halide. Thereafter, by reacting these functional groups with a compound which gives the radically polymerizable group-containing group or the cationically polymerizable group-containing group, the radically polymerizable group-containing group or the cationically polymerizable group-containing group can be formed. Examples of the compound which gives the radically polymerizable group-containing group or the cationically polymerizable group-containing group include compounds having polymerizable group such as (meth)acrylic acid, (meth) acrylic acid halide, halogenated olefin, epichlorohydrin, and glycidyl (meth)acrylate. As a reaction of the functional group such as hydroxy group, mercapto group, carboxy group, and amino group with a compound having a polymerizable group, well-known reaction forming an ether bond, a carboxylic acid ester bond, a carboxylic amid bond, or a thioether bond can be used.

A reaction forming the radically polymerizable group-containing group or the cationically polymerizable group-containing group may be a multi-step reaction. For example, an aromatic amine having a phenolic hydroxyl group is reacted with cyanuric halide, and then the phenolic hydroxyl group is glycidylated by a reaction with epichlorohydrin. Subsequently, acrylic acid is reacted with the glycidyl group to thereby enable a radically polymerizable group-containing group represented by the following formula to be introduced on the aromatic ring.

$$-O-CH_2-CHOH-CH_2-O-CO-CH=CH_2$$

The above reaction is an example, and the radically polymerizable group-containing group or the cationically polymerizable group-containing group can be formed by carrying out various reactions in combination.

The compound represented by the formula (A-2e-b) is usually synthesized in an organic solvent. This organic solvent is not particularly limited as long as the solvent is an inactive solvent which does not react with cyanuric halide, aromatic amine, radically polymerizable group, cationically polymerizable group, and the like. Organic solvents exemplified for specific examples of the solvent (S), and the like can be used as the solvent. In the production of the compound represented by the formula (A-2e-b), reaction temperature is not particularly limited when cyanuric halide is reacted with aromatic amines such as aromatic amines represented by $R^{A11}$—$NH_2$, $R^{A1}$2-$NH_2$, and $R^{A13}$—$NH_2$. Typically, the reaction temperature is preferably 0° C. or higher and 150° C. or lower.

A content of the photopolymerizable compound (A) in the composition is not particularly limited as long as the desired effects are not impaired. The content of the photopolymerizable compound (A) in the composition is preferably 0.1 parts by mass or more and 50 parts by mass or less, more preferably 0.5 parts by mass or more and 40 parts by mass or less, and particularly preferably 1 part by mass or more and 25 parts by mass or less, when a mass of the composition excluding a mass of the solvent (S) described below is 100 parts by mass.

<Metal Oxide Particles (B)>

The composition includes metal oxide particles (B). The metal oxide particles (B) consist of a metal oxide that exhibits a refractive index of 2.0 or higher for light at a wavelength of 550 nm. As the refractive index for light at a wavelength of 550 nm, a refractive index of thin film of the metal oxide formed by vapor deposition method such as electron beam vapor deposition. Such refractive index can be found in various literature, e.g., Takashi Inomata, Hyomen Gijutsu, 2020, Vol. 71, No. 10, p. 613-619.

Suitable examples of the metal oxide that exhibits a refractive index of 2.0 or higher for light at a wavelength of 550 nm include titanium oxide ($TiO_2$), zirconium oxide ($ZrO_2$), niobium pentoxide ($Nb_2O_5$), tantalum pentoxide ($Ta_2O_5$), and hafnium oxide ($HfO_2$), titanium oxide ($TiO_2$) and zirconium oxide ($ZrO_2$) are preferred.

Particle diameter of the metal oxide particles (B) is not particularly limited as long as the desired effect is not impaired. The average primary particle diameter of the metal oxide particles (B) measured by the X-ray diffraction method is preferably 50 nm or less, more preferably 1 nm or more and 30 nm or less, and even more preferably 3 nm or more and 20 nm or less.

As described below, the surfaces of the metal oxide particles (B) are functionalized with a functionalizing agent. Production method of metal oxide particles at a state that those surfaces are not functionalized is not particularly limited. Non-functionalized metal oxide particles can be obtained by known conventional methods. For example, the metal oxide particles not functionalized can be obtained according to synthesis treatment in liquid phase, hydrothermal synthesis treatment, and the like which the metal oxide particles are synthesized in a solvent in the presence or absence of a functionalizing agent optionally including a functionalizing agent described below.

[Functionalizing Agent]

The surfaces of the metal oxide particles are functionalized with the functionalizing agent. The functionalized agent includes:

- a first functionalizing agent including a metal atom which HOMO-LUMO band gap as oxide is more than 3.1 eV and 6.0 eV or less, and
- a second functionalizing agent having a spacer group and not corresponding to the first functionalizing agent.

The metal oxide particles (B) are hard to aggregate, and stably dispersed in the composition or the cured product of the composition by functionalization of those surface with the above functionalizing agent. Specifically, a 99.99% volume cumulated diameter of the metal oxide particles (B) measured by a dynamic light scattering method is preferably smaller than 5 times an average primary particle diameter of the metal oxide particles (B) measured by X-ray diffraction method.

(First Functionalizing Agent)

The cured product having high transparency can be formed by using the composition, since a first functionalizing agent including a metal atom which HOMO-LUMO band gap as oxide is more than 3.1 eV and 6.0 eV or less bonds to a part of those surface, in the metal oxide particles (B). Since the HOMO-LUMO band gap as oxide of the metal atom in the first functionalizing agent is more than 3.1 eV, the absorption wavelength of the first functionalizing agent or a functional group derived from the first functionalizing agent on the surface of the metal oxide particles (B) is in the high energy short wavelength region. Then, in the cured product including the metal oxide particles (B) having the first functionalizing agent or a functional group derived from the first functionalizing agent on their surfaces, visible light with a relatively long wavelength is hardly absorbed by the metal oxide particles (B). As a result, a refractive index of the cured product including the metal oxide particles (B) is high. The HOMO-LUMO band gap of 6.0 eV or less allows the refractive index of the functionalized metal oxide particles (B) to remain high.

For examples, examples of the metal atom which the HOMO-LUMO band gap as oxide is more than 3.1 eV and 6.0 eV or less include niobium, zirconium, hafnium, tantalum, tin, gallium, and nickel. For example, the HOMO-LUMO band gaps of oxides of various metal atoms are shown in Andrei Ghicov, Patrik Schmuki, Chemical Communication, 20, 2009, 2791-2802, and the like.

The first functionalizing agent preferably has mercapto group, carboxy group, amino group, epoxy group or hydrolysable organoxy group as a group which can bond to or react with nonfunctionalized surfaces of the metal oxide particles. The first functionalizing agent may have two or more groups which can bond to or react with the nonfunctionalized surfaces of the metal oxide particles. When the first functionalizing agent has two or more group capable of binding to the unfunctionalized surfaces of the metal oxide particles, a plurality of said groups may be the same or different. Among these group, in view of stable dispersibility of the metal oxide particles (B) in the composition, good reactivity with nonfunctionalized surfaces of the metal oxide particles, and the like, the hydrolysable organoxy group is preferred. In the first functionalizing agent, the hydrolysable organoxy group usually bonds to a metal atom which HOMO-LUMO band gap as oxide is more than 3.1 eV and 6.0 eV or less. The hydrolysable organoxy group forms a hydroxy group bonding to the metal atom by hydrolyzation. The hydroxy group bonding to the metal atom can be condensed with a hydroxy group existing on the nonfunctionalized surfaces of the metal oxide particles.

As the hydrolysable organoxy group, alkoxy group, alkoxyalkyl group, and aryloxy group are exemplified, and alkoxy group is preferred. A number of carbon atoms in the alkoxy group is not particularly limited, and preferably 1 or more and 4 or less. Suitable specific examples of the alkoxy group include methoxy group, ethoxy group, n-propyloxy group, isopropyloxy group, n-butyloxy group, isobutyloxy group, sec-butyloxy group, and tert-butyloxy group. In view of a reactivity with nonfunctionalized surfaces of the metal oxide particles, among these alkoxy group, methoxy group, and ethoxy group is preferred, and methoxy group is more preferred.

As the aforementioned first functionalizing agent, at least one of selected from niobium compounds represented by the following formula (1) are preferred, since a reactivity with nonfunctionalized surfaces of the metal oxide particles is good, and the cured product with high transparency and high refractive index is easily formed by using the composition.

$$(R^{10}O)_{5-n}Nb(R^{11})_n \quad (1)$$

In the formula (1), n is an integer of 0 or more and 4 or less. $R^{10}$ is an alkyl group. $R^{11}$ is a monovalent organic group bonding to niobium atom via Nb—C bond.

In the formula (1), n is an integer of 0 is more and 4 or less, preferably 0 or more and 2 or less, and more preferably 0 or 1. When n is an integer of 0 or more and 2 or less, a number of alkoxy groups represented by $R^{10}O$— that is a hydrolytically condensable functional group in the niobium compound represented by the formula (1) is sufficiently large. Therefore, it is easy to bond the niobium compound to the nonfunctionalized surfaces of the metal oxide well, and to functionalize the surfaces of the metal oxide particles well.

In the formula (1), $R^{10}$ is the alkyl group. In the formula (1), when there is more than one $R^{10}$, the plurality of $R^{10}$ may be the same or different. The alkyl group as $R^{10}$ may be linear or branched. A number of carbon atoms in the alkyl group as $R^{10}$ is not particularly limited, and is preferably 1 or more and 4 or less. Suitable specific examples of the alkyl group include methyl group, ethyl group, n-propyl group, isopropyl group, n-butyl group, isobutyl group, sec-butyl group, and tert-butyl group. Among alkyl groups as $R^{10}$, in view of reactivity when the metal oxide particles are functionalized, methyl group and ethyl group are preferred, and methyl group is more preferred.

In the formula (1), $R^{11}$ is a monovalent organic group. With respect to $R^{11}$, "bonding to a niobium atom via Nb—C bond" means that atom in $R^{11}$ bonding to a niobium atom is a carbon atom in a partial structure represented by $Nb(R^{11})_n$ in the formula (1). The monovalent organic group is not particularly limited as long as the desired effect is not impaired. In the formula (1), when there is more than one $R^{11}$, the plurality of $R^{11}$ may be the same or different. Examples of the monovalent organic group include an alkyl group, an alkenyl group, an alkynyl group, an aryl group, a (meth)acryloyl group, a (meth)acryloyloxyalkyl group, an epoxyalkyl group, an epoxyalkoxyalkyl group, a halogenated alkyl group, a mercaptoalkyl group, an aminoalkyl group, an aminoalkylaminoalkyl group, an aminoalkylaminoalkylaminoalkyl group, an imidazolylalkyl group, and an isocyanato group. In addition, a group represented by $-(R^{12}-O)_{n0}-R^{13}$ is also preferred as the monovalent organic group. $R^{12}$ is an alkyl group having 1 or more and 4 or less carbon atoms, and ethane-1,2-diyl group (ethylene group), propane-1,3-diyl group, or propane-1,2-diyl group are preferred. $R^{13}$ is a hydrogen group or an alkyl group having 1 or more and 4 or less carbon atoms, and methyl group or ethyl group is preferred. n0 is an integer of 1 or more and 20 or less.

The alkyl group as the monovalent organic group may be linear or branched. A number of carbon atoms in the alkyl group is not particularly limited, and is preferably 1 or more and 4 or less. Suitable specific examples of the alkyl group include methyl group, ethyl group, an n-propyl group, isopropyl group, n-butyl group, isobutyl group, sec-butyl group, and tert-butyl group.

The alkenyl group as the monovalent organic group may be linear or branched. A number of carbon atoms in the alkenyl group is not particularly limited, and is preferably 2 or more and 4 or less. Suitable specific examples of the alkenyl group include a viny group, allyl group (prop-2-en-1-yl group), prop-1-en-1-yl group, but-1-en-1-yl group, but-2-en-1-yl group, and but-3-en-1-yl group.

The alkynyl group as the monovalent organic group may be linear or branched. A number of carbon atoms in the alkynyl group is not particularly limited, and is preferably 2 or more and 4 or less. Suitable specific examples of the alkynyl group include ethynyl group, propargyl group (prop-2-yn-1-yl group), prop-1-yn-1-yl group, but-1-yn-1-yl group, but-2-yn-1-yl group, and but-3-yn-1-yl group.

The aryl group as the monovalent organic group may be a monocyclic group or a polycyclic group. The polycyclic group may be a group in which two or more aromatic rings are condensed as naphthyl group or a group a group in which two or more aromatic rings are bonded via single bond(s) as biphenylyl group. A number of carbon atoms in the aryl group is not particularly limited, and preferably 6 or more and 10 or less. Suitable specific examples of the aryl group include phenyl group, naphthalene-1-yl group, and naphthalene-2-yl group.

A saturated aliphatic hydrocarbon chain included in the (meth)acryloyloxyalkyl group as the monovalent organic group may be linear or branched. The number of carbon atoms in the saturated aliphatic hydrocarbon chain included in the (meth)acryloyloxyalkyl group as the monovalent organic group is preferably 1 or more and 10 or less, and more preferably 1 or more and 6 or less. Suitable examples of the (meth)acryloyoxyalkyl group include (meth)acryloyoxymethyl group, 2-(meth)acryloyoxyethyl group, 3-(meth)acryloyoxypropyl group, 4-(meth)acryloyoxybutyl group, 5-(meth)acryloyoxypentyl group, 6-(meth)acryloyoxyhexyl group, 7-(meth)acryloyoxyheptyl group, 8-(meth)acryloyoxyoctyl group, 9-(meth)acryloyoxynonyl group, and 10-(meth)acryloyoxydecyl group.

A saturated aliphatic hydrocarbon chain included in the epoxyalkyl group as the monovalent organic group may be linear or branched. The number of carbon atoms in the epoxyalkyl group is not particularly limited, and is preferably 2 or more and 10 or less, and more preferably 2 or more and 6 or less. Suitable specific examples of the epoxyalkyl group include oxyranyl group, glycidyl group (2,3-epoxypropyl group), 3,4-epoxybutyl group, 4,5-epoxypentyl group, 5,6-epoxyhexyl group, 6,7-epoxyheptyl group, 7,8-epoxyoctyl group, 8,9-epoxynonyl group, and 9,10-epoxydecyl group.

The saturated aliphatic hydrocarbon chain included in the epoxyalkoxyalkyl group as the monovalent organic group may be linear or branched. In an epoxyalkoxy group in the epoxyalkoxyalkyl group, the epoxyalkyl group bonding to an oxygen atom is the same as the epoxyalkyl group as the above-described monovalent organic group. In the epoxyalkoxyalkyl group, a number of carbon atoms in the alkylene group bonding to the epoxyalkoxy group is preferably 1 or more and 10 or less, and more preferably 1 or more and 6 or less. Suitable specific examples of the epoxyalkoxyalkyl group include 2-glycidyloxymethoxy group, 3-glycidyloxypropyl group, 4-glycidyloxybutyl group, 5-glycidyloxypentyl group, 6-glycidyloxyhexyl group, 7-glycidyloxyheptyl group, 8-glycidyloxyoctyl group, 9-glycidyloxynonyl group, 10-glycidyloxydecyl group, 2-(3,4-epoxybutyloxy)ethyl group, 3-(3,4-epoxybutyloxy)propyl group, 4-(3,4-epoxybutyloxy)butyl group, 5-(3,4-epoxybutyloxy)pentyl group, 6-(3,4-epoxybutyloxy)hexyl group, 7-(3,4-epoxybutyloxy)heptyl group, 8-(3,4-epoxybutyloxy)octyl group, 9-(3,4-epoxybutyloxy)nonyl group, 10-(3,4-epoxybutyloxy)decyl group, 2-(4,5-epoxypentyloxy)ethyl group, 3-(4,5-epoxypenty oxy)propyl group, 4-(3,4-epoxybutyloxy)butyl group, 5-(4,5-epoxypenty oxy)pentyl group, 6-(4,5-epoxypenty oxy)hexyl group, 7-(4,5-epoxypenty oxy)heptyl group, 8-(4,5-epoxypenty oxy)octyl group, 9-(4,5-epoxypenty oxy)nonyl group, and 10-(4,5-epoxypenty oxy)decyl group.

The halogenated alkyl group as the monovalent organic group may be linear or branched. The halogenated alkyl group may be a halogenated alkyl group in which a part of hydrogen atoms possessed by an alkyl group is substituted with halogen atom(s) or a perhalogenated alkyl group in which all hydrogen atoms are substituted with halogen atoms. As a halogen atom which the halogenated alkyl group may possess, fluorine atom, chlorine atom, bromine atom, and iodine atom are exemplified. As a halogen atom, fluorine atom, chlorine atom, and bromine atom are preferred. The halogenated alkyl group may include two or more types of halogen atoms. A number of carbon atoms in the halogenated alkyl group is not particularly limited, preferably 1 or more and 10 or less, and more preferably 1 or more and 6 or less. Suitable specific examples of the halogenated alkyl group include chloroalkyl groups such as chloromethyl group, dichloromethyl group, trichloromethyl group, 2-chloroethyl group, 2,2-dichloroethyl group, 2,2,2-trichloroethyl group, pentachloroethyl group, 2-chloropropyl group, heptachloropropyl group, 4-chlorobutyl group, nonachlorobutyl group, 5-chloropentyl group, undecachloropentyl group, 6-chlorohexyl group, tridecachlorohexyl group, 7-chloroheptyl group, pentadecachloroheptyl group, o-choloroooctyl group, heptadecachlorooctyl group, 9-chlorononyl group, nonadecachlorononyl group, 10-chlorodecyl group, and henicosachlorodecyl group; bromoalkyl groups such as bromomethyl group, dibromomethyl group, tribromomethyl group, 2-bromoethyl group, 2,2-dibromoethyl group, 2,2,2-tribromoethyl group, pentabromoethyl group, 3-bromopropyl group, heptabromopropyl group, 4-bromobutyl group, nonabromobutyl group, 5-bromopentyl group, undecabromopentyl group, 6-bromohexyl group, toridecabromohexyl group, 7-bromoheptyl group, pentadecabromoheptyl group, 8-bromooctyl group, heptadecabromooctyl group, 9-bromononyl group, nonadecabromononyl group, 10-bromodecyl group, and henicosabromodecyl group; fluoroalkyl groups such as fluoromethyl group, difluoromethyl group, trifluoromethyl group, 2-fluoroethyl group, 2,2-difluoroethyl group, 2,2,2-trifluoroethyl group, pentafluoroethyl group, 3-fluoropropyl group, heptafluoropropyl group, 4-fluorobutyl group, nonafluorobutyl group, 5-fluoropentyl group, undecafluoropentyl group, 6-fluorohexyl group, tridecafluorohexyl group, 7-fluoropentyl group, pentadecafluoroheptyl group, 8-fluorooctyl group, heptadecafluorooctyl group, 9-fluorononyl group, nonadecafluorononyl group, 10-fluorodecyl group, and henicosafluorodecyl group.

The mercaptoalkyl group as the monovalent organic group may be linear or branched. A number of carbon atoms in the mercaptoalkyl group is not particularly limited, preferably 1 or more and 10 or less, and more preferably 1 or more and 6 or less. Suitable specific examples of the mercaptoalkyl group include mercaptomethyl group, 2-mercaptoethyl group, 3-mercaptopropyl group, 4-mercaptobutyl group, 5-mercaptopentyl group, 6-mercaptohexy group, 7-mercaptoheptyl group, 8-mercaptooctyl group, 9-mercaptononyl group, and 10-mercaptodecyl group.

The aminoalkyl group as the monovalent organic group may be linear or branched. A number of carbon atoms is not particularly limited, preferably 1 or more and 10 or less, and more preferably 1 or more and 6 or less. Suitable specific examples of the aminoalkyl group include aminomethyl group, 2-aminoethyl group, 3-aminopropyl group, 4-aminobutyl group, 5-aminopentyl group, 6-aminohexyl group, 7-aminoheptyl group, 8-aminooctyl group, 9-aminononyl group, and 10-aminodecyl group.

The aminoalkylaminoalkyl group as the monovalent organic group may be linear or branched. A number of carbon atoms in each of two alkyl group is not particularly limited, preferably 1 or more and 10 or less, and more preferably 1 or more and 6 or less. Suitable specific examples of the aminoalkylaminoalkyl group include 2-(aminomethylamino)ethyl group, 3-(aminomethylamino)propyl group, 4-(aminomethylamino)butyl group, 5-(aminomethylamino)pentyl group, 6-(aminomethylamino)hexyl group, 7-(aminomethylamino)heptyl group, 8-(aminomethylamino)octyl group, 9-(aminomethylamino)nonyl group, 10-(aminomethylamino)decyl group, 2-(2-aminoethylamino)ethyl group, 3-(2-aminoethylamino)propyl group, 4-(2-aminoethylamino)butyl group, 5-(2-aminoethylamino)pentyl group, 6-(2-aminoethylamino)hexyl group, 7-(2-aminoethylamino)heptyl group, 8-(2-aminoethylamino)octyl group, 9-(2-aminoethylamino)nonyl group, 10-(2-aminoethylamino) decyl group, 2-(3-aminopropylamino)ethyl group, 3-(3-aminopropylamino)propyl group, 4-(3-aminopropylamino)butyl group, 5-(3-aminopropylamino)pentyl group, 6-(3-aminopropylamino)hexyl group, 7-(3-aminopropylamino)heptyl group, 8-(3-aminopropylamino)octyl group, 9-(3-aminopropylamino)nonyl group, 10-(3-aminopropylamino)decyl group, and the like.

The aminoalkylaminoalkylaminoalkyl group as the monovalent organic group may be linear or branched. A number of carbon atoms in each of the three alkylene groups included in the aminoalkylaminoalkylaminoalkyl group is not particularly limited, preferably 1 or more and 10 or less, and more preferably 1 or more and 6 or less. Suitable specific examples of the aminoalkylaminoalkylaminoalkyl group include 2-[2-(aminomethylamino)ethylamino]ethyl group, 3-[2-(aminomethylamino)ethylamino]propyl group, 4-[2-(aminomethylamino)ethylamino]butyl group, 5-[2-(aminomethylamino)ethylamino]pentyl group, 6-[2-(aminomethylamino)ethylamino]hexyl group, 7-[2-(aminomethylamino)ethylamino]heptyl group, 8-[2-(aminomethylamino)ethylamino]octyl group, 9-[2-(aminomethylamino)ethylamino]nonyl group, 10-[2-(aminomethylamino)ethylamino]decyl group, 2-[2-(2-aminoethylamino)ethylamino]ethyl group, 3-[2-(2-aminoethylamino)ethylamino]propyl group, 4-[2-(2-aminoethylamino)ethylamino]butyl group, 5-[2-(2-aminoethylamino)ethylamino]pentyl group, 6-[2-(2-aminoethylamino)ethylamino]hexyl group, 7-[2-(2-aminoethylamino)ethylamino]heptyl group, 8-[2-(2-aminoethylamino)ethylamino]octyl group, 9-[2-(2-aminoethylamino)ethylamino]nonyl group, 10-[2-(2- aminoethylamino)ethylamino]decyl group, 2-[2-(3-aminopropylamino)ethylamino]ethyl group, 3-[2-(3-aminopropylamino)ethylamino]propyl group, 4-[2-(3-aminopropylamino)ethylamino]butyl group, 5-[2-(3-aminopropylamino)ethylamino]pentyl group, 6-[2-(3-aminopropylamino)ethylamino]hexyl group, 7-[2-(3-aminopropylamino)ethylamino]heptyl group, 8-[2-(3-aminopropylamino)ethylamino]octyl group, 9-[2-(3-aminopropylamino)ethylamino]nonyl group, 10-[2-(3-aminopropylamino)ethylamino]decyl group, 2-[3-(aminomethylamino)propylamino]ethyl group, 3-[3-(aminomethylamino)propylamino]propyl group, 4-[3-(aminomethylamino)propylamino]butyl group, 5-[3-(aminomethylamino)propylamino]pentyl group, 6-[3-(aminomethylamino)propylamino]hexyl group, 7-[3-(aminomethylamino)propylamino]heptyl group, 8-[3-(aminomethylamino)propylamino]octyl group, 9-[3-(aminomethylamino)propylamino]nonyl group, 10-[3-(aminomethylamino)propylamino]decyl group, 2-[3-(2-aminoethylamino)propylamino]ethyl group, 3-[3-(2-aminoethylamino)propylamino]propyl group, 4-[3-(2-aminoethylamino)propylamino]butyl group, 5-[3-(2-aminoethylamino)propylamino]pentyl group, 6-[3-(2-aminoethylamino)propylamino]hexyl group, 7-[3-(2-aminoethylamino)propylamino]heptyl group, 8-[3-(2-aminoethylamino)propylamino]octyl group, 9-[3-(2-aminoethylamino)propylamino]nonyl group, 10-[3-(2-aminoethylamino)propylamino]decyl group, 2-[3-(3-aminopropylamino)propylamino]ethyl group, 3-[3-(3-aminopropylamino)propylamino]propyl group, 4-[3-(3-aminopropylamino)propylamino]butyl group, 5-[3-(3-aminopropylamino)propylamino]pentyl group, 6-[3-(3-aminopropylamino)propylamino]hexyl group, 7-[3-(3-aminopropylamino)propylamino]heptyl group, 8-[3-(3-aminopropylamino)propylamino]octyl group, 9-[3-(3-aminopropylamino)propylamino]nonyl group, 10-[3-(3-aminopropylamino)propylamino]decyl group, and the like.

The imidazolylalkyl group as the monovalent organic group may be linear or branched. A number of carbon atoms in a saturated aliphatic hydrocarbon chain included in the imidazolylalkyl group is not particularly limited, preferably 1 or more and 10 or less, more preferably 1 or more and 6 or less. Suitable specific examples of the imidazolylalkyl group include (1H-imidazole-1-yl)methyl group, 2-(1H-imidazole-1-yl)ethyl group, 3-(1H-imidazole-1-yl)propyl group, 4-(1H-imidazole-1-yl)butyl group, 5-(1H-imidazole-1-yl)pentyl group, 6-(1H-imidazole-1-yl)hexyl group, 7-(1H-imidazole-1-yl)heptyl group, 8-(1H-imidazole-1-yl)octyl group, 9-(1H-imidazole-1-yl)nonyl group, 10-(1H-imidazole-1-yl)decyl group, (1H-imidazole-2-yl)methyl group, 2-(1H-imidazole-2-yl)ethyl group, 3-(1H-imidazole-2-yl)propyl group, 4-(1H-imidazole-2-yl)butyl group, 5-(1H-imidazole-2-yl)pentyl group, 6-(1H-imidazole-2-yl)hexyl group, 7-(1H-imidazole-2-yl)heptyl group, 8-(1H-imidazole-2-yl)octyl group, 9-(1H-imidazole-2-yl)nonyl group, 10-(1H-imidazole-2-yl)decyl group, (1H-imidazole-4-yl)methyl group, 2-(1H-imidazole-4-yl)ethyl group, 3-(1H-imidazole-4-yl)propyl group, 4-(1H-imidazole-4-yl)butyl group, 5-(1H-imidazole-4-yl)pentyl group, 6-(1H-imidazole-4-yl)hexyl group, 7-(1H-imidazole-4-yl)heptyl group, 8-(1H-imidazole-4-yl)octyl group, 9-(1H-imidazole-4-yl)nonyl group, and 10-(1H-imidazole-4-yl)decyl group.

Suitable specific examples of the niobium compound represented by the formula (1) include pentaalkoxyniobiums such as pentamethoxyniobium, pentaethoxyniobium, penta-n-propoxyniobium, pentaisopropoxyniobium, and penta-n-butoxyniobium; monoalkyltetraalkoxyniobiums such as methyltetramethoxyniobium, methyltetraethoxyniobium, methyltetra-n-propoxyniobium, methyltetraisopropoxyniobium, methyltetra-n-butoxyniobium, ethyltetramethoxyniobium, ethyltetraethoxyniobium, ethyltetra-n-propoxyniobium, ethyltetraisopropxyniobium, and ethyltetra-n-butoxyniobium.

(Second Functionalizing Agent)

A second functionalizing agent is a functionalizing agent having a spacer group and not corresponding to the first functionalizing agent. The spacer group is a group which can suppress aggregation of the metal oxide particles (B) by its sterical hindrance. Typically, the spacer group is present in the second functionalizing agent as a spacer group-containing group having a terminus group bonding to the spacer group.

The spacer group as $R^{21}$ is not particularly limited as long as steric hindrance of the group represented by $-R^{21}-R^{22}$ improves the dispersibility of the nanoparticles. $R^{21}$ is a spacer group. $R^{22}$ is a hydrogen atom or a monovalent organic group. As the spacer group as $R^{21}$, an organic group having 1 or more and 20 or less carbon atoms is preferred, and a hydrocarbon group having 1 or more and 20 or less carbon atoms is more preferred. Typical examples of the spacer group include an optionally substituted alkylene group, an optionally substituted alkenylene group, an optionally substituted arylene group, and a divalent group in which two hydrogen atoms are excluded from an aryl group in an optionally substituted aralkyl group.

The alkylene group as the spacer group may be linear or branched. A number of carbon atoms in the alkylene group as the spacer group is preferably 1 or more and 20 or less, more preferably 1 or more and 10 or less, and even more preferably 2 or more and 8 or less. Specific examples of the alkylene group as the spacer group include methylene group, ethane-1,2-diyl group (ethylene group), ethane-1,1-diyl group, propane-1,3-diyl group, propane-1,2-diyl group, butane-1,4-diyl group, butane-1,2-diyl group, butane-1,3-diyl group, butane-2,3-diyl group, pentane-1,5-diyl group, hexane-1,6-diyl group, heptane-1,7-diyl group, octane-1,8-diyl group, nonane-1,9-diyl group, decane-1,10-diyl group, undecane-1,11-diyl group, dodecane-1,12-diyl group, tridecane-1,13-diyl group, tetradecane-1,14-diyl group, pentadecane-1,15-diyl group, hexadecane-1,16-diyl group, heptadecane-1,17-diyl group, octadecane-1,18-diyl group, nonadecane-1,19-diyl group, and icosane-1,20-diyl group. Examples of a substituent which the alkylene group as the spacer group may have include a halogen atom, an alkoxy group having 1 or more and 4 or less carbon atoms, a mercapto group, an alkylthio group having 1 or more and 4 or less carbon atoms, a cyano group, and the like.

The alkenylene group as the spacer group may be linear or branched. A number of carbon atoms in the alkenylene group as the spacer group is preferably 2 or more and 20 or less, more preferably 2 or more and 10 or less, and even more preferably 2 or more and 8 or less. Specific examples of the alkenylene group as the spacer group include ethene-1,2-diyl group, prop-2-en-1,3-diyl group, prop-2-en-1,2-diyl group, prop-1-en-1,2-diyl group, but-3-en-1,4-diyl group, pent-4-en-1,5-diyl group, hex-5-en-1,6-diyl group, hept-6-en-1,7-diyl group, oct-7-en-1,6-diyl group, non-8-en-1,8-diydl group, dec-9-en-1,10-diyl group, aundec-10-en-1,11-diyl group, dodec-11-en-1,12-diyl group, tridec-12-en-1,13-diyl group, tetradec-13-en-1,14-diyl group, pentadec-14-en-1,15-diyl group, hexadic-15-en-1,16-diyl group, heptadec-16-en-1,17-diyl group, octadic-17-en-1,18-diyl group, nonadec-18-en-1,19-diyl group, and icos-19-en-1,20-diyl group. Examples of a substituent which the alkenylene group as the spacer group may have include a halogen atom, an alkoxy group having 1 or more and 4 or less carbon atoms, a mercapto group, an alkylthio group having 1 or more and 4 or less carbon atoms, a cyano group, and the like.

A number of carbon atoms in the arylene group as the spacer group is preferably 6 or more and 20 or less, and more preferably 6 or more and 10 or less. Specific examples of the arylene group as the spacer group include o-phenylene group, m-phenylene group, p-phenylene group, naphthalene-1,2-diyl group, naphthalene-1,3-diyl group, naphthalene-1,4-diyl group, naphthalene-1,5-diyl group, naphthalene-1,6-diyl group, naphthalene-1,7-diyl group, naphthalene-1,8-diyl group, naphthalene-2,3-diyl group, naphthalene-2,6-diyl group, and naphthalene-2,7-diyl group. A number of carbon atoms in the divalent group in which one hydrogen atom is excluded from the aryl group in the optionally substituted aralkyl group as the spacer group is preferably 7 or more and 20 or less, and more preferably 7 or more and 12 or less. Suitable examples of the divalent group in which one hydrogen atom is excluded from an aryl group in the optionally substituted aralkyl group include $—CH_2$-Ph-, $—CH_2CH_2$-Ph-, $—CH_2—$Np—, and $—CH_2CH_2—$Np—. In these groups, Ph is an o-phenylene group, a m-phenylene group, or a p-phenylene group, and preferably the p-phenylene group. Np is naphthalene-1,2-diyl group, naphthalene-1,3-diyl group, naphthalene-1,4-diyl group, naphthalene-1,5-diyl group, naphthalene-1,6-diyl group, naphthalene-1,7-diyl group, naphthalene-1,8-diyl group, naphthalene-2,3-diyl group, naphthalene-2,6-diyl group, or naphthalene-2,7-diyl group, and preferably the naphthalene-1,2-diyl group, the naphthalene-1,4-diyl group, the naphthalene-2,3-diyl group, the naphthalene-2,6-diyl group, or the naphthalene-2,7-diyl group. Examples of the substituent which the arylene group, and the divalent group in which one hydrogen atom is excluded from the aryl group in the optionally substituted aralkyl group may possess include halogen atom, alkyl group having 1 or more and 4 or less carbon atoms, alkoxy group having 1 or more and 4 or less carbon atoms, mercapto group, alkylthio group having 1 or more and 4 or less carbon atoms, nitro group, and cyano group.

$R^{22}$ is a hydrogen atom or a monovalent organic group. $R^{22}$ is preferably the hydrogen atom. The monovalent organic group as $R^{22}$ is the same as the monovalent organic group described for $R^{11}$ in the formula (1).

The second functionalizing agent preferably has a mercapto group, a carboxy group, an amino group, an epoxy group, a hydrolysable organoxy group, and the like as the group capable of reacting with or bonding to unfunctionalized surfaces of the metal oxide particles. The second functionalizing agent may have two or more groups capable of reacting with or bonding to unfunctionalized surfaces of the metal oxide particles. When the second functionalizing agent has two or more group capable of binding to the unfunctionalized surfaces of the metal oxide particles, a plurality of said groups may be the same or different. Among these group, in view of stable dispersibility of the metal oxide particles (B) in the composition, good reactivity with nonfunctionalized surfaces of the metal oxide particles, and the like, the hydrolysable organoxy group is preferred. Suitable examples of the hydrolysable organoxy group are the same as the suitable examples of the hydrolysable organoxy group described for the first functionalizing agent.

As the second functionalizing agent, in view of ease of synthesis and availability, and good reactivity with unfunctionalized surfaces of the metal oxide particles, at least one selected from silane compound represented by the following formula (2) is preferred.

$$(R^{20}O)_{4-x}Si(R^{21}—R^{22})_x \quad (2)$$

In the formula (2), x is an integer of 1 or more and 3 or less. $R^{20}$ is an alkyl group. $R^{21}$ is a spacer group bonding to silicon atom via Si—C bond. $R^{22}$ is a hydrogen atom of a monovalent organic group.

In the formula (2), x is an integer of 1 or more and 3 or less, preferably 1 or 2, and more preferably 1. When x is 1 or 2, the silane compound represented by the formula (2) is hydrolytically condensed well to the unfunctionalized surfaces of the metal oxide particles, and hydrolysis-condensation of the silane compound represented by the formula (2) with the first functionalizing agent such as the aforementioned niobium compound also easily proceeds well.

In the formula (2), $R^{20}$ is an alkyl group. In the formula (2), when there is more than one $R^{20}$, the plurality of $R^{20}$ may be the same or different. The alkyl group as $R^{20}$ may be linear or branched. A number of carbon atoms in the alkyl group as $R^{20}$ is not particularly limited, and preferably 1 or more and 4 or less. Suitable specific examples of the alkyl group include methyl group, ethyl group, n-propyl group, isopropyl group, n-butyl group, isobutyl group, sec-butyl group, and tert-butyl group. In view of reactivity during functionalization of the inorganic oxide particles, among the alkyl group as $R^{20}$, the methyl group and the ethyl group are preferred, and the methyl group is more preferred.

In the formula (2), $R^{21}$ and $R^{22}$ are same as described above for the space group-containing group. With respect to $R^{21}$, "bonding to silicon atom via Si—C bond" means that atom in $R^{21}$ bonding to silicon atom is a carbon atom in a partial structure represented by $Si(R^{21}—R^{22})_x$ in the formula (2).

Suitable specific examples of the silane compound represented by the formula (2) include linear branched alkyltrimethoxysilanes such as methyltrimethoxysilane, an ethyltrimethoxysilane, n-propyltrimethoxysilane, n-butyltrimethoxysilane, n-pentylgrimethoxysilane, n-hexyltrimethoxysilane, n-octyltrimethoxysilane, n-nonyltrimethoxysilane, n-decyltrimethoxysilane, n-dodecyltrimethoxysilane, n-hexadecyltrimethoxysilane, and n-octadecyltrimethoxysilane;

- linear or branched alkyltriethoxysilanes such as methyltriethoxysilane, ethyltriethoxysilane, n-propyltriethoxysilane, n-butyltriethoxysilane, n-pentyltriethoxysilane, n-hexyltriethoxysilane, n-octyltriethoxysilane, n-nonyltriethoxysilane, n-decyltriethoxysilane, n-dodecyltriethoxysilane, n-hexadecyltriethoxysilane, and n-ocatadecyltriethoxysilan;
- (meth)acryloyloxyalkyltrimethoxysilanes such as 2-(meth)acryloyloxyethyltrimethoxysilane, 3-(meth)acryloyloxypropytrimethoxysilane, 4-(meth)acryloyloxybutyltrimethoxysilane, 5-(meth)acryloyloxypentyltrimethoxysilane, 6-(meth)acryloyloxyhexyltrimethoxysilane, 7-(meth)acryloyloxyheptyltrimethoxysilane, 8-(meth)acryloyloxyoctyltrimethoxysilane, 9-(meth)acryloyloxynonyltrimethoxysilane, and 10-(meth)acryloyloxydecyltrimethoxysilane;

(meth)acryloyloxyalkyltriethoxysilanes such as 2-(meth)acryloyloxyethyltriethoxysilane, 3-(meth)acryloyloxypropytriethoxysilane, 4-(meth)acryloyloxybutyltriethoxysilane, 5-(meth)acryloyloxypentyltriethoxysilane, 6-(meth)acryloyloxyhexyltriethoxysilane, 7-(meth)acryloyloxyheptyltriethoxysilane, 8-(meth)acryloyloxyoctyltriethoxysilane, 9-(meth)acryloyloxynonyltriethoxysilane, and 10-(meth)acryloyloxydecyltriethoxysilane;

glycidyloxyalkyltrimethoxysilanes such as 2-glycidyloxyethyltrimethoxysilane, 3-glycidyloxypropyltrimethoxysilane, 4-glycidyloxybutyltrimethoxysilane, 5-glycidyloxypentyltrimethoxysilane, 6-glycidyloxyhexyltrimethoxysilane, 7-glycidyloxyheptyltrimethoxysilane, 8-glycidyloxyoctyltrimethoxysilane, 9-glycidyloxynonyltrimethoxysilane, and 10-glydidyloxydecyltrimethoxysilane;

glycidyloxyalkyltriethoxysilanes such as 2-glycidyloxyethyltriethoxysilane, 3-glycidyloxypropyltriethoxysilane, 4-glycidyloxybutyltriethoxysilane, 5-glycidyloxypentyltriethoxysilane, 6-glycidyloxyhexyltriethoxysilane, 7-glycidyloxyheptyltriethoxysilane, 8-glycidyloxyoctyltriethoxysilane, 9-glycidyloxynonyltriethoxysilane, and 10-glydidyloxydecyltriethoxysilane;

aminoalkyltrimethoxysilanes such as 2-aminoethyltrimethoxysilane, 3-aminopropyltrimethoxysilane, 4-aminobutyltrimethoxysilane, 5-aminopentyltrimethoxysilane, 6-aminohexyltrimethoxysilane, 7-aminoheptyltrimethoxysilane, 8-aminooctyltrimethoxysilane, 9-aminononyltrimethoxysilane, and 10-aminodecyltrimethoxysilane;

aminoalkyltriethoxysilanes such as 2-aminoethyltriethoxysilane, 3-aminopropyltriethoxysilane, 4-aminobutyltriethoxysilane, 5-aminopentyltriethoxysilane, 6-aminohexyltriethoxysilane, 7-aminoheptyltriethoxysilane, 8-aminooctyltriethoxysilane, 9-aminononyltriethoxysilane, and 10-aminodecyltriethoxysilane; aryl group-containing trimethoxysilanes or aryl group-containing triethoxysilanes such as phenyltrimethoxysilane, phenylethyltrimethoxysilane, phenyltriethoxysilane, and phenylethyltriethoxysilane;

alkyleneoxy group-containing trimethoxysilanes or alkyleneoxy group-containing triethoxysilanes such as 3-{2-methoxy[poly(ethyleneoxy)]}propyltrimethoxysilane, 3-{2-methoxy[tri(ethyleneoxy)]}propyltrimethoxysilane, 3-{2-methoxy[poly(ethyleneoxy)]}propyltriethoxysilane, and 3-{2-methoxy[tri(ethyleneoxy)]}propyltrimethoxysilane;

unsaturated group-containing trimethoxysilanes or unsaturated group-containing triethoxysilanes such as vinyltrimethoxysilane, vinyltriethoxysilane, allyltrimethoxyxilane, allyltriethoxysilane, 1-hexenyltrimethoxysilane, 1-hexenyltriethoxysilane, 1-octenyltrimethoxyxilane, and 1-octenyltriethoxysilane; mercapto group-containing trialkoxysilanes such as 3-mercaptopropyltrimethoxyxilane and 3-mercaptopropyltriethoxyxilane;

isocyanato group-containing trialkoxysilanes such as 3-isocyanatopropyltrimethoxyxilane and 3-isocyanatopropyltriethoxysilane.

(Other Functionalizing Agent)

The functionalizing agent may include other functionalizing agent other than the first functionalizing agent and the second functionalizing agent as long as the desired effect is not impaired. Examples of the other functionalizing agent include organic thiols such as an alkane thiol, organic carboxylic acids such as an aliphatic carboxylic acid, organic amines such as an alkyl amine, organic epoxy compound, and the like. It should be noted that the functionalizing agent may not include and preferably does not include a functionalizing agent that corresponds to at least one selected from carboxylic acid, β-diketone, β-ketoester, α-hydroxyacid, β-hydroxyacid, aminoacid, phosphonic acid, and phosphonate.

A ratio of sum of a mass of the first functionalizing agent and a mass of the second functionalizing agent relative to the mass of the functionalizing agent is preferably 70% by mass or more, more preferably 80% by mass or more, further preferably 90% by mass or more, even more preferably 95% by mass or more, and particularly preferably 100% by mass.

(Reaction with Functionalizing Agent)

The aforementioned metal oxide particles (B) can be prepared by reacting the unfunctionalized surfaces of the metal oxide particles with the functionalizing agent. The unfunctionalized surfaces of the metal oxide particles can be reacted with the functionalizing agent by any known method.

Hereinafter, as a □specific example of the reaction of the unfunctionalized surfaces of the metal oxide particles with the functionalizing agent, a method using at least one of the niobium compounds represented by the formula (1) and at least one of the silane compounds represented by the formula (2) as the functionalizing agent is described.

When the metal oxide particles are reacted with the functionalizing agent, the silane compound may be reacted with the metal oxide particles after reaction of the niobium compound with the metal oxide particles, the niobium compound may be reacted with the metal oxide particles after reaction of the silane compound with the metal oxide particle, the niobium compound and the silane compound may be simultaneously reacted with the metal oxide particles, and a hydrolysis-condensation product of the niobium compound and the silane compound may be reacted with the metal oxide particles. On the surfaces of the metal oxide particles, the niobium compound and the silane compound may or may not be reacted with each other. In other words, Si—C—Nb bonds may or may not be formed on the surfaces of the metal oxide particles. The formation of the Si—C—Nb bonds can be confirmed by analysis by Fourier transform infrared spectrophotometric method(FT-IR). Specifically, the presence or absence of the Si—C—Nb bonds can be confirmed based on FT-IR spectrum of the metal oxide particles where those surfaces are functionalized with the niobium compound and the silane compound. In the FT-IR spectrum, a wave number corresponding to the Si—C—Nb bonds are a wave number around 910 $cm^{-1}$. The order of the reactions can be set appropriately according to value of n in the aforementioned formula (1) with respect to the niobium compound. For example, when n is an integer of 0 or more and 2 or less, it is preferable that the metal oxide particles are further reacted with the niobium compound after the reaction of the silane compound with the metal oxide particles. In this way, the niobium compound can bond to the surfaces of the metal oxide particles while inhibiting the aggregation of the metal oxide particles. As a result, dispersibility is improved. In addition, the resulting functionalized metal oxide particles have a higher refractive index and a transparency of a dispersion including them is also improved.

When the functionalizing agent includes other functionalizing agent than the niobium compound and the silane compound, a functionalization of the surfaces of the inorganic oxide particles with other functionalizing agent may be carried out before or after the reaction of the metal oxide particles with the niobium compound and the silane compound or at the same time as the reaction of the metal oxide particles with the niobium compound and the silane compound. In addition, the functionalization of the surfaces of the metal oxide particles with other functionalizing agent may be carried out between the reaction of the metal oxide particles with the niobium compound and the reaction of the metal oxide particles with the silane compound.

The reaction of the metal oxide particles with the niobium compound and the silane compound as the functionalizing agent may be carried out in the presence or absence of a dispersion medium which disperses the metal oxide particles, and is preferably carried out in the presence of the dispersion medium. The dispersion medium preferably includes an organic solvent. As the organic solvent, the organic solvent which is suitably used as the dispersion medium described below for the dispersion is preferably used.

An amount of the dispersion medium is not particularly limited when the metal oxide particles are reacted with the functionalized agent. The amount of the dispersion medium is preferably 10 parts by mass or more and 5000 parts by mass or less, more preferably 100 parts by mass or more and 3000 parts by mass or less relative to 100 parts by mass of the metal oxide particles.

The reaction of the metal oxide particles and the niobium compound and the silane compound is a hydrolysis-condensation reaction between functional groups such as hydroxy group exist on the surfaces of the metal oxide particles and the alkoxy groups possessed by the niobium compound and the silane compound. Therefore, the reaction of the metal oxide particles with the niobium compound and the silane compound is usually carried out in the presence of water. When the reaction of the metal oxide particles with the niobium compound and the silane compound is carried out, water may be added to the dispersion medium, and the reaction may be carried out under an atmosphere such as air including water without addition of water to the dispersion medium. When the water is added to the dispersion medium, a mass of the water is included in the mass of the dispersion medium.

When the surfaces of the metal oxide particles are functionalized, total amount of the niobium compound and the silane compound is not particularly limited as long as the desired effect is not impaired. In view of suppressing aggregation of metal oxide particles, an amount of the silane compound is preferably 5 parts by mass or more and 100 parts by mass or less, more preferably 10 parts by mass or more and 45 parts by mass or less, and further preferably 10 parts by mass or more and 40 parts by mass or less relative to 100 parts by mass of the metal oxide particles where those surfaces are not functionalized.

When the metal oxide particles (B) are functionalized with the niobium compound represented by the formula (1) and the silane compound represented by the formula (2), in the metal oxide particles (B), MN/MS which is a ratio of MN:the number of moles of niobium atoms derived from the niobium compound represented by the formula (1) and MS: the number of moles of silicon atoms derived from the silane compound represented by the formula (2) is not particularly limited as long as desired effect is not impaired. MN/MS is preferably 0.01 or more and 2.0 or less, more preferably 0.1 or more and 1.0 or less, and further preferably 0.5 or more and 1.0 or less. In determination of MN/MS, each of values of MN and MS can be measured by performing an X-ray photoelectron spectroscopy (XPS) analysis on a sample of the metal oxide particles (B), respectively. More specifically, value of MN/MS can be determined by calculating a molar ratio of a part derived from the niobium compound represented by the formula (1) and a part derived from the silane compound represented by the formula (2).

A content of the metal oxide particles (B) is not particularly limited as long as it does not interfere with the object of the present invention. The content of the metal oxide particles (B) is preferably 5% by mass or more and 95% by mass or less, 35% by mass or more and 93% by mass or less, and further preferably 40% by mass and 90% by mass or less relative to the mass of the composition excluding a mass of the solvent (S). When the content of the metal oxide particles (B) in within the above range, the composition in which the metal oxide particles (B) are stably dispersed, and the cured product that achieve the desired effect brought about by the use of metal oxide particles (B) can be easily formed by using the composition. In view of easily forming the cured product with particularly high refractive index, the content of the metal oxide particles (B) in the composition is preferably 75% by mass or more, more preferably 75% by mass or more and 98% by mass or less, and further preferably 75% by mass or more and 95% by mass or less relative to the mass of the composition excluding the mass of the solvent (S).

<Initiator (C)>

In order to cure the photopolymerizable compound (A), the composition preferably includes an initiator (C). When the photopolymerizable compound (A) has the radically polymerizable group, a radical polymerization initiator (C1) is used as the initiator (C). When the photopolymerizable compound (A) has the cationically polymerizable group, a cationically polymerization initiator (C2) is used as the initiator (C). Since regioselective curing of the composition is capable, and there is no concern about thermal degradation, volatilization, or sublimation of the components of the composition, the photo initiator is preferred as the initiator (C). The initiator (C) is not particularly limited and various polymerization initiator conventionally known can be used.

Specific examples of the photo radical polymerization initiator useful as useful as the radical polymerization initiator (C1) include 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, 1-(4-isopropylphenyl)-2-hydroxy-2-methylpropan-1-one, 1-(4-dodecylphenyl)-2-hydroxy-2-methylpropan-1-one, 2,2-dimethoxy-1,2-diphenylethan-1-one, bis(4-dimethylaminophenyl) ketone, 2-methyl-1-[4-(methylthio)phenyl]-2-morpholinopropan-1-one, 2-benzyl-2-dimethylamino-1-(4-morpholinophenyl)-butan-1-one, O-acetyl-1-[6-(2-methylbenzoyl)-9-ethyl-9H-carbazol-3-yl]ethanone oxime, (9-ethyl-6-nitro-9H-carbazol-3-yl) [4-(2-methoxy-1-methylethoxy)-2-methylphenyl]methanon O-acetyloxime, 1,2-octanedione, 2-(benzoyloxyimino)-1-[4-(phenylthio)phenyl]-1-octanone, 2,4,6-trimethylbenzoyldiphenylphosphine oxide, 4-benzoyl-4'-methyldimethyl sulfide, 4-dimethylaminobenzoic acid, methyl 4-dimethylaminobenzoate, ethyl 4-dimethylaminobenzoate, butyl 4-dimethylaminobenzoate, 4-dimethylamino-2-ethylhexylbenzoic acid, 4-dimethylamino-2-isoamylbenzoic acid, benzyl-β-methoxyethyl acetal, benzyl dimethyl ketal, 1-phenyl-1,2-propanedion-2-(0-ethoxycarbonyl) oxime, methyl o-benzoylbenzoate, 2,4-diethylthioxanthone, 2-chlorothioxanthone, 2,4-dimethylthioxanthone, 1-chloro-4-propoxythioxanthone, thioxanthene, 2-chlorothioxanthene, 2,4-diethylthioxanthene, 2-methylthioxanthene, 2-isopropylthioxanthene, 2-ethylanthraquinone, octamethylanthraquinone, 1,2-benzanthraquinone, 2,3-diphenylanthraquinone, azobisisobutyronitrile, benzoyl peroxide, cumene hydroperoxide, 2-mercaptobenzimidazole, 2-mercaptobenzoxazole, 2-mercaptobenzothiazole, 2-(o-chlorophenyl)-4,5-di(m-methoxyphenyl)-imidazolyl dimer, benzophenone, 2-chlorobenzophenone, p,p'-bisdimethylaminobenzophenone, 4,4'-bisdiethylaminobenzophenone, 4,4'-dichlorobenzophenone, 3,3-dimethyl-4-methoxybenzophenone, benzil, benzoin, benzoin methyl ether, benzoin ethyl ether, benzoin isopropyl ether, benzoin-n-butyl ether, benzoin isobutyl ether, benzoin butyl ether, acetophenone, 2,2-diethoxyacetophenone, p-dimethylacetophenone, p-dimethylaminopropiophenone, dichloroacetophenone, trichloroacetophenone, p-tert-butylacetophenone, p-dimethylaminoacetophenone, p-tert-butyltrichloroacetophenone, p-tert-butyldichloroacetophenone, α,α-dichloro-4-phenoxyacetophenone, thioxanthone, 2-methylthioxanthone, 2-isopropylthioxanthone, dibenzosuberone, pentyl 4-dimethylaminobenzoate, 9-phenylacridine, 1,7-bis-(9-acridinyl)heptane, 1,5-bis-(9-acridinyl)pentane, 1,3-bis-(9-acridinyl)propane, p-methoxytriazine, 2,4,6-tris(trichloromethyl)-s-triazine, 2-methyl-4,6-bis(trichloromethyl)-s-triazine, 2-[2-(5-methylfuran-2-yl)ethenyl]-4,6-bis(trichloromethyl)-s-triazine, 2-[2-(furan-2-yl)ethenyl]-4,6-bis(trichloromethyl)-s-triazine, 2-[2-(4-diethylamino-2-methylphenyl)ethenyl]-4,6-bis(trichloromethyl)-s-triazine, 2-[2-(3,4-dimethoxyphenyl)ethenyl]-4,6-bis(trichloromethyl)-s-triazine, 2-(4-methoxyphenyl)-4,6-bis(trichloromethyl)-s-triazine, 2-(4-ethoxystyryl)-4,6-bis(trichloromethyl)-s-triazine, 2-(4-n-butoxyphenyl)-4,6-bis(trichloromethyl)-s-triazine, 2,4-bis-trichloromethyl-6-(3-bromo-4-methoxy)phenyl-s-triazine, 2,4-bis-trichloromethyl-6-(2-bromo-4-methoxy)phenyl-s-triazine, 2,4-bis-trichloromethyl-6-(3-bromo-4-methoxy)styrylphenyl-s-triazine, 2,4-bis-trichloromethyl-6-(2-bromo-4-methoxy)styrylphenyl-s-triazine, and the like. These photo radical polymerization initiators may be used either individually or in combination of two or more.

Among photo radical polymerization initiators, an oxime ester compound is preferable from the viewpoint of sensitivity of the composition. A compound including the partial structure represented by the formula (c1) is preferable as the oxime ester compound.

(c1)

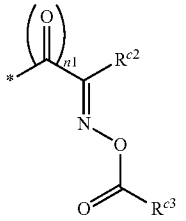

In the formula (c1), n1 is 0 or 1. $R^{c2}$ is a monovalent organic group. $R^{c3}$ is a hydrogen atom, an optionally substituted aliphatic hydrocarbon group having 1 or more and 20 or less carbon atoms, or an optionally substituted aryl group. * is a bond.

The compound including the partial structure represented by the formula (c1) preferably has a carbazole skeleton, a fluorene skeleton, a diphenyl ether skeleton, or a phenyl sulfide skeleton. The compound including the partial structure represented by the formula (c1) preferably has 1 or 2 partial structures represented by the formula (c1).

Examples of the compound including the partial structure represented by the formula (c1) includes a compound represented by the following formula (c2).

(c2)

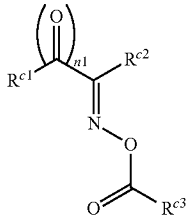

In the formula (c2), $R^{c1}$ is a group represented by the following formula (c3), (c4) or (c5). n1 is 0 or 1. $R^{c2}$ is a monovalent organic group. $R^{c3}$ is a hydrogen atom, an optionally substituted aliphatic hydrocarbon group having 1 or more and 20 or less carbon atoms, or an optionally substituted aryl group.

(c3)

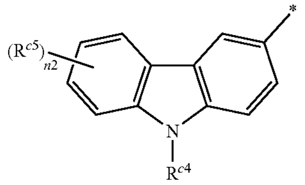

In the formula (c3), $R^{c4}$ is a monovalent organic group. $R^{c5}$ is a monovalent organic group, a halogen atom, or a nitro group. n2 is an integer of 0 or more and 3 or less. when n2 is 2 or 3, plural $R^{c5}$s may be the same as or different each other, and plural $R^{c5}$s may be combined to each other to form a ring. * is a bond.

(c4)

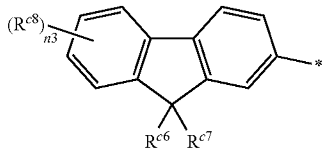

In the formula (c4), $R^{c6}$ and $R^{c7}$ are each independently an optionally substituted chain alkyl group, an optionally substituted chain alkoxy group, an optionally substituted cyclic organic group, or a hydrogen atom. $R^{c6}$ and $R^{c7}$ may be combined to each other to form a ring. $R^{c7}$ and a benzene ring in the fluorene skeleton may be combined to each other to form a ring. $R^{c8}$ is a nitro group or a monovalent organic group. n3 is an integer of 0 or more and 4 or less. * is a bond.

(c5)

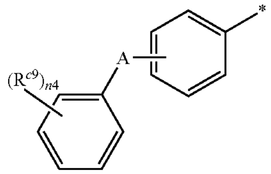

In the formula (c5), $R^{c9}$ is a monovalent organic group, a halogen atom, a nitro group, or a cyano group. A is S or O. n4 is an integer of 0 or more and 4 or less. * is a bond.

In the formula (c3), $R^{c4}$ is a monovalent organic group. $R^{c4}$ can be selected from various kinds of organic groups as long as it does not interfere with the object of the present invention. As the organic group, a carbon atom-containing group is preferred, and a group consisting of 1 or more carbon atoms, and 1 or more atoms selected from the group consisting of H, O, S, Se, N, B, P, Si and a halogen atom is more preferred. The number of carbon atoms in the carbon atom-containing group is not particularly limited, and is preferably 1 or more and 50 or less, and more preferably 1 or more and 20 or less. Suitable examples of $R^{c4}$ include an optionally substituted alkyl group having 1 or more and 20 or less carbon atoms, an optionally substituted cycloalkyl group having 3 or more an 20 or less carbon atoms, an optionally substituted saturated aliphatic acyl group having 2 or more and 20 or less carbon atoms, an optionally substituted alkoxycarbonyl group having 2 or more and 20 or less carbon atoms, an optionally substituted phenyl group, an optionally substituted benzoyl group, an optionally substituted phenoxycarbonyl group, an optionally substituted phenylalkyl group having 7 or more and 20 or less carbon atoms, an optionally substituted naphthoyl group, an optionally substituted naphthoxycarbonyl group, an optionally substituted naphthylalkyl group having 11 or more and 20 or less carbon atoms, an optionally substituted heterocyclyl group, an optionally substituted heterocyclylcarbonyl group, and the like.

Among $R^{c4}$s, the alkyl group having 1 or more and 20 or less carbon atoms. The alkyl group may be linear or branched. The number of carbon atoms in the alkyl group as $R^{C4}$ is preferably 2 or more, more preferably 5 or more, and particularly preferably 7 or more, from the viewpoint of good solubility of the compound represented by the formula (c3) in the composition. From the viewpoint of good compatibility between the compound represented by the formula (c3) and other components in the composition, the number of carbon atoms in the alkyl group as $R^{c4}$ is preferably 15 or less, and more preferably 10 or less.

When $R^{c4}$ has a substituent, suitable examples of the substituent is a hydroxy group, an alkyl group having 1 or more and 20 or less carbon atoms, an alkoxy group having 1 or more and 20 or less carbon atoms, an aliphatic acyl group having 2 or more and 20 or less carbon atoms, an aliphatic acyloxy group having 2 or more and 20 or less carbon atoms, a phenoxy group, a benzoyl group, a benzoyloxy group, a group represented by $—PO(OR)_2$ (in which, R is an alkyl group having 1 or more and 6 or less carbon atoms), a halogen atom, a cyano group, a heterocyclyl group, and the like.

When $R^{c4}$ is a heterocyclyl group, the heterocyclyl group may be an aliphatic heterocyclic group or an aromatic heterocyclic group. When $R^{c4}$ is the heterocyclyl group, the heterocyclyl group is a 5- or 6-membered single ring containing one or more N, S, and O, or a heterocyclyl group in which single rings are fused each other, or a single ring is fused with a benzene ring. When the heterocyclyl group is a fused ring, the number of rings constituting the fused ring is 3 or less. Examples of the heterocycle constituting the heterocyclyl group include furan, thiophene, pyrrole, oxazole, isoxazole, thiazole, thiadiazole, isothiazole, imidazole, pyrazole, triazole, pyridine, pyrazine, pyrimidine, pyridazine, benzofuran, benzothiophene, indole, isoindole, indolizine, benzoimidazole, benzotriazole, benzoxazole, benzothiazole, carbazole, purine, quinoline, isoquinoline, quinazoline, phthalazine, cinnoline, quinoxaline, piperidine, piperazine, morpholine, tetrahydropyran, tetrahydrofuran, and the like. When $R^{c4}$ is the heterocyclyl group, examples of substituent that the heterocyclyl group may have include a hydroxy group, an alkoxy group having 1 or more and 6 or less carbon atoms, a halogen atom, a cyano group, a nitro group, and the like.

Suitable examples of above described $R^{c4}$ include methyl group, ethyl group, n-propyl group, isopropyl group, n-butyl group, isobutyl group, sec-butyl group, tert-butyl group, n-pentyl group, isopentyl group, neopentyl group, pentane-3-yl group, sec-pentyl group, tert-pentyl group, n-hexyl group, n-heptyl group, n-octyl group and 2-ethylhexyl group. In addition, the n-octyl group and the 2-ethylhexyl group is preferable, and the 2-ethylhexyl group is more preferable, from the viewpoint of good solubility of the compound represented by the formula (c3) in the curable composition.

In the formula (c3), $R^{c5}$ is a monovalent organic group, a halogen atom. or a nitro group. The monovalent organic group as $R^{c5}$ can be selected from various kinds of organic groups as long as it does not interfere with the object of the present invention. As the organic group, a carbon atom-containing group is preferred, and a group consisting of 1 or more carbon atoms, and 1 or more atoms selected from the group consisting of H, O, S, Se, N, B, P, Si and a halogen atom is more preferred. The number of carbon atoms in the carbon atom-containing group is not particularly limited, and preferably 1 or more and 50 or less, and more preferably 1 or more and 20 or less. Examples of the organic group suitable for $R^{c5}$ include an alkyl group, an alkoxy group, a cycloalkyl group, a cycloalkoxy group, a saturated aliphatic acyl group, an alkoxycarbonyl group, a saturated aliphatic acyloxy group, an optionally substituted phenyl group, an optionally substituted phenoxy group, an optionally substituted benzoyl group, an optionally substituted phenoxycarbonyl group, an optionally substituted benzoyloxy group, an optionally substituted phenylalkyl group, an optionally substituted naphthyl group, an optionally substituted naphthoxy group, an optionally substituted naphthoyl group, an optionally substituted naphthoxycarbonyl group, an optionally substituted naphthoyloxy group, an optionally substituted naphthylalkyl group, an optionally substituted heterocyclyl group, an optionally substituted heterocyclylcarbonyl group, an amino group substituted with 1 or 2 organic groups, a morpholine-1-yl group, a piperazine-1-yl group, a halogen atom, a nitro group, a cyano group, a substituent including a group represented by $HX_2C—$ or $H_2XC—$ (in which, X is each independently a halogen atom), and the like.

When $R^{c5}$ is the alkyl group, a number of carbon atoms in the alkyl group is preferably 1 or more and 20 or less, and more preferably 1 or more and 6 or less. When $R^{c5}$ is the alkyl group, the alkyl group may be linear or branched. Specific examples of the alkyl group as $R^{c5}$ include methyl group, an ethyl group, n-propyl group, isopropyl group, n-butyl group, isobutyl group, sec-butyl group, tert-butyl group, n-pentyl group, isopentyl group, sec-pentyl group, tert-pentyl group, n-hexyl group, n-heptyl group, n-octyl group, isooctyl group, sec-octyl group, tert-octyl group, n-nonyl group, isononyl group, n-decyl group, isodecyl group, and the like. When $R^{c5}$ is alkyl group, the alkyl group may contain an ether bond (—O—) in the carbon chain. Examples of the alkyl group having an ether bond in a carbon chain include methoxyethyl group, ethoxyethyl group, methoxyethoxyethyl group, ethoxyethoxyethyl group, propyloxyethoxyethyl group, and methoxypropyl group.

When $R^{c5}$ is the alkoxy group, the number of carbon atoms in the alkoxy group is preferably 1 or more and 20 or less, and more preferably 1 or more and 6 or less. When $R^{c5}$ is the alkoxy group, the alkoxy group may be linear or branched. When $R^{c5}$ is the alkoxy groups, specific examples thereof include methoxy group, ethoxy group, n-propyloxy group, isopropyloxy group, n-butyloxy group, isobutyloxy group, sec-butyloxy group, tert-butyloxy group, n-pentyloxy group, isopentyloxy group, sec-pentyloxy group, tert-pentyloxy group, n-hexyloxy group, n-heptyloxy group, n-octyloxy group, isooctyloxy group, sec-octyloxy group, tert-octyloxy group, n-nonyloxy group, isononyloxy group, n-decyloxy group, isodecyloxy group, and the like. When $R^{c5}$ is the alkoxy groups, the alkoxy group may have an ether bond (—O—) in a carbon chain. Examples of the alkoxy group having an ether bond in a carbon chain include methoxyethoxy group, ethoxyethoxy group, methoxyethoxyethoxy group, ethoxyethoxyethoxy group, propyloxyethoxyethoxy group, and methoxypropyloxy group.

When $R^{c5}$ is the cycloalkyl group or the cycloalkoxy group, the number of carbon atoms in the cycloalkyl group or the cycloalkoxy group is preferably 3 or more and 10 or less, and more preferably 3 or more and 6 or less. Specific examples of the cycloalkyl group as $R^{c5}$ include cyclopropyl group, cyclobutyl group, cyclopentyl group, cyclohexyl group, cycloheptyl group, cyclooctyl group, and the like. Specific examples of the cycloalkoxy group as RCS include cyclopropyloxy group, cyclobutyloxy group, cyclopentyloxy group, cyclohexyloxy group, cycloheptyloxy group, cyclooctyloxy group, and the like.

When $R^{c5}$ is a saturated aliphatic acyl group or a saturated aliphatic acyloxy group, the number of carbon atoms is preferably 2 or more and 21 or less, and more preferably 2 or more and 7 or less. When $R^{c5}$ is a saturated aliphatic acyl group, specific examples thereof include acetyl group, propanoyl group, n-butanoyl group, 2-methylpropanoyl group, n-pentanoyl group, 2,2-dimethylpropanoyl group, n-hexanoyl group, n-heptanoyl group, n-octanoyl group, n-nonanoyl group, n-decanoyl group, n-undecanoyl group, n-dodecanoyl group, n-tridecanoyl group, n-tetradecanoyl group, n-pentadecanoyl group, n-hexadecanoyl group, and the like. When $R^{c5}$ is a saturated aliphatic acyloxy group, specific examples thereof include acetyloxy group, propanoyloxy group, n-butanoyloxy group, 2-methylpropanoyloxy group, n-pentanoyloxy group, 2,2-dimethylpropanoyloxy group, n-hexanoyloxy group, n-heptanoyloxy group, n-octanoyloxy group, n-nonanoyloxy group, n-decanoyloxy group, n-undecanoyloxy group, n-dodecanoyloxy group, n-tridecanoyloxy group, n-tetradecanoyloxy group, n-pentadecanoyloxy group, n-hexadecanoyloxy group, and the like.

When $R^{c5}$ is an alkoxycarbonyl group, the number of carbon atoms is preferably 2 or more and 20 or less, and preferably 2 or more and 7 or less. When $R^{c5}$ is an alkoxycarbonyl group, specific examples thereof include methoxycarbonyl group, ethoxycarbonyl group, n-propyloxycarbonyl group, isopropyloxycarbonyl group, n-butyloxycarbonyl group, isobutyloxycarbonyl group, sec-butyloxycarbonyl group, tert-butyloxycarbonyl group, n-pentyloxycarbonyl group, isopentyloxycarbonyl group, sec-pentyloxycarbonyl group, tert-pentyloxycarbonyl group, n-hexyloxycarbonyl group, n-heptyloxycarbonyl group, n-octyloxycarbonyl group, isooctyloxycarbonyl group, sec-octyloxycarbonyl group, tert-octyloxycarbonyl group, n-nonyloxycarbonyl group, isononyloxycarbonyl group, n-decyloxycarbonyl group, and isodecyloxycarbonyl group.

When $R^{c5}$ is a phenylalkyl group, the number of carbon atoms in the phenylalkyl group is preferably 7 or more and 20 or less, and more preferably 7 or more and 10 or less. In addition, when $R^{c5}$ is a naphthylalkyl group, the number of carbon atoms in the naphthylalkyl group is preferably 11 or more and 20 or less, and more preferably 11 or more and 14 or less. When $R^{c5}$ is a phenylalkyl group, specific examples thereof include benzyl group, 2-phenylethyl group, 3-phenylpropyl group, and 4-phenylbutyl group. When $R^{c5}$ is a naphthylalkyl group, specific examples thereof include α-naphthylmethyl group, β-naphthylmethyl group, 2-(α-naphthyl)ethyl group, and 2-(β-naphthyl)ethyl group. When RCS is a phenylalkyl group or a naphthylalkyl group, $R^{c5}$ may further have a substituent on a phenyl group or a naphthyl group.

When $R^{c5}$ is a heterocyclyl group, the heterocyclyl group is the same as the heterocyclyl group as $R^{c4}$ in the formula (c3), and may further have a substituent. When $R^{c5}$ is a heterocyclylcarbonyl group, the heterocyclyl group included in the heterocyclylcarbonyl group is the same as the heterocyclyl group as $R^{c5}$.

When $R^{dc5}$ is an amino group substituted with one or two organic groups, suitable examples of the organic groups include an alkyl group having 1 or more and 20 or less carbon atoms, a cycloalkyl group having 3 or more and 10 or less carbon atoms, a saturated aliphatic acyl group having 2 or more and 21 or less carbon atoms, an optionally substituted phenyl group, an optionally substituted benzoyl group, an optionally substituted phenylalkyl group having 7 or more and 20 or less carbon atoms, an optionally substituted naphthyl group, an optionally substituted naphthoyl group, an optionally substituted naphthylalkyl group having 11 or more and 20 or less carbon atoms, and a heterocyclyl group. Specific examples of these suitable organic group are the same as $R^{c5}$. Specific examples of the amino group substituted with one or two organic groups include methylamino group, ethylamino group, diethylamino group, n-propylamino group, di-n-propylamino group, isopropylamino group, n-butylamino group, di-n-butylamino group, n-pentylamino group, n-hexylamino group, n-heptylamino group, n-octylamino group, n-nonylamino group, n-decylamino group, phenylamino group, naphthylamino group, acetylamino group, propanoylamino group, n-butanoylamino group, n-pentanoylamino group, n-hexanoylamino group, n-heptanoylamino group, n-octanoylamino group, n-decanoylamino group, benzoylamino group, α-naphthoylamino group, 3-naphthoylamino group, and the like.

When the phenyl group, the naphthyl group, and the heterocyclyl group included in $R^{c5}$ further have a substituent, examples of the substituent include a substituent including a group represented by $HX_2C$— or $H_2XC$— (for example, a halogenated alkoxy group including a group represented by $HX_2C$— or $H_2XC$—, and a halogenated alkyl group including a group represented by $HX_2C$— or $H_2XC$—), an alkyl group having 1 or more and 6 or less carbon atoms, an alkoxy group having 1 or more and 6 or less carbon atoms, a saturated aliphatic acyl group having 2 or more and 7 or less carbon atoms, an alkoxycarbonyl group having 2 or more and 7 or less carbon atoms, a saturated aliphatic acyloxy group having 2 or more and 7 or less carbon atoms, a monoalkyl group having an alkyl group having 1 or more and 6 or less carbon atoms, a dialkyl amino group having alkyl groups having 1 or more and 6 or less carbon atoms, a morpholine-1-yl group, a piperazine-1-yl group, a benzoyl group, a halogen atom, a nitro group, a cyano group, and the like. When the phenyl group, the naphthyl group, and the heterocyclyl group included in $R^{c5}$ further having one or more substituents, the number of substituents is not particularly limited as long as it does not interfere with the object of the present invention, and is preferably 1 or more and 4 or less. When a phenyl group, a naphthyl group, and a heterocyclyl group included in $R^{c5}$ have a plurality of substituents, the plurality of substituents may be the same or different.

When a benzoyl group, a naphthyl group included in $R^{c5}$ further have a substituent, examples of the substituent include an alkyl group having 1 or more and 6 or less carbon atoms, a morpholine-1-yl group, a piperazine-1-yl group, a 2-thenoyl group (thiophen-2-ylcarbonyl group), a furan-3-ylcarbonyl group, a phenyl group, and the like.

As a halogen atom represented by X, a fluorine atom, a chlorine atom, a bromine atom, and the like are exemplified, and the fluorine atom is preferred.

As a substituent including a group represented by $HX_2C$— or $H_2XC$—, a halogenated alkoxy group including a group represented by $HX_2C$— or $H_2XC$—, a group having a halogenated alkoxy group including a group represented by $HX_2C$— or $H_2XC$—, a halogenated alkyl group including a group represented by $HX_2C$— or $H_2XC$—, a group having a halogenated alkyl group including a group represented by $HX_2C$— or $H_2XC$—, and the like are exemplified, and the halogenated alkoxy group including a group represented by $HX_2C$— or $H_2XC$— or the group having a halogenated alkoxy group including a group represented by $HX_2C$— or $H_2XC$— is preferred.

As a group having a halogenated alkyl group including a group represented by $HX_2C$— or $H_2XC$—, an aromatic group, such as phenyl group, and naphthyl group, substituted with the halogenated alkyl group including a group represented by $HX_2C$— or $H_2XC$—, a cycloalkyl group, such as cyclopentyl group, and cyclohexyl group, substituted with the halogenated alkyl group including a group represented by $HX_2C$— or $H_2XC$—, and the like are exemplified, and the aromatic group substituted with the halogenated alkyl group including a group represented by $HX_2C$— or $H_2XC$— is preferred.

As a group having a halogenated alkoxy group including a group represented by $HX_2C$— or $H_2XC$—, an aromatic group, such as phenyl group, and naphthyl group, substituted with the halogenated alkoxy group including a group represented by $HX_2C$— or $H_2XC$—, an alkyl group, such as methyl group, ethyl group, n-propyl group, and i-propyl group, substituted with the halogenated alkoxy group including a group represented by $HX_2C$— or $H_2XC$—, a cycloalkyl group, such as cyclopentyl group, and cyclohexyl group, substituted with the halogenated alkoxy group including a group represented by $HX_2C$— or $H_2XC$—, and the like are exemplified, and the aromatic group substituted with the halogenated alkoxy group including a group represented by $HX_2C$— or $H_2XC$—.

The substituent that the phenoxyalkyl group and phenylthioalkyl group may have is the same as the substituent that the phenyl group included in RCS may have.

Among the monovalent organic groups, an alkyl group, a cycloalkyl group, an optionally substituted phenyl group, a cycloalkylalkyl group, and a phenylthioalkyl group that may have a substituent in the aromatic ring are preferred. As the alkyl group, an alkyl group having 1 or more and 20 or less carbon atoms is preferred, an alkyl group having 1 or more and 8 or less carbon atoms is more preferred, an alkyl group having 1 or more and 4 or less carbon atoms is particularly preferred, and a methyl group is most preferred. Among the optionally substituted phenyl groups, a 2-methylphenyl group is preferred. The number of carbon atoms in the cycloalkyl group included in the cycloalkylalkyl group is preferably 5 or more and 10 or less, more preferably 5 or more and 8 or less, and particularly preferably 5 or 6. The number of carbon atoms in the alkyl group included in the cycloalkylalkyl group is preferably 1 or more and 8 or less, more preferably 1 or more and 4 or less, and particularly preferably 2. Among the cycloalkylalkyl groups, cyclopentylethyl group is preferred. The number of carbon atoms in the alkylene group included in the phenylthioalkyl group that may have a substituent on the aromatic ring is preferably 1 or more and 8 or less, more preferably 1 or more and 4 or less, and particularly preferably 2. Among the phenylthioalkyl groups that may have a substituent on the aromatic ring, 2-(4-chlorophenylthio)ethyl group is preferred.

In the group represented by the formula (c3), when there is a plurality of $R^{c5}$s and the plurality of $R^{c5}$s bonds to each other to form a ring, examples of the ring formed include a hydrocarbon ring, a heterocyclic ring, and the like. As a heteroatom included in the heterocycle, for example, N, O, and S is exemplified. An aromatic ring is particularly preferred as the ring formed by combining a plurality of $R^{c5}$s each other. Such an aromatic ring may be an aromatic hydrocarbon ring or an aromatic heterocyclic ring. Such an aromatic ring is preferably an aromatic hydrocarbon ring. Specific examples of the group in which a benzene ring is formed by combining a plurality of $R^{c5}$s in the formula (3) each other are shown below.

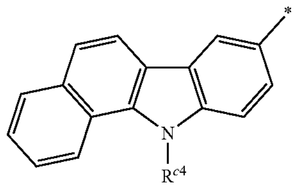

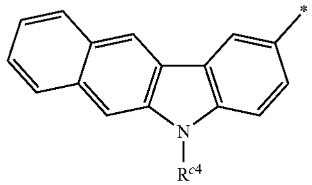

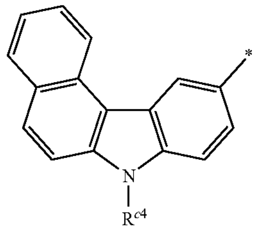

In a group represented by the formula (c4), $R^{c8}$ is a nitro group or a monovalent organic group. $R^{c8}$ bonds to a 6-membered aromatic ring other than an aromatic ring that bonds to a group represented by —$(CO)_{n1}$— on a condensed ring in the formula (c4). In the formula (c4), the bond position of $R^{c8}$ is not particularly limited. When a group represented by the formula (c4) has 1 or more $R^{c8}$s, one of 1 or more $R^{c8}$s preferably bonds to 7-position in a fluorene skeleton from the viewpoint that a compound having the group represented by the formula (c4) can be easily synthesized. In other words, when a group represented by the formula (c4) has 1 or more $R^{c8}$s, the group represented by the formula (c4) is preferably a group represented by the formula (c6). When there is a plurality of $R^{c8}$s, plurality of substituents may be the same or different.

(c6)

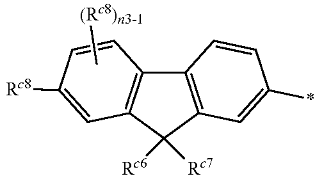

In the formula (c6), $R^{c6}$, $R^{c7}$, $R^{c8}$, and n3 are same as $R^{c6}$, $R^{c7}$, $R^{c8}$, and n3 in the formula (c4).

When RCS is the monovalent organic group, $R^{c8}$ is not particularly limited as long as it does not interfere with the object of the present invention. As the organic group, a carbon atom-containing group is preferred, and a group consisting of 1 or more carbon atoms, and 1 or more atoms selected from the group consisting of H, O, S, Se, N, B, P, Si and a halogen atom is more preferred. The number of carbon atoms in the carbon atom-containing group is not particularly limited, and preferably 1 or more and 50 or less, and more preferably 1 or more and 20 or less. Suitable examples of the monovalent organic group as $R^{c8}$ include the same groups as the examples of the monovalent organic group as $R^{c5}$ in the formula (c3).

In the formula (c4), $R^{c6}$ and $R^{c7}$ each represent an optionally substituted chain alkyl group, an optionally substituted chain alkoxy group, an optionally substituted cyclic organic group, or a hydrogen atom. $R^{c6}$ and $R^{c7}$ may be combined to one another to form a ring. Among these groups, $R^{c6}$ and $R^{c7}$ are preferably the optionally substituted chain alkyl groups. When $R^{c6}$ and $R^{c7}$ are the optionally substituted chain alkyl groups, the chain alkyl group may be either a straight-chain alkyl group or a branched-chain alkyl group.

When $R^{c6}$ and $R^{c7}$ are chain alkyl groups having no substituent, the number of carbon atoms in the chain alkyl group is preferably 1 or more and 20 or less, more preferably 1 or more and 10 or less, and particularly preferably 1 or more and 6 or less. When $R^{c6}$ and $R^{c7}$ are chain alkyl groups, specific examples thereof include methyl group, ethyl group, an n-propyl group, isopropyl group, n-butyl group, isobutyl group, sec-butyl group, tert-butyl group, n-pentyl group, isopentyl group, sec-pentyl group, tert-pentyl group, n-hexyl group, n-heptyl group, n-octyl group, isooctyl group, sec-octyl group, tert-octyl group, n-nonyl group, isononyl group, n-decyl group, isodecyl group, and the like. When $R^{c6}$ and $R^{c7}$ are alkyl group, the alkyl group may have an ether bond (—O—) in a carbon chain. Examples of the alkyl group having an ether bond in a carbon chain include methoxyethyl group, ethoxyethyl group, methoxyethoxyethyl group, ethoxyethoxyethyl group, propyloxyethoxyethyl group, and methoxypropyl group.

When $R^{c6}$ and $R^{c7}$ are chain alkyl group having a substituent, the number of carbon atoms in the chain alkyl group is preferably 1 or more and 20 or less, more preferably 1 or more and 10 or less, and particularly preferably 1 or more and 6 or less. In this case, the number of carbon atoms in the substituent is not included in the number of carbon atoms in the chain alkyl group. The chain alkyl group having a substituent is preferably a straight-chain group.

The substituent, with which the alkyl group is optionally substituted, is not particularly limited as long as it does not interfere with the object of the present invention. Suitable examples of the substituent include an alkoxy group, a cyano group, a halogen atom, a halogenated alkyl group, a cyclic organic group, and an alkoxycarbonyl group. Examples of the halogen atom include fluorine atom, chlorine atom, bromine atom, and iodine atom. Among these, fluorine atom, chlorine atom, and bromine atom are preferred. Examples of the cyclic organic group include a cycloalkyl group, an aromatic hydrocarbon group, and a heterocyclyl group. Specific examples of the cycloalkyl group are the same as suitable examples in case RCS is a cycloalkyl group. Specific examples of the aromatic hydrocarbon group include phenyl group, naphthyl group, biphenylyl group, anthryl group, phenanthryl group, and the like. Specific examples of the heterocyclyl group are the same as suitable examples in case $R^{c8}$ is a heterocyclyl group. When RCS is an alkoxycarbonyl group, an alkoxy group included in the alkoxycarbonyl group may be straight or branched, and preferably straight. The number of carbon atoms in an alkoxy group included in the alkoxycarbonyl group is preferably 1 or more and 10 or less, and more preferably 1 or more and 6 or less.

When the chain alkyl group has a substituent, the number of substituents is not particularly limited. The number of substituents preferably varies depending on the number of carbon atoms in the chain alkyl group. The number of substituents is typically 1 or more and 20 or less, preferably 1 or more and 10 or less, and more preferably 1 or more and 6 or less.

When $R^{c6}$ and $R^{c7}$ are unsubstituted chain alkoxy group, the number of carbon atoms in the chain alkoxy group is preferably 1 or more and 20 or less, more preferably 1 or more and 10 or less, and particularly preferably 1 or more and 6 or less. When $R^{c6}$ and $R^{c7}$ are chain alkoxy group, specific examples thereof include methoxy group, ethoxy group, n-propyloxy group, isopropyloxy group, n-butyloxy group, isobutyloxy group, sec-butyloxy group, tert-butyloxy group, n-pentyloxy group, isopentyloxy group, sec-pentyloxy group, tert-pentyloxy group, n-hexyloxy group, n-heptyloxy group, n-octyloxy group, isooctyloxy group, sec-octyloxy group, tert-octyloxy group, n-nonyloxy group, isononyloxy group, n-decyloxy group, isodecyloxy group, and the like. In addition, when $R^{c6}$ and $R^{c7}$ are alkoxy group, the alkoxy group may include an ether bond (—O—) in the carbon chain. Examples of the alkoxy group having an ether bond in the carbon chain include methoxyethoxy group, ethoxyethoxy group, methoxyethoxyethoxy group, ethoxyethoxyethoxy group, propyloxyethoxyethoxy group, methoxypropyloxy group, and the like.

When $R^{c6}$ and $R^{c7}$ are chain alkoxy groups having a substituent, the substituent that the alkoxy group may have is the same as the substituent that the chain alkyl group as $R^{c6}$ and $R^{c7}$ may have.

When $R^{c6}$ and $R^{c7}$ are cyclic organic group, the cyclic organic group may be an alicyclic group or an aromatic group. Examples of the cyclic organic group include an aliphatic cyclic hydrocarbon group, an aromatic hydrocarbon group, and a heterocyclyl group. When $R^{c6}$ and $R^{c7}$ are cyclic organic group, the substituent, with which the cyclic organic group is optionally substituted, is the same as in the case where $R^{c6}$ and $R^{c7}$ are chain alkyl groups.

When $R^{c6}$ and $R^{c7}$ are aromatic hydrocarbon groups, the aromatic hydrocarbon group is preferably a phenyl group, or a group formed by bonding a plurality of benzene rings through a carbon-carbon bond, or a group formed by condensing a plurality of benzene rings. When the aromatic hydrocarbon group is a phenyl group, or a group formed by bonding or condensing a plurality of benzene rings, the number of benzene rings included in the aromatic hydrocarbon group is not particularly limited, and is preferably 3 or less, more preferably 2 or less, and particularly preferably 1. Preferred specific examples of the aromatic hydrocarbon group include phenyl group, naphthyl group, biphenylyl group, anthryl group, and phenanthryl group.

When $R^{c6}$ and $R^{c7}$ are aliphatic cyclic hydrocarbon groups, the aliphatic cyclic hydrocarbon group may be a monocyclic or polycyclic group. The number of carbon atoms in the aliphatic cyclic hydrocarbon group is not particularly limited, and is preferably 3 or more and 20 or less, and more preferably 3 or more and 10 or less. Examples of the monocyclic cyclic hydrocarbon group include cyclopropyl group, cyclobutyl group, cyclopentyl group, cyclohexyl group, cycloheptyl group, cyclooctyl group, norbornyl group, isobornyl group, tricyclononyl group, tricyclodecyl group, tetracyclododecyl group, and adamantyl group.

When $R^{c6}$ and $R^{c7}$ are heterocyclyl groups, the same groups as the heterocyclyl groups as $R^{c5}$ in the formula (c3) are exemplified.

$R^{c6}$ and $R^{c7}$ may be combined to one another to form a ring. The group composed of the ring formed by $R^{c6}$ and $R^{c7}$ is preferably a cycloalkylidene group. When $R^{c6}$ and $R^{c7}$ are combined to form a cycloalkylidene group, the ring constituting the cycloalkylidene group is preferably a 5- to 6-membered ring, and more preferably a 5-membered ring.

When $R^{c7}$ and a benzene ring in fluorene skeleton are combined to form a ring, the ring may be an aromatic ring or an aliphatic ring.

When the group formed by combining $R^{c6}$ and $R^{c7}$ is a cycloalkylidene group, the cycloalkylidene group may be condensed with one or more other rings. Examples of the ring which may be condensed with the cycloalkylidene group include benzene ring, naphthalene ring, cyclobutane ring, cyclopentane ring, cyclohexane ring, cycloheptane ring, cyclooctane ring, furan ring, thiophene ring, pyrrole ring, pyridine ring, pyrazine ring, pyrimidine ring, and the like.

Examples of a suitable group among $R^{c6}$ and $R^{c7}$ described above include a group represented by the formula: $-A^1-A^2$. In the formula, A1 is a linear alkylene group. $A^2$ is an alkoxy group, a cyano group, a halogen atom, a halogenated alkyl group, a cyclic organic group, or an alkoxycarbonyl group.

The number of carbon atoms in the linear alkylene group for A1 is preferably 1 or more and 10 or less, and more preferably 1 or more and 6 or less. When $A^2$ is an alkoxy group, the alkoxy group may be a linear or branched alkoxy group, and preferably a linear alkoxy group. The number of carbon atoms in the alkoxy group is preferably 1 or more and 10 or less, and more preferably 1 or more and 6 or less. When $A^2$ is a halogen atom, fluorine atom, chlorine atom, bromine atom, or iodine atom is preferable, and fluorine atom, chlorine atom, or bromine atom is more preferable. When $A^2$ is a halogenated alkyl group, a halogen atom included in the halogenated alkyl group is preferably fluorine atom, chlorine atom, bromine atom, or iodine atom, and more preferably is fluorine atom, chlorine atom, or bromine atom. The halogenated alkyl group may be a linear or branched halogenated alkyl group, preferably a linear halogenated alkyl group. When $A^2$ is a cyclic organic group, examples of the cyclic organic group are the same as the cyclic organic group possessed by $R^{c6}$ and $R^{c7}$ as a substituent. When $A^2$ is an alkoxycarbonyl group, examples of the alkoxycarbonyl group are the same as the alkoxycarbonyl group possessed by $R^{c6}$ and $R^{c7}$ as a substituent.

Suitable specific examples of $R^{c6}$ and $R^{c7}$ include alkyl groups such as ethyl group, n-propyl group, n-butyl group, n-hexyl group, n-heptyl group, and n-octyl group; alkoxyalkyl groups such as 2-methoxyethyl group, 3-methoxy-n-propyl group, 4-methoxy-n-butyl group, 5-methoxy-n-pentyl group, 6-methoxy-n-hexyl group, 7-methoxy-n-heptyl group, 8-methoxy-n-octyl group, 2-ethoxyethyl group, 3-ethoxy-n-propyl group, 4-ethoxy-n-butyl group, 5-ethoxy-n-pentyl group, 6-ethoxy-n-hexyl group, 7-ethoxy-n-heptyl group, and 8-ethoxy-n-octyl group; cyanoalkyl groups such as 2-cyanoethyl group, 3-cyano-n-propyl group, 4-cyano-n-butyl group, 5-cyano-n-pentyl group, 6-cyano-n-hexyl group, 7-cyano-n-heptyl group, and 8-cyano-n-octyl group; phenylalkyl groups such as 2-phenylethyl group, 3-phenyl-n-propyl group, 4-phenyl-n-butyl group, 5-phenyl-n-pentyl group, 6-phenyl-n-hexyl group, 7-phenyl-n-heptyl group, and 8-phenyl-n-octyl group; cycloalkylalkyl groups such as 2-cyclohexylethyl group, 3-cyclohexyl-n-propyl group, 4-cyclohexyl-n-butyl group, 5-cyclohexyl-n-pentyl group, 6-cyclohexyl-n-hexyl group, 7-cyclohexyl-n-heptyl group, 8-cyclohexyl-n-octyl group, 2-cyclopentylethyl group, 3-cyclopentyl-n-propyl group, 4-cyclopentyl-n-butyl group, 5-cyclopentyl-n-pentyl group, 6-cyclopentyl-n-hexyl group, 7-cyclopentyl-n-heptyl group, and 8-cyclopentyl-n-octyl group; alkoxycarbonylalkyl groups such as 2-methoxycarbonylethyl group, 3-methoxycarbonyl-n-propyl group, 4-methoxycarbonyl-n-butyl group, 5-methoxycarbonyl-n-pentyl group, 6-methoxycarbonyl-n-hexyl group, 7-methoxycarbonyl-n-heptyl group, 8-methoxycarbonyl-n-octyl group, 2-ethoxycarbonylethyl group, 3-ethoxycarbonyl-n-propyl group, 4-ethoxycarbonyl-n-butyl group, 5-ethoxycarbonyl-n-pentyl group, 6-ethoxycarbonyl-n-hexyl group, 7-ethoxycarbonyl-n-heptyl group, and 8-ethoxycarbonyl-n-octyl group; and halogenated alkyl groups such as 2-chloroethyl group, 3-chloro-n-propyl group, 4-chloro-n-butyl group, 5-chloro-n-pentyl group, 6-chloro-n-hexyl group, a 7-chloro-n-heptyl group, 8-chloro-n-octyl group, 2-bromoethyl group, 3-bromo-n-propyl group, 4-bromo-n-butyl group, 5-bromo-n-pentyl group, 6-bromo-n-hexyl group, 7-bromo-n-heptyl group, 8-bromo-n-octyl group, 3,3,3-trifluoropropyl group, and 3,3,4,4,5,5,5-heptafluoro-n-pentyl group.

Among groups mentioned above, Suitable groups as $R^{c6}$ and $R^{c7}$ are ethyl group, n-propyl group, n-butyl group, n-pentyl group, 2-methoxyethyl group, 2-cyanoethyl group, 2-phenylethyl group, 2-cyclohexylethyl group, 2-methoxycarbonylethyl group, 2-chloroethyl group, 2-bromoethyl group, 3,3,3-trifluoropropyl group, and 3,3,4,4,5,5,5-heptafluoro-n-pentyl group.

From the view point that a highly sensitive photo polymerization initiator is likely to be easily obtained, A is preferably S.

In the formula (c5), $R^{c9}$ is a monovalent organic group, a halogen atom, a nitro group, or a cyano group. When $R^{c9}$ in the formula (c5) is the monovalent organic group, the monovalent organic group can be selected from various organic groups as long as it does not interfere with the object of the present invention. As the organic group, a carbon atom-containing group is preferred, and a group consisting of 1 or more carbon atoms, and 1 or more atoms selected from the group consisting of H, O, S, Se, N, B, P, Si and a halogen atom is more preferred. The number of carbon atoms in the carbon atom-containing group is not particularly limited, and preferably 1 or more and 50 or less, and more preferably 1 or more and 20 or less. Suitable examples of the organic group as $R^{c9}$ in the formula (c5) are the same groups as the monovalent organic groups as $R^{c5}$ in the formula (c5).

Among $R^{c9}$, benzoyl group; naphthoyl group; benzoyl groups substituted with a group selected from the group consisting of an alkyl group having 1 or more and 6 or less carbon atoms, morpholine-1-yl group, piperazine-1-yl group, and a phenyl group; nitro group; optionally substituted benzofuranylcarbonyl group are preferred, and benzoyl group; naphthoyl group; 2-methylphenylcarbonyl group; 4-(piperazine-1-yl)phenylcarbonyl group; and 4-(phenyl)phenylcarbonyl group are more preferred.

In addition, in the formula (c5), n4 is preferably an integer of 0 or more and 3 or less, more preferably an integer of 0 or more and 2 or less, and particularly preferably 0 or 1. When n4 is 1, the position at which $R^{c9}$ bonds is preferably the para-position relative to the bonding through which the phenyl group (to which $R^{c9}$ bonds) bonds to an oxygen atom or a sulfur atom.

In the formula (c1) and the formula (c2), the monovalent organic group as $R^{c2}$ is not particularly limited as long as it does not interfere with the object of the present invention. As the organic group, a carbon atom-containing group is preferred, and a group consisting of 1 or more carbon atoms, and 1 or more atoms selected from the group consisting of H, O, S, Se, N, B, P, Si and a halogen atom is more preferred. The number of carbon atoms in the carbon atom-containing group is not particularly limited, and preferably 1 or more and 50 or less, and more preferably 1 or more and 20 or less. Suitable examples of the monovalent organic group as $R^{c2}$ are the same groups as the monovalent organic groups as $R^{c5}$ in the formula (c3). Specific examples of these groups are the same as the groups described for $R^{c5}$ in the formula (c3). In addition, a cycloalkyl group, a phenoxyalkyl group that may have a substituent on an aromatic ring, and a phenylthioalkyl group that may have a substituent on an aromatic ring are also preferred as $R^{c2}$. The substituent that the phenoxyalkyl group and phenylthioalkyl group may have is the same as the substituent that the phenyl group, the naphthyl group, and the heterocyclyl group included in $R^{c5}$ in the formula (c3) may have.

Among substituents, a substituent including the group represented by $HX_2C$— or $H_2XC$— described above, an alkyl group, a cycloalkyl group, an optionally substituted phenyl group, an optionally substituted cycloalkyl group, and a phenylthioalkyl group that may have a substituent on an aromatic ring are preferred. The alkyl group, the optionally substituted alkyl group, the number of carbon atoms in the cycloalkyl group included in the cycloalkylalkyl group, the cycloalkylalkyl group, the number of carbon atoms in the alkylene group included in the phenylthioalkyl group that may have a substituent on an aromatic ring, and the phenylthioalkyl group that may have a substituent on an aromatic ring are the same as these about RCs.

A group represented by $-A^3$-CO—O-$A^4$ is also preferred as $R^{c2}$. $A^3$ is a divalent organic group, preferably a divalent hydrocarbon group, and more preferably an alkylene group. $A^4$ is a monovalent organic group, and preferably a monovalent hydrocarbon group.

When $A^3$ is the alkylene group, the alkylene group may be straight or branched, and is preferably straight. When $A^3$ is the alkylene group, the number of carbon atoms in the alkylene group is preferably 1 or more and 10 or less, more preferably 1 or more and 6 or less, and particularly preferably 1 or more and 4 or less.

Suitable examples of $A^4$ include an alkyl group having 1 or more and 10 or less carbon atoms, an aralkyl group having 7 or more and 20 or less carbon atoms, and an aromatic hydrocarbon group having 6 or more and 20 or less carbon atoms. Suitable specific examples of $A^4$ include methyl group, ethyl group, n-propyl group, isopropyl group, n-butyl group, isobutyl group, sec-butyl group, tert-butyl group, n-pentyl group, n-hexyl group, phenyl group, naphthyl group, benzyl group, phenethyl group, α-naphthylmethyl group, β-naphthylmethyl group, and the like.

Specific examples of a suitable group represented by $-A^3$-CO—O-$A^4$ include 2-methoxycarbonylethyl group, 2-ethoxycarbonylethyl group, 2-n-propyloxycarbonylethyl group, 2-n-butyloxycarbonylethyl group, 2-n-pentyloxycarbonylethyl group, 2-n-hexyloxycarbonylethyl group, 2-benzyloxycarbonylethyl group, 2-phenoxycarbonylethyl group, 3-methoxycarbonyl-n-propyl group, 3-ethoxycarbonyl-n-propyl group, n-propyloxycarbonyl-n-propyl group, 3-n-butyloxycarbonyl-n-propyl group, 3-n-pentyloxycarbonyl-n-propyl group, 3-n-hexyloxycarbonyl-n-propyl group, 3-benzyloxycarbonyl-n-propyl group, 3-phenoxycarbonyl-n-propyl group, and the like.

A group represented by the following formula (c7) or the following formula (c8) is also preferred as $R^{c2}$.

(c7)

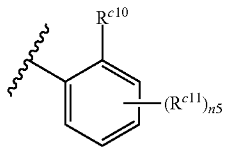

(c8)

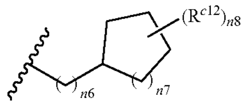

In the formula (c7) and (c8), $R^{c10}$ and $R^{c11}$ are each independently a monovalent organic group. n5 is an integer of 0 or more and 4 or less. When $R^{c10}$ and $R^{c11}$ are adjacent to each other on the benzene ring, $R^{c10}$ and $R^{c11}$ may be combined to each other to form a ring, $R^{c12}$ is a monovalent organic group, n6 is an integer of 1 or more and 8 or less, n7 is an integer of 1 or more and 5 or less, and n8 is an integer of 0 or more and (n7+3) or less.

The organic group as $R^{c10}$ and $R^{a11}$ in the formula (c7) is the same as RCS in the formula (c4). As $R^{c10}$, a halogenated alkoxy group including a group represented by $HX_2C$— or $H_2XC$—, a halogenated alkyl group including a group represented by $HX_2C$— or $H_2XC$—, an alkyl group, or a phenyl group is preferred. When $R^{c10}$ and $R^{c11}$ are combined to each other to form a ring, the ring may be an aromatic ring or an aliphatic ring. Suitable examples of the group represented by the formula (d7) in which $R^{c10}$ and $R^{c11}$ form a ring include a naphthalen-1-yl group, a 1,2,3,4-tetrahydronaphthalene-5-yl group, and the like. In the above formula (c7), n7 is an integer of 0 or more and 4 or less, preferably 0 or 1, and more preferably 0.

In the above formula (c8), $R^{c12}$ is an organic group. As the organic group, the same group as the organic group described above as $R^{c8}$ in the formula (c4) is exemplified. Among the organic groups, an alkyl group is preferred. The alkyl group may be straight or branched. The number of carbon atoms in the alkyl group is preferably 1 or more and 10 or less, more preferably 1 or more and 5 or less, and particularly preferably 1 or more and 3 or less. Methyl group, ethyl group, propyl group, isopropyl group, butyl group, and the like are preferably exemplified as $R^{c12}$. Among these, the methyl group is preferred.

In the above formula (c8), n7 is an integer of 1 or more and 5 or less, preferably an integer of 1 or more and 3 or less, and more preferably 1 or 2. In the above formula (c8), n8 is 0 or more and (n7+3) or less, preferably an integer of 0 or more and 3 or less, more preferably an integer of 0 or more and 2 or less, and particularly preferably 0. In the above formula (c8), n6 is an integer of 1 or more and 8 or less, preferably an integer of 1 or more and 5 or less, further preferably an integer of 1 or more and 3 or less, and particularly preferably 1 or 2.

In the formula (c2), $R^{c3}$ is a hydrogen atom, an optionally substituted aliphatic hydrocarbon group having 1 or more and 20 or less carbon atoms, or an optionally substituted aryl group. $R^{c3}$ is the aliphatic hydrocarbon group, preferable examples of the substituent which may be possessed by the aliphatic hydrocarbon group includes phenyl group, naphthyl group and the like.

In the formula (c1) and (c2), suitable examples of $R^{c3}$ include hydrogen atom, methyl group, ethyl group, n-propyl group, isopropyl group, n-butyl group, 2-cyclopentylethyl group, 2-cyclobutylethyl group, cyclohexylmethyl group, phenyl group, benzyl group, methylphenyl group, naphthyl group, and the like. Among these, methyl group or phenyl group is more preferred.

Preferable specific examples of the compound represented by the formula (c2) and having the group represented by the formula (c3) as $R^{c1}$ include the following compounds.

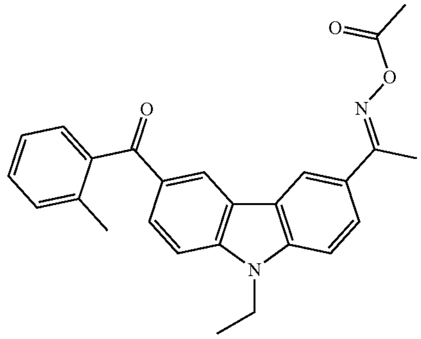

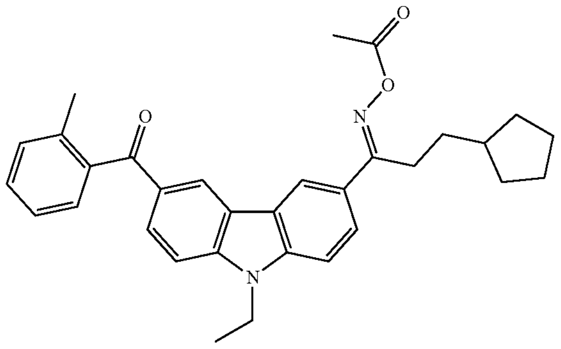

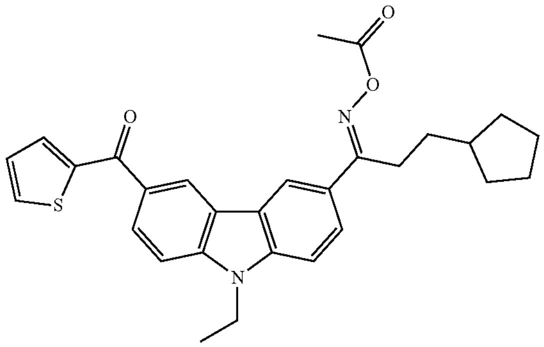

-continued

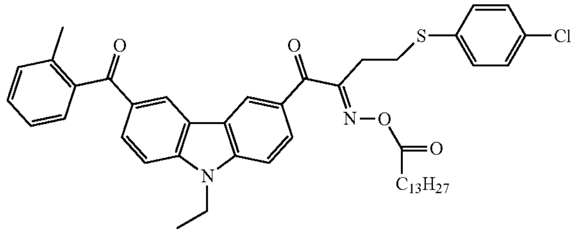

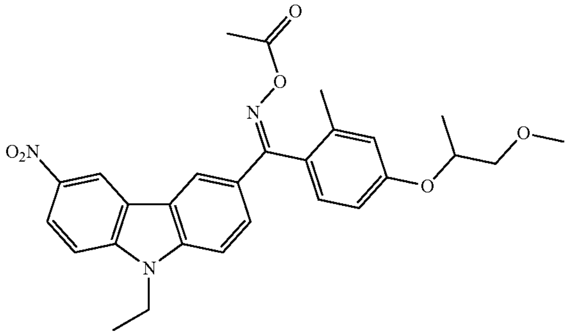

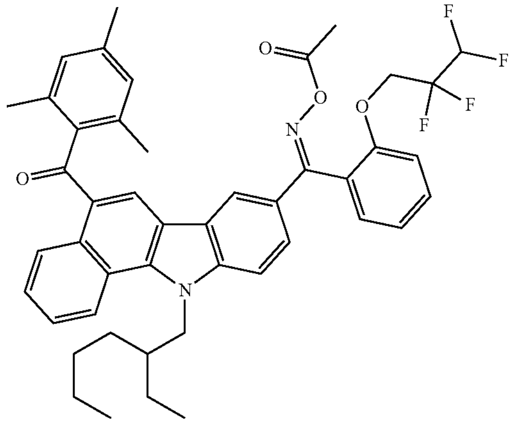

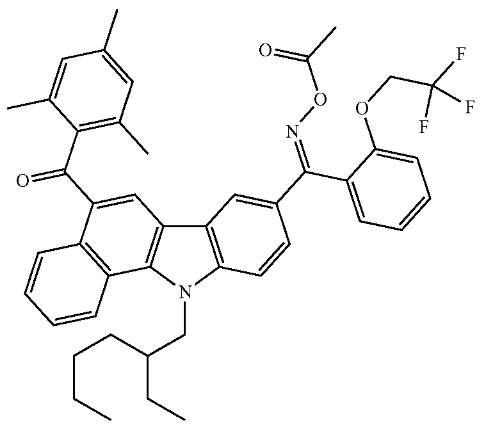

-continued
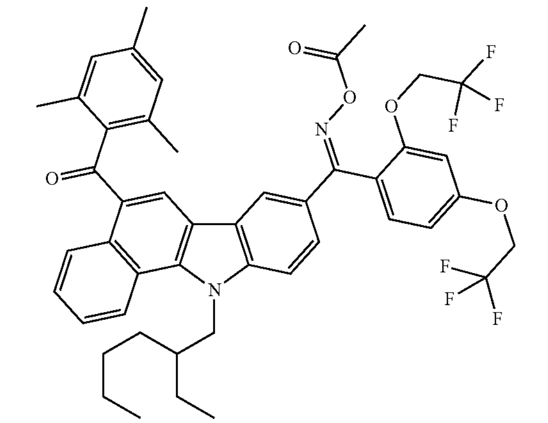
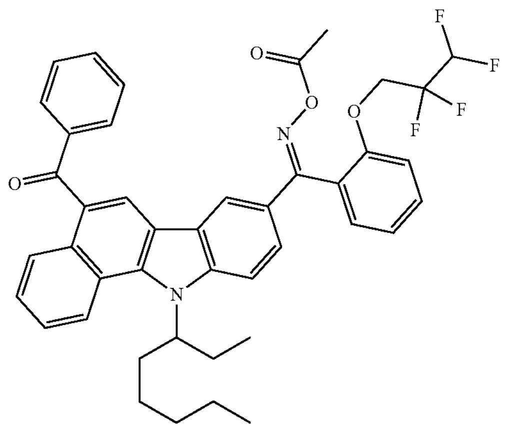
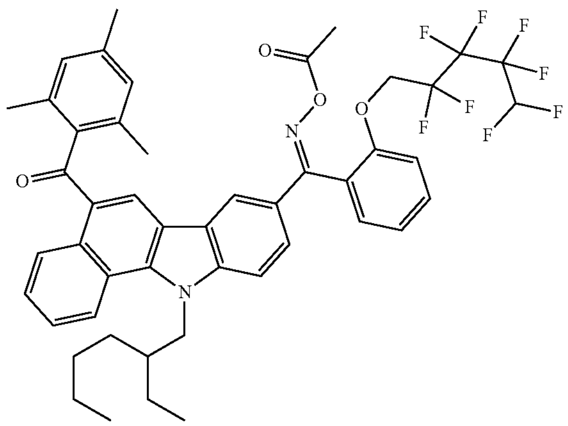
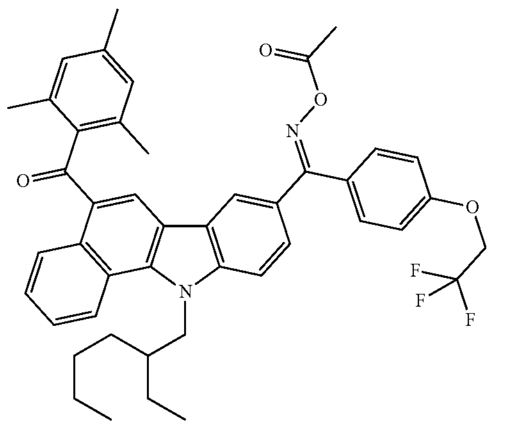
-continued
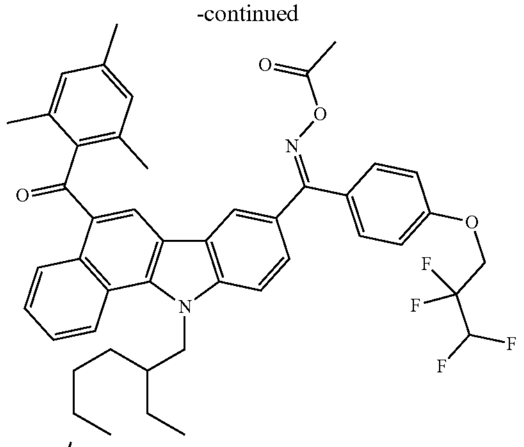
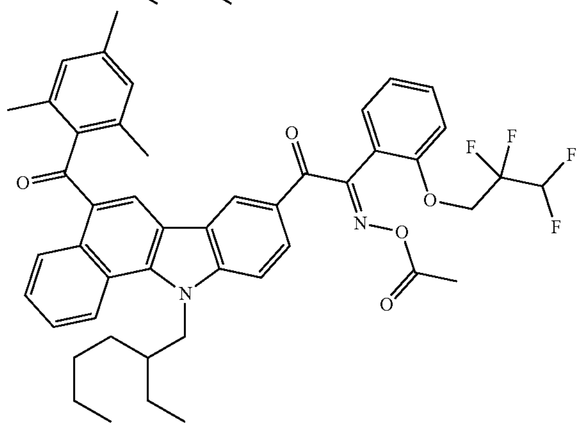
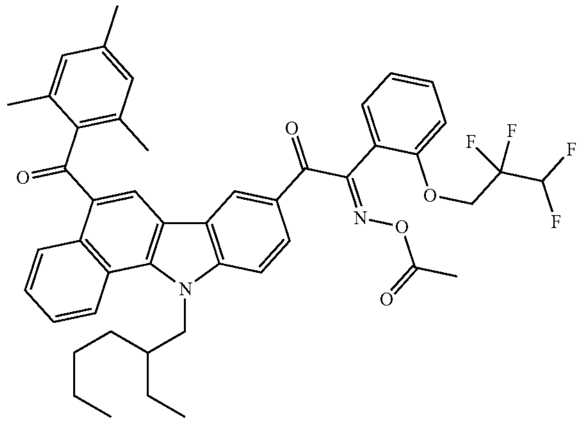
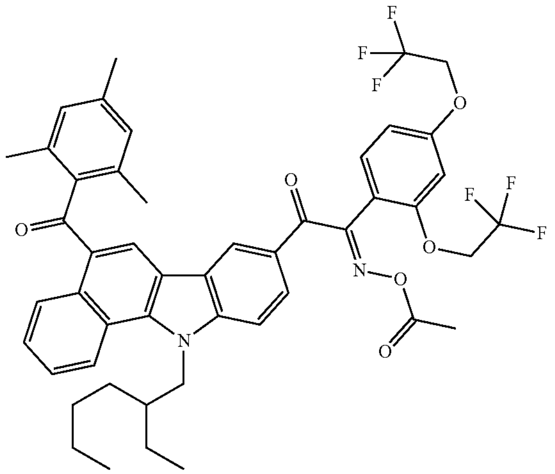

-continued
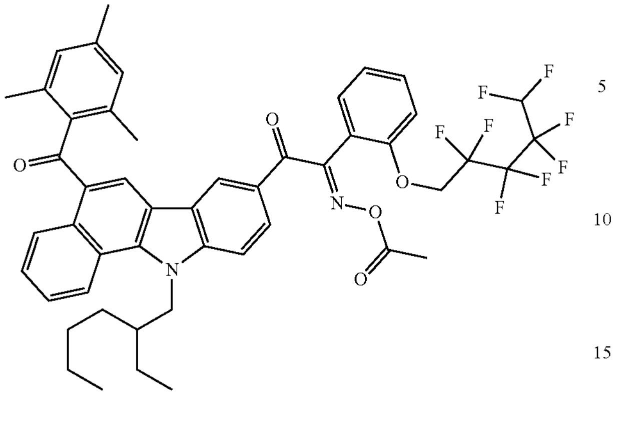
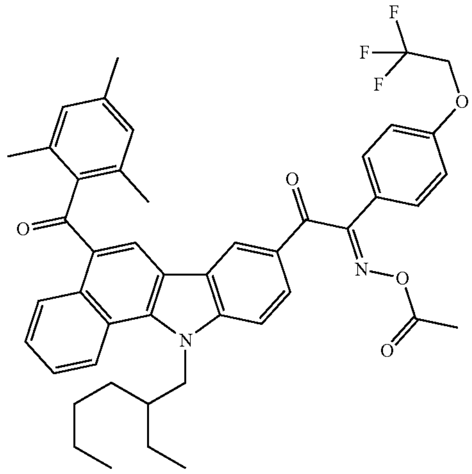
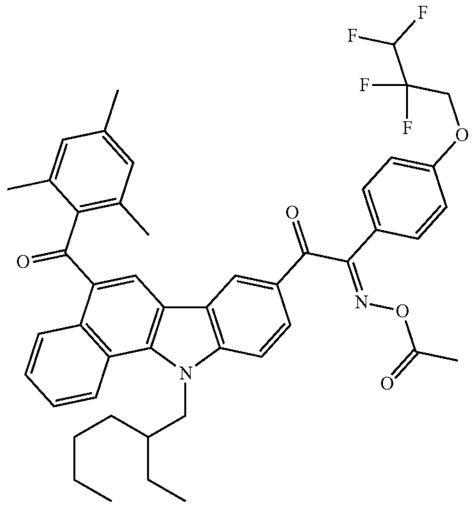
-continued
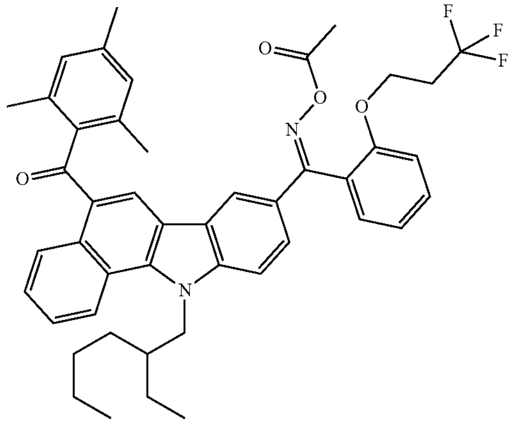
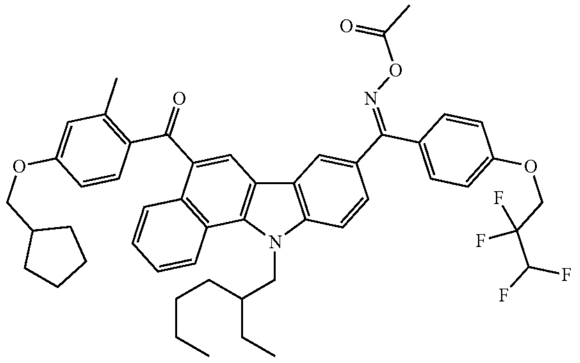
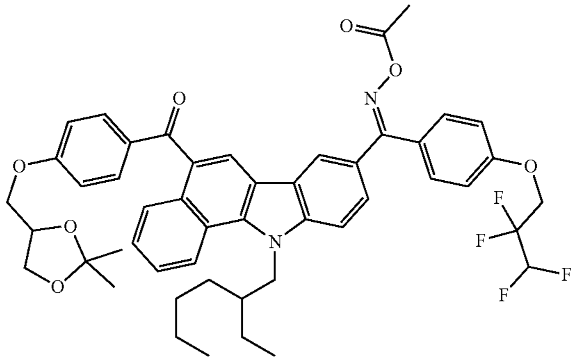
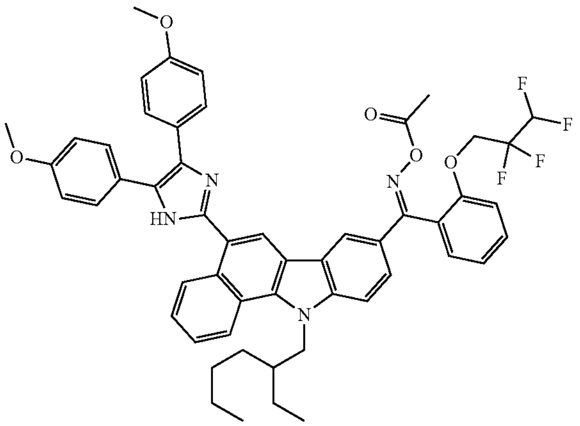

-continued
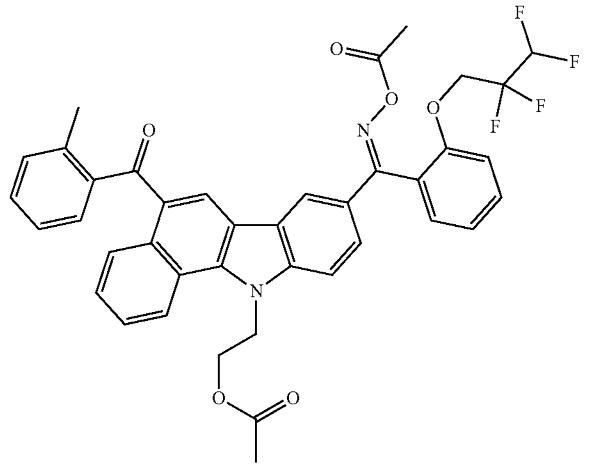
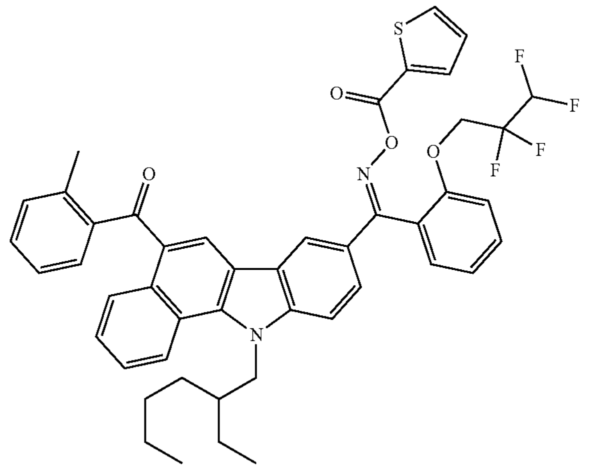
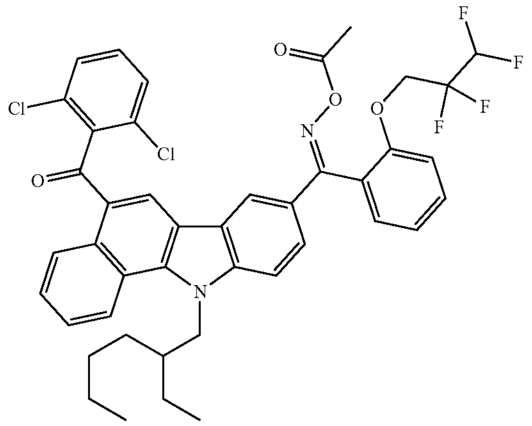
-continued
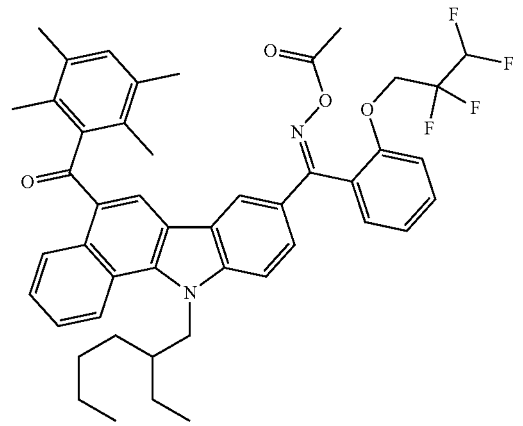
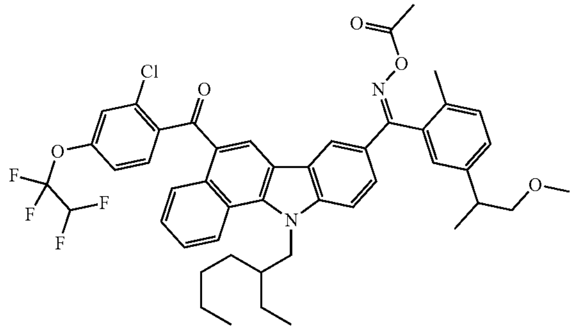
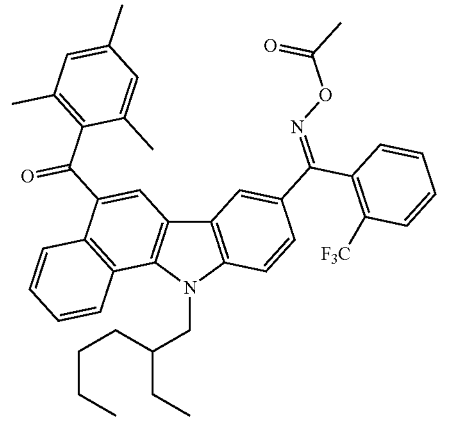
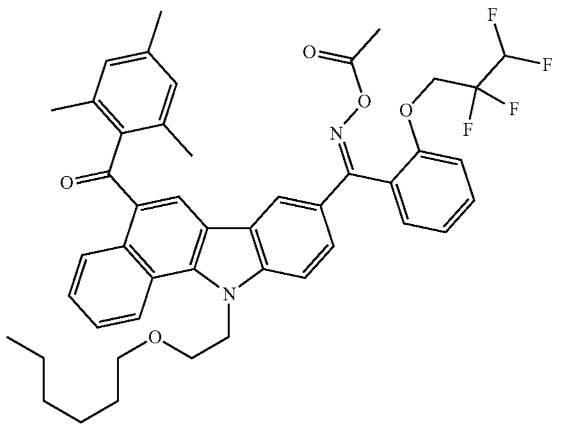

-continued
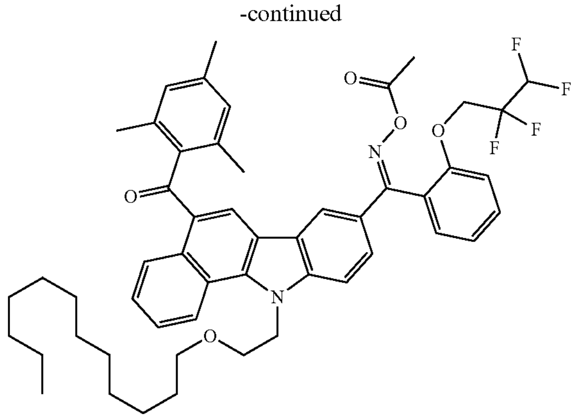
Preferable specific examples of the compound represented by the formula (c2) and having the group represented by the formula (c4) as $R^{c1}$ include the following compounds.
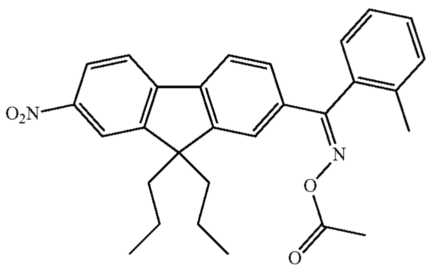
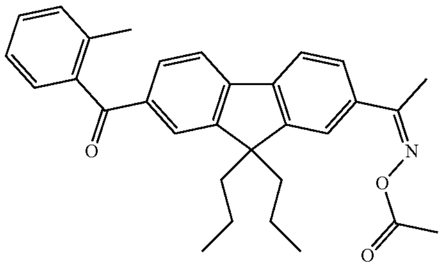
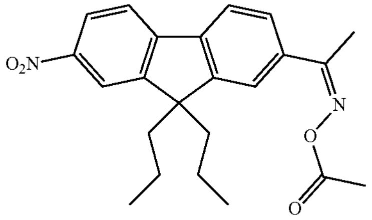
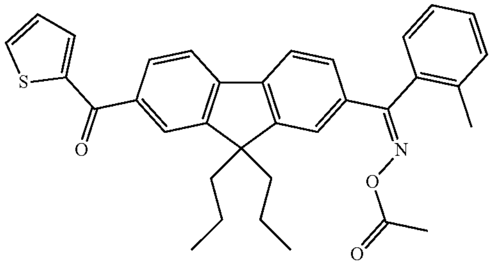
-continued
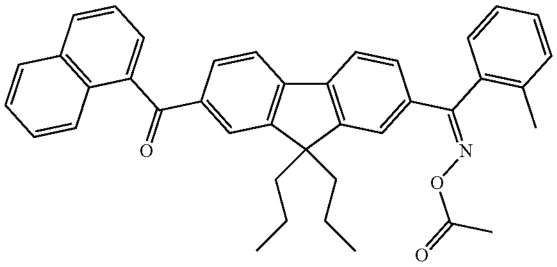
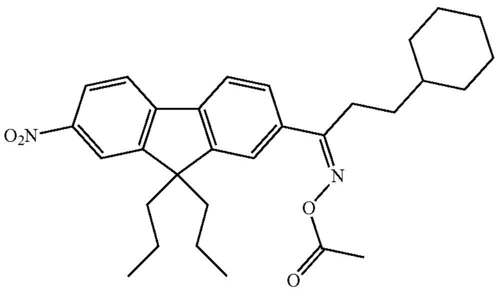
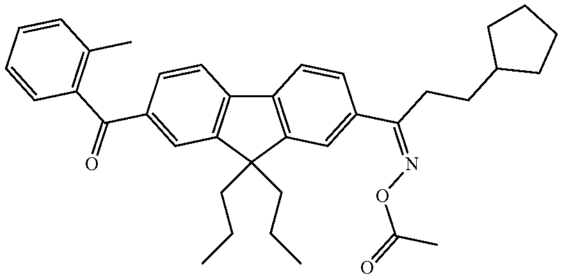
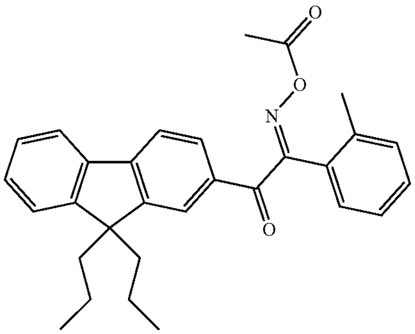
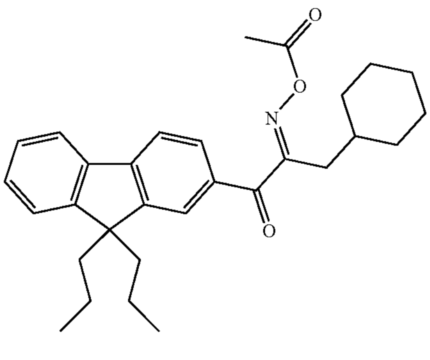

-continued
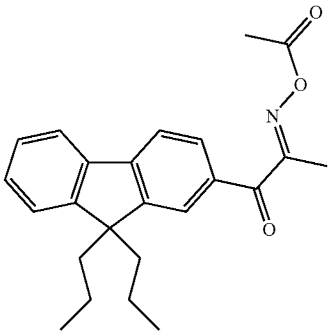
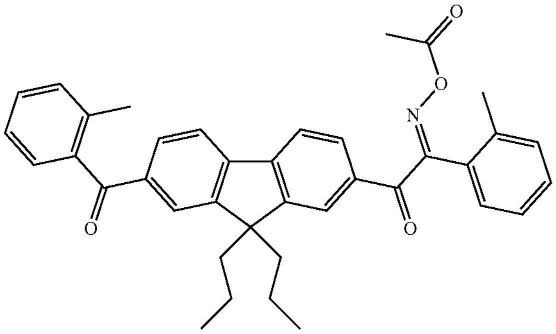
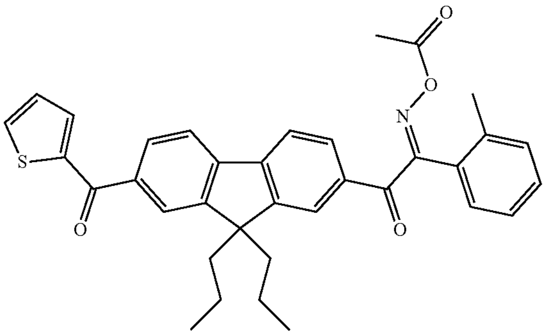
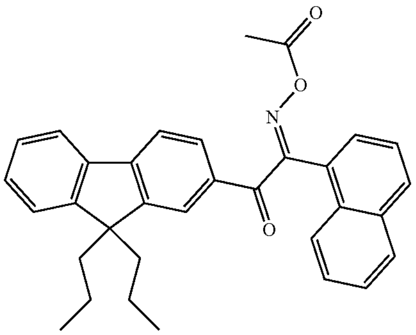
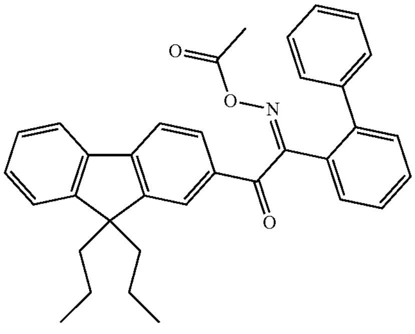
-continued
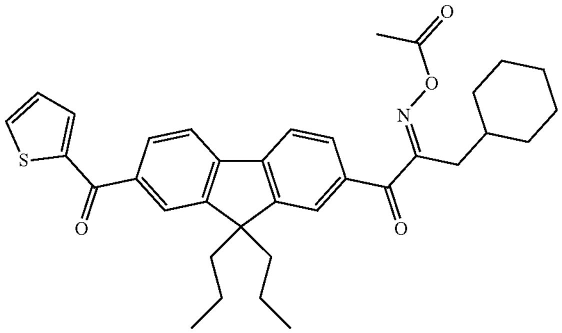
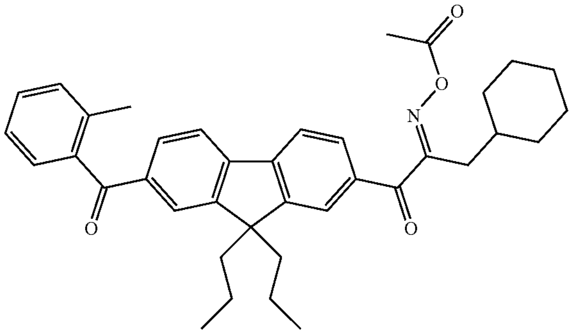
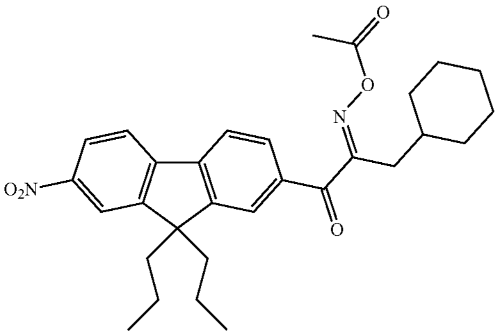
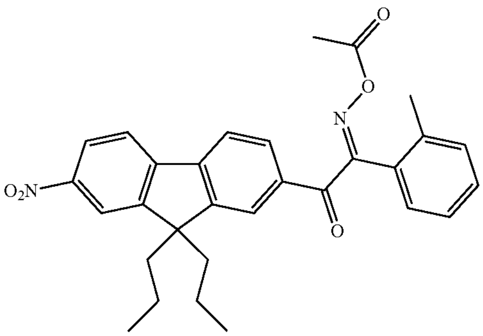
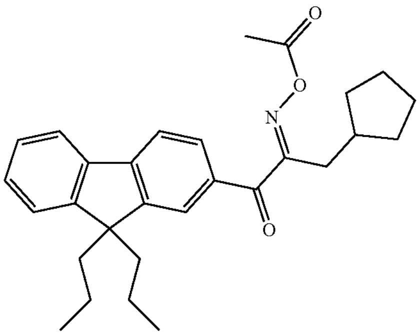

-continued
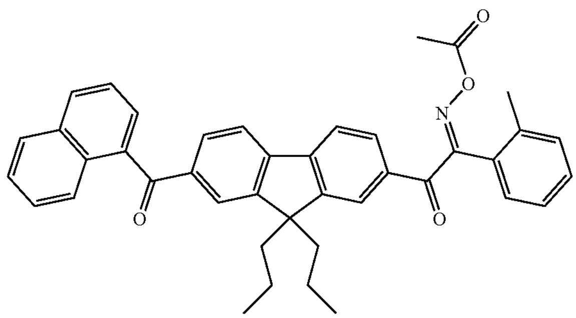
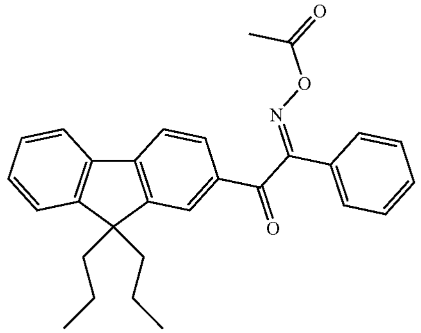
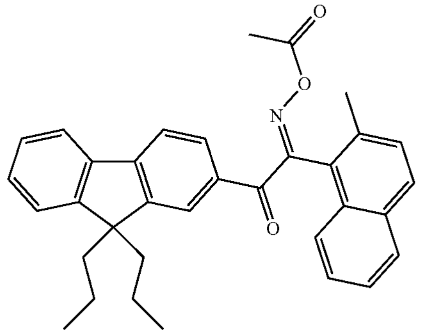
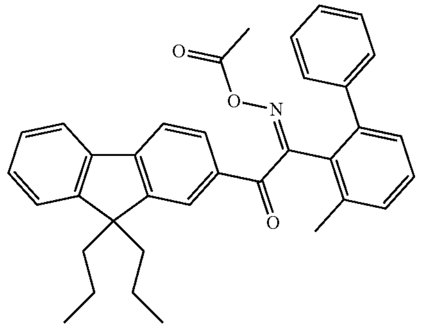
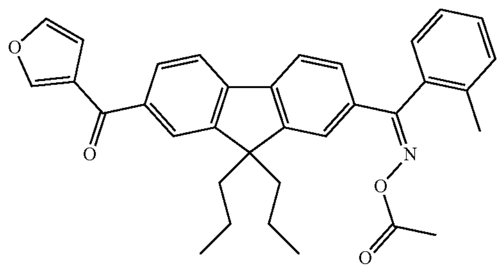
-continued
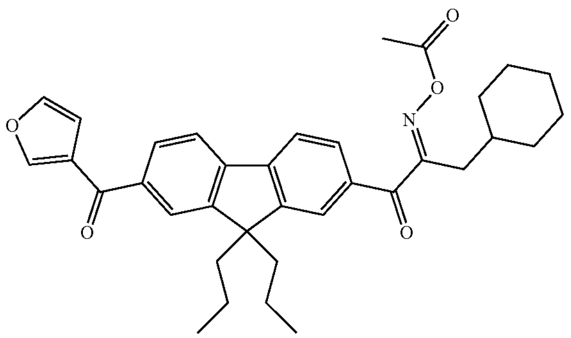
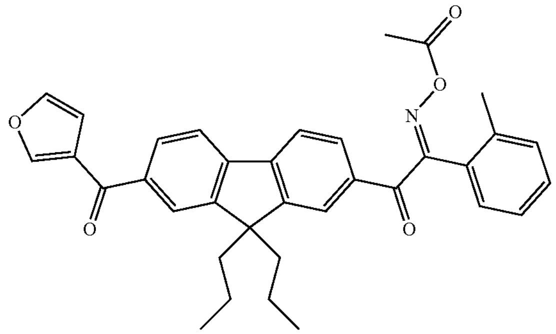
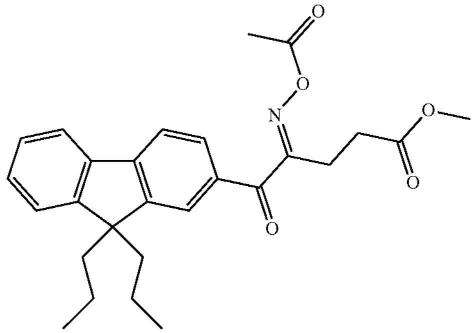
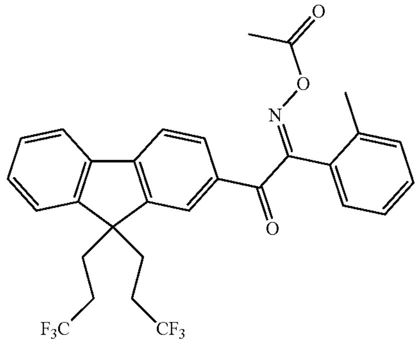
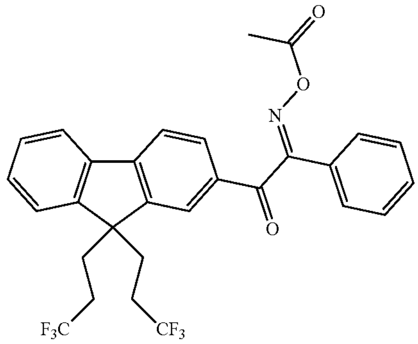

-continued
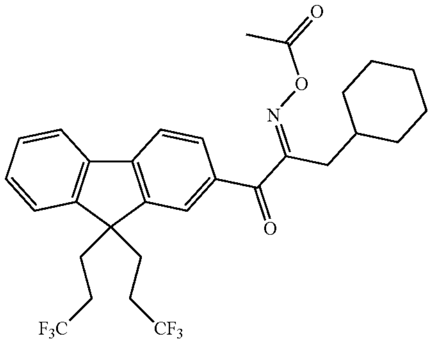
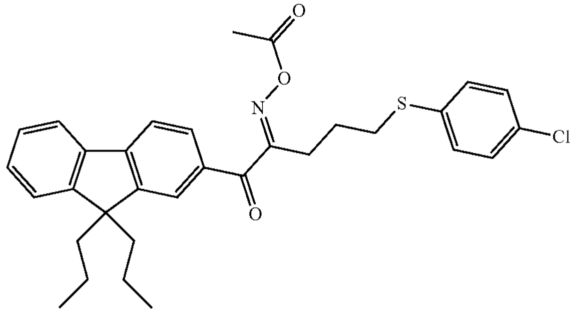
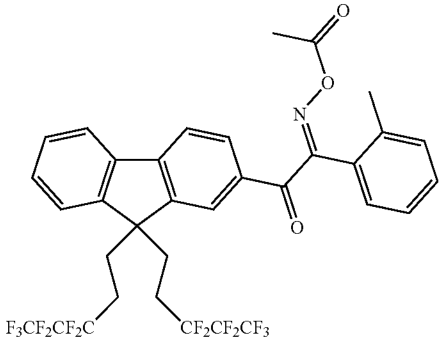
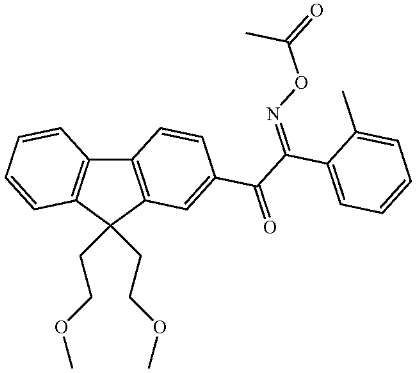
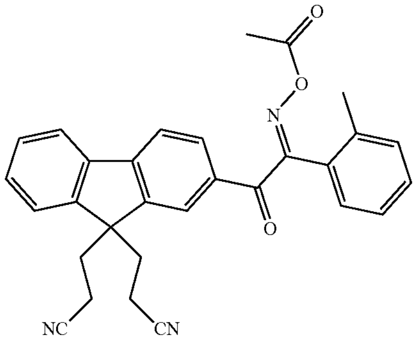
-continued
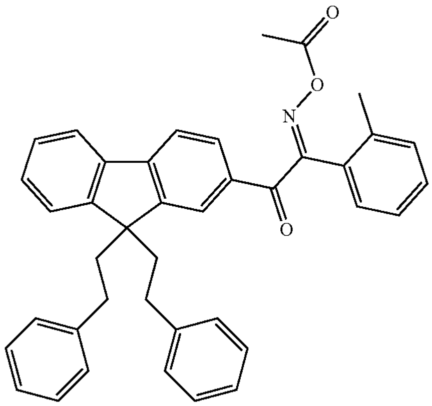
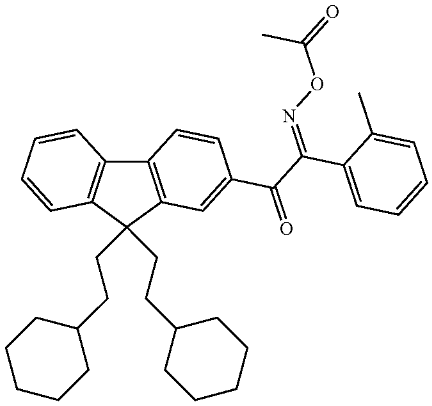
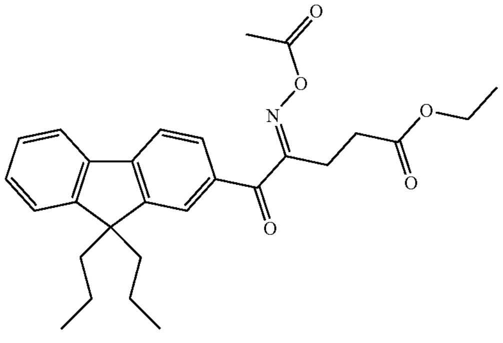
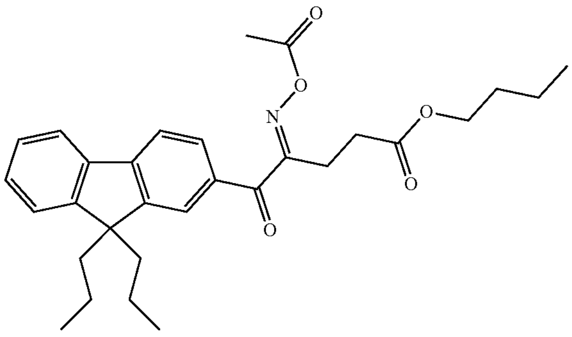

-continued
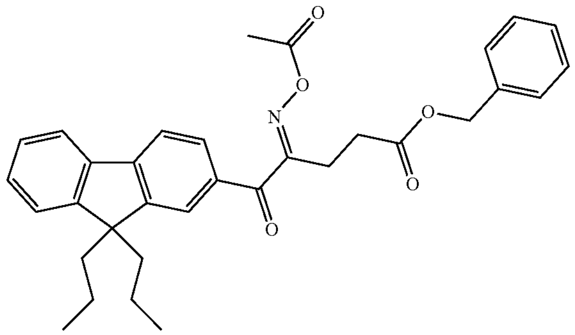
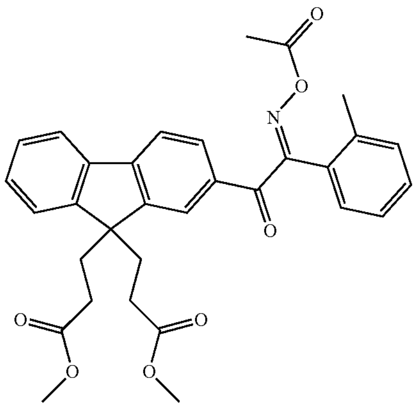
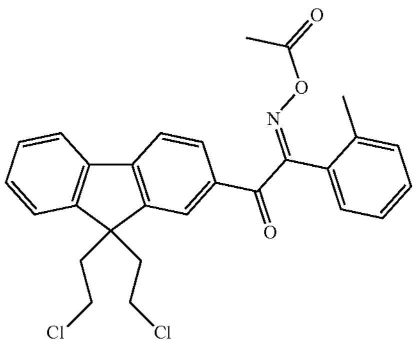
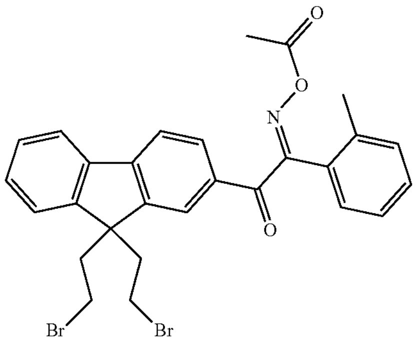
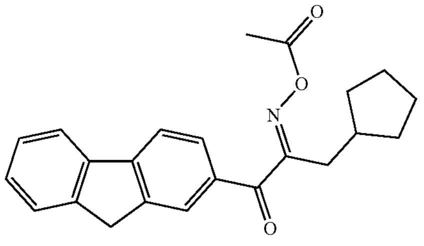
-continued
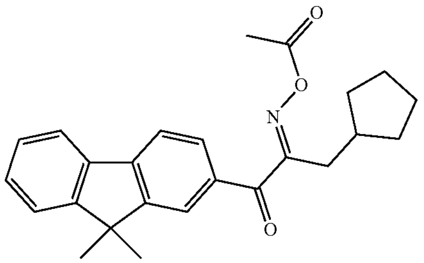
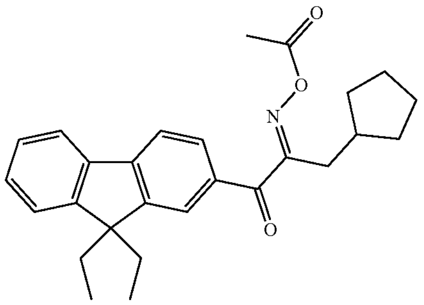
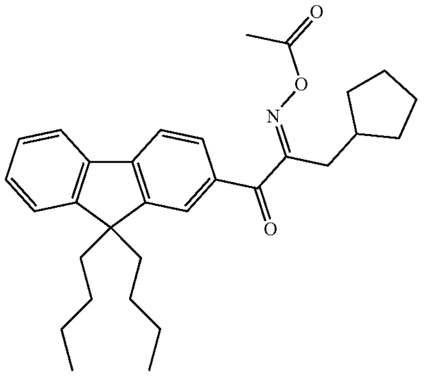
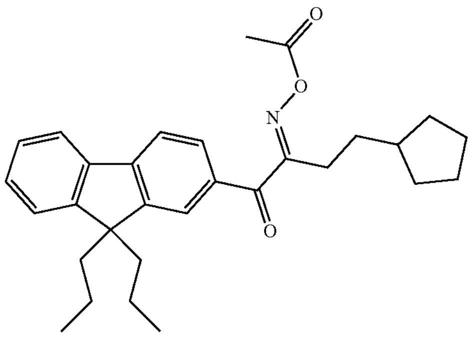
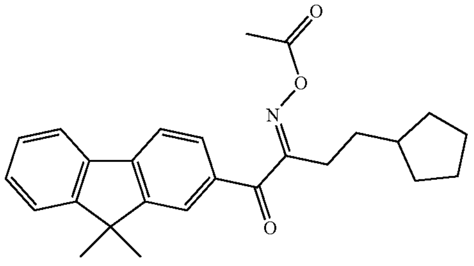

-continued
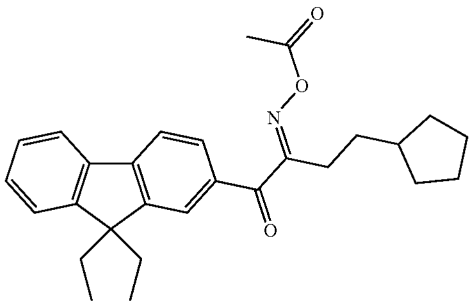
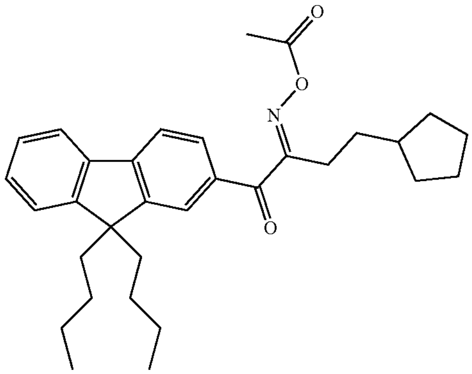
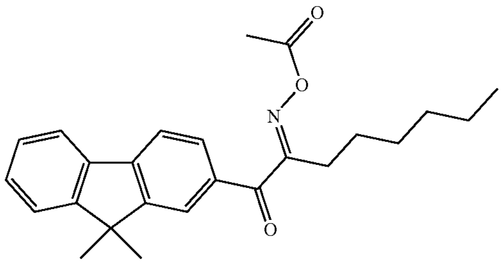
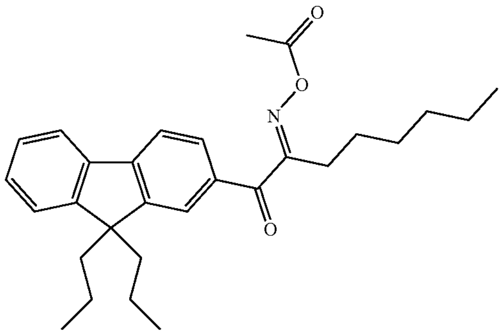
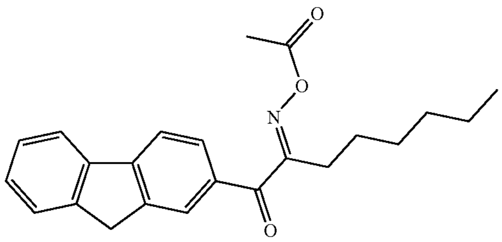
-continued
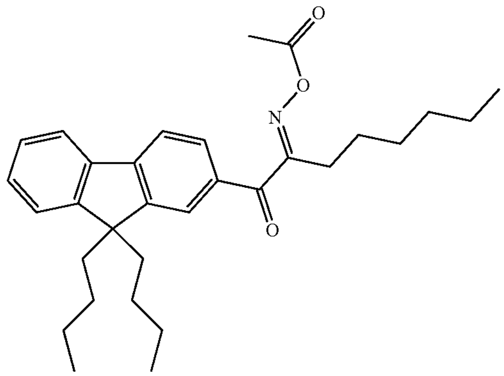
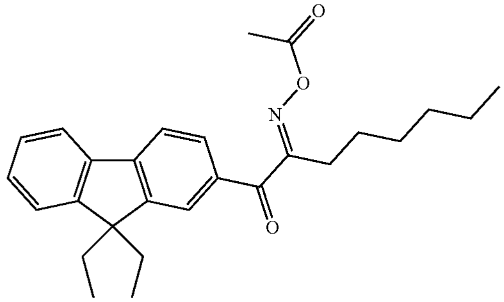
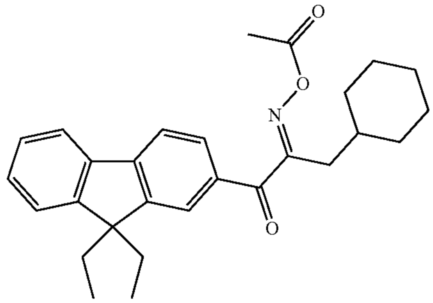
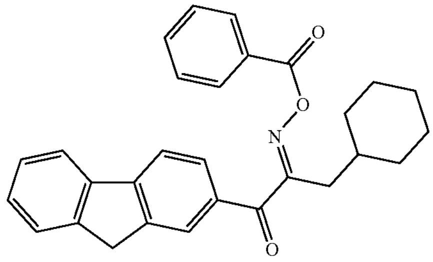
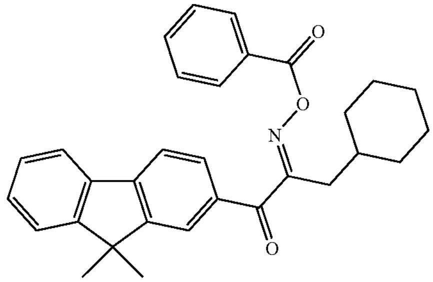

-continued
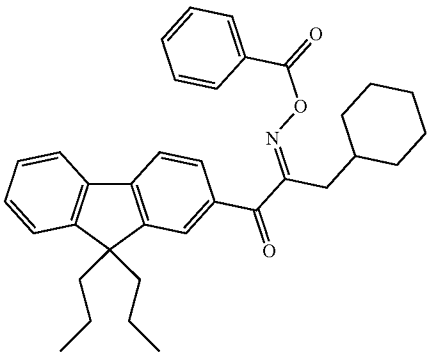
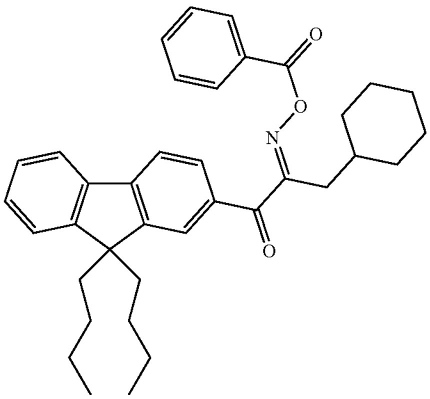
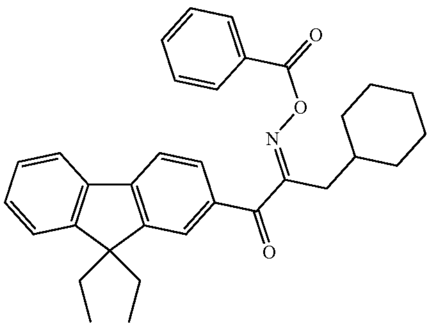
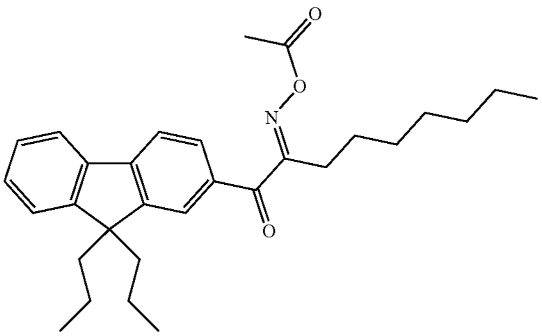
-continued
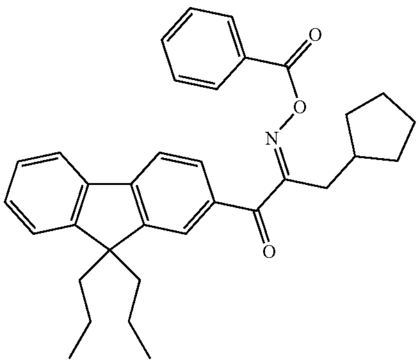
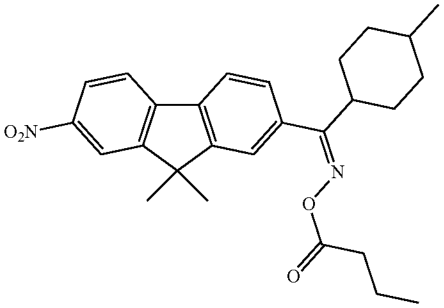
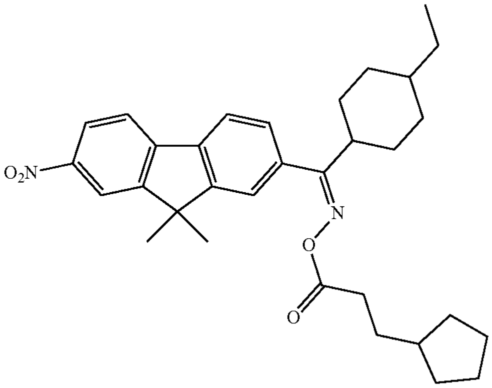
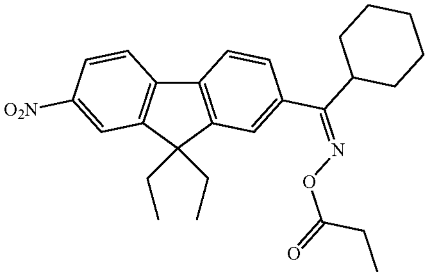
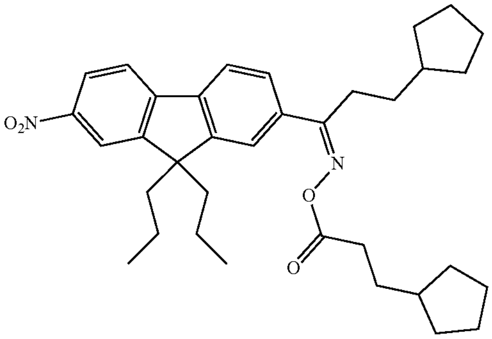

-continued
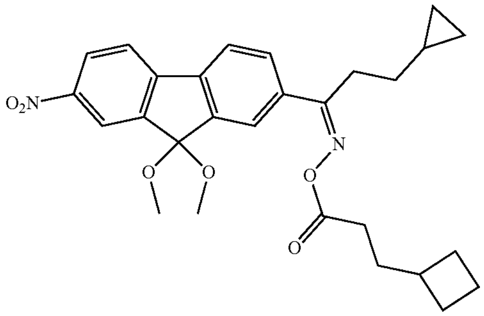
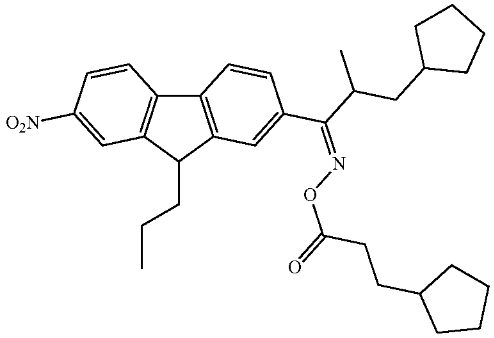
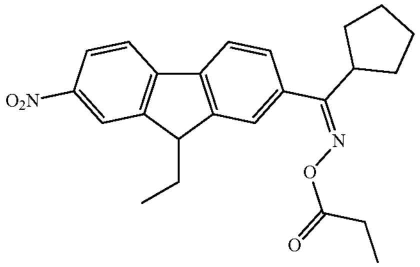
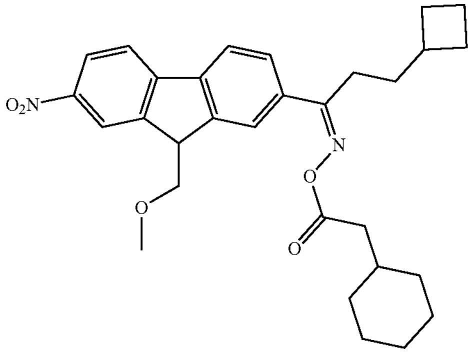
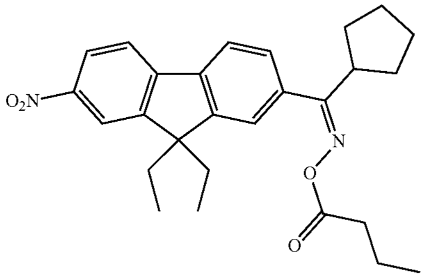
-continued
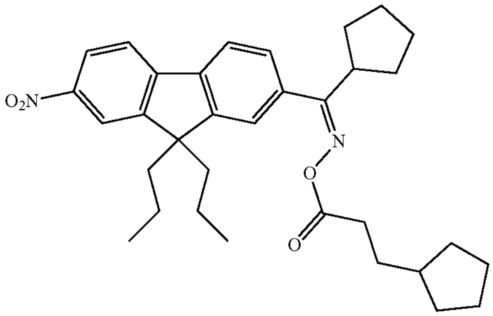
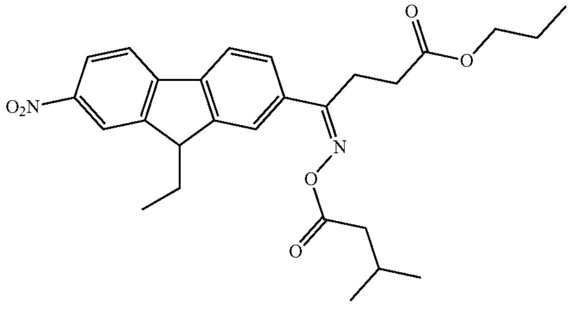
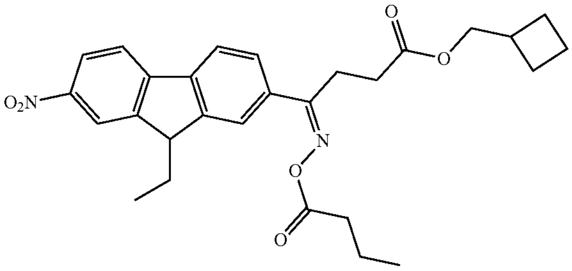
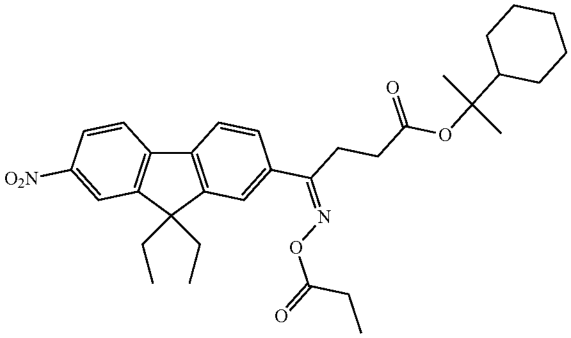
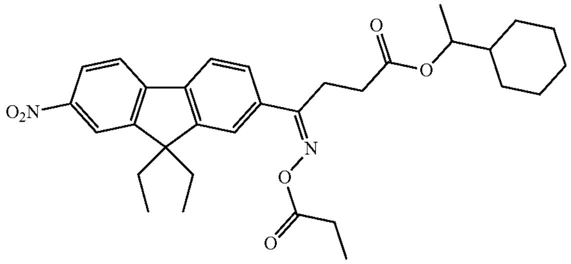

-continued
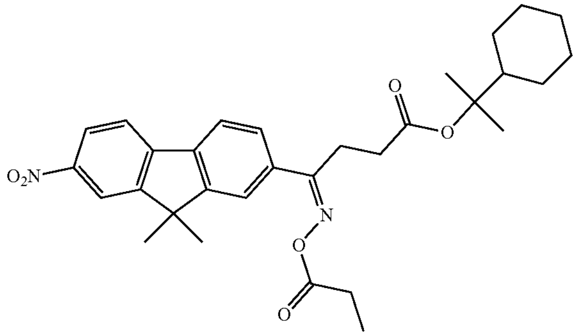
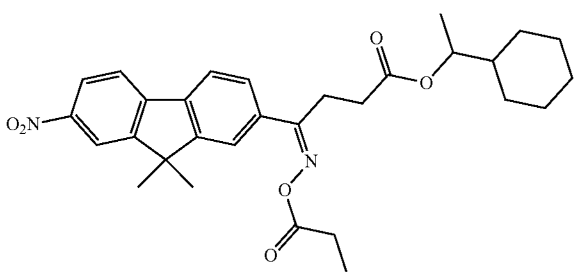
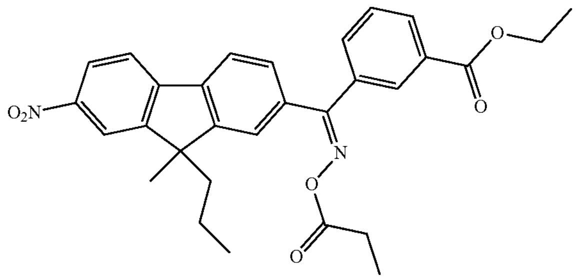
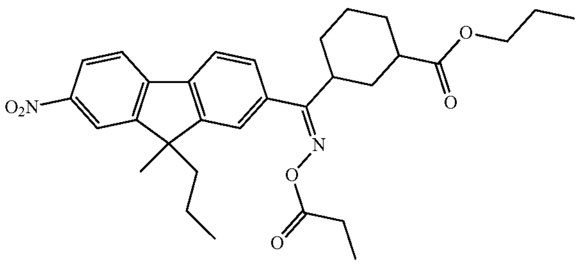
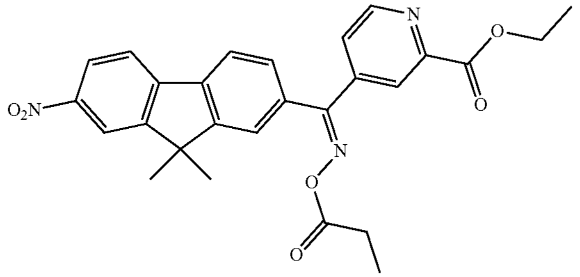
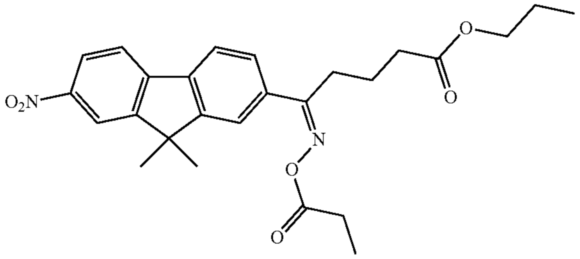
-continued
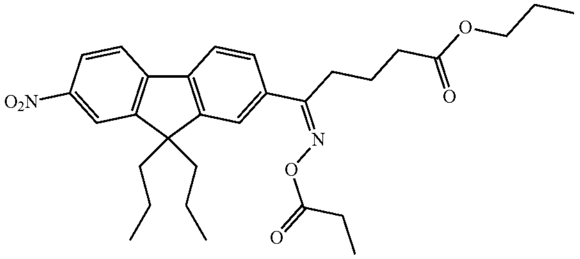
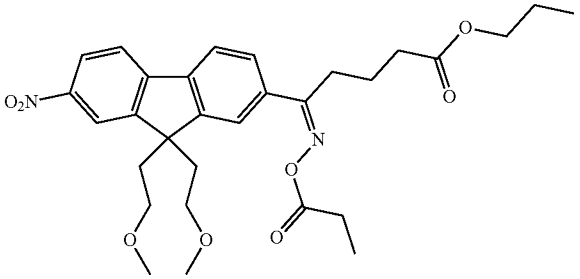
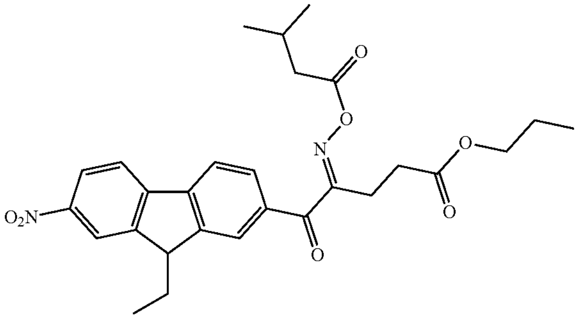
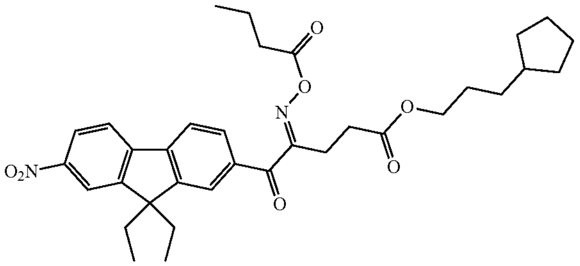
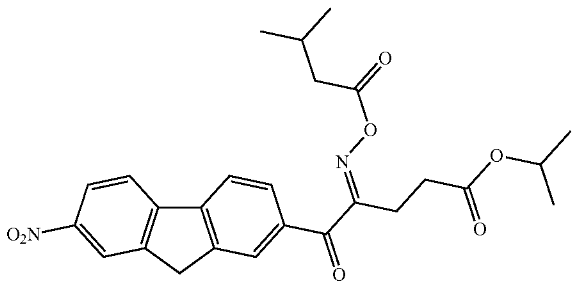

-continued
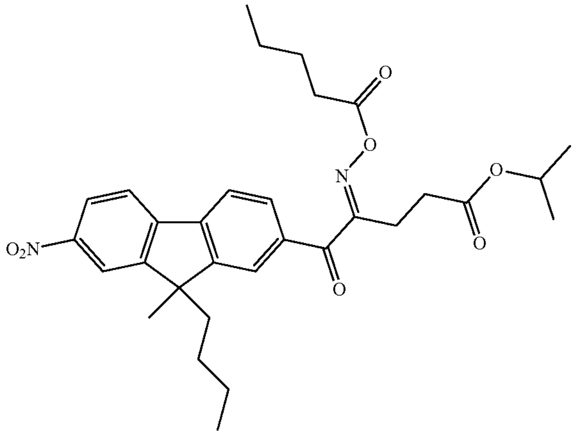
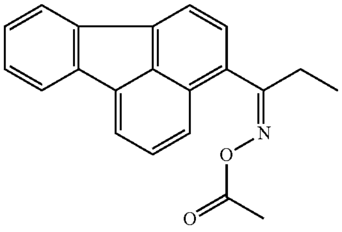
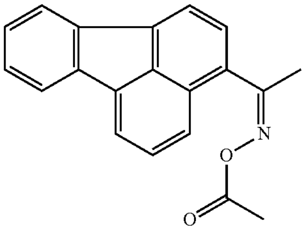
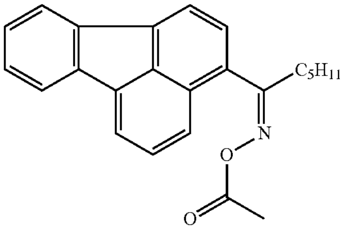
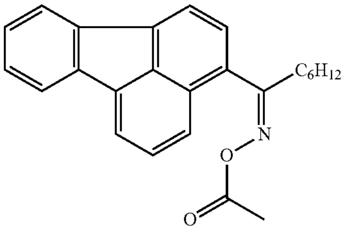
Preferable specific examples of the compound represented by the formula (c2) and having the group represented by the formula (c5) as $R^{c1}$ include following compounds.
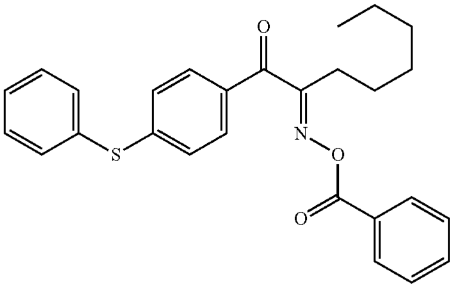
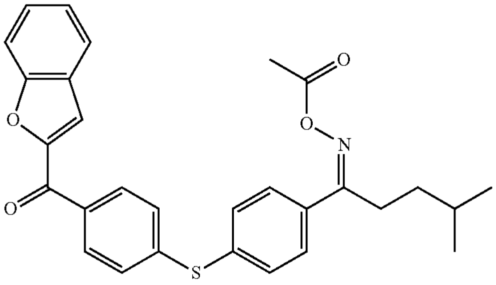
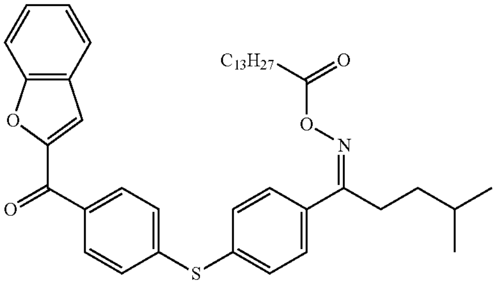
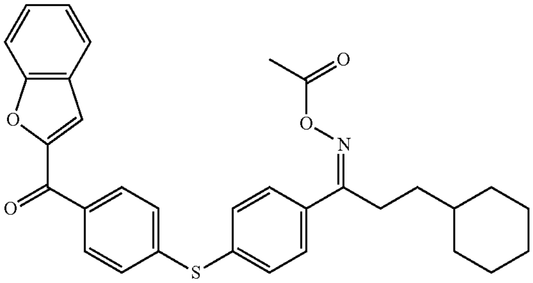
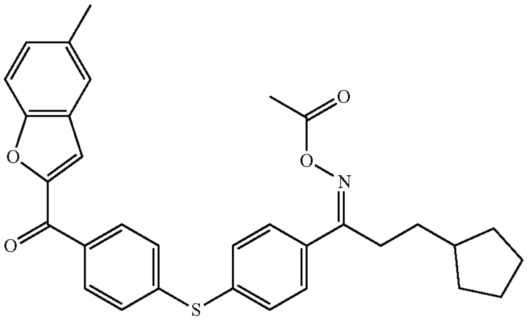

-continued

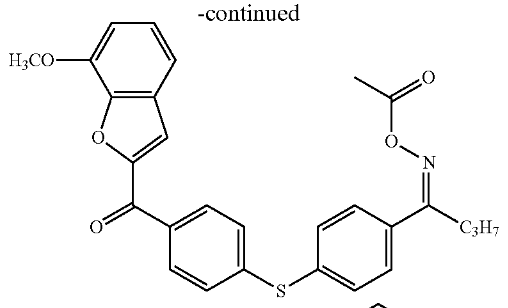

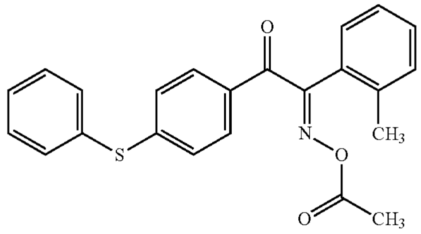

As the radical polymerization initiator (C1), in view of good deeply curing property of the composition, a phosphine oxide compound is also preferred. As the phosphine oxide compound, a phosphine oxide compound having a partial structure represented by the following formula (c9) is preferred.

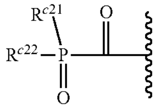

(c9)

In the formula (c9), $R^{c21}$ and $R^{c22}$ are each independently an alkyl group, a cycloalkyl group, an aryl group, an aliphatic acyl group having 2 or more and 20 or less carbon atoms, or an aromatic acyl group having 7 or more and 20 or less carbon atoms. Provided that, both of $R^{c21}$ and $R^{c22}$ are the aliphatic acyl group or the aromatic aryl group.

A number of carbon atoms in the alkyl group as $R^{c21}$ and $R^{c22}$ is preferably 1 or more and 12 or less, more preferably 1 or more and 8 or less, and further preferably 1 or more and 4 or less. The alkyl group as $R^{c21}$ and $R^{c22}$ may be linear or branched. Specific examples of the alkyl group include methyl group, ethyl group, n-propyl group, isopropyl group, n-butyl group, isobutyl group, sec-butyl group, tert-butyl group, n-pentyl group, isopentyl group, tert-pentyl group, n-hexyl group, n-heptyl group, n-octyl group, 2,4,4-trimethylpentyl group, 2-ethylhexyl group, n-nonyl group, n-decyl group, n-undecyl group, and n-dodecyl group.

A number of carbon atoms in the cycloalkyl group as $R^{c21}$ and $R^{c22}$ is preferably 5 or more and 12 or less. Specific examples of the cycloalkyl group include cyclopentyl group, cyclohexyl group, cycloheptyl group, cyclooctyl group, cyclononyl group, cyclodecyl group, cycloundecyl group, and cyclododecyl group.

A number of carbon atoms in the aryl group as $R^{c21}$ and $R^{c22}$ is preferably 6 or more and 12 or less. The aryl group may have a substituent. Examples of the substituent include a halogen atom, an alkyl group having 1 or more and 4 or less carbon atoms, an alkoxy group having 1 or more and 4 or less carbon atoms, and the like. Specific examples of the aryl group include phenyl group and naphthyl group.

A number of carbon atoms in the aliphatic acyl group as $R^{c21}$ and $R^{c22}$ is 2 or more and 20 or less, preferably 2 or more and 12 or less, more preferably 2 or more and 8 or less, and further preferably 2 or more and 6 or less. The aliphatic acyl group may be linear or branched. Specific examples of the aliphatic acyl group include acetyl group, propionyl group, butanoyl group, pentanoyl group, hexanoyl group, heptanoyl group, octanoyl group, nonanoyl group, decanoyl group, undecanoyl group, dodecanoyl group, tridecanoyl group, tetradecanoyl group, pentadecenoyl group, hexadecanoyl group, heptadecanonyl group, octadecanoyl group, nonadecanonyl group, and icosanoyl group.

A number of carbon atoms in the aromatic acyl group as $R^{c21}$ and $R^{c22}$ is 7 or more and 20 or less. The aromatic acyl group may have a substituent. Examples of the substituent include a halogen atom, an alkyl group having 1 or more and 4 or less carbon atoms, an alkoxy group having 1 or more and 4 or less carbon atoms, and the like. Specific examples of the aromatic acyl group include benzoyl group, o-tolyl group, m-tolyl group, p-tolyl group, 2,6-dimethylbenzoyl group, 2,6-dimethoxybenzoyl group, 2,4,6-trimethylbenzoyl group, α-naphthoyl group, and 3-naphthoyl group.

Suitable specific examples of the phosphine oxide compound having the partial structure represented by the formula (c9) include 2,4,6-trimethylbenzoyldiphenylphosphineoxide, bis(2,4,6-trimethylbenzoyl)-phenylphosphineoxide, bis(2,6-dimethoxybenzoyl)-2,4,4-trimethyl-pentylphosphineoxide, and the like. In view of deeply curing property of the composition, it is also preferred that the phosphine oxide compound having the partial structure represented by the formula (c9) is used with α-hydroxyalkylphenone type initiator such as 2-hydroxy-2-methylpropiophenone. When the phosphine oxide compound having the partial structure represented by the formula (c9) is used with α-hydroxyalkylphenone type initiator such as 2-hydroxy-2-methylpropiophenone, a ratio of a mass of the phosphine oxide compound having the partial structure represented by the formula (c9) is preferably 20% by mass or more and 80% by mass or less, more preferably 30% by mass or more and 70% by mass or less, and further preferably 40% by mass or more and 60% by mass or less relative to a sum of the mass of both.

As a cationic polymerization initiator (C2), a conventionally known cationic polymerization initiator may be used without particular limitation. Typical examples of the cationically polymerization initiator (C2) can include onium salts. Examples of the cationic polymerization initiator (C2) include an oxonium salt, an ammonium salt, a phosphonium salt, a sulfonium salt, and an iodonium salt. A sulfonium salt and an iodonium salt are preferred, and a sulfonium salt is more preferred.

The content of the initiator (C) in the composition is not particularly limited. The content of the initiator (C) is appropriately determined depending on the type of radically polymerizable group or cationically polymerizable group, or on the type of initiator (C). The content of the initiator (C) in the composition is preferably 0.01 parts by mass or more and 20 parts by mass or less, more preferably 0.1 parts by mass or more and 15 parts by mass or less, and even more preferably 1 part by mass or more and 10 parts by mass or less relative to 100 parts by mass of the mass of the composition excluding the mass of the solvent (S) described later.

<Plasticizer (D)>

The composition may include a plasticizer. The plasticizer (D) is a component which lowers a viscosity of the composition without significantly compromising various properties such as high refractive index of the cured product formed using the composition.

The plasticizer (D) is preferably a compound represented by the following formula (d-1).

$$R^{d1}—R^{d3}{}_r—X^d—R^{d4}{}_s—R^{d2} \quad (d\text{-}1)$$

In the formula (d-1), $R^{d1}$ and $R^{d2}$ are each independently phenyl group optionally substituted with 1 or more and 5 or less substituents. The substituent is selected from an alkyl group having 1 or more and 4 or less carbon atoms, an alkoxy group having 1 or more and 4 or less carbon atoms, and a halogen atom. $R^{d3}$ and $R^{d4}$ are each independently methylene group or ethane-1,2-diyl group. r and s are each independently 0 or 1. $X^d$ is oxygen atom or sulfur atom.

By inclusion of the plasticizer (D) in the composition, the composition can be made low viscosity without significantly compromising various properties such as high refractive index of the cured product formed using the composition. From the viewpoint of low viscosity of the composition, the viscosity of the plasticizer (D) measured by an E-type viscometer at 25° C. is preferably 10 cP or less, more preferably 8 cP or less, and further preferably 6 cP or less. From the viewpoint that the plasticizer (D) is less likely to volatilize and an effect of lowering the viscosity of the composition can be easily maintained, the boiling point of the plasticizer (D) under atmospheric pressure is preferably 250° C. or higher, and more preferably 260° C. or higher. Upper limit of the boiling point under atmospheric pressure of the plasticized (D) is not particularly limited, and may be 300° C. or higher, or 350° C. or higher, for example.

$R^{d1}$ and $R^{d2}$ in the formula (d-1) are each independently a phenyl group optionally substituted with 1 or more and 5 or less substituents. The substituent bonding to the phenyl group is a group selected from an alkyl group having 1 or more and 4 or less carbon atoms, an alkoxy group having 1 or more and 4 or less carbon atoms, and a halogen atom. When the phenyl group has the substituent, a number of substituents is not particularly limited. The number of substituents is 1 or more and 5 or less, preferably 1 or 2, and more preferably 1 Since the viscosity of the composition is low, $R^{d1}$ and $R^{d2}$ are respectively preferably unsubstituted phenyl group.

Examples of the alkyl group having 1 or more and 4 or less carbon atoms as the substituent include methyl group, ethyl group, n-propyl group, isopropyl group, n-butyl group, isobutyl group, sec-butyl group, and tert-butyl group. Examples of the alkoxy group having 1 or more and 4 or less carbon atoms as the substituent include methoxy group, ethoxy group, n-propyloxy group, isopropyloxy group, n-butyloxy group, isobutyloxy group, sec-butyloxy group, and tert-butyloxy group. Example of halogen atom as the substituent include fluorine atom, chlorine atom, bromine atom, and iodine atom.

$R^{d3}$ and $R^{d4}$ in the formula (d-1) are each independently methylene group or ethane-1,2-diyl group. In addition, r and s are each independently 0 or 1. Xs in the formula (d-1) is oxygen atom of sulfur atom.

Suitable specific examples of the compound represented by the formula (d-1) described above include diphenyl ether, diphenyl sulfide, dibenzyl ether, dibenzyl sulfide, diphenethyl ether, and diphenethyl sulfide. Among these, diphenyl sulfide and/or dibenzyl ether are preferred.

In view of adjusting viscosity and dispersibility of the metal oxide particles (B), a content of the plasticizer (D) in the composition is preferably 0% by mass or more and 35% by mass or less, and more preferably 5% by mass or more and 15% by mass or less.

<Nitrogen-Containing Compound (E)>

In order to uniformly disperse the metal oxide particles (B) in the cured product formed using the composition, the composition may include an amine compound represented by the following formula (e1) and/or an imine compound represented by the following formula (e2) as a nitrogen-containing compound (E).

$$NR^{e1}Re2R^{e3} \quad (e1)$$

$$R^{e4}—N{=}CR^{e5}R^{e6} \quad (e2)$$

In the formula (e1), $R^{e1}$, $R^{e2}$, and $R^{e3}$ are each independently a hydrogen atom of an organic group.

In the formula (e2), $R^{e4}$, $R^{e5}$, and $R^{e5}$ are each independently a hydrogen atom of an organic group.

When $R^{e1}$, $R^{e2}$, $R^{e3}$, $R^{e4}$, $R^{e5}$, and $R^{e6}$ are the organic group, the organic group can be selected from various organic groups as long as the desired effect is not impaired. As the organic group, a carbon atom-containing group is preferred, and a group consisting of 1 or more carbon atoms, and 1 or more atoms selected from the group consisting of H, O, S, Se, N, B, P, Si and a halogen atom is more preferred. The number of carbon atoms in the carbon atom-containing group is not particularly limited, and preferably 1 or more and 50 or less, and more preferably 1 or more and 20 or less. Suitable examples of the organic group include an alkyl group, a cycloalkyl group, an optionally substituted phenyl group, an optionally substituted phenylalkyl group, an optionally substituted naphthyl group, an optionally substituted naphthyl alkyl group, an optionally substituted heterocyclyl group, and the like.

A number of carbon atoms in the alkyl group as the organic group is preferably 1 or more and 20 or less, and more preferably 1 or more and 6 or less. Structure of the alkyl group may be straight or branched. Specific examples of the alkyl group include methyl group, ethyl group, n-propyl group, isopropyl group, n-butyl group, isobutyl group, sec-butyl group, tert-butyl group, n-pentyl group, isopentyl group, sec-pentyl group, tert-pentyl group, n-hexyl group, n-heptyl group, n-octyl group, n-isooctyl group, sec-octyl group, tert-octyl group, n-nonyl group, n-decyl group, isodecyl group, and the like. In addition, the alkyl group may include an ether bond (—O—) in the carbon chain. Examples of the alkyl group having an ether bond in the carbon chain include methoxyethyl group, ethoxyethyl group, methoxyethoxyethyl group, ethoxyethoxyethyl group, propyloxyethoxyethyl group, methoxypropyl group, and the like.

A number of carbon atoms in the cycloalkyl group as the organic group is preferably 3 or more and 10 or less, and more preferably 3 or more and 6 or less. Specific examples of the cycloalkyl group include cyclopropyl group, cyclobutyl group, cyclopentyl group, cyclohexyl group, cycloheptyl group, cyclooctyl group, and the like.

A number of carbon atoms in the phenylalkyl group as the organic group is preferably 7 or more and 20 or less, and more preferably 7 or more and 10 or less. A number of carbon atoms in the naphthylalkyl group as the organic group is preferably 11 or more and 20 or less, and more preferably 11 or more and 14 or less. Specific examples of the phenylalkyl group include benzyl group, 2-phenylethyl group, 3-phenylpropyl group, and 4-phenylbutyl group. Specific example of the naphthylalkyl group include α-naphthylmethyl group, β-naphthylmethyl group, 2-(α-naphthyl)

ethyl group, and 2-(β-naphthyl)ethyl group. The phenylalkyl group or the naphthylalkyl group may have a substituent on phenyl group or naphthyl group.

When the organic group is the heterocyclyl group, the heterocyclyl group is the same as when $R^{c4}$ in the formula (c3) is the heterocyclyl group, and the heterocyclyl group may have additional substituents.

The heterocyclyl group as the organic group may be an aliphatic heterocyclic group or an aromatic heterocyclic group. The heterocyclyl group is preferably a heterocyclyl group consisting of 5- or 6-membered single ring including one or more N, S, and O, or a fused ring in which above single rings are fused each other, or a above single ring is fused with a benzene ring. When the heterocyclyl group is a fused ring, the number of rings constituting the fused ring is 3 or less. Examples of the heterocycle constituting the heterocyclyl group include furan, thiophene, pyrrole, oxazole, isoxazole, thiazole, thiadiazole, isothiazole, imidazole, pyrazole, triazole, pyridine, pyrazine, pyrimidine, pyridazine, benzofuran, benzothiophene, indole, isoindole, indolizine, benzoimidazole, benzotriazole, benzoxazole, benzothiazole, carbazole, purine, quinoline, isoquinoline, quinazoline, phthalazine, cinnoline, quinoxaline, piperidine, piperazine, morpholine, tetrahydropyran, tetrahydrofuran, and the like.

When phenyl group, naphthyl group, and heterocyclyl group included in the above organic group have substituent, examples of the substituent include an alkyl group having 1 or more and 6 or less carbon atoms, an alkoxy group having 1 or more and 6 or less carbon atoms, a halogenated alkyl group having 1 or more and 6 or less carbon atoms, a halogenated alkoxy group having 1 or more and 6 or less carbon atoms, an aliphatic acyl group having 2 or more and 7 or less carbon atoms, an alkoxycarbonyl group having 2 or more and 7 or less carbon atoms, a saturated aliphatic acyloxy group having 2 or more and 7 or less carbon atoms, a monoalkylamino group having 1 or more and 6 or less carbon atoms, a dialkylamino group having an alkyl group having 1 or more and 6 or less carbon atoms, a benzoyl group, a halogen atom, a nitro group, a cyano group, and the like. When a phenyl group, a naphthyl group, and a heterocyclyl group included in the organic group have one or more substituents, a number of the substituents is not particularly limited, and preferably 1 or more and 4 or less. When a phenyl group, naphthyl group, and a heterocyclyl group included in the organic group have a plurality of substituents, the plurality of substituents may be the same or different.

In the formula (e1), $R^{e1}$, $R^{e2}$, and $R^{e3}$ are each independently a hydrogen atom or an organic group, and at least one of $R^{e1}$, $R^{e2}$, and $R^{e3}$ is an aromatic group-containing group. In addition, in the formula (e2), $R^{e4}$, $R^{e5}$, and $R^{e6}$ are each independently a hydrogen atom or an organic group, and at least one of $R^{e4}$, $R^{e5}$, and $R^{e6}$ is an aromatic group-containing group. The aromatic ring in the aromatic ring-containing group may be an aromatic hydrocarbon ring or an aromatic heterocycle. The aromatic ring-containing group is preferably a hydrocarbon group. As the aromatic ring-containing group, an aromatic hydrocarbon group (aryl group) and an aralkyl group are preferred. Examples of the aromatic hydrocarbon group include phenyl group, naphthalene-1-yl group, and naphthalene-2-yl group. Among these group, phenyl group is preferred. Examples of the aralkyl group include benzyl group, 2-phenylethyl group, 3-phenylpropyl group, and 4-phenylbutyl group.

In the formula (e1), at least one of $R^{e1}$, $R^{e2}$, and $R^{e3}$ is preferably a group represented by $—Ar^{e1}—CH_2—$. In addition, in the formula (e2), $R^{e4}$ is preferably a group represented by $—Ar^{e1}—CH_2—$. $Ar^{e1}$ is an optionally substituted aromatic group. The aromatic group as $Ar^{e1}$ may be an aromatic hydrocarbon group, or an aromatic heterocyclic group. The aromatic group as $Ar^{e1}$ is preferably the aromatic hydrocarbon group. Examples of the aromatic hydrocarbon group include phenyl group, naphthalene-1-yl group, and naphthalene-2-yl group. Among these group, phenyl group is preferred. The substituent which the aromatic group as $Ar^{e1}$ may have is the same as the substituent which phenyl group, naphthyl group, and heterocyclyl group may have in case that the organic group as $R^{e4}$, $R^{e5}$, and $R^{e6}$ is these groups.

Suitable specific examples of the amine compound represented by the formula (e1) include triphenyl amine, N,N-diphenylbenzylamine, N-phenylbenzylamine, tribenzylamine, N,N-dimethylphenylamine, N-methyldiphenylamine, N,N-dimethylbenzylamine, N-methyldibenzylamine, N-methyl-N-benzylphenylamine, N,N-diethylphenyl amine, N-ethyldiphenylamine, N,N-diethylbenzylamine, N-ethylbenzylamine, and N-ethyl-N-benzylamine.

Suitable specific examples of the imine compound represented by the formula (e2) include N-benzylphenylmethaneimine, N-benzyldiphenylmethaneimine, N-benzyl-1-phenylethaneimine, and N-benzylpropane-2-imine.

A content of the nitrogen-containing compound (E) is not particularly limited as long as the desired effect is not impaired. The content of the nitrogen-containing compound (E) is preferably 5% by mass or more and 25% by mass or less, and more preferably 7% by mass or more and 20% by mass or less relative to the mass of the photopolymerizable compound (A).

<Triazine Compound (F)>

For the purpose of forming the cured product with higher refractive index using the composition, the composition may include a compound represented by the following formula (F1) as a triazine compound (F).

(F1)

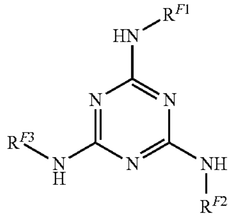

In the formula (F1), $R^{F1}$, $R^{F2}$, and $R^{F3}$ are each independently an optionally substituted monocyclic aromatic group or an optionally substituted condensed aromatic group. Provided that, $R^{F1}$, $R^{F2}$, and $R^{F3}$ do not include the radically polymerizable group-containing group or the cationically polymerizable group-containing group. When the monocyclic aromatic group or the condensed aromatic group has the substituent, the substituent includes not aromatic ring. Three —NH— groups bonding to the triazine ring respectively bond to aromatic rings in $R^{F1}$, $R^{F2}$, and $R^{F3}$.

The monocyclic aromatic group may be an aromatic hydrocarbon group or an aromatic heterocyclic group. Examples of the monocyclic aromatic group include phenyl group, pyridinyl group, pyrimidinyl group, pyridinyl group, pyridazinyl group, furanyl group, thienyl group, oxazolyl group, thiazolyl group, and the like.

Examples of the substituted which the monocyclic aromatic group may have include a halogen atom, a hydroxy group, a mercapto group, a cyano group, a nitro group, and a monovalent organic group. Provided that, the monovalent organic group includes no aromatic ring. Examples of the halogen atom as the substituent include fluorine atom, chlorine atom, bromine atom, and iodine atom. Examples of the monovalent organic group include an alkyl group, an alkoxy group, an alkoxyalkyl group, an aliphatic acyl group, an aliphatic acyloxy group, an alkoxycarbonyl group, an alkylthio group, an aliphatic acylthio group, and the like.

A number of carbon atoms in the monovalent organic group as the substituent is not particularly limited as long as the desired effect is not impaired. For example, the number of carbon atoms in the monovalent organic group as the substituent is preferably 1 or more and 20 or less, more preferably 1 or more and 12 or less, and further preferably 1 or more and 8 or less. In the alkoxyalkyl group, the aliphatic acyl group, the aliphatic acyloxy group, the alkoxycarbonyl group, the alkoxyalkylthio group, and the aliphatic acylthio group, lower limit of the number of carbon atoms is 2.

Suitable specific examples of the alkyl group as the substituent include methyl group, ethyl group, n-propyl group, isopropyl group, n-butyl group, isobutyl group, sec-butyl group, tert-butyl group, n-pentyl group, n-hexyl group, n-heptyl group, and n-octyl group.

Suitable specific examples of the alkoxy group as the substituent include methoxy group, ethoxy group, n-propyloxy group, isopropyl oxy group, n-butyloxy group, isobutyloxy group, sec-butyloxy group, tert-butyloxy group, n-pentyloxy group, n-hexyloxy group, n-heptyloxy group, and n-octyloxy group.

Suitable specific examples of the alkoxyalkyl group include methoxymethyl group, ethoxymethyl group, n-propyloxymethyl group, n-butyloxymethyl group, 2-methoxyethyl group, 2-ethoxyethyl group, 2-n-propyloxyethyl group, 2-n-butyloxyethyl group, 3-methoxy-n-propyl group, 3-ethoxy-n-propyl group, 3-n-propyloxy-n-propyl group, 3-n-butyloxy-n-propyl group, 4-methoxy-n-bnutyl group, 4-ethoxy-n-butyl group, 4-n-propyloxy-n-butyl group, and 4-n-butyloxy-n-butyl group.

Suitable specific examples of the aliphatic acyl group include acetyl group, propionyl group, butanoyl group, pentanoyl group, hexanoyl group, heptanoyl group, and octanoyl group.

Suitable specific examples of the aliphatic acyloxy group as the substituent include acetoxy group, propionyloxy group, butanoyloxy group, pentanoyloxy group, hexanoyloxy group, heptanoyloxy group, and octanoyloxy group.

Suitable specific examples of the alkoxycarbonyl group as the substituent include methoxycarbonyl group, ethoxycarbonyl group, n-propyloxycarbonyl group, isopropyloxycarbonyl group, n-butyloxycarbonyl group, isobutyloxycarbonyl group, sec-butyloxycarbonyl group, tert-butyloxycarbonyl group, n-pentyloxycarbonyl group, n-hexyloxycarbonyl group, n-heptyloxycarbonyl group, and n-octyloxycarbonyl group.

Suitable specific examples of the alkylthio group as the substituent include methylthio group, ethylthio group, n-propylthio group, isopropylthio group, n-butylthio group, isobutylthio group, sec-butylthio group, tert-butylthio group, n-pentylthio group, n-hexylthio group, n-heptylthio group, and n-octylthio group.

Suitable specific examples of the aliphatic acylthio group as the substituent include acetylthio group, propionylthio group, butanoylthio group, pentanoylthio group, hexanoylthio group, heptanoylthio group, and ocatnoylthio group.

When the monocyclic aromatic group has the substituent, a number of the substituent is not particularly limited as long as the desired effect is not impaired. When the monocyclic aromatic group has the substituent, the number of the substituent is preferably 1 or more and 4 or less, more preferably 1 or 2, and particularly preferably 1. When the monocyclic aromatic group has a plurality of the substituents, the plurality of the substituents may be different from each other.

Examples of the above-described optionally substituted monocyclic aromatic group include phenyl group, 4-cyanophenyl group, 3-cyanophenyl group, 2-cyanophenyl group, 2,3-dicyanophenyl group, 2,4-dicyanophenyl group, 2,5-dicyanophenyl group, 2,6-dicyanophenyl group, 3,4-dicyanophenyl group, 3,5-dicyanopohenyl group, 4-nitrophenyl group, 3-nitrophenyl group, 2-nitrophenyl group, 4-chlorophenyl group, 3-chlorophenyl group, 2-chlorophenyl group, 4-bromophenyl group, 3-bromophenyl group, 2-bromophenyl group, 4-iodophenyl group, 3-iodophenyl group, 2-iodophenyl group, 4-methoxyphenyl group, 3-methoxyphenyl group, 2-methoxyphenyl group, 4-methylphenyl group, 3-methylphenyl group, and 2-methylphenyl group.

Among these groups, phenyl group, 4-cyanophenyl group, 3-cyanophenyl group, 2-cyanophenyl group, 4-nitrophenyl group, 3-nitrophenyl group, and 2-nitrophenyl group are preferred, and phenyl group, and 4-cyanophenyl group are more preferred.

The condensed aromatic group as $R^{F1}$, $R^{F2}$, and $R^{F3}$ is a group in which one hydrogen atom is excluded from the fused polycycle in which two or more aromatic monocycles are fused. A number of aromatic monocycles constituting the condensed aromatic group is not particularly limited. The number of aromatic monocycles constituting the condensed aromatic group is preferably 2 or 3, and more preferably 2. That is, the condensed aromatic group is preferably a bicyclic condensed aromatic group or a tricyclic condensed aromatic group, and more preferably a bicyclic condensed aromatic group. The condensed aromatic group may be an aromatic hydrocarbon group, or an aromatic heterocyclic group.

For example, examples of the bicyclic condensed aromatic group include naphthalene-1-yl group, naphthalene-2-yl group, quinoline-2-yl group, quinoline-3-yl group, quinoline-4-yl group, quinoline-5-yl group, quinoline-6-yl group, quinoline-7-yl group, quinoline-8-yl group, isoquinoline-1-yl group, isoquinoline-3-yl group, isoquinoline-4-yl group, isoquinoline-5-yl group, isoquinoline-6-yl group, isoquinoline-7-yl group, isoquinoline-8-yl group, benzoxazole-2-yl group, benzoxazole-4-yl group, benzoxazole-5-yl group, benzoxazole-6-yl group, benzoxazole-7-yl group, benzothiazole-2-yl group, benzothiazole-4-yl group, benzothiazole-5-yl group, benzothiazole-6-yl group, benzothiazole-7-yl group, and the like.

For example, examples of the tricyclic condensed aromatic group include anthracene-1-yl group, anthracene-2-yl group, anthracene-9-yl group, phenanthrene-1-yl group, phenanthrene-2-yl group, phenanthrene-3-yl group, phenanthrene-4-yl group, phenanthrene-9-yl group, acridine-1-yl group, acridine-2-yl group, acridine-3-yl group, acridine-4-yl group, and acridine-9-yl group.

The substituent which the polycyclic condensed aromatic group such as the bicyclic condensed aromatic group and the tricyclic condensed aromatic group may have is the same as the substituent which monocyclic aromatic group may have.

As the above-described optionally substituted condensed aromatic group, naphthalene-1-yl group, naphthalene-2-yl group, quinoline-2-yl group, quinoline-3-yl group, quinoline-4-yl group, quinoline-5-yl group, quinoline-6-yl group, quinoline-7-yl group, quinoline-8-yl group, benzothiazole-2-yl group, and 2-mercaptobenzothiazole-6-yl group are preferred.

Among these groups, naphthalene-1-yl group, quinoline-3-yl group, quinoline-4-yl group, and 2-mmercaptobenzothiazole-6-yl group are preferred, and naphthalene-1-yl group is more preferred.

Among the above-described compounds represented by the formula (F1), a compound in which 1 or more of $R^{F1}$, $R^{F2}$, and $R^{F3}$ is the optionally substituted naphthyl group, and 1 or more of $R^{F1}$, $R^{F2}$, and $R^{F3}$ is 4-cyanophenyl group or benzothiazolyl group is preferred, since a refractive index, a surface appearance, and a heat resistance of the cured product formed by using the composition are good in balance. As the optionally substituted naphthyl group, naphthalene-1-yl group is preferred.

Suitable examples of the compound represented by the formula (F1) include the following compounds.

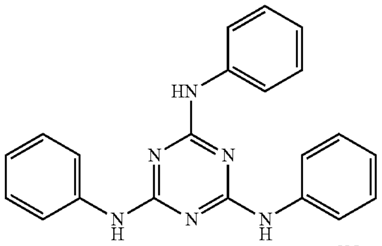

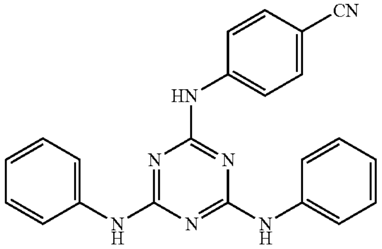

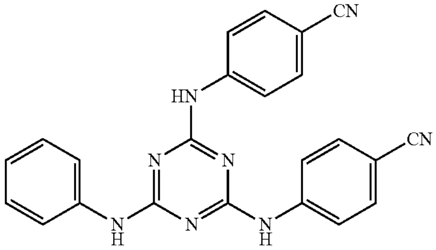

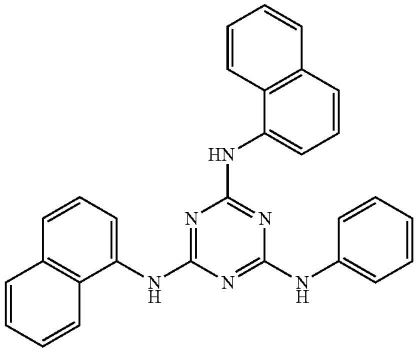

-continued

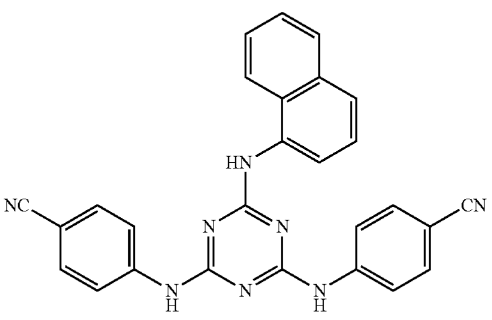

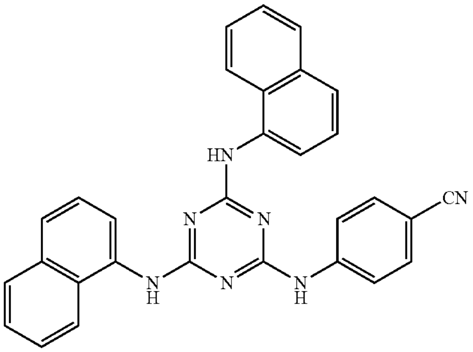

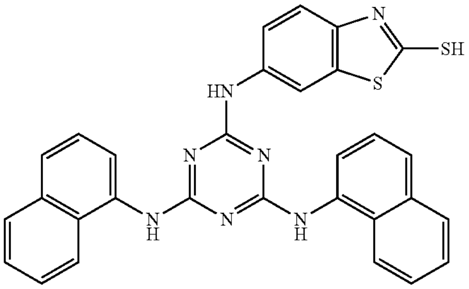

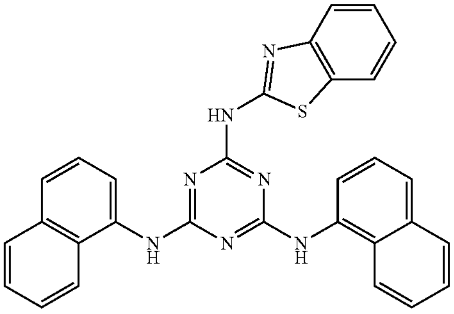

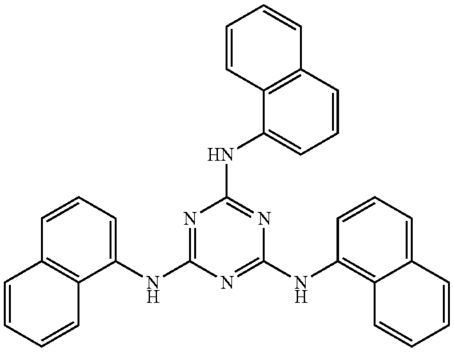

-continued

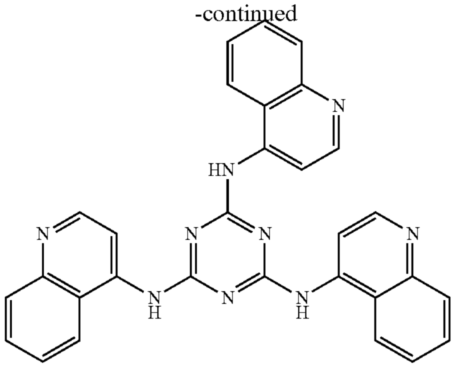

Production method of the compound represented by the formula (F1) is not particularly limited. Typically, the compound represented by the formula (F1) can be prepared by reacting cyanuric halide such as cyanuric chloride with aromatic amines represented by $R^{F1}$—$NH_2$, $R^{F2}$—$NH_2$, and $R^{F3}$—$NH_2$. These multiple amines may react with the cyanuric halide simultaneously or sequentially, and preferably sequentially react with the cyanuric halide.

The compound represented by the formula (F1) is usually synthesized in an organic solvent. This organic solvent is not particularly limited as long as the solvent is an inactive solvent which does not react with cyanuric halide, aromatic amine, radically polymerizable group, cationically polymerizable group, and the like. As the solvent, solvents exemplified as specific examples of the solvent (S) described below can be used. In the production of the compound represented by the formula (F1), reaction temperature is not particularly limited when cyanuric halide is reacted with aromatic amines such as aromatic amines represented by $R^{F1}$—$NH_2$, $R^{F2}$—$NH_2$, and $R^{F13}$—$NH_2$. Typically, the reaction temperature is preferably 0° C. or higher and 150° C. or lower.

An amount of the triazine compound (F) is not particularly limited as long as the desired effect is impaired. The amount of the triazine compound (F) in the composition is preferably 0.1 parts by mass or more and 30 parts by mass or less, 0.3 parts by mass or more and 20 parts by mass or less, and further preferably 0.5 parts by mass or more and 15 parts by mass or less, when a mass of the composition excluding a mass of the solvent (S) described below is 100 parts by mass.

<Solvent (S)>

The composition may include a solvent (S) for purposes of adjusting applicability and the like. Type of the solvent (S) is not particularly limited as long as the desired effect is not impaired.

For example, suitable examples of the solvent (S) include (poly)alkyleneglycol monoalkyl ethers such as ethylene glycol monomethyl ether, ethylene glycol monoethyl ether, ethylene glycol mono-n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether ($HO—CH_2CH_2CH_2—O—CH_3$), propylene glycol monomethyl ether ($HO—C(CH_3)HCH_2—O—CH_3$ or $H_3C—O—C(CH_3)HCH_2—OH$), propylene glycol monoethyl ether ($HO—CH_2CH_2CH_2—O—CH_2CH_3$), propylene glycol monomethyl ether ($HO—C(CH_3)HCH_2—O—CH_2CH_3$ or $H_3CH_2C—O—C(CH_3)HCH_2—OH$), propylene glycol mono-n-propyl ether ($HO—CH_2CH_2CH_2—O—CH_2CH_2CH_3$), propylene glycol mono-n-propyl ether ($HO—C(CH_3)HCH_2—O—CH_2CH_2CH_3$ or $H_3CH_2CH_2C—O—C(CH_3)HCH_2—OH$), propylene glycol mono-n-butyl ether ($HO—CH_2CH_2CH_2—O—CH_2CH_2CH_3$), propylene glycol mono-n-butyl ether ($HO—C(CH_3)HCH_2—O—CH_2CH_2CH_2CH_3$ or $H_3CH_2CH_2CH_2C—O—C(CH_3)HCH_2—OH$), dipropylene glycol monomethyl ether ($HO—(CH_2CH_2CH_2—O)_2—CH_3$), dipropylene glycol monomethyl ether ($HO—(C(CH_3)HCH_2—O)_2—CH_3$ or $H_3C—O—(C(CH_3)HCH_2—O)_2—H$), dipropylene glycol monoethyl ether ($HO—(CH_2CH_2CH_2—O)_2—CH_2CH_3$), dipropylene glycol monoethyl ether ($HO—(C(CH_3)HCH_2—O)_2—CH_2CH_3$ or $H_3CH_2C—O—(C(CH_3)HCH_2—O)_2—H$), dipropylene glycol mono-n-propyl ether ($HO—(CH_2CH_2CH_2—O)_2—CH_2CH_2CH_3$), dipropylene glycol mono-n-propyl ether ($HO—(C(CH_3)HCH_2—O)_2—CH_2CH_2CH_3$ or $H_3CH_2CH_2C—O—(C(CH_3)HCH_2—O)_2—H$), dipropylene glycol mono-n-butyl ether ($HO—(CH_2CH_2CH_2—O)_2—CH_2CH_2CH_2CH_3$), dipropylene glycol mono-n-butyl ether ($HO—(C(CH_3)HCH_2—O)_2—CH_2CH_2CH_2CH_3$ or $H_3CH_2CH_2CH_2C—O—(C(CH_3)HCH_2—O)_2—H$), tripropylene glycol monomethyl ether ($HO—(CH_2CH_2CH_2—O)_3—CH_3$), tripropylene glycol monomethyl ether ($HO—(C(CH_3)HCH_2—O)_3—CH_3$ or $H_3C—O—(C(CH_3)HCH_2—O)_3—H$), tripropylene glycol monoethyl ether ($HO—(CH_2CH_2CH_2—O)_3—CH_2CH_3$), and tripropylene glycol monoethyl ether ($HO—(C(CH_3)HCH_2—O)_3—CH_2CH_3$ or $H_3CH_2C—O—(C(CH_3)HCH_2—O)_3—H$); (poly)alkylene glycol monoalkyl ether acetates such as ethylene glycol monomethyl ether acetate, ethylene glycol monoethyl ether acetate, diethylene glycol monomethyl ether acetate, diethylene glycol monoethyl ether acetate, propylene glycol monomethyl ether acetate, and propylene glycol monoethyl ether acetate; other ethers such as ethylene glycol dimethyl ether, ethylene glycol diethyl ether, ethylene glycol methyl ethyl ether, diethylene glycol dimethyl ether, diethylene glycol methyl ethyl ether, diethylene glycol diethyl ether, propylene glycol dimethyl ether, propylene glycol diethyl ether, propylene glycol methyl ethyl ether, dipropylene glycol dimethyl ether, dipropylene glycol methyl ethyl ether, dipropylene glycol diethyl ether, and tetrahydrofuran; ketones such as methyl ethyl ketone, cyclohexanone, 2-hepotanone, and 3-heptanone; lactic acid alkyl esters such as methyl 2-hydroxypropionate, and ethyl 2-hydroxypropionate; other esters such as ethyl 2-hydroxy-2-methylpropionate, methyl 3-methoxypropionate, ethyl 3-methoxypropionate, methyl-3-ethoxypropionate, ethyl 3-ethoxypropionate, ethyl ethoxyacetate, ethyl hydroxyacetate, methyl 2-hydroxy-3-methylbutanoate, 3-nethoxybutyl acetate, 3-methyl-3-methoxybutyl acetate, 3-methyl-3-methoxybutyl propionate, ethyl acetate, n-propyl acetate, isopropyl acetate, n-butyl acetate, isobutyl acetate, n-pentyl formate, isopentyl acetate, n-butyl propionate, ethyl butanoate, n-propyl butanoate, isopropyl butanoate, n-butyl butanoate, methyl pyruvate, ethyl pyruvate, n-propyl pyruvate, methyl acetoacetate, ethyl acetoacetate, and ethyl 2-oxabutanoate; aromatic hydrocarbons such as toluene and xylene, amides such as N-methylpyrrolidone, N,N-dimethylformamide, and N,N-dimethylacetamide, and the (poly) alkylene glycol monoalkyl ether acetates are preferred.

From the viewpoint than application by inkjet method can be performed well, the solvent (S) preferably includes a solvent having boiling point of 140° C. or higher under atmospheric pressure, and more preferably includes a high boiling point solvent (S1) having boiling point of 170° C. or higher under atmospheric pressure.

Specific examples of the solvent having boiling point of 140° C. or higher under atmospheric pressure include ethylene glycol mono-n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether ($HO—CH_2CH_2CH_2—O—CH_3$), propylene glycol monoethyl ether ($HO—CH_2CH_2CH_2—O—CH_2CH_3$), propylene glycol mono-n-propyl ether ($HO—CH_2CH_2CH_2—O—CH_2CH_2CH_3$), propylene glycol mono-n-propyl ether ($HO—C(CH_3)HCH_2—O—CH_2CH_2CH_3$ or $H_3CH_2CH_2C—O—C(CH_3)HCH_2—OH$), propylene glycol mono-n-butyl ether ($HO—CH_2CH_2CH_2—O—CH_2CH_2CH_3$), propylene glycol mono-n-butyl ether ($HO—C(CH_3)HCH_2—O—CH_2CH_2CH_2CH_3$ or $H_3CH_2CH_2CH_2C—O—C(CH_3)HCH_2—OH$), dipropylene glycol monomethyl ether ($HO—(CH_2CH_2CH_2—O)_2—CH_3$), dipropylene glycol monomethyl ether ($HO—(C(CH_3)HCH_2—O)_2—CH_3$ or $H_3C—O—(C(CH_3)HCH_2—O)_2—H$), dipropylene glycol monoethyl ether ($HO—(CH_2CH_2CH_2—O)_2—CH_2CH_3$), dipropylene glycol monoethyl ether ($HO—(C(CH_3)HCH_2—O)_2—CH_2CH_3$ or $H_3CH_2C—O—(C(CH_3)HCH_2—O)_2—H$), dipropylene glycol mono-n-propyl ether ($HO—(CH_2CH_2CH_2—O)_2—CH_2CH_2CH_3$), dipropylene glycol mono-n-propyl ether ($HO—(C(CH_3)HCH_2—O)_2—CH_2CH_2CH_3$ or $H_3CH_2CH_2C—O—(C(CH_3)HCH_2—O)_2—H$), dipropylene glycol mono-n-butyl ether ($HO—(CH_2CH_2CH_2—O)_2—CH_2CH_2CH_2CH_3$), dipropylene glycol mono-n-butyl ether ($HO—(C(CH_3)HCH_2—O)_2—CH_2CH_2CH_2CH_3$ or $H_3CH_2CH_2CH_2C—O—(C(CH_3)HCH_2—O)_2—H$), tripropylene glycol monomethyl ether ($HO—(CH_2CH_2CH_2—O)_3—CH_3$), tripropylene glycol monomethyl ether ($HO—(C(CH_3)HCH_2—O)_3—CH_3$ or $H_3C—O—(C(CH_3)HCH_2—O)_3 —H$), tripropylene glycol monoethyl ether ($HO—(CH_2CH_2CH_2—O)_3—CH_2CH_3$), tripropylene glycol monoethyl ether ($HO—(C(CH_3)HCH_2—O)_3—CH_2CH_3$ or $H_3CH_2C—O—(C(CH_3)HCH_2—O)_3—H$), diethylene glycol monomethyl ether acetate, diethylene glycol monoethyl ether acetate, diethylene glycol dimethyl ether, cyclohexanone, 2-hepotanone, ethyl 2-hydroxypropionate, ethyl 2-hydroxy-2-methylpropionate, ethyl 3-methoxypropionate, ethyl 3-methoxypropionate, ethyl 3-ethoxypropionate, ethyl ethoxyacetate, 3-nethoxybutyl acetate, 3-methyl-3-methoxybutyl acetate, 3-methyl-3-methoxybutyl propionate, n-butyl butanoate, methyl acetoacetate, ethyl acetoacetate, ethyl 2-oxabutanoate, N-methylpyrrolidone, N,N-dimethylformamide, and N,N-dimethylacetamide.

Specific examples of the high boiling point solvent (S1) include ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol mono-n-butyl ether ($HO—CH_2CH_2CH_2—O—CH_2CH_2CH_3$), propylene glycol mono-n-butyl ether ($HO—C(CH_3)HCH_2—O—CH_2CH_2CH_2CH_3$ or $H_3CH_2CH_2CH_2C—O—C(CH_3)HCH_2—OH$), dipropylene glycol monomethyl ether ($HO—(CH_2CH_2CH_2—O)_2—CH_3$), dipropylene glycol monomethyl ether ($HO—(C(CH_3)HCH_2—O)_2—CH_3$ or $H_3C—O—(C(CH_3)HCH_2—O)_2—H$), dipropylene glycol monoethyl ether ($HO—(CH_2CH_2CH_2—O)_2—CH_2CH_3$), dipropylene glycol monoethyl ether ($HO—(C(CH_3)HCH_2—O)_2—CH_2CH_3$ or $H_3CH_2C—O—(C(CH_3)HCH_2—O)_2—H$), dipropylene glycol mono-n-propyl ether ($HO—(CH_2CH_2CH_2—O)_2—CH_2CH_2CH_3$), dipropylene glycol mono-n-propyl ether ($HO—(C(CH_3)HCH_2—O)_2—CH_2CH_2CH_3$ or $H_3CH_2CH_2C—O—(C(CH_3)HCH_2—O)_2—H$), dipropylene glycol mono-n-butyl ether ($HO—(CH_2CH_2CH_2—O)_2—CH_2CH_2CH_2CH_3$), dipropylene glycol mono-n-butyl ether ($HO—(C(CH_3)HCH_2—O)_2—CH_2CH_2CH_2CH_3$ or $H_3CH_2CH_2CH_2C—O—(C(CH_3)HCH_2—O)_2—H$), tripropylene glycol monomethyl ether ($HO—(CH_2CH_2CH_2—O)_3—CH_3$), tripropylene glycol monomethyl ether ($HO—(C(CH_3)HCH_2—O)_3—CH_3$ or $H_3C—O—(C(CH_3)HCH_2—O)_3—H$), tripropylene glycol monoethyl ether ($HO—(CH_2CH_2CH_2—O)_3—CH_2CH_3$), tripropylene glycol monoethyl ether ($HO—(C(CH_3)HCH_2—O)_3—CH_2CH_3$ or $H_3CH_2C—O—(C(CH_3)HCH_2—O)_3—H$), diethylene glycol monomethyl ether acetate, diethylene glycol monoethyl ether acetate, diethylene glycol methyl ethyl ether, diethylene glycol diethyl ether, dipropylene glycol dimethyl ether, dipropylene glycol methyl ethyl ether, dipropylene glycol diethyl ether, ethyl hydroxy acetate, 3-methoxybutyl acetate, 3-methyl-3-methoxybutyl acetate, 3-methyl-3-methoxybutyl propionate, methyl acetoacetate, ethyl acetoacetate, ethyl 2-oxobutanoate, and N-methyhlpyrrolidone.

In view of easily obtaining the desired effect, a ratio of a mass of the solvent having boiling point of 140° C. or higher or the high boiling point solvent (S1) having boiling point of 170° C. or higher is preferably 20% by mass or more, more preferably 30% by mass or more, further preferably 50% by mass or more, even more preferably 70% by mass or more, particularly preferably 90% by mass or more, and most preferably 100% by mass relative to the mass of the solvent (S).

A content of the solvent (S) is in an amount such that the concentration of components other than the solvent (S) in the composition is preferably 1% by mass or more and 99% by mass or less, more preferably 5% by mass or more and 50% by mass or less, and further preferably 10% by mass or more and 30% by mass or less.

<Other Component>

The composition may include various additives as needed, as other components other than the components described above. Examples of the additive include a sensitizer, a curing accelerator, a filler, a dispersant, an adhesion promoter such as a silane coupling agent, an antioxidant, an antiaggregant agent, a thermal polymerization inhibitor, a defoaming agent, and a surfactant. The amount of these additives used is appropriately determined in consideration of the amount of these additives used in the composition.

The photopolymerizable compound (A), the metal oxide particles (B), and optional components such as the initiator (C) added as needed are uniformly mixed and dispersed at desired amount to obtain the composition.

<<Production Method of Cured Product>>

A cured product can be produced by shaping the composition described above into a desired shape and then subjecting the composition to curing by a method in accordance with the types and ratios of components in the composition. In particular, when the composition includes the initiator (C), the cured product can be produces by light exposure to the composition in accordance with the type of the initiator (C).

The shaping method of the composition is not particularly limited and appropriately selected depending on the shape of the cured product. Examples of the shaping method include coating and casting into a mold. Hereinafter, a production method of a cured film will be described as a representative example of the production method of the cured product.

First, the composition is coated on a desired substrate to form a coating film. Then, as needed, the solvent (S) is at least partially removed from the coating film to form a coating film.

The method of coating the composition on the substrate is not particularly limited. The coating film can be formed by coating the composition on the substrate such that a desired film thickness is achieved, using a contact transfer-type applicator such as a roll coater, a reverse coater, a bar coater, or a slit coater, or a non-contact type applicator such as a spinner (a rotary applicator) or a curtain flow coater, for example. In addition, printing methods such as screen printing and inkjet printing can also be applied to form the coating film. As described above, the aforementioned composition is not likely to dry rapidly, thicken or solidify in the inkjet head. Therefore, by using the aforementioned composition, applying by inkjet printing method can be performed well.

After applying the composition on the substrate, as needed, the solvent (S) is preferably removed at least partially from the coating film by baking the coating film. The baking temperature is appropriately determined in consideration of the boiling point of the solvent (S) and the like. The baking may be carried out at a low temperature under reduced pressure conditions.

The method of baking is not particularly limited, and examples thereof include a method in which the coating film is dried using a hot plate at a temperature of 80° C. or higher and 150° C. or lower and preferably 85° C. or higher and 120° C. or lower, for 60 seconds or longer and 500 seconds or shorter.

The film thickness of the coating film formed as described above is not particularly limited. The film thickness of the coating film is appropriately determined depending on the applications of the cured film. The film thickness of the coating film is typically appropriately adjusted such that a cured film to be formed has a film thickness of preferably 0.1 μm or more and 10 μm or less and more preferably 0.2 μm or more and 5 μm or less.

After a coating film is formed by the above method, the coating film is subjected to light exposure to thereby enable a cured film to be obtained.

A condition for light exposure to the coating film is not particularly limited as long as curing proceeds well. Light exposure is carried out by irradiation with, for example, active energy rays such as ultraviolet rays and excimer laser light. The dose of energy used in the irradiation is not particularly limited, and examples thereof include a dose of 30 mJ/cm$^2$ or more and 5000 mJ/cm$^2$ or less. After the light exposure, the coating film subjected to light exposure may be baked in the same manner as the heating after coating.

EXAMPLES

Hereinafter, the present invention is described in more detail by way of Examples, but the present invention is not limited to these Examples.

Preparation Example 1

4,4'-thiobisbenzenethiol (20.0 g, 0.080 mol), and 100 mL of aqueous solution of sodium hydroxide at 20% concentration were added to a reactor with 300 mL capacity. After nitrogen replacement in the reactor, the contents of the reactor were stirred at an internal temperature of 60° C. for 30 minutes. Thereafter, ethylene glycol mono-2-chloroethyl ether (23.2 g, 0.186 moles) was added dropwise into the reactor, and the reaction was carried out at an internal temperature of 90° C. for 4 hours. Subsequently, the reaction liquid was cooled to room temperature with stirring. Solid precipitated by cooling was filtered and washed with water. The resulting solid was dried under reduced pressure to give 33.8 g (99% yield) of compound IMI. Subsequently, the compound IMI (33.8 g, 0.079 mol), triethylamine (19.2 g, 0.190 mol), hydroquinone (0.87 g, 0.008 mol), and 340 mL of tetrahydrofuran were mixed in a reactor with 500 mL capacity. Obtained solution was cooled in an ice bath. Acryloyl chloride (17.2 g, 0.190 mol) was added dropwise to the cooled solution while keeping the internal temperature 5° C. or lower. Solution which acryloyl chloride was added was stirred at room temperature for 2 hours, and precipitated slat was filtered. From the resulting filtrate, the solvent was removed with an evaporator to obtain a viscous liquid. The obtained viscous liquid was purified with silicagel chromatography to obtain 22.1 g (Yield. 52%) of compound 1 as colorless liquid. Measurement result of 1H-NMR of compound 1 is shown below.

$^1$H-NMR (DMSO): 3.27 (t, 4H), 3.63 (t, 4H), 3.77 (t, 4H), 4.27 (t, 4H), 5.80 (dd, 2H), 6.15 (dd, 2H), 6.41 (dd, 2H), 7.20 (d, 4H), 7.28 (d, 4H)

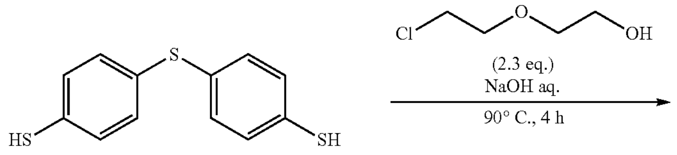

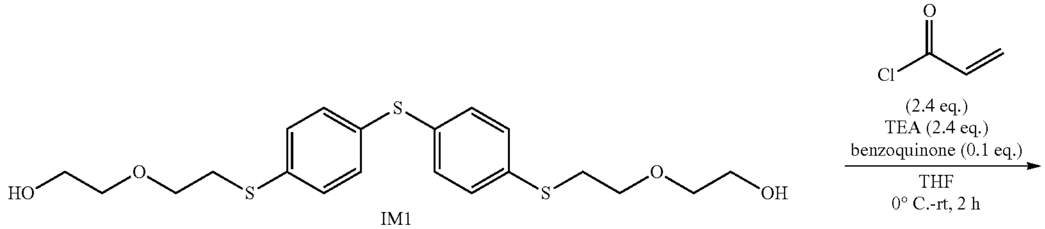

IM1

-continued

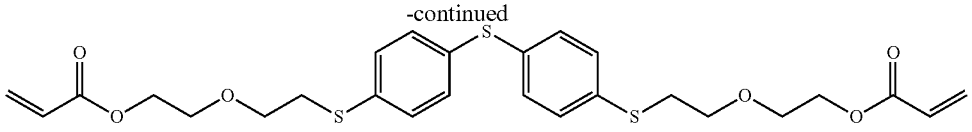

1

Preparation Example 2

Titanium oxide particles were prepared by the same method as in Example 8 of International Publication No. 2020/106860. A shape of the titanium oxide particles was spherical according to a TEM observation of the titanium oxide particles obtained. With respect to the titanium oxide particles obtained, XRD measurement was carried out with an X-ray diffractometer (SmartLab, manufactured by Rigaku Corp.). Obtained result was analyzed with accompanying software PDXL to determine an average primary particle diameter (size of crystallite) of the titanium oxide particles according to Halder-Wagner method. The average primary particle diameter of the titanium oxide particles was 9.7 nm.

100 parts by mass of titanium oxide particles, 25 parts by mass of pentyltrimethoxysilane as the silane compound represented by the formula (1), and propylene glycol monomethyl ether acetate (PGMEA) as the dispersion medium were mixed in a vial bottle. Contents in the vial bottle were stirred at 110° C. for 30 minutes to react the silane compound with surfaces of the titanium oxide particles. Subsequently, 5 parts by mass of a penta-n-butoxy niobium as the niobium compound were added to the liquid in the vial bottle. Contents in the vial bottle were stirred at 110° C. for 20 minutes to react the niobium compound with surfaces of the titanium oxide particles. The titanium oxide particles where those surfaces were functionalized with the pentyltrimethoxysilane and the penta-n-butoxy niobium were collected by centrifuge after addition of an n-heptane to the obtained reaction liquid.

Preparation Example 3

Titanium oxide particles where those surfaces were functionalized with the pentyltrimethoxysilane and the penta-n-butoxy niobium were obtained in the same manner as in Preparation Example 2 except that the amount of the pentyltrimethoxysilane was changed from 25 parts by mass to 15 parts by mass and the amount of the penta-n-butoxy niobium was changed from 5 parts by mass to 15 parts by mass.

Preparation Example 4

Titanium oxide particles where those surfaces were functionalized with the pentyltrimethoxysilane and the penta-n-butoxy niobium were obtained in the same manner as in Preparation Example 2 except that the amount of the pentyltrimethoxysilane was changed from 25 parts by mass to 35 parts by mass and the amount of the penta-n-butoxy niobium was changed from 5 parts by mass to 20 parts by mass.

Preparation Example 5

Titanium oxide particles where those surfaces were functionalized with the pentyltrimethoxysilane and the penta-n-butoxy niobium were obtained in the same manner as in Preparation Example 2 except that the amount of the pentyltrimethoxysilane was changed from 25 parts by mass to 35 parts by mass and the amount of the penta-n-butoxy niobium was changed from 5 parts by mass to 40 parts by mass.

Preparation Example 6

Titanium oxide particles where those surfaces were functionalized with the pentyltrimethoxysilane were obtained in the same manner as in Preparation Example 2 except that the amount of the pentyltrimethoxysilane was changed from 25 parts by mass to 35 parts by mass and the penta-n-butoxy niobium was not used.

Average primary particle diameters of the titanium oxide particles where those surfaces were functionalized obtained in Preparation Examples 2 to 6 were measured by X-ray diffraction (XRD) method. The average primary particle diameter of all titanium oxide particles was 9.7 nm.

X-ray photoelectron spectroscopy (XPS) analysis was also performed on the titanium oxide particles where those surfaces were functionalized obtained in Preparation Examples 2 to 6 to determine the value of MN/MS which is a ratio of MN:the number of moles of niobium atoms derived from the niobium compound and MS: the number of moles of silicon atoms derived from the silane compound in the titanium oxide particles. FT-IR spectra were obtained for the titanium dioxide particles where those surfaces were functionalized obtained in Preparation Examples 2 to 6 using an infrared spectrophotometer (FT-IR Nicolet 6700, Thermo Fisher Scientific Inc.). The absorbance near the wavenumber 910 $cm^{-1}$ in the obtained FT-IR spectra indicated that the titanium oxide particles where those surfaces were functionalized obtained in Preparation Examples 2 to 6 have Si—C—Nb bonds on the surfaces.

In addition, dispersions where the titanium oxide particles obtained in Preparation Examples 2 to 6 were dispersed in dipropylene glycol monomethyl ether at a content of 5% by mass were prepared, and 99.99% volume cumulated diameters (Dv9999) of the titanium oxide particles in the obtained dispersions were measured by dynamic light scattering method. A dynamic light scattering (DLS) instrument (Malvern Zetasizer Nano S) was used to measure particle diameter by dynamic light scattering method.

These measurement results are shown in Table 1.

TABLE 1

| | Amount of niobium compound (Parts by mass) | Amount of silane compound (Parts by mass) | XRD Average primary particle diameter (nm) | MN/MS | DLS measurement Dv9999 (nm) |
|---|---|---|---|---|---|
| Preparation Example 2 | 5 | 25 | 9.7 | 0.09 | 32.1 |
| Preparation Example 3 | 15 | 15 | 9.7 | 0.15 | 43.3 |
| Preparation Example 4 | 20 | 35 | 9.7 | 0.10 | 31.9 |
| Preparation Example 5 | 40 | 35 | 9.7 | 0.15 | 42.6 |
| Preparation Example 6 | 0 | 35 | 9.7 | 0 | 55.8 |

Example 1 to 9 and Comparative Example 1

In Examples and Comparative Example, the compound 1 obtained in Preparation Example 1 was used as the photopolymerizable compound (A). In Examples and Comparative Example, the titanium oxide particles where those surfaces were functionalized obtained in Preparation Examples 2 to 6 were used. In Examples 6 to 9, tribenzylamine was used as the nitrogen-containing compound (E). In Examples and Comparative Example, following S-1 and S-2 were used as the solvent (S).

S-1: propylene glycol monomethyl ether acetate

S-2: mixed solvent of dipropylene glycol monomethyl ether (HO—$(CH_2CH_2CH_2—O)_2—CH_3$) and tripropylene glycol monomethyl ether ((HO—$(CH(CH_3)CH_2—O)_3—CH_3$) at a mass ratio of 1:1

In Examples 1 to 5 and Comparative Example 1, the photopolymerizable compound (A) in an amount show in Table 2, 75 parts by mass of the titanium oxide particles of type shown in Tables 2 as the metal oxide particles (B), 1 part by mass of bis(2,4,6-trimethylbenzoyl)-phenylphosphineoxide as the initiator (C) were dispersed and dissolved in the solvent (S) of type shown in Table 2 to obtain the composition, so that the solid content was 10% by mass. In Examples 6 to 9, the photopolymerizable compound (A) in an amount show in Table 2, 75 parts by mass of the titanium oxide particles of type shown in Tables 2 as the metal oxide particles (B), 1 part by mass of bis(2,4,6-trimethylbenzoyl)-phenylphosphineoxide as the initiator (C), and 0.5 parts by mass of tribenzylamine as the nitrogen-containing compound (E) were dispersed and dissolved in the solvent (S) of type shown in Table 2 to obtain the composition, so that the solid content was 10% by mass.

Transparency and refractive index of cured product were evaluated according to following method using the obtained compositions. These evaluation results are shown in Table 2.

<Evaluation of Transparency>

The composition was coated onto a glass substrate using a spin coater. Subsequently, a film consisting of the composition was heated for 2 minutes to obtain a coating film having a thickness to form a cured film having a film thickness of 0.3 μm. The coating film obtained was subjected to light exposure using a high-pressure mercury lamp such that the cumulative exposure amount reached 5 J/cm$^2$. Thus, cured film having a film thickness of 0.3 μm was obtained. Measurement of light transmittance of the obtained cured film was carried out with Spectrophotometer (Vista Spectrophotometer, manufactured by Hunter Associates Laboratory, Inc.), and average transmittance in a wavelength range of from 400 to 700 nm is determined. Based on the value of average transmittance, light transmittance was evaluated in accordance with the following criteria.

Very Good: average transmittance is 92% or higher.

Good: average transmittance is 90% or higher and less than 92%.

Poor: average transmittance is less than 90%.

<Measurement of Refractive Index>

First the composition was applied on a silicon wafer using a spin coater to form a coating film consisting of the curable composition. The coating film obtained was subjected to light exposure using a high-pressure mercury lamp such that the cumulative exposure amount reached 5 J/cm$^2$. Thus, cured film was obtained. The refractive index of the obtained cured film was measured with rotating compensator ellipsometer manufactured by J. A. Woollam Japan Corporation, the refractive index of the cured film at wavelength of 520 nm was determined. Based on the value of refractive index, refractive index was evaluated in accordance with the following criteria.

Very Good: Refractive index is 1.97 or higher.

Good: Refractive index is 1.95 or higher and lower than 1.97.

Poor: Refractive index is less than 1.95.

TABLE 2

| | Photopolymerizable compound (A) (Parts by mass) | Metal oxide Particles (B) | Solvent (S) | Evaluation of light transmittance (Average of 400 nm-700 nm) | Evaluation of refractive index (520 nm) |
|---|---|---|---|---|---|
| Example 1 | 23.5 | Preparation Examople 2 | S-1 | Good | Good |
| Example 2 | 23.5 | Preparation Examople 2 | S-2 | Good | Good |
| Example 3 | 23.5 | Preparation Examople 3 | S-2 | Good | Good |

TABLE 2-continued

| | Photopolymerizable compound (A) (Parts by mass) | Metal oxide Particles (B) | Solvent (S) | Evaluation of light transmittance (Average of 400 nm-700 nm) | Evaluation of refractive index (520 nm) |
|---|---|---|---|---|---|
| Example 4 | 23.5 | Preparation Examople 4 | S-2 | Good | Good |
| Example 5 | 23.5 | Preparation Examople 5 | S-2 | Good | Good |
| Example 6 | 23.0 | Preparation Examople 2 | S-2 | Very Good | Very Good |
| Example 7 | 23.0 | Preparation Examople 3 | S-2 | Very Good | Very Good |
| Example 8 | 23.0 | Preparation Examople 4 | S-2 | Very Good | Very Good |
| Example 9 | 23.0 | Preparation Examople 5 | S-2 | Very Good | Very Good |
| Comparative Example 1 | 24.0 | Preparation Examople 6 | S-1 | Poor | Poor |

According to Table 2, it is found that the compositions of Examples 1 to 9 including the metal oxide particles, where those surfaces are functionalized by using the niobium compound which meets predetermined requirements with respect to the first functionalizing agent and the silane compound which meets requirements with respect to the second functionalizing agent in combination, obtained in Preparation Examples 2 to 5 gives the cured product exhibiting both high light transmittance and high refractive index. On the other hand, the composition obtained in Comparative Example 1 including the metal oxide particles (B), where those surfaces are functionalized by using only the silane compound which meets predetermined requirements with respect to the second functionalizing agent and without using the niobium compound which meets predetermined requirements with respect to the first functionalizing agent, obtained in Preparation Example 1 does not gives the cured product exhibiting both high light transmittance and high refractive index.

What is claimed is:

1. A composition comprising a photopolymerizable compound (A) and metal oxide particles (B), wherein the metal oxide particles (B) are composed of a metal oxide comprising a metal oxide that exhibits a refractive index of 2.0 or higher for light at a wavelength of 550 nm, and surfaces of the metal oxide particles (B) are functionalized with a functionalizing agent, wherein the functionalizing agent comprises:

a first functionalizing agent comprising at least one of niobium compounds represented by formula (1):

$$(R^{10}O)_{5-n}Nb(R^{11})_n \quad (1)$$

wherein n is an integer of 0 or more and 4 or less, $R^{10}$ is an alkyl group, and $R^{11}$ is a monovalent organic group bonding to niobium atom via Nb—C bond, and a second functionalizing agent comprising at least one of silane compounds represented by formula (2):

$$(R^{20}O)_{4-x}Si(R^{21}—R^{22})_x \quad (2)$$

wherein, in the formula (2), x is an integer of 1 or more and 3 or less, $R^{20}$ is an alkyl group, $R^{21}$ is a spacer group bonding to silicon atom via Si—C bond, and $R^{22}$ is a hydrogen atom or a monovalent organic group; and wherein the second functionalizing agent is present on at least part of the surfaces of the metal oxide particles, and the first functionalizing agent is present on at least part of the second functionalizing agent and is optionally directly present on portions of the metal oxide surface that remain exposed in regions where the second functionalizing agent is not present.

2. The composition according to claim 1, wherein an average primary particle diameter of the metal oxide particles (B) measured by X-ray diffraction method is 3 nm or more and 20 nm or less.

3. The composition according to claim 1, wherein, in the metal oxide particles (B), a molar ratio (MN/MS) is 0.01 or more and 2.0 or less, wherein MN is a number of moles of niobium atoms derived from the niobium compound represented by the formula (1) and MS is a number of moles of silicon atoms derived from the silane compound represented by the formula (2).

4. The composition according to claim 1, wherein a 99.99% volume cumulated diameter of the metal oxide particles (B) measured by a dynamic light scattering method is smaller than 5 times an average primary particle diameter of the metal oxide particles (B) measured by X-ray diffraction method.

5. The composition according to claim 1, further comprising the initiator (C).

6. The composition according to claim 1, wherein the photopolymerizable compound (A) comprises a compound represented by formula (A1):

$$R^{a01}—X^{a03}—R^{a02}—X^{a01}\text{-}Ph^1\text{-}S\text{-}Ph^2\text{-}X^{a02}—R^{a04}—X^{a04}—R^{a03} \quad (A1)$$

wherein, in the formula (A1), $R^{a01}$ and $R^{a03}$ are each independently a radically polymerizable group-containing group or a cationically polymerizable group-containing group, $R^{a02}$ and $R^{a04}$ are each independently an alkylene group which may be interrupted with one or more oxygen atoms and/or sulfur atoms, $X^{a01}$, $X^{a02}$, $X^{a03}$, and $X^{a04}$ are each independently oxygen atom or sulfur atom, $Ph^1$ and $Ph^2$ are each independently, a phenylene group optionally substituted with an alkyl group having 1 or more and 5 or less carbon atoms, sum of a number of oxygen atoms and/or sulfur atoms included in the alkylene group as $R^{a02}$ and a number of oxygen atoms and/or sulfur atoms included in the alkylene group as $R^{a04}$ is 2 or more, and the compound represented by the formula (A1) does not have the radically polymerizable group-containing group and the cationically polymerizable group-containing group simultaneously.

7. The composition according to claim 6, wherein the radically polymerizable group-containing group is a (meth) acryloyl group, or the cationically polymerizable group-containing group is an epoxy group.

8. The composition according to claim 6, wherein the $R^{a02}$ and the $R^{a04}$ are a divalent group composed of ma saturated aliphatic hydrocarbon groups selected from an alkylene group having 1 or more and 4 or less carbon atoms, an alkanetriyl group having 1 or more and 4 or less carbon atoms, and an alkyl group having 1 or more and 4 or less carbon atoms, and (ma-1) oxygen atoms and/or sulfur atoms bridging the ma saturated aliphatic hydrocarbon groups, and the ma is an integer of 2 or more and 6 or less.

9. The composition according to claim 8, wherein the $R^{a02}$ and the $R^{a04}$ are a divalent group consisting of ma alkylene groups having 1 or more and 4 or less carbon atoms, and (ma-1) oxygen atoms and/or sulfur atoms bridging the ma alkylene groups.

10. The composition according to claim 9, wherein the alkylene group is at least one selected from the group consisting of ethane-1,2-diyl group, propane-1,2-diyl group, and propane-1,3-diyl group.

11. The composition according to claim 6, wherein the $X^{a01}$ bonds to a para position in the $Ph^1$ relative to S bridging the $Ph^1$ and the $Ph^2$, and the $X^{a02}$ bonds to a para position in the $Ph^2$ relative to S bridging the $Ph^1$ and the $Ph^2$.

12. The composition according to claim 1 comprising a solvent(S), wherein the solvent(S) comprises a high boiling point-solvent (S1) having a boiling point of 170° C. or higher at atmospheric pressure.

13. A cured product of the composition according to claim 1.

14. The composition according to claim 1, wherein the photopolymerizable compound (A) and the metal oxide particles (B) are present in an amount of 23.5 parts and 75 parts by mass, respectively.

15. The composition according to claim 1, wherein the photopolymerizable compound (A) and the metal oxide particles (B) are present in an amount of 23.0 parts and 75 parts by mass, respectively.

16. The composition according to claim 1, further comprising a nitrogen-containing compound (E), wherein the nitrogen-containing compound (EE) comprises tribenzylamine.

* * * * *